US012720082B2

(12) United States Patent
Kim et al.

(10) Patent No.: US 12,720,082 B2
(45) Date of Patent: Aug. 25, 2026

(54) METHOD, DEVICE AND RECORDING MEDIUM FOR IMAGE ENCODING/DECODING

(71) Applicant: Electronics and Telecommunications Research Institute, Daejeon (KR)

(72) Inventors: Dong Hyun Kim, Daejeon (KR); Hyoung Jin Kwon, Daejeon (KR); Jong Ho Kim, Daejeon (KR); Sung Chang Lim, Daejeon (KR); Woong Lim, Daejeon (KR); Jin Soo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/856,574

(22) PCT Filed: Apr. 11, 2023

(86) PCT No.: PCT/KR2023/004882

§ 371 (c)(1),
(2) Date: Oct. 11, 2024

(87) PCT Pub. No.: WO2023/200228

PCT Pub. Date: Oct. 19, 2023

(65) Prior Publication Data

US 2025/0267291 A1 Aug. 21, 2025

(30) Foreign Application Priority Data

Apr. 12, 2022 (KR) ........................ 10-2022-0045423
May 10, 2022 (KR) ........................ 10-2022-0057077

(51) Int. Cl.
*H04N 19/176* (2014.01)
*G06V 10/50* (2022.01)
(Continued)

(52) U.S. Cl.
CPC ........... *H04N 19/176* (2014.11); *G06V 10/50* (2022.01); *H04N 19/11* (2014.11); *H04N 19/159* (2014.11)

(58) Field of Classification Search
None
See application file for complete search history.

(56) References Cited

U.S. PATENT DOCUMENTS 10,045,048 B2 * 8/2018 Nam ...................... H04N 19/52
11,336,901 B2 5/2022 Lee et al.
(Continued)

FOREIGN PATENT DOCUMENTS

KR 10-2018-0005119 A 1/2018
KR 10-2018-0005121 A 1/2018
(Continued)

OTHER PUBLICATIONS

International Search Report for PCT/KR2023/004882 by Korean Intellectual Property Office dated Aug. 7, 2023.

*Primary Examiner* — Talha M Nawaz
(74) *Attorney, Agent, or Firm* — BROADVIEW IP LAW, PC

(57) ABSTRACT

An image decoding method according to one embodiment of the present disclosure comprises the steps of: generating a first prediction block for the current block; generating a second prediction block for the current block or a sub-block within the current block; and generating a final prediction block of the current block or the sub-block through the weighted sum of the first prediction block and the second prediction block. Here, the prediction information used for generating the first prediction block can differ from the prediction information used for generating the second prediction block.

15 Claims, 33 Drawing Sheets

(51) Int. Cl.
*H04N 19/11* (2014.01)
*H04N 19/159* (2014.01)

(56) References Cited

U.S. PATENT DOCUMENTS

| | | | | |
|---|---|---|---|---|
| 11,343,528 | B2 | 5/2022 | Mukherjee et al. | |
| 11,375,185 | B2 | 6/2022 | Lee et al. | |
| 11,924,410 | B2 * | 3/2024 | Huang | H04N 19/70 |
| 12,160,567 | B2 * | 12/2024 | Li | H04N 19/54 |
| 2021/0235072 | A1 * | 7/2021 | Ko | H04N 19/105 |
| 2022/0248026 | A1 * | 8/2022 | Lee | H04N 19/105 |
| 2024/0129528 | A1 * | 4/2024 | Lim | H04N 19/96 |
| 2024/0305775 | A1 * | 9/2024 | Ko | H04N 19/105 |
| 2025/0203100 | A1 * | 6/2025 | Paluri | H04N 19/46 |

FOREIGN PATENT DOCUMENTS

| | | | |
|---|---|---|---|
| KR | 10-2018-0061042 | A | 6/2018 |
| KR | 10-2019-0056332 | A | 5/2019 |
| KR | 10-2019-0142749 | A | 12/2019 |

* cited by examiner

Diagonal scanning

Horizontal scanning

FIG. 27

| Priority | Condition | Deblocking filter strength | | |
|---|---|---|---|---|
| | | Y Channel | U Channel | V Channel |
| 7 | multi-prediction block method is performed in current block | 1 | 1 | 1 |
| 6 | At least one of the adjacent blocks is coded with intra or CIIP mode | 2 | 2 | 2 |
| 5 | At least one of the adjacent blocks has non-zero transform coefficients | 1 | 1 | 1 |
| 4 | One of the adjacent blocks is coded in IBC prediction mode and the other is coded in inter prediction mode | 1 | 1 | 1 |
| 3 | Absolute difference between the motion vectors that belong the adjacent blocks is greater than or equal to one half luma sample | 1 | 0 | 0 |
| 2 | Reference pictures the two adjacent blocks refers to are different | 1 | 0 | 0 |
| 1 | Otherwise | 0 | 0 | 0 |

FIG. 28

| Priority | Condition | Deblocking filter strength | | |
|---|---|---|---|---|
| | | Y Channel | U Channel | V Channel |
| 7 | multi-prediction block method is performed in current block | 1 | 0 | 0 |
| 6 | At least one of the adjacent blocks is coded with intra or CIIP mode | 2 | 2 | 2 |
| 5 | At least one of the adjacent blocks has non-zero transform coefficients | 1 | 1 | 1 |
| 4 | One of the adjacent blocks is coded in IBC prediction mode and the other is coded in inter prediction mode | 1 | 1 | 1 |
| 3 | Absolute difference between the motion vectors that belong the adjacent blocks is greater than or equal to one half luma sample | 1 | 0 | 0 |
| 2 | Reference pictures the two adjacent blocks refers to are different | 1 | 0 | 0 |
| 1 | Otherwise | 0 | 0 | 0 |

FIG. 32
Current block
Sub-block/Surrounding block
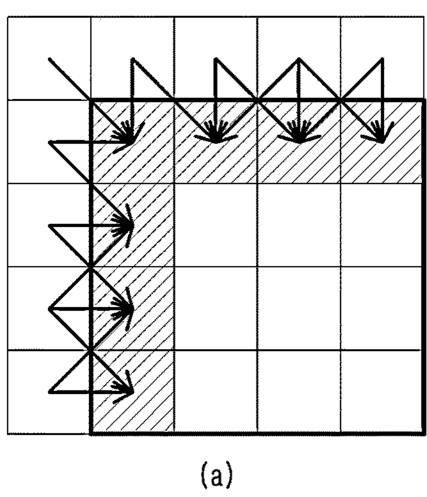
(a)
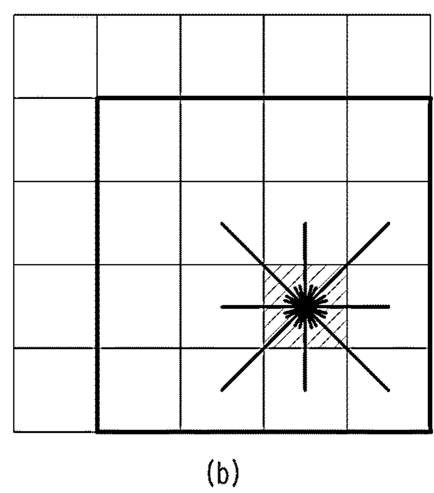
(b)
FIG. 33
Current block
Sub-block/Surrounding block
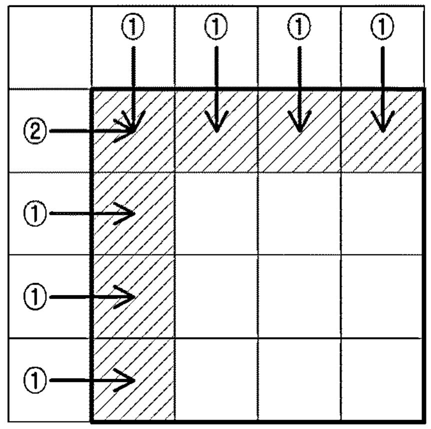
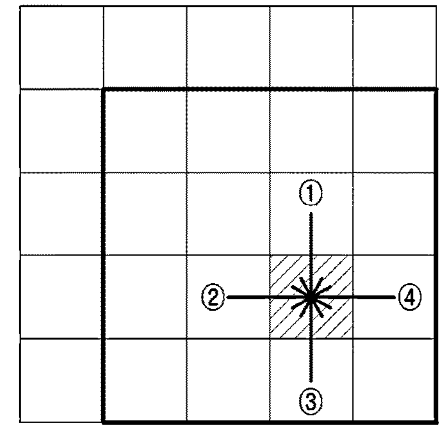

FIG. 34
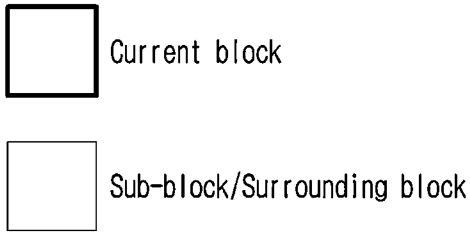
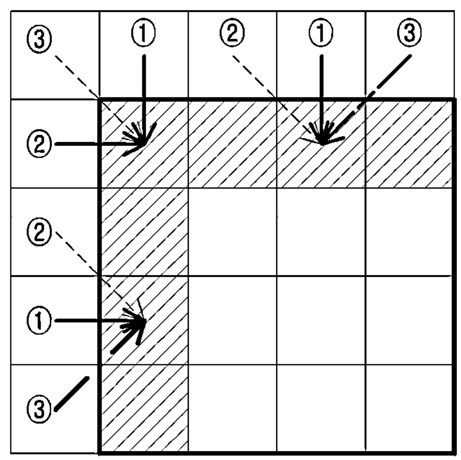
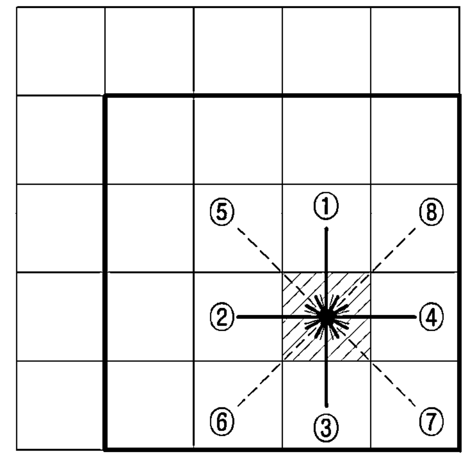

FIG. 36

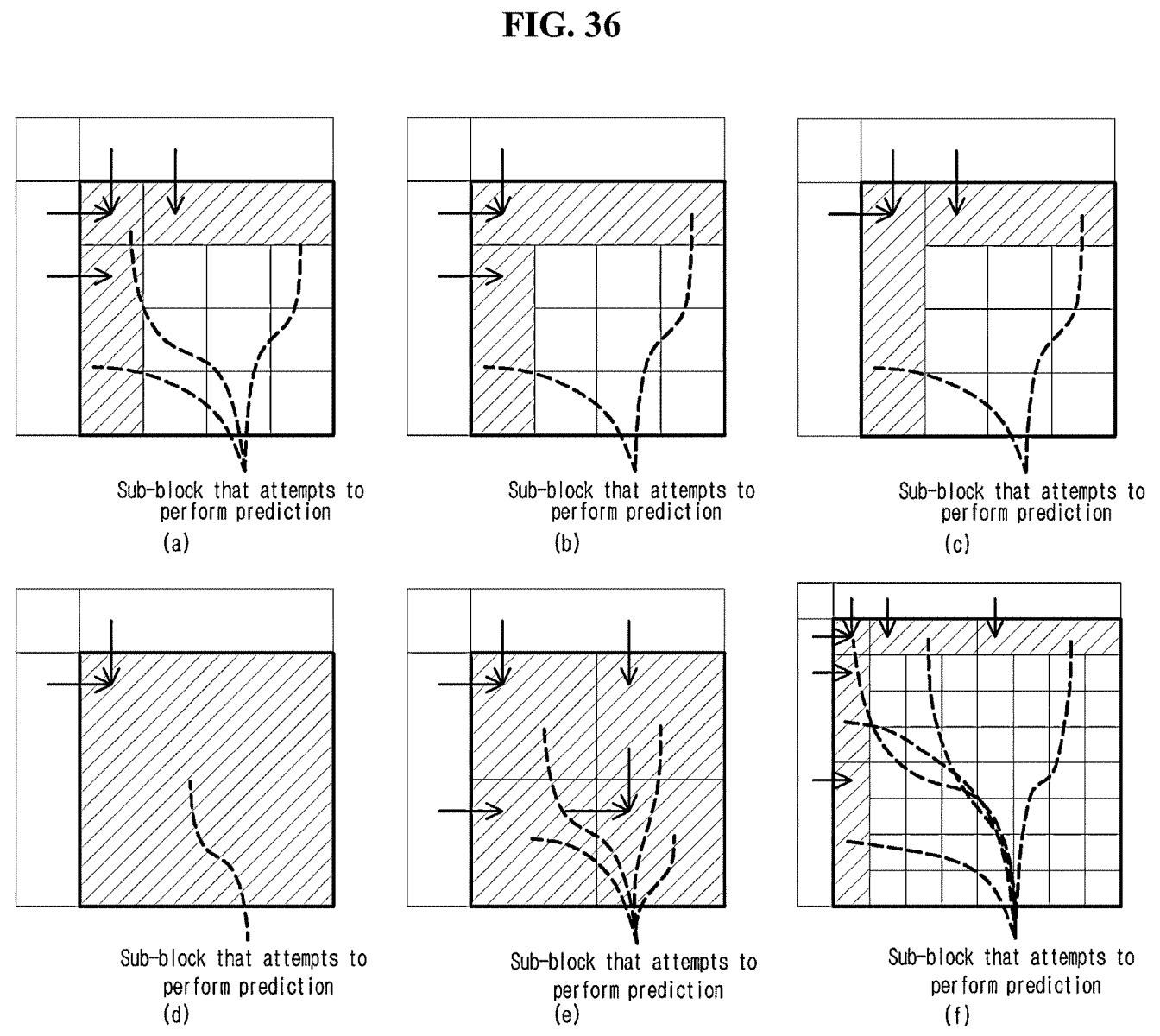

Sub-block that attempts to perform prediction
(a)

Sub-block that attempts to perform prediction
(b)

Sub-block that attempts to perform prediction
(c)

Sub-block that attempts to perform prediction
(d)

Sub-block that attempts to perform prediction
(e)

Sub-block that attempts to perform prediction
(f)

Current block

Sub-block/Surrounding block

| 1/32 | 1/32 | 1/32 | 1/32 |
|---|---|---|---|
| 1/32 | 1/64 | 1/64 | 1/64 |
| 1/32 | 1/64 | 1/128 | 1/128 |
| 1/32 | 1/64 | 1/128 | 1/256 |

| 1/4 | 1/4 | 1/4 | 1/4 |
|---|---|---|---|
| 1/8 | 1/8 | 1/8 | 1/8 |
| 1/16 | 1/16 | 1/16 | 1/16 |
| 1/32 | 1/32 | 1/32 | 1/32 |

| 1/32 | 1/32 | 1/32 | 1/32 |
|---|---|---|---|
| 1/64 | 1/64 | 1/64 | 1/32 |
| 1/128 | 1/128 | 1/64 | 1/32 |
| 1/256 | 1/128 | 1/64 | 1/32 |

| 1/4 | 1/8 | 1/16 | 1/32 |
|---|---|---|---|
| 1/4 | 1/8 | 1/16 | 1/32 |
| 1/4 | 1/8 | 1/16 | 1/32 |
| 1/4 | 1/8 | 1/16 | 1/32 |

| 1/32 | 1/16 | 1/8 | 1/4 |
|---|---|---|---|
| 1/32 | 1/16 | 1/8 | 1/4 |
| 1/32 | 1/16 | 1/8 | 1/4 |
| 1/32 | 1/16 | 1/8 | 1/4 |

| 1/32 | 1/64 | 1/128 | 1/256 |
|---|---|---|---|
| 1/32 | 1/64 | 1/128 | 1/128 |
| 1/32 | 1/64 | 1/64 | 1/64 |
| 1/32 | 1/32 | 1/32 | 1/32 |

| 1/32 | 1/32 | 1/32 | 1/32 |
|---|---|---|---|
| 1/16 | 1/16 | 1/16 | 1/16 |
| 1/8 | 1/8 | 1/8 | 1/8 |
| 1/4 | 1/4 | 1/4 | 1/4 |

| 1/256 | 1/128 | 1/64 | 1/32 |
|---|---|---|---|
| 1/128 | 1/128 | 1/64 | 1/32 |
| 1/64 | 1/64 | 1/64 | 1/32 |
| 1/32 | 1/32 | 1/32 | 1/32 |

FIG. 40

| prediction_unit( x0, y0, nPbW, nPbH ) { | Descriptor |
| --- | --- |
| } else { | |
| if( slice_type = = B ) | |
| inter_pred_idc[ x0 ][ y0 ] | ae(v) |
| if( inter_pred_idc[ x0 ][ y0 ] != PRED_L1 ) { | |
| if( num_ref_idx_l0_active_minus1 > 0 ) | |
| ref_idx_l0[ x0 ][ y0 ] | ae(v) |
| mvd_coding( x0, y0, 0 ) | |
| mvp_l0_flag[ x0 ][ y0 ] | ae(v) |
| wf_l0[ x0 ][ y0 ] | ae(v) |
| offset_l0[ x0 ][ y0 ] | ae(v) |
| } | |
| if( inter_pred_idc[ x0 ][ y0 ] != PRED_L0 ) { | |
| if( num_ref_idx_l1_active_minus1 > 0 ) | |
| ref_idx_l1[ x0 ][ y0 ] | ae(v) |
| if( mvd_l1_zero_flag && inter_pred_idc[ x0 ][ y0 ] = = PRED_BI ) { | |
| MvdL1[ x0 ][ y0 ][ 0 ] = 0 | |
| MvdL1[ x0 ][ y0 ][ 1 ] = 0 | |
| } else | |
| mvd_coding( x0, y0, 1 ) | |
| mvp_l1_flag[ x0 ][ y0 ] | ae(v) |
| wf_l1[ x0 ][ y0 ] | ae(v) |
| offset_l1[ x0 ][ y0 ] | ae(v) |
| } | |
| if( inter_pred_idc[ x0 ][ y0 ] != PRED_BI && inter_pred_idc[ x0 ][ y0 ] != PRED_L0 && inter_pred_idc[ x0 ][ y0 ] != PRED_L1) { | |
| if( num_ref_idx_l2_active_minus1 > 0 ) | |
| ref_idx_l2[ x0 ][ y0 ] | ae(v) |
| mvd_coding( x0, y0, 0 ) | |
| mvp_l2_flag[ x0 ][ y0 ] | ae(v) |
| wf_l2[ x0 ][ y0 ] | ae(v) |
| offset_l2[ x0 ][ y0 ] | ae(v) |
| } | |
| if( inter_pred_idc[ x0 ][ y0 ] != PRED_BI && inter_pred_idc[ x0 ][ y0 ] != PRED_L0 && inter_pred_idc[ x0 ][ y0 ] != PRED_L1 && inter_pred_idc[ x0 ][ y0 ] != PRED_TRI) { | |
| if( num_ref_idx_l3_active_minus1 > 0 ) | |
| ref_idx_l3[ x0 ][ y0 ] | ae(v) |
| mvd_coding( x0, y0, 0 ) | |
| mvp_l3_flag[ x0 ][ y0 ] | ae(v) |
| wf_l3[ x0 ][ y0 ]] | ae(v) |
| offset_l3[ x0 ][ y0 ] | ae(v) |
| } | |
| } | |

FIG. 41

| coding_unit( x0, y0, log2CbSize ) { | Descriptor |
|---|---|
| ... | |
| if( slice_type != I ) | |
| cu_skip_flag[ x0 ][ y0 ] | ae(v) |
| nCbS = ( 1 << log2CbSize ) | |
| if( cu_skip_flag[ x0 ][ y0 ] ) | |
| prediction_unit( x0, y0, nCbS, nCbS ) | |
| ... | |

| prediction_unit( x0, y0, nPbW, nPbH ) { | Descriptor |
|---|---|
| if( cu_skip_flag[ x0 ][ y0 ] ) { | |
| if( MaxNumMergeCand > 1 ) | |
| merge_idx[ x0 ][ y0 ] | ae(v) |
| } else { /* MODE_INTER */ | |
| merge_flag[ x0 ][ y0 ] | ae(v) |
| if( merge_flag[ x0 ][ y0 ] ) { | |
| if( MaxNumMergeCand > 1 ) | |
| merge_idx[ x0 ][ y0 ] | ae(v) |
| if( slice_type = = B ) | |
| inter_pred_idc[ x0 ][ y0 ] | ae(v) |
| if( inter_pred_idc[ x0 ][ y0 ] != PRED_L1 ) { | |
| wf_l0[ x0 ][ y0 ] | ae(v) |
| offset_l0[ x0 ][ y0 ] | ae(v) |
| } | |
| if( inter_pred_idc[ x0 ][ y0 ] != PRED_L0 ) { | |
| wf_l1[ x0 ][ y0 ] | ae(v) |
| offset_l1[ x0 ][ y0 ] | ae(v) |
| } | |
| if( inter_pred_idc[ x0 ][ y0 ] != PRED_BI && inter_pred_idc[ x0 ][ y0 ] != PRED_L0 && inter_pred_idc[ x0 ][ y0 ] != PRED_L1) { | |
| wf_l2[ x0 ][ y0 ] | ae(v) |
| offset_l2[ x0 ][ y0 ] | ae(v) |
| } | |
| if( inter_pred_idc[ x0 ][ y0 ] != PRED_BI && inter_pred_idc[ x0 ][ y0 ] != PRED_L0 && inter_pred_idc[ x0 ][ y0 ] != PRED_L1 && inter_pred_idc[ x0 ][ y0 ] != PRED_TRI) { | |
| wf_l3[ x0 ][ y0 ]] | ae(v) |
| offset_l3[ x0 ][ y0 ] | ae(v) |
| } | |
| } ... | |

FIG. 42

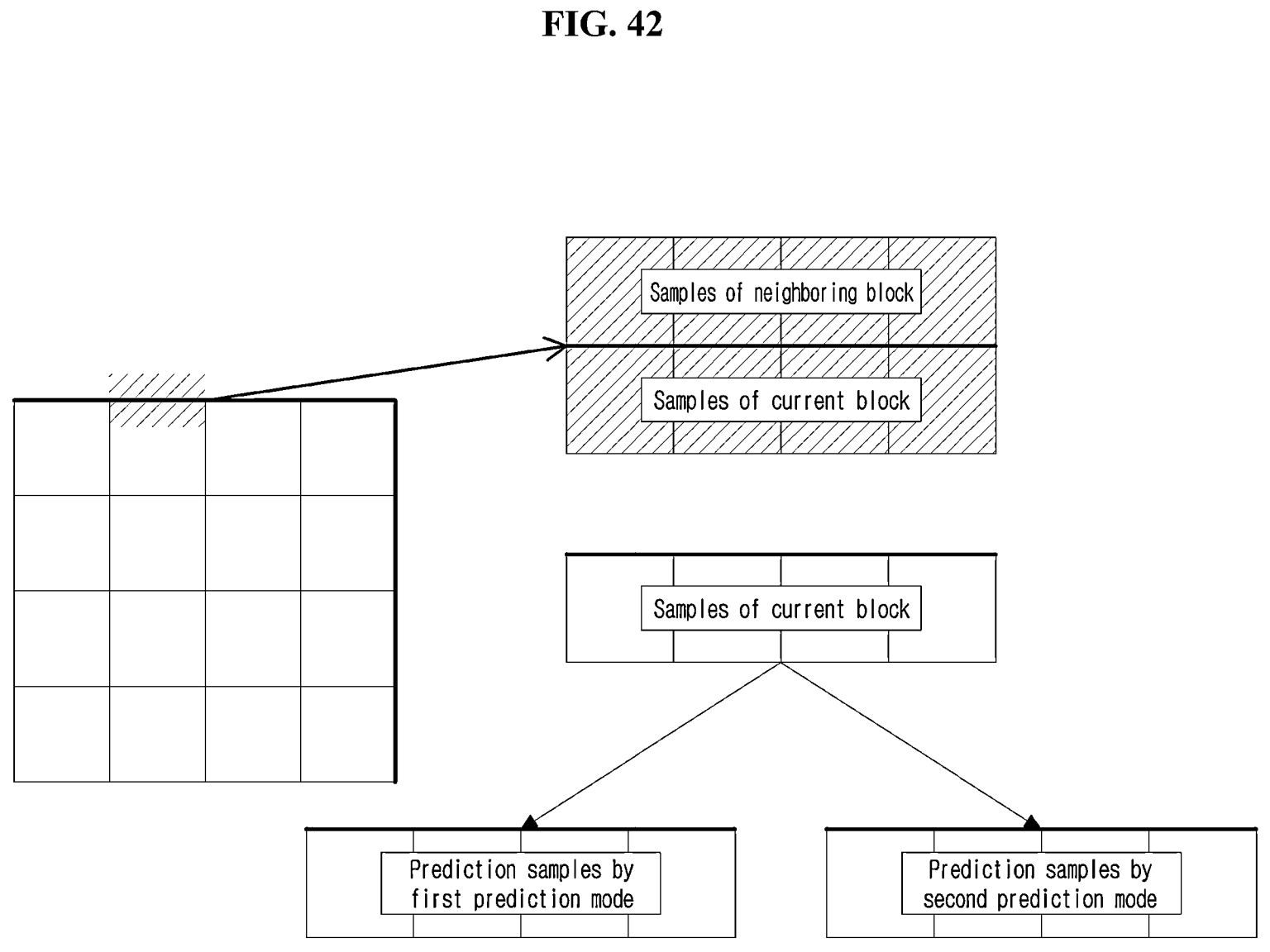

Samples of neighboring block

Samples of current block

Samples of current block

Prediction samples by first prediction mode

Prediction samples by second prediction mode

METHOD, DEVICE AND RECORDING MEDIUM FOR IMAGE ENCODING/DECODING

CROSS-REFERENCE TO RELATED APPLICATIONS

This application is a National Phase Entry Application of PCT Application No. PCT/KR2023/004882 filed on Apr. 11, 2023, which claims priority to Korean Patent Application No. 10-2022-0045423 filed on Apr. 12, 2022, and No. 10-2022-0057077 filed on May 10, 2022, in the Korean Intellectual Property Office, the entire contents of which are hereby incorporated by reference in its entirety.

TECHNICAL FIELD

The present disclosure relates generally to a method, an apparatus and a storage medium for image encoding/decoding. More particularly, the present disclosure

DESCRIPTION OF THE RELATED ART

With the continuous development of the information and communication industries, broadcasting services supporting High-Definition (HD) resolution have been popularized all over the world. Through this popularization, a large number of users have become accustomed to high-resolution and high-definition images and/or video.

To satisfy users' demand for high definition, many institutions have accelerated the development of next-generation imaging devices. Users' interest in UHD TVs, having resolution that is more than four times as high as that of Full HD (FHD) TVs, as well as High-Definition TVs (HDTV) and FHD TVs, has increased. As interest therein has increased, image encoding/decoding technology for images having higher resolution and higher definition is currently required.

As image compression technology, there are various technologies, such as inter-prediction technology, intra-prediction technology, transform, quantization technology, filtering technology and entropy coding technology.

Inter-prediction technology is technology for predicting the value of a pixel included in a current picture using a picture previous to and/or a picture subsequent to the current picture. Intra-prediction technology is technology for predicting the value of a pixel included in a current picture using information about pixels in the current picture. Transform and quantization technology may be technology for compressing the energy of a residual signal. The entropy coding technology is technology for assigning a short codeword to a frequently occurring value and assigning a long codeword to a less frequently occurring value.

By utilizing this image compression technology, data about images may be effectively compressed, transmitted, and stored.

DISCLOSURE

Technical Problem

The purpose of the present disclosure is to provide a method for acquiring a plurality of prediction blocks through multi-prediction and acquiring a final prediction block based thereon and a device therefor.

The purpose of the present disclosure is to provide a method for deriving prediction information for multi-prediction from a surrounding block and a device for performing it.

The purpose of the present disclosure is to provide a method for adaptively determining at least one of a weighted sum operation application region or a weight for a plurality of prediction blocks and a method for performing it.

Technical Solution

An image decoding method according to an embodiment of the present disclosure includes generating a first prediction block for a current block; generating a second prediction block for the current block or a sub-block within the current block; and generating a final prediction block of the sub-block or the current block through a weighted sum of the first prediction block and the second prediction block. In this case, prediction information used to generate the first prediction block may be different from prediction information used to generate the second prediction block.

An image encoding method according to an embodiment of the present disclosure includes generating a first prediction block for a current block; generating a second prediction block for the current block or a sub-block within the current block; and generating a final prediction block of the sub-block or the current block through a weighted sum of the first prediction block and the second prediction block. In this case, prediction information used to generate the first prediction block may be different from prediction information used to generate the second prediction block.

In an image encoding/decoding method according to an embodiment of the present disclosure, the second prediction block may be acquired based on prediction information of a surrounding block which is positioned outside the current block and is adjacent to the sub-block.

In an image encoding/decoding method according to an embodiment of the present disclosure, when a difference between the maximum value and the minimum value of prediction samples within the first prediction block is smaller than a threshold value, it may be allowed to generate the second prediction block.

In an image encoding/decoding method according to an embodiment of the present disclosure, the number of main gradients may be determined from a gradient histogram generated based on a gradient of each prediction sample in the first prediction block, and when the number of the main gradients is smaller than a threshold value, it may be allowed to generate the second prediction block.

In an image encoding/decoding method according to an embodiment of the present disclosure, the first prediction block may be generated based on a first intra prediction mode and the second prediction block may be generated based on a second intra prediction mode different from the first intra prediction mode.

In an image encoding/decoding method according to an embodiment of the present disclosure, the second intra prediction mode may be used to decode a surrounding block adjacent to the sub-block.

In an image encoding/decoding method according to an embodiment of the present disclosure, when a plurality of prediction blocks excluding the first prediction block are additionally generated, a weighted sum operation may be sequentially performed for the plurality of prediction blocks.

In an image encoding/decoding method according to an embodiment of the present disclosure, the order of performing the weighted sum operation for the plurality of prediction blocks may be determined based on a priority of surrounding blocks from which prediction information for each of the plurality of prediction blocks is derived.

In an image encoding/decoding method according to an embodiment of the present disclosure, the order of performing the weighted sum operation for the plurality of prediction blocks may be determined according to a prediction mode for each of the plurality of prediction blocks.

In an image encoding/decoding method according to an embodiment of the present disclosure, a weight applied to the first prediction block and the second prediction block may be determined by comparing a first matching cost obtained by applying first prediction information for the first prediction block to a surrounding template of the sub-block and a second matching cost obtained by applying second prediction information for the second prediction block to the template.

In an image encoding/decoding method according to an embodiment of the present disclosure, the weight may be determined by additionally considering a third matching cost obtained by performing a weighted sum for the first matching cost and the second matching cost.

In an image encoding/decoding method according to an embodiment of the present disclosure, the first matching cost and the second matching cost may be obtained by using subsampled positions within the template.

In an image encoding/decoding method according to an embodiment of the present disclosure, an additional prediction block may be obtained only for sub-blocks bordering a boundary within the current block.

In the present disclosure, a recording medium storing a bitstream generated by an image encoding method may be provided.

Technical Effect

According to the present disclosure, prediction accuracy may be improved by obtaining a plurality of prediction blocks through multi-prediction and obtaining a final prediction block based thereon.

According to the present disclosure, by using a surrounding block, prediction information for multi-prediction may be derived without increasing the number of signaled bits.

According to the present disclosure, prediction accuracy may be improved by adaptively determining at least one of a weight or a weighted sum operation application region for a plurality of prediction blocks.

DESCRIPTION OF DIAGRAMS

FIGS. 27 and 28 illustrate conditions under which the strength of a deblocking filter is determined.

FIG. 32 illustrates a surrounding block referred to for deriving motion information of a sub-block.

FIGS. 33 and 34 illustrate the reference order of surrounding blocks.

FIG. 36 illustrates a sub-block group within a current block.

FIGS. 40 and 41 show syntax elements for multi-prediction including a weight and an offset.

FIG. 42 shows surrounding samples and samples within a current block used to calculate similarity.

MODE FOR INVENTION

Figure 1:
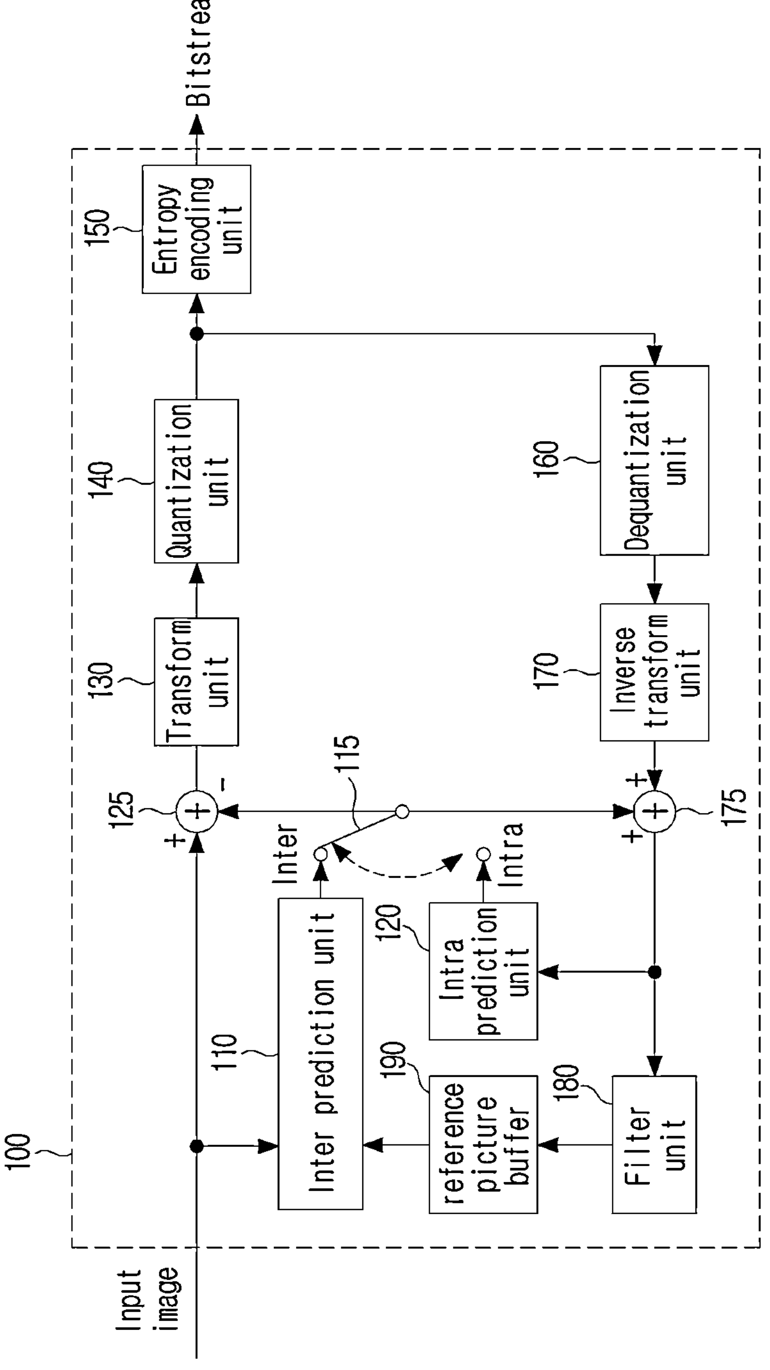
FIG. 1 is a block diagram illustrating the configuration of an embodiment of an encoding apparatus to which the present disclosure is applied.

The present invention may be variously changed, and may have various embodiments, and specific embodiments will be described in detail below with reference to the attached drawings. However, it should be understood that those embodiments are not intended to limit the present invention to specific disclosure forms, and that they include all changes, equivalents or modifications included in the spirit and scope of the present invention.

Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that the various embodiments are different from each other, but do not need to be mutually exclusive of each other. For example, specific shapes, structures, and characteristics described here may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

Terms such as "first" and "second" may be used to describe various components, but the components are not restricted by the terms. The terms are used only to distinguish one component from another component. For example, a first component may be named a second component without departing from the scope of the present specification. Likewise, a second component may be named a first component. The terms "and/or" may include combinations of a plurality of related described items or any of a plurality of related described items.

It will be understood that when a component is referred to as being "connected" or "coupled" to another component, the two components may be directly connected or coupled to each other, or intervening components may be present between the two components. On the other hand, it will be understood that when a component is referred to as being "directly connected or coupled", no intervening components are present between the two components.

Also, components described in the embodiments are independently shown in order to indicate different characteristic functions, but this does not mean that each of the components is formed of a separate piece of hardware or software. That is, the components are arranged and included separately for convenience of description. For example, at least two of the components may be integrated into a single component. Conversely, one component may be divided into multiple components. An embodiment into which the components are integrated or an embodiment in which some components are separated is included in the scope of the present specification as long as it does not depart from the essence of the present specification.

The terms used in the embodiment are merely used to describe specific embodiments and are not intended to limit the present invention. A singular expression includes a plural expression unless a description to the contrary is specifically pointed out in context. In the embodiments, it should be understood that the terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added. That is, in the embodiments, an expression describing that a component "comprises" a specific component means that additional components may be included within the scope of the practice of the present invention or the technical spirit of the present invention, but does not preclude the presence of components other than the specific component.

In the embodiments, a term "at least one" may mean one of one or more numbers, such as 1, 2, 3, and 4. In the embodiments, a term "a plurality of" may mean one of two or more numbers, such as 2, 3 and 4.

Some components of the embodiments are not essential components for performing essential functions, but may be optional components for improving only performance. The embodiments may be implemented using only essential components for implementing the essence of the embodiments. For example, a structure including only essential components, excluding optional components used only to improve performance, is also included in the scope of the embodiments.

Embodiments will be described in detail below with reference to the accompanying drawings so that those having ordinary knowledge in the technical field to which the embodiments pertain can easily practice the embodiments. In the following description of the embodiments, detailed descriptions of known functions or configurations which are deemed to make the gist of the present specification obscure will be omitted. Further, the same reference numerals are used to designate the same components throughout the drawings, and repeated descriptions of the same components will be omitted.

Hereinafter, "image" may mean a single picture constituting a video, or may mean the video itself. For example, "encoding and/or decoding of an image" may mean "encoding and/or decoding of a video", and may also mean "encoding and/or decoding of any one of images constituting the video".

Hereinafter, the terms "video" and "motion picture" may be used to have the same meaning, and may be used interchangeably with each other.

Hereinafter, a target image may be an encoding target image, which is the target to be encoded, and/or a decoding target image, which is the target to be decoded. Further, the target image may be an input image that is input to an encoding apparatus or an input image that is input to a decoding apparatus. And, a target image may be a current image, that is, the target to be currently encoded and/or decoded. For example, the terms "target image" and "current image" may be used to have the same meaning, and may be used interchangeably with each other.

Hereinafter, the terms "image", "picture", "frame", and "screen" may be used to have the same meaning and may be used interchangeably with each other.

Hereinafter, a target block may be an encoding target block, i.e. the target to be encoded and/or a decoding target block, i.e. the target to be decoded. Further, the target block may be a current block, i.e. the target to be currently encoded and/or decoded. Here, the terms "target block" and "current block" may be used to have the same meaning, and may be used interchangeably with each other. A current block may denote an encoding target block, which is the target of encoding, during encoding and/or a decoding target block, which is the target of decoding, during decoding. Also, the current block may be at least one of a coding block, a prediction block, a residual block, and a transform block.

Hereinafter, the terms "block" and "unit" may be used to have the same meaning, and may be used interchangeably with each other. Alternatively, "block" may denote a specific unit.

Hereinafter, the terms "region" and "segment" may be used interchangeably with each other.

In the following embodiments, specific information, data, a flag, an index, an element, and an attribute may have their respective values. A value of "0" corresponding to each of the information, data, flag, index, element, and attribute may indicate a false, a logical false or a first predefined value. In other words, the value of "0", a false, logical false, and a first predefined value may be used interchangeably with each other. A value of "1" corresponding to each of the information, data, flag, index, element, and attribute may indicate a true, a logical true or a second predefined value. In other words, the value of "1", true, logical true, and a second predefined value may be used interchangeably with each other.

When a variable such as i or j is used to indicate a row, a column, or an index, the value of i may be an integer of 0 or more or an integer of 1 or more. In other words, in the embodiments, each of a row, a column, and an index may be counted from 0 or may be counted from 1.

In embodiments, the term "one or more" or the term "at least one" may mean the term "plural". The term "one or more" or the term "at least one" may be used interchangeably with "plural".

Below, the terms to be used in embodiments will be described.

Encoder: An encoder denotes a device for performing encoding. That is, an encoder may mean an encoding apparatus.

Decoder: A decoder denotes a device for performing decoding. That is, a decoder may mean a decoding apparatus.

Unit: A unit may denote the unit of image encoding and decoding. The terms "unit" and "block" may be used to have the same meaning, and may be used interchangeably with each other.

- A unit may be an M×N array of samples. Each of M and N may be a positive integer. A unit may typically mean an array of samples in the form of two-dimensions.
- In the encoding and decoding of an image, "unit" may be an area generated by the partitioning of one image. In other words, "unit" may be a region specified in one image. A single image may be partitioned into multiple units. Alternatively, one image may be partitioned into sub-parts, and the unit may denote each partitioned sub-part when encoding or decoding is performed on the partitioned sub-part.
- In the encoding and decoding of an image, predefined processing may be performed on each unit depending on the type of the unit.
- Depending on functions, the unit types may be classified into a macro unit, a Coding Unit (CU), a Prediction Unit (PU), a residual unit, a Transform Unit (TU), etc. Alternatively, depending on functions, the unit may denote a block, a macroblock, a coding tree unit, a coding tree block, a coding unit, a coding block, a prediction unit, a prediction block, a residual unit, a residual block, a transform unit, a transform block, etc. For example, a target unit, which is the target of encoding and/or decoding, may be at least one of a CU, a PU, a residual unit, and a TU.
- The term "unit" may mean information including a luminance (luma) component block, a chrominance (chroma) component block corresponding thereto, and syntax elements for respective blocks so that the unit is designated to be distinguished from a block.
- The size and shape of a unit may be variously implemented. Further, a unit may have any of various sizes and shapes. In particular, the shapes of the unit may include not only a square, but also a geometric figure that can be represented in two dimensions (2D), such as a rectangle, a trapezoid, a triangle, and a pentagon.
- Further, unit information may include one or more of the type of a unit, the size of a unit, the depth of a unit, the order of encoding of a unit and the order of decoding of a unit, etc. For example, the type of a unit may indicate one of a CU, a PU, a residual unit and a TU.
- One unit may be partitioned into sub-units, each having a smaller size than that of the relevant unit.

Depth: A depth may mean an extent to which the unit is partitioned. Further, the depth of the unit may indicate the level at which the corresponding unit is present when unit(s) are represented by a tree structure.

- Unit partition information may include a depth indicating the depth of a unit. A depth may indicate the number of times the unit is partitioned and/or the degree to which the unit is partitioned.
- In a tree structure, it may be considered that the depth of a root node is the smallest, and the depth of a leaf node is the largest. The root node may be the highest (top) node. The leaf node may be a lowest node.
- A single unit may be hierarchically partitioned into multiple sub-units while having depth information based on a tree structure. In other words, the unit and sub-units, generated by partitioning the unit, may correspond to a node and child nodes of the node, respectively. Each of the partitioned sub-units may have a unit depth. Since the depth indicates the number of times the unit is partitioned and/or the degree to which the unit is partitioned, the partition information of the sub-units may include information about the sizes of the sub-units.
- In a tree structure, the top node may correspond to the initial node before partitioning. The top node may be referred to as a "root node". Further, the root node may have a minimum depth value. Here, the top node may have a depth of level '0'.
- A node having a depth of level '1' may denote a unit generated when the initial unit is partitioned once. A node having a depth of level '2' may denote a unit generated when the initial unit is partitioned twice.
- A leaf node having a depth of level 'n' may denote a unit generated when the initial unit has been partitioned n times.

The leaf node may be a bottom node, which cannot be partitioned any further. The depth of the leaf node may be the maximum level. For example, a predefined value for the maximum level may be 3.

A QT depth may denote a depth for a quad-partitioning. A BT depth may denote a depth for a binary-partitioning. A TT depth may denote a depth for a ternary-partitioning.

Sample: A sample may be a base unit constituting a block. A sample may be represented by values from 0 to $2^{Bd}-1$ depending on the bit depth (Bd).

A sample may be a pixel or a pixel value.

Hereinafter, the terms "pixel" and "sample" may be used to have the same meaning, and may be used interchangeably with each other.

A Coding Tree Unit (CTU): A CTU may be composed of a single luma component (Y) coding tree block and two chroma component (Cb, Cr) coding tree blocks related to the luma component coding tree block. Further, a CTU may mean information including the above blocks and a syntax element for each of the blocks.

Each coding tree unit (CTU) may be partitioned using one or more partitioning methods, such as a quad tree (QT), a binary tree (BT), and a ternary tree (TT) so as to configure sub-units, such as a coding unit, a prediction unit, and a transform unit. A quad tree may mean a quarternary tree. Further, each coding tree unit may be partitioned using a multitype tree (MTT) using one or more partitioning methods.

"CTU" may be used as a term designating a pixel block, which is a processing unit in an image-decoding and encoding process, as in the case of partitioning of an input image.

Coding Tree Block (CTB): "CTB" may be used as a term designating any one of a Y coding tree block, a Cb coding tree block, and a Cr coding tree block.

Neighbor block: A neighbor block (or neighboring block) may mean a block adjacent to a target block. A neighbor block may mean a reconstructed neighbor block.

Hereinafter, the terms "neighbor block" and "adjacent block" may be used to have the same meaning and may be used interchangeably with each other.

A neighbor block may mean a reconstructed neighbor block.

Spatial neighbor block; A spatial neighbor block may a block spatially adjacent to a target block. A neighbor block may include a spatial neighbor block.

The target block and the spatial neighbor block may be included in a target picture.

The spatial neighbor block may mean a block, the boundary of which is in contact with the target block, or a block located within a predetermined distance from the target block.

The spatial neighbor block may mean a block adjacent to the vertex of the target block. Here, the block adjacent to the vertex of the target block may mean a block vertically adjacent to a neighbor block which is horizontally adjacent to the target block or a block horizontally adjacent to a neighbor block which is vertically adjacent to the target block.

Temporal neighbor block: A temporal neighbor block may be a block temporally adjacent to a target block. A neighbor block may include a temporal neighbor block.

The temporal neighbor block may include a co-located block (col block).

The col block may be a block in a previously reconstructed co-located picture (col picture). The location of the col block in the col-picture may correspond to the location of the target block in a target picture. Alternatively, the location of the col block in the col-picture may be equal to the location of the target block in the target picture. The col picture may be a picture included in a reference picture list.

The temporal neighbor block may be a block temporally adjacent to a spatial neighbor block of a target block.

Prediction mode: The prediction mode may be information indicating the mode used for intra prediction, or the mode used for inter prediction.

Prediction unit: A prediction unit may be a base unit for prediction, such as inter prediction, intra prediction, inter compensation, intra compensation, and motion compensation.

A single prediction unit may be divided into multiple partitions having smaller sizes or sub-prediction units. The multiple partitions may also be base units in the performance of prediction or compensation. The partitions generated by dividing the prediction unit may also be prediction units.

Prediction unit partition: A prediction unit partition may be the shape into which a prediction unit is divided.

Reconstructed neighbor unit: A reconstructed neighbor unit may be a unit which has already been decoded and reconstructed neighboring a target unit.

A reconstructed neighbor unit may be a unit that is spatially adjacent to the target unit or that is temporally adjacent to the target unit.

A reconstructed spatial neighbor unit may be a unit which is included in a target picture and which has already been reconstructed through encoding and/or decoding.

A reconstructed temporal neighbor unit may be a unit which is included in a reference image and which has already been reconstructed through encoding and/or decoding. The location of the reconstructed temporal neighbor unit in the reference image may be identical to that of the target unit in the target picture, or may correspond to the location of the target unit in the target picture. Also, a reconstructed temporal neighbor unit may be a block neighboring the corresponding block in a reference image. Here, the location of the corresponding block in the reference image may correspond to the location of the target block in the target image. Here, the fact that the locations of blocks correspond to each other may mean that the locations of the blocks are identical to each other, may mean that one block is included in another block, or may mean that one block occupies a specific location in another block.

Sub-picture: A picture may be divided into one or more sub-pictures. A sub-picture may be composed of one or more tile rows and one or more tile columns.

A sub-picture may be a region having a square shape or a rectangular (i.e., a non-square rectangular) shape in a picture. Further, a sub-picture may include one or more CTUs.

A sub-picture may be a rectangular region of one or more slices in a picture.

One sub-picture may include one or more tiles, one or more bricks, and/or one or more slices.

Tile: A tile may be a region having a square shape or rectangular (i.e., a non-square rectangular) shape in a picture.

A tile may include one or more CTUs.

A tile may be partitioned into one or more bricks.

Brick: A brick may denote one or more CTU rows in a tile.

A tile may be partitioned into one or more bricks. Each brick may include one or more CTU rows.

A tile that is not partitioned into two parts may also denote a brick.

Slice: A slice may include one or more tiles in a picture. Alternatively, a slice may include one or more bricks in a tile.

A sub-picture may contain one or more slices that collectively cover a rectangular region of a picture. Consequently, each sub-picture boundary is also always a slice boundary, and each vertical sub-picture boundary is always also a vertical tile boundary.

Parameter set: A parameter set may correspond to header information in the internal structure of a bitstream.

A parameter set may include at least one of a video parameter set (VPS), a sequence parameter set (SPS), a picture parameter set (PPS), an adaptation parameter set (APS), a decoding parameter set (DPS), etc.

Information signaled through each parameter set may be applied to pictures which refer to the corresponding parameter set. For example, information in a VPS may be applied to pictures which refer to the VPS. Information in an SPS may be applied to pictures which refer to the SPS. Information in a PPS may be applied to pictures which refer to the PPS.

Each parameter set may refer to a higher parameter set. For example, a PPS may refer to an SPS. An SPS may refer to a VPS.

Further, a parameter set may include a tile group, slice header information, and tile header information. The tile group may be a group including multiple tiles. Also, the meaning of "tile group" may be identical to that of "slice".

Rate-distortion optimization: An encoding apparatus may use rate-distortion optimization so as to provide high coding efficiency by utilizing combinations of the size of a coding unit (CU), a prediction mode, the size of a prediction unit (PU), motion information, and the size of a transform unit (TU).

A rate-distortion optimization scheme may calculate rate-distortion costs of respective combinations so as to select an optimal combination from among the combinations. The rate-distortion costs may be calculated using the equation "$D+\lambda*R$". Generally, a combination enabling the rate-distortion cost to be minimized may be selected as the optimal combination in the rate-distortion optimization scheme.

D may denote distortion. D may be the mean of squares of differences (i.e. mean square error) between original transform coefficients and reconstructed transform coefficients in a transform unit.

R may denote the rate, which may denote a bit rate using related-context information.

$\lambda$ denotes a Lagrangian multiplier. R may include not only coding parameter information, such as a prediction mode, motion information, and a coded block flag, but also bits generated due to the encoding of transform coefficients.

An encoding apparatus may perform procedures, such as inter prediction and/or intra prediction, transform, quantization, entropy encoding, inverse quantization (dequantization), and/or inverse transform so as to calculate precise D and R. These procedures may greatly increase the complexity of the encoding apparatus.

Bitstream: A bitstream may denote a stream of bits including encoded image information.

Parsing: Parsing may be the decision on the value of a syntax element, made by performing entropy decoding on a bitstream. Alternatively, the term "parsing" may mean such entropy decoding itself.

Symbol: A symbol may be at least one of the syntax element, the coding parameter, and the transform coefficient of an encoding target unit and/or a decoding target unit. Further, a symbol may be the target of entropy encoding or the result of entropy decoding.

Reference picture: A reference picture may be an image referred to by a unit so as to perform inter prediction or motion compensation. Alternatively, a reference picture may be an image including a reference unit referred to by a target unit so as to perform inter prediction or motion compensation.

Hereinafter, the terms "reference picture" and "reference image" may be used to have the same meaning, and may be used interchangeably with each other.

Reference picture list: A reference picture list may be a list including one or more reference images used for inter prediction or motion compensation.

The types of a reference picture list may include List Combined (LC), List 0 (L0), List 1 (L1), List 2 (L2), List 3 (L3), etc.

For inter prediction, one or more reference picture lists may be used.

Inter-prediction indicator: An inter-prediction indicator may indicate the inter-prediction direction for a target unit. Inter prediction may be one of unidirectional prediction and bidirectional prediction. Alternatively, the inter-prediction indicator may denote the number of reference pictures used to generate a prediction unit of a target unit. Alternatively, the inter-prediction indicator may denote the number of prediction blocks used for inter prediction or motion compensation of a target unit.

Prediction list utilization flag: A prediction list utilization flag may indicate whether a prediction unit is generated using at least one reference picture in a specific reference picture list.

An inter-prediction indicator may be derived using the prediction list utilization flag. In contrast, the prediction list utilization flag may be derived using the inter-prediction indicator. For example, the case where the prediction list utilization flag indicates "0", which is a first value, may indicate that, for a target unit, a prediction block is not generated using a reference picture in a reference picture list. The case where the prediction list utilization flag indicates "1", which is a second value, may indicate that, for a target unit, a prediction unit is generated using the reference picture list.

Reference picture index: A reference picture index may be an index indicating a specific reference picture in a reference picture list.

Picture Order Count (POC): A POC value for a picture may denote an order in which the corresponding picture is displayed.

Motion vector (MV): A motion vector may be a 2D vector used for inter prediction or motion compensation. A motion vector may mean an offset between a target image and a reference image.

For example, a MV may be represented in a form such as $(mv_x, mv_y)$. $mv_x$ may indicate a horizontal component, and $mv_y$ may indicate a vertical component.

Search range: A search range may be a 2D area in which a search for a MV is performed during inter prediction.

For example, the size of the search range may be M×N. M and N may be respective positive integers.

Motion vector candidate: A motion vector candidate may be a block that is a prediction candidate or the motion vector of the block that is a prediction candidate when a motion vector is predicted.

A motion vector candidate may be included in a motion vector candidate list.

Motion vector candidate list: A motion vector candidate list may be a list configured using one or more motion vector candidates.

Motion vector candidate index: A motion vector candidate index may be an indicator for indicating a motion vector candidate in the motion vector candidate list. Alternatively, a motion vector candidate index may be the index of a motion vector predictor.

Motion information: Motion information may be information including at least one of a reference picture list, a reference image, a motion vector candidate, a motion vector candidate index, a merge candidate, and a merge index, as well as a motion vector, a reference picture index, and an inter-prediction indicator.

Merge candidate list: A merge candidate list may be a list configured using one or more merge candidates.

Merge candidate: A merge candidate may be a spatial merge candidate, a temporal merge candidate, a combined merge candidate, a combined bi-prediction merge candidate, a candidate based on a history, a candidate based on an average of two candidates, a zero-merge candidate, etc. A merge candidate may include an inter-prediction indicator, and may include motion information such as prediction type information, a reference picture index for each list, a motion vector, a prediction list utilization flag, and an inter-prediction indicator.

Merge index: A merge index may be an indicator for indicating a merge candidate in a merge candidate list.

A merge index may indicate a reconstructed unit used to derive a merge candidate between a reconstructed unit spatially adjacent to a target unit and a reconstructed unit temporally adjacent to the target unit.

A merge index may indicate at least one of pieces of motion information of a merge candidate.

Transform unit: A transform unit may be the base unit of residual signal encoding and/or residual signal decoding, such as transform, inverse transform, quantization, dequantization, transform coefficient encoding, and transform coefficient decoding. A single transform unit may be partitioned into multiple sub-transform units having a smaller size. Here, a transform may include one or more of a primary transform and a secondary transform, and an inverse transform may include one or more of a primary inverse transform and a secondary inverse transform.

Scaling: Scaling may denote a procedure for multiplying a factor by a transform coefficient level.

As a result of scaling of the transform coefficient level, a transform coefficient may be generated. Scaling may also be referred to as "dequantization".

Quantization Parameter (QP): A quantization parameter may be a value used to generate a transform coefficient level for a transform coefficient in quantization. Alternatively, a quantization parameter may also be a value used to generate a transform coefficient by scaling the transform coefficient level in dequantization. Alternatively, a quantization parameter may be a value mapped to a quantization step size.

Delta quantization parameter: A delta quantization parameter may mean a difference value between a predicted quantization parameter and the quantization parameter of a target unit.

Scan: Scan may denote a method for aligning the order of coefficients in a unit, a block or a matrix. For example, a method for aligning a 2D array in the form of a one-dimensional (1D) array may be referred to as a "scan". Alternatively, a method for aligning a 1D array in the form of a 2D array may also be referred to as a "scan" or an "inverse scan".

Transform coefficient: A transform coefficient may be a coefficient value generated as an encoding apparatus performs a transform. Alternatively, the transform coefficient may be a coefficient value generated as a decoding apparatus performs at least one of entropy decoding and dequantization.

A quantized level or a quantized transform coefficient level generated by applying quantization to a transform coefficient or a residual signal may also be included in the meaning of the term "transform coefficient".

Quantized level: A quantized level may be a value generated as the encoding apparatus performs quantization on a transform coefficient or a residual signal. Alternatively, the quantized level may be a value that is the target of dequantization as the decoding apparatus performs dequantization.

A quantized transform coefficient level, which is the result of transform and quantization, may also be included in the meaning of a quantized level.

Non-zero transform coefficient: A non-zero transform coefficient may be a transform coefficient having a value other than 0 or a transform coefficient level having a value other than 0. Alternatively, a non-zero transform coefficient may be a transform coefficient, the magnitude of the value of which is not 0, or a transform coefficient level, the magnitude of the value of which is not 0.

Quantization matrix: A quantization matrix may be a matrix used in a quantization procedure or a dequantization procedure so as to improve the subjective image quality or objective image quality of an image. A quantization matrix may also be referred to as a "scaling list".

Quantization matrix coefficient: A quantization matrix coefficient may be each element in a quantization matrix. A quantization matrix coefficient may also be referred to as a "matrix coefficient".

Default matrix: A default matrix may be a quantization matrix predefined by the encoding apparatus and the decoding apparatus.

Non-default matrix: A non-default matrix may be a quantization matrix that is not predefined by the encoding apparatus and the decoding apparatus. The non-default matrix may mean a quantization matrix to be signaled from the encoding apparatus to the decoding apparatus by a user.

Most Probable Mode (MPM): An MPM may denote an intra-prediction mode having a high probability of being used for intra prediction for a target block.

An encoding apparatus and a decoding apparatus may determine one or more MPMs based on coding parameters related to the target block and the attributes of entities related to the target block.

The encoding apparatus and the decoding apparatus may determine one or more MPMs based on the intra-prediction mode of a reference block. The reference block may include multiple reference blocks. The multiple reference blocks may include spatial neighbor blocks adjacent to the left of the target block and spatial neighbor blocks adjacent to the top of the target block. In other words, depending on which intra-prediction modes have been used for the reference blocks, one or more different MPMs may be determined.

The one or more MPMs may be determined in the same manner both in the encoding apparatus and in the decoding apparatus. That is, the encoding apparatus and the decoding apparatus may share the same MPM list including one or more MPMs.

MPM list: An MPM list may be a list including one or more MPMs. The number of the one or more MPMs in the MPM list may be defined in advance.

MPM indicator: An MPM indicator may indicate an MPM to be used for intra prediction for a target block among one or more MPMs in the MPM list. For example, the MPM indicator may be an index for the MPM list.

Since the MPM list is determined in the same manner both in the encoding apparatus and in the decoding apparatus, there may be no need to transmit the MPM list itself from the encoding apparatus to the decoding apparatus.

The MPM indicator may be signaled from the encoding apparatus to the decoding apparatus. As the MPM indicator is signaled, the decoding apparatus may determine the MPM to be used for intra prediction for the target block among the MPMs in the MPM list.

MPM use indicator: An MPM use indicator may indicate whether an MPM usage mode is to be used for prediction for a target block. The MPM usage mode may be a mode in which the MPM to be used for intra prediction for the target block is determined using the MPM list.

The MPM use indicator may be signaled from the encoding apparatus to the decoding apparatus.

Signaling: "signaling" may denote that information is transferred from an encoding apparatus to a decoding apparatus. Alternatively, "signaling" may mean information is included in in a bitstream or a recoding medium by an encoding apparatus. Information signaled by an encoding apparatus may be used by a decoding apparatus.

The encoding apparatus may generate encoded information by performing encoding on information to be signaled. The encoded information may be transmitted from the encoding apparatus to the decoding apparatus. The decoding apparatus may obtain information by decoding the transmitted encoded information. Here, the encoding may be entropy encoding, and the decoding may be entropy decoding.

Selective Signaling: Information may be signaled selectively. A selective signaling FOR information may mean that an encoding apparatus selectively includes information (according to a specific condition) in a bitstream or a recording medium. Selective signaling for information may mean that a decoding apparatus selectively extracts information from a bitstream (according to a specific condition).

Omission of signaling: Signaling for information may be omitted. Omission of signaling for information on information may mean that an encoding apparatus does not include information (according to a specific condition) in a bitstream or a recording medium. Omission of signaling for information may mean that a decoding apparatus does not extract information from a bitstream (according to a specific condition).

Statistic value: A variable, a coding parameter, a constant, etc. may have values that can be calculated. The statistic value may be a value generated by performing calculations (operations) on the values of specified targets. For example, the statistic value may indicate one or more of the average, weighted average, weighted sum, minimum value, maximum value, mode, median value, and interpolated value of the values of a specific variable, a specific coding parameter, a specific constant, or the like.

FIG. 1 is a block diagram illustrating the configuration of an embodiment of an encoding apparatus to which the present disclosure is applied.

An encoding apparatus 100 may be an encoder, a video encoding apparatus or an image encoding apparatus. A video may include one or more images (pictures). The encoding apparatus 100 may sequentially encode one or more images of the video.

Referring to FIG. 1, the encoding apparatus 100 includes an inter-prediction unit 110, an intra-prediction unit 120, a switch 115, a subtractor 125, a transform unit 130, a quantization unit 140, an entropy encoding unit 150, a dequantization (inverse quantization) unit 160, an inverse transform unit 170, an adder 175, a filter unit 180, and a reference picture buffer 190.

The encoding apparatus 100 may perform encoding on a target image using an intra mode and/or an inter mode. In other words, a prediction mode for a target block may be one of an intra mode and an inter mode.

Hereinafter, the terms "intra mode", "intra-prediction mode", "intra-picture mode" and "intra-picture prediction mode" may be used to have the same meaning, and may be used interchangeably with each other.

Hereinafter, the terms "inter mode", "inter-prediction mode", "inter-picture mode" and "inter-picture prediction mode" may be used to have the same meaning, and may be used interchangeably with each other.

Hereinafter, the term "image" may indicate only part of an image, or may indicate a block. Also, the processing of an "image" may indicate sequential processing of multiple blocks.

Further, the encoding apparatus 100 may generate a bitstream, including encoded information, via encoding on the target image, and may output and store the generated bitstream. The generated bitstream may be stored in a computer-readable storage medium and may be streamed through a wired and/or wireless transmission medium.

When the intra mode is used as a prediction mode, the switch 115 may switch to the intra mode. When the inter mode is used as a prediction mode, the switch 115 may switch to the inter mode.

The encoding apparatus 100 may generate a prediction block of a target block. Further, after the prediction block has been generated, the encoding apparatus 100 may encode a residual block for the target block using a residual between the target block and the prediction block.

When the prediction mode is the intra mode, the intra-prediction unit 120 may use pixels of previously encoded/decoded neighbor blocks adjacent to the target block as reference samples. The intra-prediction unit 120 may perform spatial prediction on the target block using the reference samples, and may generate prediction samples for the target block via spatial prediction. the prediction samples may mean samples in the prediction block.

The inter-prediction unit 110 may include a motion prediction unit and a motion compensation unit.

When the prediction mode is an inter mode, the motion prediction unit may search a reference image for the area most closely matching the target block in a motion prediction procedure, and may derive a motion vector for the target block and the found area based on the found area. Here, the motion-prediction unit may use a search range as a target area for searching.

The reference image may be stored in the reference picture buffer 190. More specifically, an encoded and/or decoded reference image may be stored in the reference picture buffer 190 when the encoding and/or decoding of the reference image have been processed.

Since a decoded picture is stored, the reference picture buffer 190 may be a Decoded Picture Buffer (DPB).

The motion compensation unit may generate a prediction block for the target block by performing motion compensation using a motion vector. Here, the motion vector may be a two-dimensional (2D) vector used for inter-prediction. Further, the motion vector may indicate an offset between the target image and the reference image.

The motion prediction unit and the motion compensation unit may generate a prediction block by applying an interpolation filter to a partial area of a reference image when the motion vector has a value other than an integer. In order to perform inter prediction or motion compensation, it may be determined which one of a skip mode, a merge mode, an advanced motion vector prediction (AMVP) mode, and a current picture reference mode corresponds to a method for predicting the motion of a PU included in a CU, based on the CU, and compensating for the motion, and inter prediction or motion compensation may be performed depending on the mode.

The subtractor 125 may generate a residual block, which is the differential between the target block and the prediction block. A residual block may also be referred to as a "residual signal".

The residual signal may be the difference between an original signal and a prediction signal. Alternatively, the residual signal may be a signal generated by transforming or quantizing the difference between an original signal and a prediction signal or by transforming and quantizing the difference. A residual block may be a residual signal for a block unit.

The transform unit 130 may generate a transform coefficient by transforming the residual block, and may output the generated transform coefficient. Here, the transform coefficient may be a coefficient value generated by transforming the residual block.

The transform unit 130 may use one of multiple predefined transform methods when performing a transform.

The multiple predefined transform methods may include a Discrete Cosine Transform (DCT), a Discrete Sine Transform (DST), a Karhunen-Loeve Transform (KLT), etc.

The transform method used to transform a residual block may be determined depending on at least one of coding parameters for a target block and/or a neighbor block. For example, the transform method may be determined based on at least one of an inter-prediction mode for a PU, an intra-prediction mode for a PU, the size of a TU, and the shape of a TU. Alternatively, transformation information indicating the transform method may be signaled from the encoding apparatus 100 to the decoding apparatus 200.

When a transform skip mode is used, the transform unit 130 may omit transforming the residual block.

By applying quantization to the transform coefficient, a quantized transform coefficient level or a quantized level may be generated. Hereinafter, in the embodiments, each of the quantized transform coefficient level and the quantized level may also be referred to as a 'transform coefficient'.

The quantization unit 140 may generate a quantized transform coefficient level (i.e., a quantized level or a quantized coefficient) by quantizing the transform coefficient depending on quantization parameters. The quantization unit 140 may output the quantized transform coefficient level that is generated. In this case, the quantization unit 140 may quantize the transform coefficient using a quantization matrix.

The entropy encoding unit 150 may generate a bitstream by performing probability distribution-based entropy encoding based on values, calculated by the quantization unit 140, and/or coding parameter values, calculated in the encoding procedure. The entropy encoding unit 150 may output the generated bitstream.

The entropy encoding unit 150 may perform entropy encoding on information about the pixels of the image and information required to decode the image. For example, the information required to decode the image may include syntax elements or the like.

When entropy encoding is applied, fewer bits may be assigned to more frequently occurring symbols, and more bits may be assigned to rarely occurring symbols. As symbols are represented by means of this assignment, the size of a bit string for target symbols to be encoded may be reduced. Therefore, the compression performance of video encoding may be improved through entropy encoding.

Further, for entropy encoding, the entropy encoding unit 150 may use a coding method such as exponential Golomb, Context-Adaptive Variable Length Coding (CAVLC), or Context-Adaptive Binary Arithmetic Coding (CABAC). For example, the entropy encoding unit 150 may perform entropy encoding using a Variable Length Coding/Code (VLC) table. For example, the entropy encoding unit 150 may derive a binarization method for a target symbol. Further, the entropy encoding unit 150 may derive a probability model for a target symbol/bin. The entropy encoding unit 150 may perform arithmetic coding using the derived binarization method, a probability model, and a context model.

The entropy encoding unit 150 may transform the coefficient of the form of a 2D block into the form of a 1D vector through a transform coefficient scanning method so as to encode a quantized transform coefficient level.

The coding parameters may be information required for encoding and/or decoding. The coding parameters may include information encoded by the encoding apparatus 100 and transferred from the encoding apparatus 100 to a decoding apparatus, and may also include information that may be derived in the encoding or decoding procedure. For example, information transferred to the decoding apparatus may include syntax elements.

The coding parameters may include not only information (or a flag or an index), such as a syntax element, which is encoded by the encoding apparatus and is signaled by the encoding apparatus to the decoding apparatus, but also information derived in an encoding or decoding process. Further, the coding parameters may include information required so as to encode or decode images. For example, the coding parameters may include at least one value, combinations or statistics of a size of a unit/block, a shape/form of a unit/block, a depth of a unit/block, partition information of a unit/block, a partition structure of a unit/block, information indicating whether a unit/block is partitioned in a quad-tree structure, information indicating whether a unit/block is partitioned in a binary tree structure, a partitioning direction of a binary tree structure (horizontal direction or vertical direction), a partitioning form of a binary tree structure (symmetrical partitioning or asymmetrical partitioning), information indicating whether a unit/block is partitioned in a ternary tree structure, a partitioning direction of a ternary tree structure (horizontal direction or vertical direction), a partitioning form of a ternary tree structure (symmetrical partitioning or asymmetrical partitioning, etc.), information indicating whether a unit/block is partitioned in a multi-type tree structure, a combination and a direction (horizontal direction or vertical direction, etc.) of a partitioning of the multi-type tree structure, a partitioning form of a multi-type tree structure (symmetrical partitioning or asymmetrical partitioning, etc.), a partitioning tree (a binary tree or a ternary tree) of the multi-type tree form, a type of a prediction (intra prediction or inter prediction), an intra-prediction mode/direction, an intra luma prediction mode/direction, an intra chroma prediction mode/direction, an intra partitioning information, an inter partitioning information, a coding block partitioning flag, a prediction block partitioning flag, a transform block partitioning flag, a reference sample filtering method, a reference sample filter tap, a reference sample filter coefficient, a prediction block filtering method, a prediction block filter tap, a prediction block filter coefficient, a prediction block boundary filtering method, a prediction block boundary filter tap, a prediction block boundary filter coefficient, an inter-prediction mode, motion information, a motion vector, a motion vector difference, a reference picture index, an inter-prediction direction, an inter-prediction indicator, a prediction list utilization flag, a reference picture list, a reference image, a POC, a motion vector predictor, a motion vector prediction index, a motion vector prediction candidate, a motion vector candidate list, information indicating whether a merge mode is used, a merge index, a merge candidate, a merge candidate list, information indicating whether a skip mode is used, a type of an interpolation filter, a tap of an interpolation filter, a filter coefficient of an interpolation filter, a magnitude of a motion vector, accuracy of motion vector representation, a transform type, a transform size, information indicating whether a first transform is used, information indicating whether an additional (secondary) transform is used, first transform selection information (or a first transform index), secondary transform selection information (or a secondary transform index), information indicating a presence or absence of a residual signal, a coded block pattern, a coded block flag, a quantization parameter, a residual quantization parameter, a quantization matrix, information about an intra-loop filter, information indicating whether an intra-loop filter is applied, a coefficient of an intra-loop filter, a tap of an intra-loop filter, a shape/form of an intra-loop filter, information indicating whether a deblocking filter is applied, a coefficient of a deblocking filter, a tap of a deblocking filter, deblocking filter strength, a shape/form of a deblocking filter, information indicating whether an adaptive sample offset is applied, a value of an adaptive sample offset, a category of an adaptive sample offset, a type of an adaptive sample offset, information indicating whether an adaptive in-loop filter is applied, a coefficient of an adaptive in-loop filter, a tap of an adaptive in-loop filter, a shape/form of an adaptive in-loop filter, a binarization/inverse binarization method, a context model, a context model decision method, a context model update method, information indicating whether a regular mode is performed, information whether a bypass mode is performed, a significant coefficient flag, a last significant coefficient flag, a coding flag for a coefficient group, a position of a last significant coefficient, information indicating whether a value of a coefficient is greater than 1, information indicating whether a value of a coefficient is greater than 2, information indicating whether a value of a coefficient is greater than 3, a remaining coefficient value information, a sign information, a reconstructed luma sample, a reconstructed chroma sample, a context bin, a bypass bin, a residual luma sample, a residual chroma sample, a transform coefficient, a luma transform coefficient, a chroma transform coefficient, a quantized level, a luma quantized level, a chroma quantized level, a transform coefficient level, a transform coefficient level scanning method, a size of a motion vector search region on a side of a decoding apparatus, a shape/form of a motion vector search region on a side of a decoding apparatus, the number of a motion vector search on a side of a decoding apparatus, a size of a CTU, a minimum block size, a maximum block size, a maximum block depth, a minimum block depth, an image display/output order, slice identification information, a slice type, slice partition information, tile group identification information, a tile group type, a tile group partitioning information, tile identification information, a tile type, tile partitioning information, a picture type, bit depth, input sample bit depth, reconstructed sample bit depth, residual sample bit depth, transform coefficient bit depth, quantized level bit depth, information about a luma signal, information about a chroma signal, a color space of a target block and a color space of a residual block. Further, the above-described coding parameter-related information may also be included in the coding parameter. Information used to calculate and/or derive the above-described coding parameter may also be included in the coding parameter. Information calculated or derived using the above-described coding parameter may also be included in the coding parameter.

The first transform selection information may indicate a first transform which is applied to a target block.

The second transform selection information may indicate a second transform which is applied to a target block.

The residual signal may denote the difference between the original signal and a prediction signal. Alternatively, the residual signal may be a signal generated by transforming the difference between the original signal and the prediction signal. Alternatively, the residual signal may be a signal generated by transforming and quantizing the difference between the original signal and the prediction signal. A residual block may be the residual signal for a block.

Here, signaling information may mean that the encoding apparatus 100 includes an entropy-encoded information, generated by performing entropy encoding a flag or an index, in a bitstream, and that the decoding apparatus 200 acquires information by performing entropy decoding on the entropy-encoded information, extracted from the bitstream. Here, the information may comprise a flag, an index, etc.

A signal may mean information to be signaled. Hereinafter, information for an image and a block may be referred to as a signal. Further, hereinafter, the terms "information" and "signal" may be used to have the same meaning and may be used interchangeably with each other. For example, a specific signal may be a signal representing a specific block. An original signal may be a signal representing a target block. A prediction signal may be a signal representing a prediction block. A residual signal may be a signal representing a residual block.

A bitstream may include information based on a specific syntax. The encoding apparatus 100 may generate a bitstream including information depending on a specific syntax. The decoding apparatus 200 may acquire information from the bitstream depending on a specific syntax.

Since the encoding apparatus 100 performs encoding via inter prediction, the encoded target image may be used as a reference image for additional image(s) to be subsequently processed. Therefore, the encoding apparatus 100 may reconstruct or decode the encoded target image and store the reconstructed or decoded image as a reference image in the reference picture buffer 190. For decoding, dequantization and inverse transform on the encoded target image may be processed.

The quantized level may be inversely quantized by the dequantization unit 160, and may be inversely transformed by the inverse transform unit 170. The dequantization unit 160 may generate an inversely quantized coefficient by performing inverse transform for the quantized level. The inverse transform unit 170 may generate a inversely quantized and inversely transformed coefficient by performing inverse transform for the inversely quantized coefficient.

The inversely quantized and inversely transformed coefficient may be added to the prediction block by the adder 175. The inversely quantized and inversely transformed coefficient and the prediction block are added, and then a reconstructed block may be generated. Here, the inversely quantized and/or inversely transformed coefficient may denote a coefficient on which one or more of dequantization and inverse transform are performed, and may also denote a reconstructed residual block. Here, the reconstructed block may mean a recovered block or a decoded block.

The reconstructed block may be subjected to filtering through the filter unit 180. The filter unit 180 may apply one or more of a deblocking filter, a Sample Adaptive Offset (SAO) filter, an Adaptive Loop Filter (ALF), and a Non Local Filter (NLF) to a reconstructed sample, the reconstructed block or a reconstructed picture. The filter unit 180 may also be referred to as an "in-loop filter".

The deblocking filter may eliminate block distortion occurring at the boundaries between blocks in a reconstructed picture. In order to determine whether to apply the deblocking filter, the number of columns or rows which are included in a block and which include pixel(s) based on which it is determined whether to apply the deblocking filter to a target block may be decided on.

When the deblocking filter is applied to the target block, the applied filter may differ depending on the strength of the required deblocking filtering. In other words, among different filters, a filter decided on in consideration of the strength of deblocking filtering may be applied to the target block. When a deblocking filter is applied to a target block, one or more filters of a long-tap filter, a strong filter, a weak filter and Gaussian filter may be applied to the target block depending on the strength of required deblocking filtering.

Also, when vertical filtering and horizontal filtering are performed on the target block, the horizontal filtering and the vertical filtering may be processed in parallel.

The SAO may add a suitable offset to the values of pixels to compensate for coding error. The SAO may perform, for the image to which deblocking is applied, correction that uses an offset in the difference between an original image and the image to which deblocking is applied, on a pixel basis. To perform an offset correction for an image, a method for dividing the pixels included in the image into a certain number of regions, determining a region to which an offset is to be applied, among the divided regions, and applying an offset to the determined region may be used, and a method for applying an offset in consideration of edge information of each pixel may also be used.

The ALF may perform filtering based on a value obtained by comparing a reconstructed image with an original image. After pixels included in an image have been divided into a predetermined number of groups, filters to be applied to each group may be determined, and filtering may be differentially performed for respective groups. information related to whether to apply an adaptive loop filter may be signaled for each CU. Such information may be signaled for a luma signal. The shapes and filter coefficients of ALFs to be applied to respective blocks may differ for respective blocks. Alternatively, regardless of the features of a block, an ALF having a fixed form may be applied to the block.

A non-local filter may perform filtering based on reconstructed blocks, similar to a target block. A region similar to the target block may be selected from a reconstructed picture, and filtering of the target block may be performed using the statistical properties of the selected similar region. Information about whether to apply a non-local filter may be signaled for a Coding Unit (CU). Also, the shapes and filter coefficients of the non-local filter to be applied to blocks may differ depending on the blocks.

The reconstructed block or the reconstructed image subjected to filtering through the filter unit 180 may be stored in the reference picture buffer 190 as a reference picture. The reconstructed block subjected to filtering through the filter unit 180 may be a part of a reference picture. In other words, the reference picture may be a reconstructed picture composed of reconstructed blocks subjected to filtering through the filter unit 180. The stored reference picture may be subsequently used for inter prediction or a motion compensation.

Figure 2:
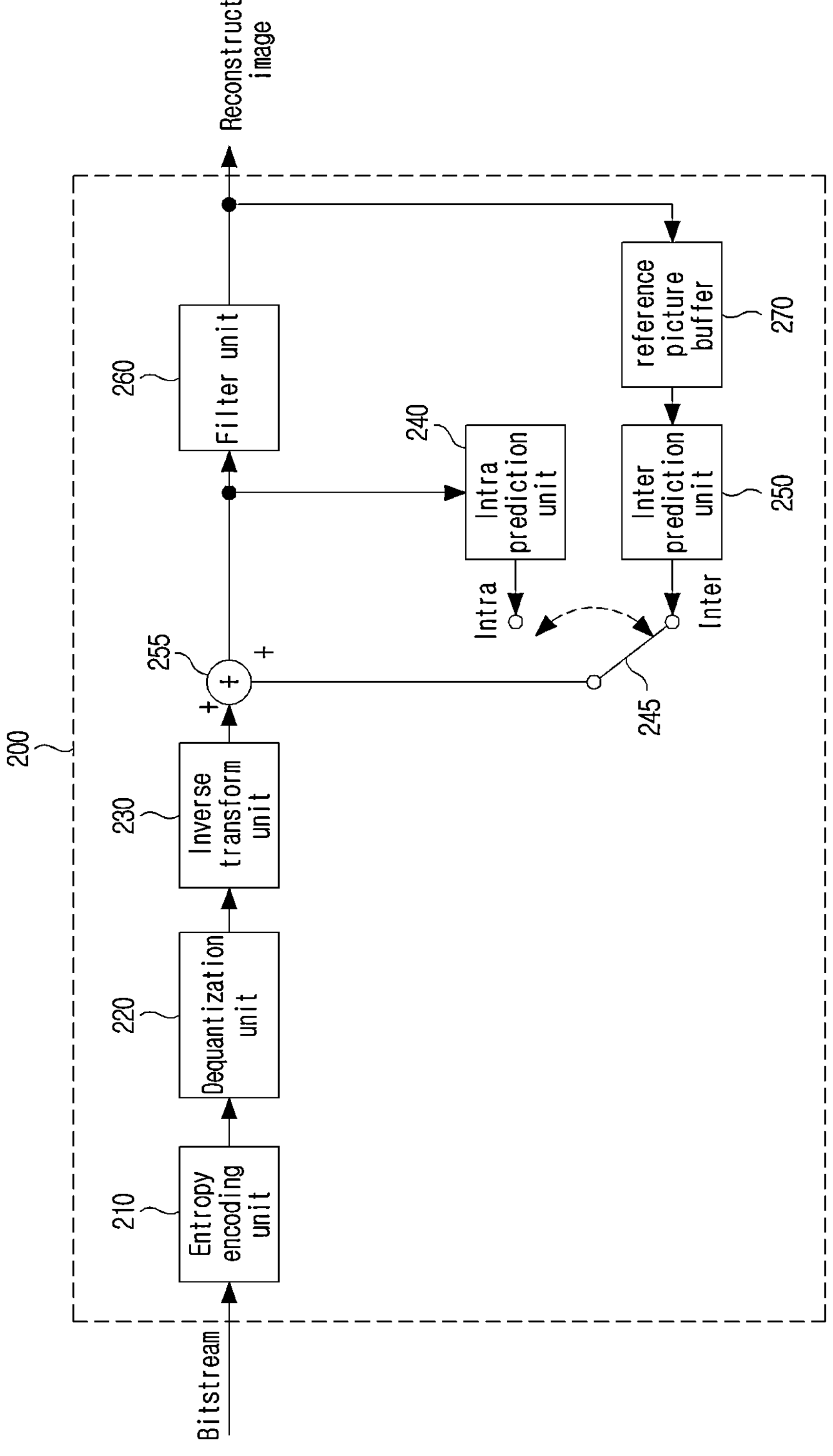
FIG. 2 is a block diagram illustrating the configuration of an embodiment of a decoding apparatus to which the present disclosure is applied.

FIG. 2 is a block diagram illustrating the configuration of an embodiment of a decoding apparatus to which the present disclosure is applied.

A decoding apparatus 200 may be a decoder, a video decoding apparatus or an image decoding apparatus.

Referring to FIG. 2, the decoding apparatus 200 may include an entropy decoding unit 210, a dequantization (inverse quantization) unit 220, an inverse transform unit 230, an intra-prediction unit 240, an inter-prediction unit 250, a switch 245 an adder 255, a filter unit 260, and a reference picture buffer 270.

The decoding apparatus 200 may receive a bitstream output from the encoding apparatus 100. The decoding apparatus 200 may receive a bitstream stored in a computer-readable storage medium, and may receive a bitstream that is streamed through a wired/wireless transmission medium.

The decoding apparatus 200 may perform decoding on the bitstream in an intra mode and/or an inter mode. Further, the decoding apparatus 200 may generate a reconstructed image or a decoded image via decoding, and may output the reconstructed image or decoded image.

For example, switching to an intra mode or an inter mode based on the prediction mode used for decoding may be performed by the switch 245. When the prediction mode used for decoding is an intra mode, the switch 245 may be operated to switch to the intra mode. When the prediction mode used for decoding is an inter mode, the switch 245 may be operated to switch to the inter mode.

The decoding apparatus 200 may acquire a reconstructed residual block by decoding the input bitstream, and may generate a prediction block. When the reconstructed residual block and the prediction block are acquired, the decoding apparatus 200 may generate a reconstructed block, which is the target to be decoded, by adding the reconstructed residual block and the prediction block.

The entropy decoding unit 210 may generate symbols by performing entropy decoding on the bitstream based on the probability distribution of a bitstream. The generated symbols may include symbols in a form of a quantized transform coefficient level (i.e., a quantized level or a quantized coefficient). Here, the entropy decoding method may be similar to the above-described entropy encoding method. That is, the entropy decoding method may be the reverse procedure of the above-described entropy encoding method.

The entropy decoding unit 210 may change a coefficient having a one-dimensional (1D) vector form to a 2D block shape through a transform coefficient scanning method in order to decode a quantized transform coefficient level.

For example, the coefficients of the block may be changed to 2D block shapes by scanning the block coefficients using up-right diagonal scanning. Alternatively, which one of up-right diagonal scanning, vertical scanning, and horizontal scanning is to be used may be determined depending on the size and/or the intra-prediction mode of the corresponding block.

The quantized coefficient may be inversely quantized by the dequantization unit 220. The dequantization unit 220 may generate an inversely quantized coefficient by performing dequantization on the quantized coefficient. Further, the inversely quantized coefficient may be inversely transformed by the inverse transform unit 230. The inverse transform unit 230 may generate a reconstructed residual block by performing an inverse transform on the inversely quantized coefficient. As a result of performing dequantization and the inverse transform on the quantized coefficient, the reconstructed residual block may be generated. Here, the dequantization unit 220 may apply a quantization matrix to the quantized coefficient when generating the reconstructed residual block.

When the intra mode is used, the intra-prediction unit 240 may generate a prediction block by performing spatial prediction that uses the pixel values of previously decoded neighbor blocks adjacent to a target block for the target block.

The inter-prediction unit 250 may include a motion compensation unit. Alternatively, the inter-prediction unit 250 may be designated as a "motion compensation unit".

When the inter mode is used, the motion compensation unit may generate a prediction block by performing motion compensation that uses a motion vector and a reference image stored in the reference picture buffer 270 for the target block.

The motion compensation unit may apply an interpolation filter to a partial area of the reference image when the motion vector has a value other than an integer, and may generate a prediction block using the reference image to which the interpolation filter is applied. In order to perform motion compensation, the motion compensation unit may determine which one of a skip mode, a merge mode, an Advanced Motion Vector Prediction (AMVP) mode, and a current picture reference mode corresponds to the motion compensation method used for a PU included in a CU, based on the CU, and may perform motion compensation depending on the determined mode.

The reconstructed residual block and the prediction block may be added to each other by the adder 255. The adder 255 may generate a reconstructed block by adding the reconstructed residual block to the prediction block.

The reconstructed block may be subjected to filtering through the filter unit 260. The filter unit 260 may apply at least one of a deblocking filter, an SAO filter, an ALF, and a NLF to the reconstructed block or the reconstructed image. The reconstructed image may be a picture including the reconstructed block.

The filter unit may output the reconstructed image.

The reconstructed image and/or the reconstructed block subjected to filtering through the filter unit 260 may be stored as a reference picture in the reference picture buffer 270. The reconstructed block subjected to filtering through the filter unit 260 may be a part of the reference picture. In other words, the reference picture may be an image composed of reconstructed blocks subjected to filtering through the filter unit 260. The stored reference picture may be subsequently used for inter prediction or a motion compensation.

Figure 3:
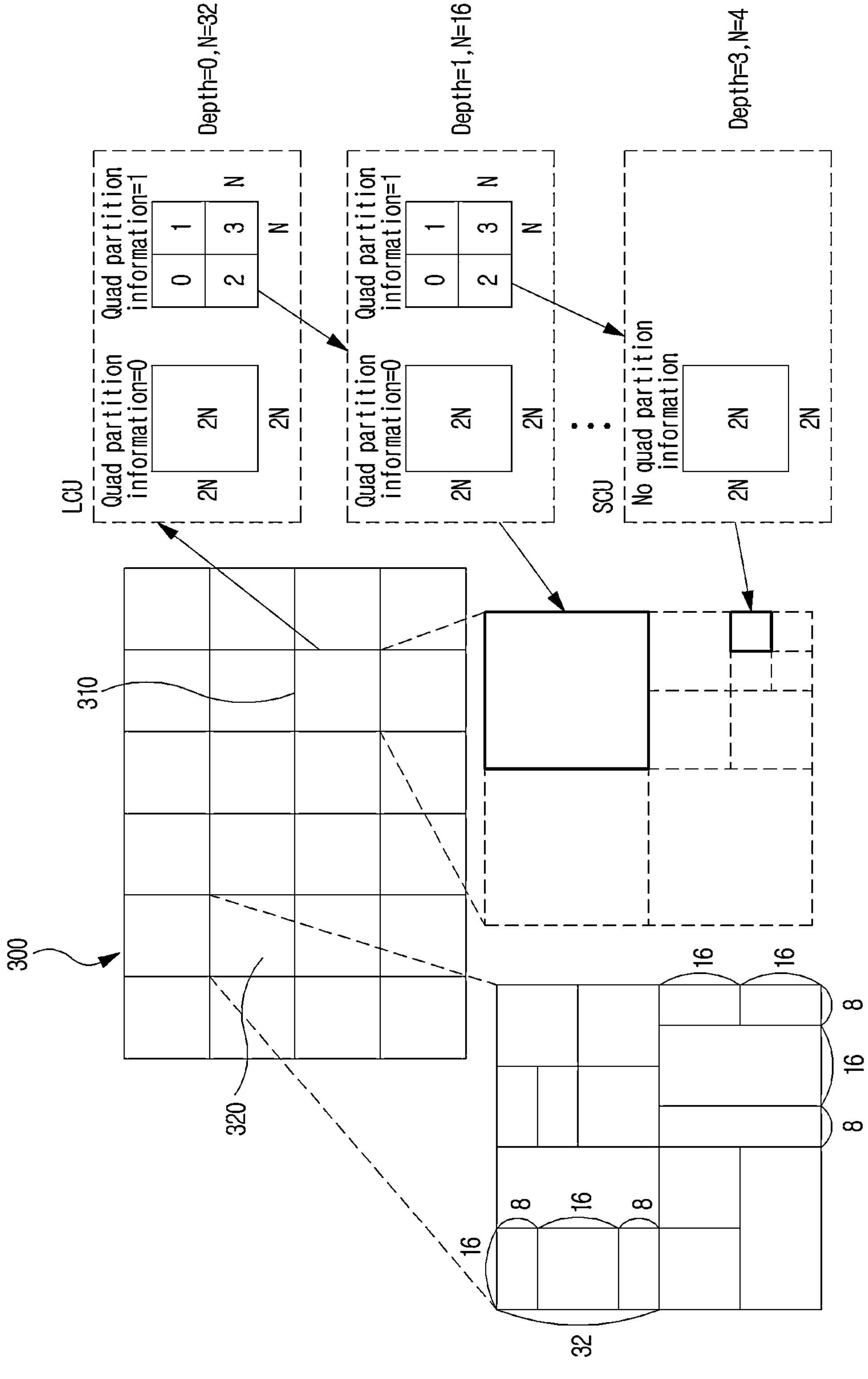
FIG. 3 is a diagram schematically illustrating the partition structure of an image when the image is encoded and decoded.

FIG. 3 is a diagram schematically illustrating the partition structure of an image when the image is encoded and decoded.

FIG. 3 may schematically illustrate an example in which a single unit is partitioned into multiple sub-units.

In order to efficiently partition the image, a Coding Unit (CU) may be used in encoding and decoding. The term "unit" may be used to collectively designate 1) a block including image samples and 2) a syntax element. For example, the "partitioning of a unit" may mean the "partitioning of a block corresponding to a unit".

A CU may be used as a base unit for image encoding/decoding. A CU may be used as a unit to which one mode selected from an intra mode and an inter mode in image encoding/decoding is applied. In other words, in image encoding/decoding, which one of an intra mode and an inter mode is to be applied to each CU may be determined.

Further, a CU may be a base unit in prediction, transform, quantization, inverse transform, dequantization, and encoding/decoding of transform coefficients.

Referring to FIG. 3, an image 300 may be sequentially partitioned into units corresponding to a Largest Coding Unit (LCU), and a partition structure may be determined for each LCU. Here, the LCU may be used to have the same meaning as a Coding Tree Unit (CTU).

The partitioning of a unit may mean the partitioning of a block corresponding to the unit. Block partition information may include depth information about the depth of a unit. The depth information may indicate the number of times the unit is partitioned and/or the degree to which the unit is partitioned. A single unit may be hierarchically partitioned into a plurality of sub-units while having depth information based on a tree structure.

Each of partitioned sub-units may have depth information. The depth information may be information indicating the size of a CU. The depth information may be stored for each CU.

Each CU may have depth information. When the CU is partitioned, CUs resulting from partitioning may have a depth increased from the depth of the partitioned CU by 1.

The partition structure may mean the distribution of Coding Units (CUs) to efficiently encode the image in an LCU 310. Such a distribution may be determined depending on whether a single CU is to be partitioned into multiple CUs. The number of CUs generated by partitioning may be a positive integer of 2 or more, including 2, 3, 4, 8, 16, etc.

The horizontal size and the vertical size of each of CUs generated by the partitioning may be less than the horizontal size and the vertical size of a CU before being partitioned, depending on the number of CUs generated by partitioning. For example, the horizontal size and the vertical size of each of CUs generated by the partitioning may be half of the horizontal size and the vertical size of a CU before being partitioned.

Each partitioned CU may be recursively partitioned into four CUs in the same way. Via the recursive partitioning, at least one of the horizontal size and the vertical size of each partitioned CU may be reduced compared to at least one of the horizontal size and the vertical size of the CU before being partitioned.

The partitioning of a CU may be recursively performed up to a predefined depth or a predefined size.

For example, the depth of a CU may have a value ranging from 0 to 3. The size of the CU may range from a size of 64×64 to a size of 8×8 depending on the depth of the CU.

For example, the depth of an LCU 310 may be 0, and the depth of a Smallest Coding Unit (SCU) may be a predefined maximum depth. Here, as described above, the LCU may be the CU having the maximum coding unit size, and the SCU may be the CU having the minimum coding unit size.

Partitioning may start at the LCU 310, and the depth of a CU may be increased by 1 whenever the horizontal and/or vertical sizes of the CU are reduced by partitioning.

For example, for respective depths, a CU that is not partitioned may have a size of 2N×2N. Further, in the case of a CU that is partitioned, a CU having a size of 2N×2N may be partitioned into four CUs, each having a size of N×N. The value of N may be halved whenever the depth is increased by 1.

Referring to FIG. 3, an LCU having a depth of 0 may have 64×64 pixels or 64×64 blocks. 0 may be a minimum depth. An SCU having a depth of 3 may have 8×8 pixels or 8×8 blocks. 3 may be a maximum depth. Here, a CU having 64×64 blocks, which is the LCU, may be represented by a depth of 0. A CU having 32×32 blocks may be represented by a depth of 1. A CU having 16×16 blocks may be represented by a depth of 2. A CU having 8×8 blocks, which is the SCU, may be represented by a depth of 3.

Information about whether the corresponding CU is partitioned may be represented by the partition information of the CU. The partition information may be 1-bit information. All CUs except the SCU may include partition information. For example, the value of the partition information of a CU that is not partitioned may be a first value. The value of the partition information of a CU that is partitioned may be a second value. When the partition information indicates whether a CU is partitioned or not, the first value may be "0" and the second value may be "1".

For example, when a single CU is partitioned into four CUs, the horizontal size and vertical size of each of four CUs generated by partitioning may be half the horizontal size and the vertical size of the CU before being partitioned. When a CU having a 32×32 size is partitioned into four CUs, the size of each of four partitioned CUs may be 16×16. When a single CU is partitioned into four CUs, it may be considered that the CU has been partitioned in a quad-tree structure. In other words, it may be considered that a quad-tree partition has been applied to a CU.

For example, when a single CU is partitioned into two CUs, the horizontal size or the vertical size of each of two CUs generated by partitioning may be half the horizontal size or the vertical size of the CU before being partitioned. When a CU having a 32×32 size is vertically partitioned into two CUs, the size of each of two partitioned CUs may be 16×32. When a CU having a 32×32 size is horizontally partitioned into two CUs, the size of each of two partitioned CUs may be 32×16. When a single CU is partitioned into two CUs, it may be considered that the CU has been partitioned in a binary-tree structure. In other words, it may be considered that a binary-tree partition has been applied to a CU.

For example, when a single CU is partitioned (or split) into three CUs, the original CU before being partitioned is partitioned so that the horizontal size or vertical size thereof is divided at a ratio of 1:2:1, thus enabling three sub-CUs to be generated. For example, when a CU having a 16×32 size is horizontally partitioned into three sub-CUs, the three sub-CUs resulting from the partitioning may have sizes of 16×8, 16×16, and 16×8, respectively, in a direction from the top to the bottom. For example, when a CU having a 32×32 size is vertically partitioned into three sub-CUs, the three sub-CUs resulting from the partitioning may have sizes of 8×32, 16×32, and 8×32, respectively, in a direction from the left to the right. When a single CU is partitioned into three CUs, it may be considered that the CU is partitioned in a ternary-tree form. In other words, it may be considered that a ternary-tree partition has been applied to the CU.

Both of quad-tree partitioning and binary-tree partitioning are applied to the LCU 310 of FIG. 3.

In the encoding apparatus 100, a Coding Tree Unit (CTU) having a size of 64×64 may be partitioned into multiple smaller CUs by a recursive quad-tree structure. A single CU may be partitioned into four CUs having the same size. Each CU may be recursively partitioned, and may have a quad-tree structure.

By the recursive partitioning of a CU, an optimal partitioning method that incurs a minimum rate-distortion cost may be selected.

The Coding Tree Unit (CTU) 320 in FIG. 3 is an example of a CTU to which all of a quad-tree partition, a binary-tree partition, and a ternary-tree partition are applied.

As described above, in order to partition a CTU, at least one of a quad-tree partition, a binary-tree partition, and a ternary-tree partition may be applied to the CTU. Partitions may be applied based on specific priority.

For example, a quad-tree partition may be preferentially applied to the CTU. A CU that cannot be partitioned in a quad-tree form any further may correspond to a leaf node of a quad-tree. A CU corresponding to the leaf node of the quad-tree may be a root node of a binary tree and/or a ternary tree. That is, the CU corresponding to the leaf node of the quad-tree may be partitioned in a binary-tree form or a ternary-tree form, or may not be partitioned any further. In this case, each CU, which is generated by applying a binary-tree partition or a ternary-tree partition to the CU corresponding to the leaf node of a quad-tree, is prevented from being subjected again to quad-tree partitioning, thus effectively performing partitioning of a block and/or signaling of block partition information.

The partition of a CU corresponding to each node of a quad-tree may be signaled using quad-partition information. Quad-partition information having a first value (e.g., "1") may indicate that the corresponding CU is partitioned in a quad-tree form. Quad-partition information having a second value (e.g., "0") may indicate that the corresponding CU is not partitioned in a quad-tree form. The quad-partition information may be a flag having a specific length (e.g., 1 bit).

Priority may not exist between a binary-tree partition and a ternary-tree partition. That is, a CU corresponding to the leaf node of a quad-tree may be partitioned in a binary-tree form or a ternary-tree form. Also, the CU generated through a binary-tree partition or a ternary-tree partition may be further partitioned in a binary-tree form or a ternary-tree form, or may not be partitioned any further.

Partitioning performed when priority does not exist between a binary-tree partition and a ternary-tree partition may be referred to as a "multi-type tree partition". That is, a CU corresponding to the leaf node of a quad-tree may be the root node of a multi-type tree. Partitioning of a CU corresponding to each node of the multi-type tree may be signaled using at least one of information indicating whether the CU is partitioned in a multi-type tree, partition direction information, and partition tree information. For partitioning of a CU corresponding to each node of a multi-type tree, information indicating whether partitioning in the multi-type tree is performed, partition direction information, and partition tree information may be sequentially signaled.

For example, information indicating whether a CU is partitioned in a multi-type tree and having a first value (e.g., "1") may indicate that the corresponding CU is partitioned in a multi-type tree form. Information indicating whether a CU is partitioned in a multi-type tree and having a second value (e.g., "0") may indicate that the corresponding CU is not partitioned in a multi-type tree form.

When a CU corresponding to each node of a multi-type tree is partitioned in a multi-type tree form, the corresponding CU may further include partition direction information.

The partition direction information may indicate the partition direction of the multi-type tree partition. Partition direction information having a first value (e.g., "1") may indicate that the corresponding CU is partitioned in a vertical direction. Partition direction information having a second value (e.g., "0") may indicate that the corresponding CU is partitioned in a horizontal direction.

When a CU corresponding to each node of a multi-type tree is partitioned in a multi-type tree form, the corresponding CU may further include partition-tree information. The partition-tree information may indicate the tree that is used for a multi-type tree partition.

For example, partition-tree information having a first value (e.g., "1") may indicate that the corresponding CU is partitioned in a binary-tree form. Partition-tree information having a second value (e.g., "0") may indicate that the corresponding CU is partitioned in a ternary-tree form.

Here, each of the above-described information indicating whether partitioning in the multi-type tree is performed, partition-tree information, and partition direction information may be a flag having a specific length (e.g., 1 bit).

At least one of the above-described quad-partition information, information indicating whether partitioning in the multi-type tree is performed, partition direction information, and partition-tree information may be entropy-encoded and/or entropy-decoded. In order to perform entropy encoding/decoding of such information, information of a neighbor CU adjacent to a target CU may be used.

For example, it may be considered that there is a high probability that the partition form of a left CU and/or an above CU (i.e., partitioning/non-partitioning, a partition tree and/or a partition direction) and the partition form of a target CU will be similar to each other. Therefore, based on the information of a neighbor CU, context information for entropy encoding and/or entropy decoding of the information of the target CU may be derived. Here, the information of the neighbor CU may include at least one of 1) quad-partition information of the neighbor CU, 2) information indicating whether the neighbor CU is partitioned in a multi-type tree, 3) partition direction information of the neighbor CU, and 4) partition-tree information of the neighbor CU.

In another embodiment, of a binary-tree partition and a ternary-tree partition, the binary-tree partition may be preferentially performed. That is, the binary-tree partition may be first applied, and then a CU corresponding to the leaf node of a binary tree may be set to the root node of a ternary tree. In this case, a quad-tree partition or a binary-tree partition may not be performed on the CU corresponding to the node of the ternary tree.

A CU, which is not partitioned any further through a quad-tree partition, a binary-tree partition, and/or a ternary-tree partition, may be the unit of encoding, prediction and/or transform. That is, the CU may not be partitioned any further for prediction and/or transform. Therefore, a partition structure for partitioning the CU into Prediction Units (PUs) and/or Transform Units (TUs), partition information thereof, etc. may not be present in a bitstream.

However, when the size of a CU, which is the unit of partitioning, is greater than the size of a maximum transform block, the CU may be recursively partitioned until the size of the CU becomes less than or equal to the size of the maximum transform block. For example, when the size of a CU is 64×64 and the size of the maximum transform block is 32×32, the CU may be partitioned into four 32×32 blocks so as to perform a transform. For example, when the size of a CU is 32×64 and the size of the maximum transform block is 32×32, the CU may be partitioned into two 32×32 blocks.

In this case, information indicating whether a CU is partitioned for a transform may not be separately signaled. Without signaling, whether a CU is partitioned may be determined via a comparison between the horizontal size (and/or vertical size) of the CU and the horizontal size (and/or vertical size) of the maximum transform block. For example, when the horizontal size of the CU is greater than the horizontal size of the maximum transform block, the CU may be vertically bisected. Further, when the vertical size of the CU is greater than the vertical size of the maximum transform block, the CU may be horizontally bisected.

Information about the maximum size and/or minimum size of a CU and information about the maximum size and/or minimum size of a transform block may be signaled or determined at a level higher than that of the CU. For example, the higher level may be a sequence level, a picture level, a tile level, a tile group level or a slice level. For example, the minimum size of the CU may be set to 4×4. For example, the maximum size of the transform block may be set to 64×64. For example, the maximum size of the transform block may be set to 4×4.

Information about the minimum size of a CU corresponding to the leaf node of a quad-tree (i.e., the minimum size of the quad-tree) and/or information about the maximum depth of a path from the root node to the leaf node of a multi-type tree (i.e., the maximum depth of a multi-type tree) may be signaled or determined at a level higher than that of the CU. For example, the higher level may be a sequence level, a picture level, a slice level, a tile group level or a tile level. Information about the minimum size of a quad-tree and/or information about the maximum depth of a multi-type tree may be separately signaled or determined at each of an intra-slice level and an inter-slice level.

Information about the difference between the size of a CTU and the maximum size of a transform block may be signaled or determined at a level higher than that of a CU. For example, the higher level may be a sequence level, a picture level, a slice level, a tile group level or a tile level. Information about the maximum size of a CU corresponding to each node of a binary tree (i.e., the maximum size of the binary tree) may be determined based on the size and the difference information of a CTU. The maximum size of a CU corresponding to each node of a ternary tree (i.e., the maximum size of the ternary tree) may have different values depending on the type of slice. For example, the maximum size of the ternary tree at an intra-slice level may be 32×32. For example, the maximum size of the ternary tree at an inter-slice level may be 128×128. For example, the minimum size of a CU corresponding to each node of a binary tree (i.e., the minimum size of the binary tree) and/or the minimum size of a CU corresponding to each node of a ternary tree (i.e., the minimum size of the ternary tree) may be set to the minimum size of a CU.

In a further example, the maximum size of a binary tree and/or the maximum size of a ternary tree may be signaled or determined at a slice level. Also, the minimum size of a binary tree and/or the minimum size of a ternary tree may be signaled or determined at a slice level.

Based on the above-described various block sizes and depths, quad-partition information, information indicating whether partitioning in a multi-type tree is performed, partition tree information and/or partition direction information may or may not be present in a bitstream.

For example, when the size of a CU is not greater than the minimum size of a quad-tree, the CU may not include quad-partition information, and quad-partition information of the CU may be inferred as a second value.

For example, when the size of a CU corresponding to each node of a multi-type tree (horizontal size and vertical size) is greater than the maximum size of a binary tree (horizontal size and vertical size) and/or the maximum size of a ternary tree (horizontal size and vertical size), the CU may not be partitioned in a binary-tree form and/or a ternary-tree form. By means of this determination manner, information indicating whether partitioning in a multi-type tree is performed may not be signaled, but may be inferred as a second value.

Alternatively, when the size of a CU corresponding to each node of a multi-type tree (horizontal size and vertical size) is equal to the minimum size of a binary tree (horizontal size and vertical size), or when the size of a CU (horizontal size and vertical size) is equal to twice the minimum size of a ternary tree (horizontal size and vertical size), the CU may not be partitioned in a binary tree form and/or a ternary tree form. By means of this determination manner, information indicating whether partitioning in a multi-type tree is performed may not be signaled, but may be inferred as a second value. The reason for this is that, when a CU is partitioned in a binary tree form and/or a ternary tree form, a CU smaller than the minimum size of the binary tree and/or the minimum size of the ternary tree is generated.

Alternatively, a binary-tree partition or a ternary-tree partition may be limited based on the size of a virtual pipeline data unit (i.e., the size of a pipeline buffer). For example, when a CU is partitioned into sub-CUs unsuitable for the size of a pipeline buffer through a binary-tree partition or a ternary-tree partition, a binary-tree partition or a ternary-tree partition may be limited. The size of the pipeline buffer may be equal to the maximum size of a transform block (e.g., 64×64).

For example, when the size of the pipeline buffer is 64×64, the following partitions may be limited.

Ternary-tree partition for N×M CU (where N and/or M are 128)

Horizontal binary-tree partition for 128×N CU (where N<=64)

Vertical binary-tree partition for N×128 CU (where N<=64)

Alternatively, when the depth of a CU corresponding to each node of a multi-type tree is equal to the maximum depth of the multi-type tree, the CU may not be partitioned in a binary-tree form and/or a ternary-tree form. By means of this determination manner, information indicating whether partitioning in a multi-type tree is performed may not be signaled, but may be inferred as a second value.

Alternatively, information indicating whether partitioning in a multi-type tree is performed may be signaled only when at least one of a vertical binary-tree partition, a horizontal binary-tree partition, a vertical ternary-tree partition, and a horizontal ternary-tree partition is possible for a CU corresponding to each node of a multi-type tree. Otherwise, the CU may not be partitioned in a binary-tree form and/or a ternary-tree form. By means of this determination manner, information indicating whether partitioning in a multi-type tree is performed may not be signaled, but may be inferred as a second value.

Alternatively, partition direction information may be signaled only when both a vertical binary-tree partition and a horizontal binary-tree partition are possible or only when both a vertical ternary-tree partition and a horizontal ternary-tree partition are possible, for a CU corresponding to each node of a multi-type tree. Otherwise, the partition direction information may not be signaled, but may be inferred as a value indicating the direction in which the CU can be partitioned.

Alternatively, partition tree information may be signaled only when both a vertical binary-tree partition and a vertical ternary-tree partition are possible or only when both a horizontal binary-tree partition and a horizontal ternary-tree partition are possible, for a CU corresponding to each node of a multi-type tree. Otherwise, the partition tree information may not be signaled, but may be inferred as a value indicating a tree that can be applied to the partition of the CU.

Figure 4:
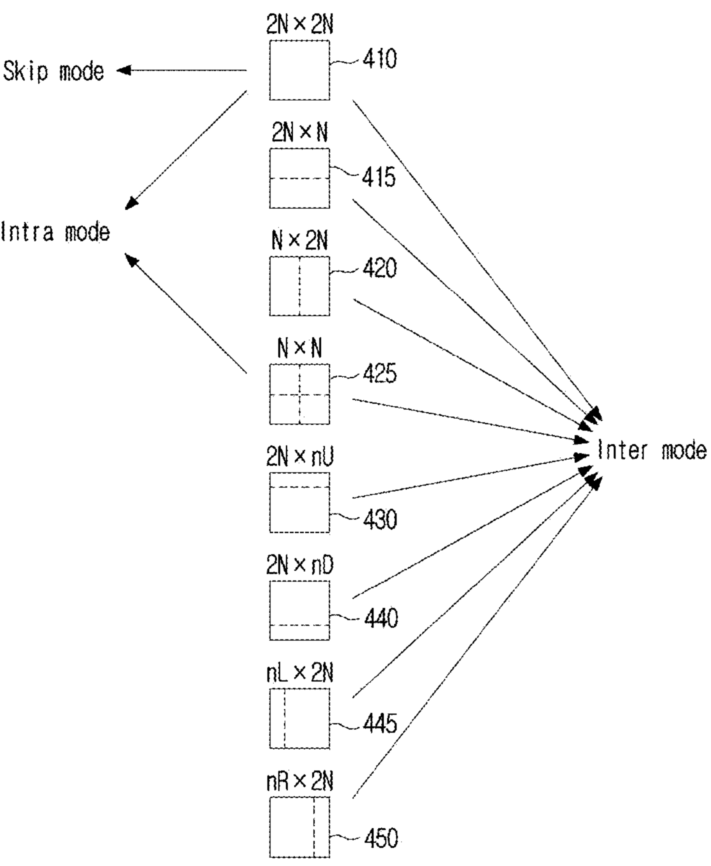
FIG. 4 is a diagram illustrating the form of a Prediction Unit (PU) that a Coding Unit (CU) can include.

FIG. 4 is a diagram illustrating the form of a Prediction Unit that a Coding Unit can include.

When, among CUs partitioned from an LCU, a CU, which is not partitioned any further, may be divided into one or more Prediction Units (PUs). Such division is also referred to as "partitioning".

A PU may be a base unit for prediction. A PU may be encoded and decoded in any one of a skip mode, an inter mode, and an intra mode. A PU may be partitioned into various shapes depending on respective modes. For example, the target block, described above with reference to FIG. 1, and the target block, described above with reference to FIG. 2, may each be a PU.

A CU may not be split into PUs. When the CU is not split into PUs, the size of the CU and the size of a PU may be equal to each other.

In a skip mode, partitioning may not be present in a CU. In the skip mode, a 2N×2N mode 410, in which the sizes of a PU and a CU are identical to each other, may be supported without partitioning.

In an inter mode, 8 types of partition shapes may be present in a CU. For example, in the inter mode, the 2N×2N mode 410, a 2N×N mode 415, an N×2N mode 420, an N×N mode 425, a 2N×nU mode 430, a 2N×nD mode 435, an nL×2N mode 440, and an nR×2N mode 445 may be supported.

In an intra mode, the 2N×2N mode 410 and the N×N mode 425 may be supported.

In the 2N×2N mode 410, a PU having a size of 2N×2N may be encoded. The PU having a size of 2N×2N may mean a PU having a size identical to that of the CU. For example, the PU having a size of 2N×2N may have a size of 64×64, 32×32, 16×16 or 8×8.

In the N×N mode 425, a PU having a size of N×N may be encoded.

For example, in intra prediction, when the size of a PU is 8×8, four partitioned PUs may be encoded. The size of each partitioned PU may be 4×4.

When a PU is encoded in an intra mode, the PU may be encoded using any one of multiple intra-prediction modes. For example, HEVC technology may provide 35 intra-prediction modes, and the PU may be encoded in any one of the 35 intra-prediction modes.

Which one of the 2N×2N mode 410 and the N×N mode 425 is to be used to encode the PU may be determined based on rate-distortion cost.

The encoding apparatus 100 may perform an encoding operation on a PU having a size of 2N×2N. Here, the encoding operation may be the operation of encoding the PU in each of multiple intra-prediction modes that can be used by the encoding apparatus 100. Through the encoding operation, the optimal intra-prediction mode for a PU having a size of 2N×2N may be derived. The optimal intra-prediction mode may be an intra-prediction mode in which a minimum rate-distortion cost occurs upon encoding the PU having a size of 2N×2N, among multiple intra-prediction modes that can be used by the encoding apparatus 100.

Further, the encoding apparatus 100 may sequentially perform an encoding operation on respective PUs obtained from N×N partitioning. Here, the encoding operation may be the operation of encoding a PU in each of multiple intra-prediction modes that can be used by the encoding apparatus 100. By means of the encoding operation, the optimal intra-prediction mode for the PU having a size of N×N may be derived. The optimal intra-prediction mode may be an intra-prediction mode in which a minimum rate-distortion cost occurs upon encoding the PU having a size of N×N, among multiple intra-prediction modes that can be used by the encoding apparatus 100.

The encoding apparatus 100 may determine which of a PU having a size of 2N×2N and PUs having sizes of N×N to be encoded based on a comparison of a rate-distortion cost of the PU having a size of 2N×2N and a rate-distortion costs of the PUs having sizes of N×N.

A single CU may be partitioned into one or more PUs, and a PU may be partitioned into multiple PUs.

For example, when a single PU is partitioned into four PUs, the horizontal size and vertical size of each of four PUs generated by partitioning may be half the horizontal size and the vertical size of the PU before being partitioned. When a PU having a 32×32 size is partitioned into four PUs, the size of each of four partitioned PUs may be 16×16. When a single PU is partitioned into four PUs, it may be considered that the PU has been partitioned in a quad-tree structure.

For example, when a single PU is partitioned into two PUs, the horizontal size or the vertical size of each of two PUs generated by partitioning may be half the horizontal size or the vertical size of the PU before being partitioned. When a PU having a 32×32 size is vertically partitioned into two PUs, the size of each of two partitioned PUs may be 16×32. When a PU having a 32×32 size is horizontally partitioned into two PUs, the size of each of two partitioned PUs may be 32×16. When a single PU is partitioned into two PUs, it may be considered that the PU has been partitioned in a binary-tree structure.

Figure 5:
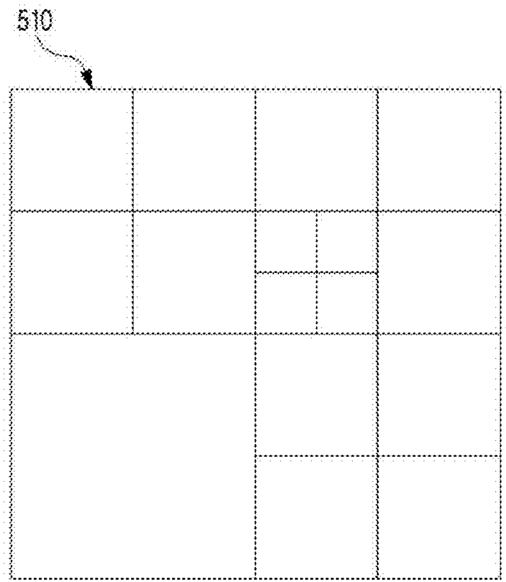
FIG. 5 is a diagram illustrating the form of a Transform Unit (TU) that can be included in a CU.

FIG. 5 is a diagram illustrating the form of a Transform Unit that can be included in a Coding Unit.

A Transform Unit (TU) may have a base unit that is used for a procedure, such as transform, quantization, inverse transform, dequantization, entropy encoding, and entropy decoding, in a CU.

A TU may have a square shape or a rectangular shape. A shape of a TU may be determined based on a size and/or a shape of a CU.

Among CUs partitioned from the LCU, a CU which is not partitioned into CUs any further may be partitioned into one or more TUs. Here, the partition structure of a TU may be a quad-tree structure. For example, as shown in FIG. 5, a single CU 510 may be partitioned one or more times depending on the quad-tree structure. By means of this partitioning, the single CU 510 may be composed of TUs having various sizes.

It can be considered that when a single CU is split two or more times, the CU is recursively split. Through splitting, a single CU may be composed of Transform Units (TUs) having various sizes.

Alternatively, a single CU may be split into one or more TUs based on the number of vertical lines and/or horizontal lines that split the CU.

A CU may be split into symmetric TUs or asymmetric TUs. For splitting into asymmetric TUs, information about the size and/or shape of each TU may be signaled from the encoding apparatus 100 to the decoding apparatus 200. Alternatively, the size and/or shape of each TU may be derived from information about the size and/or shape of the CU.

A CU may not be split into TUs. When the CU is not split into TUs, the size of the CU and the size of a TU may be equal to each other.

A single CU may be partitioned into one or more TUs, and a TU may be partitioned into multiple TUs.

For example, when a single TU is partitioned into four TUs, the horizontal size and vertical size of each of four TUs generated by partitioning may be half the horizontal size and the vertical size of the TU before being partitioned. When a TU having a 32×32 size is partitioned into four TUs, the size of each of four partitioned TUs may be 16×16. When a single TU is partitioned into four TUs, it may be considered that the TU has been partitioned in a quad-tree structure.

For example, when a single TU is partitioned into two TUs, the horizontal size or the vertical size of each of two TUs generated by partitioning may be half the horizontal size or the vertical size of the TU before being partitioned. When a TU having a 32×32 size is vertically partitioned into two TUs, the size of each of two partitioned TUs may be 16×32. When a TU having a 32×32 size is horizontally partitioned into two TUs, the size of each of two partitioned TUs may be 32×16. When a single TU is partitioned into two TUs, it may be considered that the TU has been partitioned in a binary-tree structure.

In a way differing from that illustrated in FIG. 5, a CU may be split.

For example, a single CU may be split into three CUs. The horizontal sizes or vertical sizes of the three CUs generated from splitting may be ¼, ½, and ¼, respectively, of the horizontal size or vertical size of the original CU before being split.

For example, when a CU having a 32×32 size is vertically split into three CUs, the sizes of the three CUs generated from the splitting may be 8×32, 16×32, and 8×32, respectively. In this way, when a single CU is split into three CUs, it may be considered that the CU is split in the form of a ternary tree.

One of exemplary splitting forms, that is, quad-tree splitting, binary tree splitting, and ternary tree splitting, may be applied to the splitting of a CU, and multiple splitting schemes may be combined and used together for splitting of a CU. Here, the case where multiple splitting schemes are combined and used together may be referred to as "complex tree-format splitting".

Figure 6:
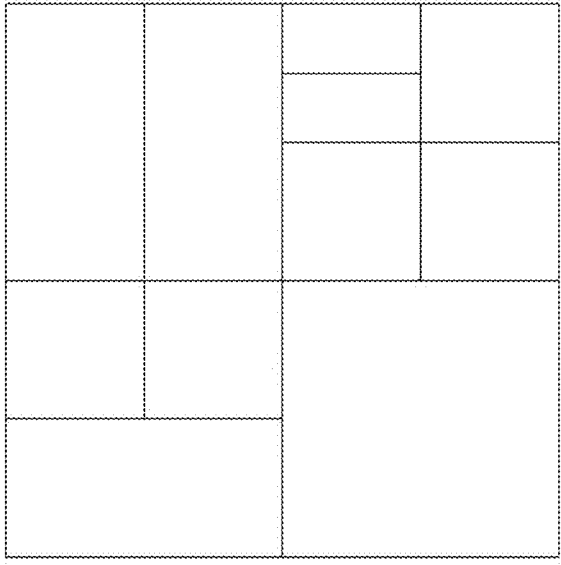
FIG. 6 illustrates splitting of a block according to an example.

FIG. 6 illustrates the splitting of a block according to an example.

In a video encoding and/or decoding process, a target block may be split, as illustrated in FIG. 6. For example, the target block may be a CU.

For splitting of the target block, an indicator indicating split information may be signaled from the encoding apparatus 100 to the decoding apparatus 200. The split information may be information indicating how the target block is split.

The split information may be one or more of a split flag (hereinafter referred to as "split_flag"), a quad-binary flag (hereinafter referred to as "QB_flag"), a quad-tree flag (hereinafter referred to as "quadtree_flag"), a binary tree flag (hereinafter referred to as "binarytree_flag"), and a binary type flag (hereinafter referred to as "Btype_flag").

"split_flag" may be a flag indicating whether a block is split. For example, a split_flag value of 1 may indicate that the corresponding block is split. A split_flag value of 0 may indicate that the corresponding block is not split.

"QB_flag" may be a flag indicating which one of a quad-tree form and a binary tree form corresponds to the shape in which the block is split. For example, a QB_flag value of 0 may indicate that the block is split in a quad-tree form. A QB_flag value of 1 may indicate that the block is split in a binary tree form. Alternatively, a QB_flag value of 0 may indicate that the block is split in a binary tree form. A QB_flag value of 1 may indicate that the block is split in a quad-tree form.

"quadtree_flag" may be a flag indicating whether a block is split in a quad-tree form. For example, a quadtree_flag value of 1 may indicate that the block is split in a quad-tree form. A quadtree_flag value of 0 may indicate that the block is not split in a quad-tree form.

"binarytree_flag" may be a flag indicating whether a block is split in a binary tree form. For example, a binarytree_flag value of 1 may indicate that the block is split in a binary tree form. A binarytree_flag value of 0 may indicate that the block is not split in a binary tree form.

"Btype_flag" may be a flag indicating which one of a vertical split and a horizontal split corresponds to a split direction when a block is split in a binary tree form. For example, a Btype_flag value of 0 may indicate that the block is split in a horizontal direction. A Btype_flag value of 1 may indicate that a block is split in a vertical direction. Alternatively, a Btype_flag value of 0 may indicate that the block is split in a vertical direction. A Btype_flag value of 1 may indicate that a block is split in a horizontal direction.

For example, the split information of the block in FIG. 6 may be derived by signaling at least one of quadtree_flag, binarytree_flag, and Btype_flag, as shown in the following Table 1.

TABLE 1

| quadtree_flag | binarytree_flag | Btype_flag |
|---|---|---|
| 1 | | |
| 0 | | |
| | 1 | |
| | | 1 |
| | 0 | |
| | 0 | |
| 1 | | |
| 0 | | |
| | 1 | |
| | | 0 |
| | 0 | |
| | 0 | |
| 0 | | |
| | 0 | |
| 0 | | |
| | 0 | |
| 0 | | |
| | 0 | |
| 0 | | |
| | 1 | |
| | | 0 |
| | 1 | |
| | | 1 |
| | 0 | |
| | 0 | |
| | 0 | |
| 0 | | |
| | 0 | |

For example, the split information of the block in FIG. 6 may be derived by signaling at least one of split_lag, QB_flag and Btype_flag, as shown in the following Table 2.

TABLE 2

| split_flag | QB_flag | Btype_flag |
|---|---|---|
| 1 | | |
| | 0 | |
| 1 | | |
| | 1 | |
| | | 1 |
| 0 | | |
| 0 | | |
| 1 | | |
| | 0 | |
| 1 | | |
| | 1 | |
| | | 0 |
| 0 | | |
| 0 | | |
| 0 | | |
| 0 | | |
| 0 | | |
| 1 | | |
| | 1 | |
| | | 0 |
| 1 | | |
| | | 1 |
| 0 | | |
| 0 | | |
| 0 | | |
| 0 | | |

The splitting method may be limited only to a quad-tree or to a binary tree depending on the size and/or shape of the block. When this limitation is applied, split_flag may be a flag indicating whether a block is split in a quad-tree form or a flag indicating whether a block is split in a binary tree form. The size and shape of a block may be derived depending on the depth information of the block, and the depth information may be signaled from the encoding apparatus 100 to the decoding apparatus 200.

When the size of a block falls within a specific range, only splitting in a quad-tree form may be possible. For example, the specific range may be defined by at least one of a maximum block size and a minimum block size at which only splitting in a quad-tree form is possible.

Information indicating the maximum block size and the minimum block size at which only splitting in a quad-tree form is possible may be signaled from the encoding apparatus 100 to the decoding apparatus 200 through a bitstream. Further, this information may be signaled for at least one of units such as a video, a sequence, a picture, a parameter, a tile group, and a slice (or a segment).

Alternatively, the maximum block size and/or the minimum block size may be fixed sizes predefined by the encoding apparatus 100 and the decoding apparatus 200. For example, when the size of a block is above 64×64 and below 256×256, only splitting in a quad-tree form may be possible. In this case, split_flag may be a flag indicating whether splitting in a quad-tree form is performed.

When the size of a block is greater than the maximum size of a transform block, only partitioning in a quad-tree form may be possible. Here, a sub-block resulting from partitioning may be at least one of a CU and a TU.

In this case, split_flag may be a flag indicating whether a CU is partitioned in a quad-tree form.

When the size of a block falls within the specific range, only splitting in a binary tree form or a ternary tree form may be possible. For example, the specific range may be defined by at least one of a maximum block size and a minimum block size at which only splitting in a binary tree form or a ternary tree form is possible.

Information indicating the maximum block size and/or the minimum block size at which only splitting in a binary tree form or splitting in a ternary tree form is possible may be signaled from the encoding apparatus 100 to the decoding apparatus 200 through a bitstream. Further, this information may be signaled for at least one of units such as a sequence, a picture, and a slice (or a segment).

Alternatively, the maximum block size and/or the minimum block size may be fixed sizes predefined by the encoding apparatus 100 and the decoding apparatus 200. For example, when the size of a block is above 8×8 and below 16×16, only splitting in a binary tree form may be possible. In this case, split_flag may be a flag indicating whether splitting in a binary tree form or a ternary tree form is performed.

The above description of partitioning in a quad-tree form may be equally applied to a binary-tree form and/or a ternary-tree form.

The partition of a block may be limited by a previous partition. For example, when a block is partitioned in a specific binary-tree form and then multiple sub-blocks are generated from the partitioning, each sub-block may be additionally partitioned only in a specific tree form. Here, the specific tree form may be at least one of a binary-tree form, a ternary-tree form, and a quad-tree form.

When the horizontal size or vertical size of a partition block is a size that cannot be split further, the above-described indicator may not be signaled.

Figure 7:
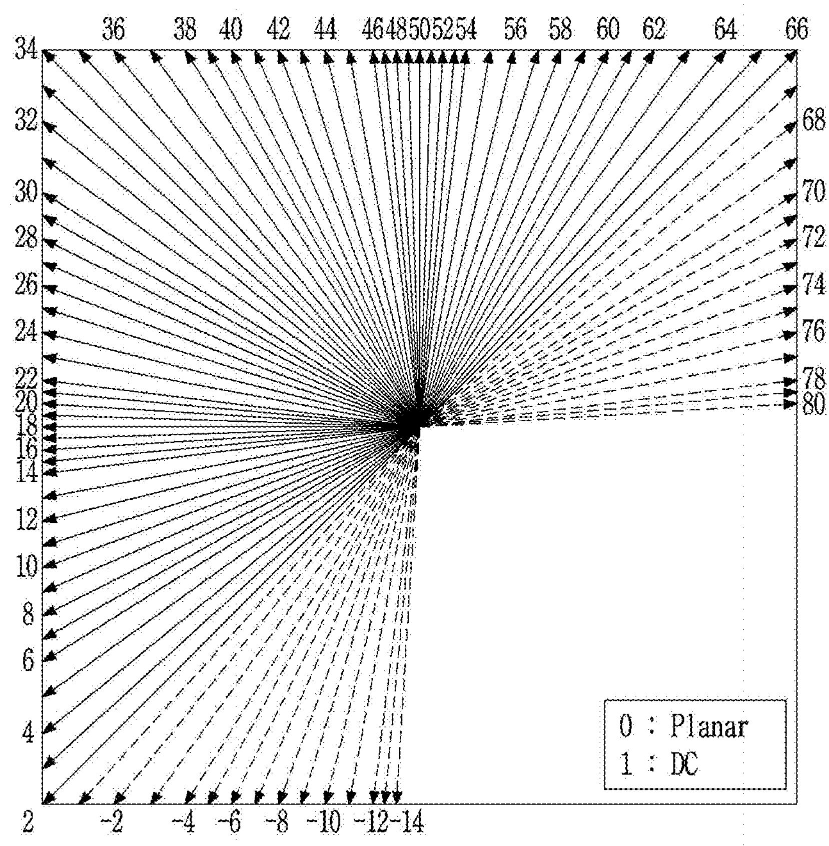
FIG. 7 is a diagram for explaining an embodiment of an intra-prediction procedure.

FIG. 7 is a diagram for explaining an embodiment of an intra-prediction process.

Arrows radially extending from the center of the graph in FIG. 7 indicate the prediction directions of intra-prediction modes. Further, numbers appearing near the arrows indicate examples of mode values assigned to intra-prediction modes or to the prediction directions of the intra-prediction modes.

In FIG. 7, A number 0 may represent a Planar mode which is a non-directional intra prediction mode. A number 1 may represent a DC mode which is a non-directional intra prediction mode Intra encoding and/or decoding may be performed using a reference sample of neighbor block of a target block. The neighbor block may be a reconstructed neighbor block. The reference sample may mean a neighbor sample.

For example, intra encoding and/or decoding may be performed using the value of a reference sample which are included in are reconstructed neighbor block or the coding parameters of the reconstructed neighbor block.

The encoding apparatus 100 and/or the decoding apparatus 200 may generate a prediction block by performing intra prediction on a target block based on information about samples in a target image. When intra prediction is performed, the encoding apparatus 100 and/or the decoding apparatus 200 may generate a prediction block for the target block by performing intra prediction based on information about samples in the target image. When intra prediction is performed, the encoding apparatus 100 and/or the decoding apparatus 200 may perform directional prediction and/or non-directional prediction based on at least one reconstructed reference sample.

A prediction block may be a block generated as a result of performing intra prediction. A prediction block may correspond to at least one of a CU, a PU, and a TU.

The unit of a prediction block may have a size corresponding to at least one of a CU, a PU, and a TU. The prediction block may have a square shape having a size of 2N×2N or N×N. The size of N×N may include sizes of 4×4, 8×8, 16×16, 32×32, 64×64, or the like.

Alternatively, a prediction block may a square block having a size of 2×2, 4×4, 8×8, 16×16, 32×32, 64×64 or the like or a rectangular block having a size of 2×8, 4×8, 2×16, 4×16, 8×16, or the like.

Intra prediction may be performed in consideration of the intra-prediction mode for the target block. The number of intra-prediction modes that the target block can have may be a predefined fixed value, and may be a value determined differently depending on the attributes of a prediction block. For example, the attributes of the prediction block may include the size of the prediction block, the type of prediction block, etc. Further, the attribute of a prediction block may indicate a coding parameter for the prediction block.

For example, the number of intra-prediction modes may be fixed at N regardless of the size of a prediction block. Alternatively, the number of intra-prediction modes may be, for example, 3, 5, 9, 17, 34, 35, 36, 65, 67 or 95.

The intra-prediction modes may be non-directional modes or directional modes.

For example, the intra-prediction modes may include two non-directional modes and 65 directional modes corresponding to numbers 0 to 66 illustrated in FIG. 7.

For example, the intra-prediction modes may include two non-directional modes and 93 directional modes corresponding to numbers −14 to 80 illustrated in FIG. 7 in a case that a specific intra prediction method is used.

The two non-directional modes may include a DC mode and a planar mode.

A directional mode may be a prediction mode having a specific direction or a specific angle. The directional mode may also be referred to as an "angular mode".

An intra-prediction mode may be represented by at least one of a mode number, a mode value, a mode angle, and a mode direction. In other words, the terms "(mode) number of the intra-prediction mode", "(mode) value of the intra-prediction mode", "(mode) angle of the intra-prediction mode", and "(mode) direction of the intra-prediction mode" may be used to have the same meaning, and may be used interchangeably with each other.

The number of intra-prediction modes may be M. The value of M may be 1 or more. In other words, the number of intra-prediction modes may be M, which includes the number of non-directional modes and the number of directional modes.

The number of intra-prediction modes may be fixed to M regardless of the size and/or the color component of a block. For example, the number of intra-prediction modes may be fixed at any one of 35 and 67 regardless of the size of a block.

Alternatively, the number of intra-prediction modes may differ depending on the shape, the size and/or the type of the color component of a block.

For example, in FIG. 7, directional prediction modes illustrated as dashed lines may be applied only for a prediction for a non-square block.

For example, the larger the size of the block, the greater the number of intra-prediction modes. Alternatively, the larger the size of the block, the smaller the number of intra-prediction modes. When the size of the block is 4×4 or 8×8, the number of intra-prediction modes may be 67. When the size of the block is 16×16, the number of intra-prediction modes may be 35. When the size of the block is 32×32, the number of intra-prediction modes may be 19. When the size of a block is 64×64, the number of intra-prediction modes may be 7.

For example, the number of intra prediction modes may differ depending on whether a color component is a luma signal or a chroma signal. Alternatively, the number of intra-prediction modes corresponding to a luma component block may be greater than the number of intra-prediction modes corresponding to a chroma component block.

For example, in a vertical mode having a mode value of 50, prediction may be performed in a vertical direction based on the pixel value of a reference sample. For example, in a horizontal mode having a mode value of 18, prediction may be performed in a horizontal direction based on the pixel value of a reference sample.

Even in directional modes other than the above-described mode, the encoding apparatus 100 and the decoding apparatus 200 may perform intra prediction on a target unit using reference samples depending on angles corresponding to the directional modes.

Intra-prediction modes located on a right side with respect to the vertical mode may be referred to as 'vertical-right modes'. Intra-prediction modes located below the horizontal mode may be referred to as 'horizontal-below modes'. For example, in FIG. 7, the intra-prediction modes in which a mode value is one of 51, 52, 53, 54, 55, 56, 57, 58, 59, 60, 61, 62, 63, 64, 65, and 66 may be vertical-right modes. Intra-prediction modes in which a mode value is one of 2, 3, 4, 5, 6, 7, 8, 9, 10, 11, 12, 13, 14, 15, 16, and 17 may be horizontal-below modes.

The non-directional mode may include a DC mode and a planar mode. For example, a value of the DC mode may be 1. A value of the planar mode may be 0.

The directional mode may include an angular mode. Among the plurality of the intra prediction modes, remaining modes except for the DC mode and the planar mode may be directional modes.

When the intra-prediction mode is a DC mode, a prediction block may be generated based on the average of pixel values of a plurality of reference pixels. For example, a value of a pixel of a prediction block may be determined based on the average of pixel values of a plurality of reference pixels.

The number of above-described intra-prediction modes and the mode values of respective intra-prediction modes are merely exemplary. The number of above-described intra-prediction modes and the mode values of respective intra-prediction modes may be defined differently depending on the embodiments, implementation and/or requirements.

In order to perform intra prediction on a target block, the step of checking whether samples included in a reconstructed neighbor block can be used as reference samples of a target block may be performed. When a sample that cannot be used as a reference sample of the target block is present among samples in the neighbor block, a value generated via copying and/or interpolation that uses at least one sample value, among the samples included in the reconstructed neighbor block, may replace the sample value of the sample that cannot be used as the reference sample. When the value generated via copying and/or interpolation replaces the sample value of the existing sample, the sample may be used as the reference sample of the target block.

When intra prediction is used, a filter may be applied to at least one of a reference sample and a prediction sample based on at least one of the intra-prediction mode and the size of the target block.

The type of filter to be applied to at least one of a reference sample and a prediction sample may differ depending on at least one of the intra-prediction mode of a target block, the size of the target block, and the shape of the target block. The types of filters may be classified depending on one or more of the length of filter tap, the value of a filter coefficient, and filter strength. The length of filter tap may mean the number of filter taps. Also, the number of filter tap may mean the length of the filter.

When the intra-prediction mode is a planar mode, a sample value of a prediction target block may be generated using a weighted sum of an above reference sample of the target block, a left reference sample of the target block, an above-right reference sample of the target block, and a below-left reference sample of the target block depending on the location of the prediction target sample in the prediction block when the prediction block of the target block is generated.

When the intra-prediction mode is a DC mode, the average of reference samples above the target block and the reference samples to the left of the target block may be used when the prediction block of the target block is generated. Also, filtering using the values of reference samples may be performed on specific rows or specific columns in the target block. The specific rows may be one or more upper rows adjacent to the reference sample. The specific columns may be one or more left columns adjacent to the reference sample.

When the intra-prediction mode is a directional mode, a prediction block may be generated using the above reference samples, left reference samples, above-right reference sample and/or below-left reference sample of the target block.

In order to generate the above-described prediction sample, real-number-based interpolation may be performed.

The intra-prediction mode of the target block may be predicted from intra prediction mode of a neighbor block adjacent to the target block, and the information used for prediction may be entropy-encoded/decoded.

For example, when the intra-prediction modes of the target block and the neighbor block are identical to each other, it may be signaled, using a predefined flag, that the intra-prediction modes of the target block and the neighbor block are identical.

For example, an indicator for indicating an intra-prediction mode identical to that of the target block, among intra-prediction modes of multiple neighbor blocks, may be signaled.

When the intra-prediction modes of the target block and a neighbor block are different from each other, information about the intra-prediction mode of the target block may be encoded and/or decoded using entropy encoding and/or decoding.

Figure 8:
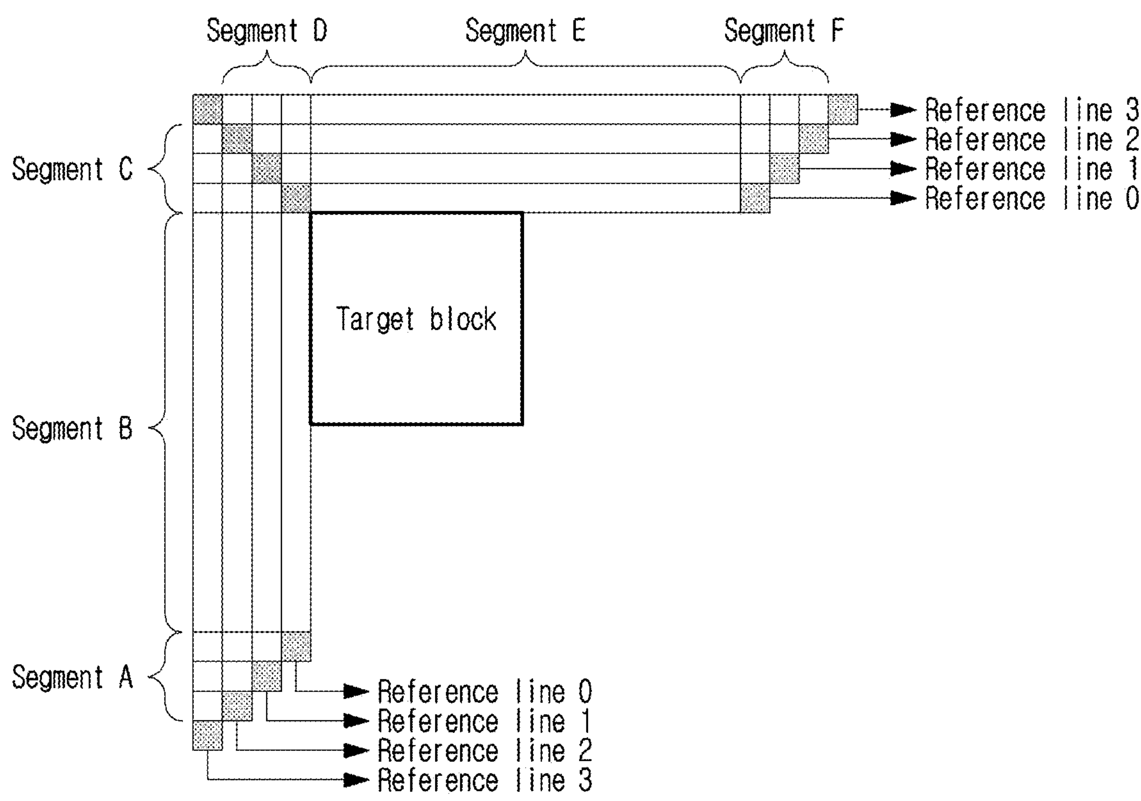
FIG. 8 is a diagram illustrating reference samples used in an intra-prediction procedure.

FIG. 8 is a diagram illustrating reference samples used in an intra-prediction procedure.

Reconstructed reference samples used for intra prediction of the target block may include below-left reference samples, left reference samples, an above-left corner reference sample, above reference samples, and above-right reference samples.

For example, the left reference samples may mean reconstructed reference pixels adjacent to the left side of the target block. The above reference samples may mean reconstructed reference pixels adjacent to the top of the target block. The above-left corner reference sample may mean a reconstructed reference pixel located at the above-left corner of the target block. The below-left reference samples may mean reference samples located below a left sample line composed of the left reference samples, among samples located on the same line as the left sample line. The above-right reference samples may mean reference samples located to the right of an above sample line composed of the above reference samples, among samples located on the same line as the above sample line.

When the size of a target block is N×N, the numbers of the below-left reference samples, the left reference samples, the above reference samples, and the above-right reference samples may each be N.

By performing intra prediction on the target block, a prediction block may be generated. The generation of the prediction block may include the determination of the values of pixels in the prediction block. The sizes of the target block and the prediction block may be equal.

The reference samples used for intra prediction of the target block may vary depending on the intra-prediction mode of the target block. The direction of the intra-prediction mode may represent a dependence relationship between the reference samples and the pixels of the prediction block. For example, the value of a specified reference sample may be used as the values of one or more specified pixels in the prediction block. In this case, the specified reference sample and the one or more specified pixels in the prediction block may be the sample and pixels which are positioned in a straight line in the direction of an intra-prediction mode. In other words, the value of the specified reference sample may be copied as the value of a pixel located in a direction reverse to the direction of the intra-prediction mode. Alternatively, the value of a pixel in the prediction block may be the value of a reference sample located in the direction of the intra-prediction mode with respect to the location of the pixel.

In an example, when the intra-prediction mode of a target block is a vertical mode, the above reference samples may be used for intra prediction. When the intra-prediction mode is the vertical mode, the value of a pixel in the prediction block may be the value of a reference sample vertically located above the location of the pixel. Therefore, the above reference samples adjacent to the top of the target block may be used for intra prediction. Furthermore, the values of pixels in one row of the prediction block may be identical to those of the above reference samples.

In an example, when the intra-prediction mode of a target block is a horizontal mode, the left reference samples may be used for intra prediction. When the intra-prediction mode is the horizontal mode, the value of a pixel in the prediction block may be the value of a reference sample horizontally located left to the location of the pixel. Therefore, the left reference samples adjacent to the left of the target block may be used for intra prediction. Furthermore, the values of pixels in one column of the prediction block may be identical to those of the left reference samples.

In an example, when the mode value of the intra-prediction mode of the current block is 34, at least some of the left reference samples, the above-left corner reference sample, and at least some of the above reference samples may be used for intra prediction. When the mode value of the intra-prediction mode is 34, the value of a pixel in the prediction block may be the value of a reference sample diagonally located at the above-left corner of the pixel.

Further, At least a part of the above-right reference samples may be used for intra prediction in a case that an intra prediction mode of which a mode value is a value ranging from 52 to 66.

Further, At least apart of the below-left reference samples may be used for intra prediction in a case that an intra prediction mode of which a mode value is a value ranging from 2 to 17.

Further, the above-left corner reference sample may be used for intra prediction in a case that an intra prediction mode of which a mode value is a value ranging from 19 to 49.

The number of reference samples used to determine the pixel value of one pixel in the prediction block may be either 1, or 2 or more.

As described above, the pixel value of a pixel in the prediction block may be determined depending on the location of the pixel and the location of a reference sample indicated by the direction of the intra-prediction mode. When the location of the pixel and the location of the reference sample indicated by the direction of the intra-prediction mode are integer positions, the value of one reference sample indicated by an integer position may be used to determine the pixel value of the pixel in the prediction block.

When the location of the pixel and the location of the reference sample indicated by the direction of the intra-prediction mode are not integer positions, an interpolated reference sample based on two reference samples closest to the location of the reference sample may be generated. The value of the interpolated reference sample may be used to determine the pixel value of the pixel in the prediction block. In other words, when the location of the pixel in the prediction block and the location of the reference sample indicated by the direction of the intra-prediction mode indicate the location between two reference samples, an interpolated value based on the values of the two samples may be generated.

The prediction block generated via prediction may not be identical to an original target block. In other words, there may be a prediction error which is the difference between the target block and the prediction block, and there may also be a prediction error between the pixel of the target block and the pixel of the prediction block.

Hereinafter, the terms “difference”, “error”, and “residual” may be used to have the same meaning, and may be used interchangeably with each other.

For example, in the case of directional intra prediction, the longer the distance between the pixel of the prediction block and the reference sample, the greater the prediction error that may occur. Such a prediction error may result in discontinuity between the generated prediction block and neighbor blocks.

In order to reduce the prediction error, filtering for the prediction block may be used. Filtering may be configured to adaptively apply a filter to an area, regarded as having a large prediction error, in the prediction block. For example, the area regarded as having a large prediction error may be the boundary of the prediction block. Further, an area regarded as having a large prediction error in the prediction block may differ depending on the intra-prediction mode, and the characteristics of filters may also differ depending thereon.

As illustrated in FIG. 8, for intra prediction of a target block, at least one of reference line 0 to reference line 3 may be used.

Each reference line in FIG. 8 may indicate a reference sample line comprising one or more reference samples. As the number of the reference line is lower, a line of reference samples closer to a target block may be indicated.

Samples in segment A and segment F may be acquired through padding that uses samples closest to the target block in segment B and segment E instead of being acquired from reconstructed neighbor blocks.

Index information indicating a reference sample line to be used for intra-prediction of the target block may be signaled. The index information may indicate a reference sample line to be used for intra-prediction of the target block, among multiple reference sample lines. For example, the index information may have a value corresponding to any one of 0 to 3.

When the top boundary of the target block is the boundary of a CTU, only reference sample line 0 may be available. Therefore, in this case, index information may not be signaled. When an additional reference sample line other than reference sample line 0 is used, filtering of a prediction block, which will be described later, may not be performed.

In the case of inter-color intra prediction, a prediction block for a target block of a second color component may be generated based on the corresponding reconstructed block of a first color component.

For example, the first color component may be a luma component, and the second color component may be a chroma component.

In order to perform inter-color intra prediction, parameters for a linear model between the first color component and the second color component may be derived based on a template.

The template may include reference samples above the target block (above reference samples) and/or reference samples to the left of the target block (left reference samples), and may include above reference samples and/or left reference samples of a reconstructed block of the first color component, which correspond to the reference samples.

For example, parameters for a linear model may be derived using 1) the value of the sample of a first color component having the maximum value, among the samples in the template, 2) the value of the sample of a second color component corresponding to the sample of the first color component, 3) the value of the sample of a first color component having the minimum value, among the samples in the template, and 4) the value of the sample of a second color component corresponding to the sample of the first color component.

When the parameters for the linear model are derived, a prediction block for the target block may be generated by applying the corresponding reconstructed block to the linear model.

Depending on the image format, sub-sampling may be performed on samples neighbor the reconstructed block of the first color component and the corresponding reconstructed block of the first color component. For example, when one sample of the second color component corresponds to four samples of the first color component, one corresponding sample may be calculated by performing sub-sampling on the four samples of the first color component. When sub-sampling is performed, derivation of the parameters for the linear model and inter-color intra prediction may be performed based on the sub-sampled corresponding sample.

Information about whether inter-color intra prediction is performed and/or the range of the template may be signaled in an intra-prediction mode.

The target block may be partitioned into two or four sub-blocks in a horizontal direction and/or a vertical direction.

The sub-blocks resulting from the partitioning may be sequentially reconstructed. That is, as intra-prediction is performed on each sub-block, a sub-prediction block for the sub-block may be generated. Also, as dequantization (inverse quantization) and/or an inverse transform are performed on each sub-block, a sub-residual block for the corresponding sub-block may be generated. A reconstructed sub-block may be generated by adding the sub-prediction block to the sub-residual block. The reconstructed sub-block may be used as a reference sample for intra prediction of the sub-block having the next priority.

A sub-block may be a block including a specific number (e.g., 16) of samples or more. For example, when the target block is an 8×4 block or a 4×8 block, the target block may be partitioned into two sub-blocks. Also, when the target block is a 4×4 block, the target block cannot be partitioned into sub-blocks. When the target block has another size, the target block may be partitioned into four sub-blocks.

Information about whether intra prediction based on such sub-blocks is performed and/or information about a partition direction (horizontal direction or vertical direction) may be signaled.

Such sub-block-based intra prediction may be limited such that it is performed only when reference sample line 0 is used. When sub-block-based intra-prediction is performed, filtering of a prediction block, which will be described below, may not be performed.

A final prediction block may be generated by performing filtering on the prediction block generated via intra prediction.

Filtering may be performed by applying specific weights to a filtering target sample, which is the target to be filtered, a left reference sample, an above reference sample, and/or an above-left reference sample.

The weights and/or reference samples (e.g., the range of reference samples, the locations of the reference samples, etc.) used for filtering may be determined based on at least one of a block size, an intra-prediction mode, and the location of the filtering target sample in a prediction block.

For example, filtering may be performed only in a specific intra-prediction mode (e.g., DC mode, planar mode, vertical mode, horizontal mode, diagonal mode and/or adjacent diagonal mode).

The adjacent diagonal mode may be a mode having a number obtained by adding k to the number of the diagonal mode, and may be a mode having a number obtained by subtracting k from the number of the diagonal mode. In other words, the number of the adjacent diagonal mode may be the sum of the number of the diagonal mode and k, or may be the difference between the number of the diagonal mode and k. For example, k may be a positive integer of 8 or less.

The intra-prediction mode of the target block may be derived using the intra-prediction mode of a neighbor block present near the target block, and such a derived intra-prediction mode may be entropy-encoded and/or entropy-decoded.

For example, when the intra-prediction mode of the target block is identical to the intra-prediction mode of the neighbor block, information indicating that the intra-prediction mode of the target block is identical to the intra-prediction mode of the neighbor block may be signaled using specific flag information.

Further, for example, indicator information for a neighbor block having an intra-prediction mode identical to the intra-prediction mode of the target block, among intra-prediction modes of multiple neighbor blocks, may be signaled.

For example, when the intra-prediction mode of the target block is different from the intra-prediction mode of the neighbor block, entropy encoding and/or entropy decoding may be performed on information about the intra-prediction mode of the target block by performing entropy encoding and/or entropy decoding based on the intra-prediction mode of the neighbor block.

Figure 9:
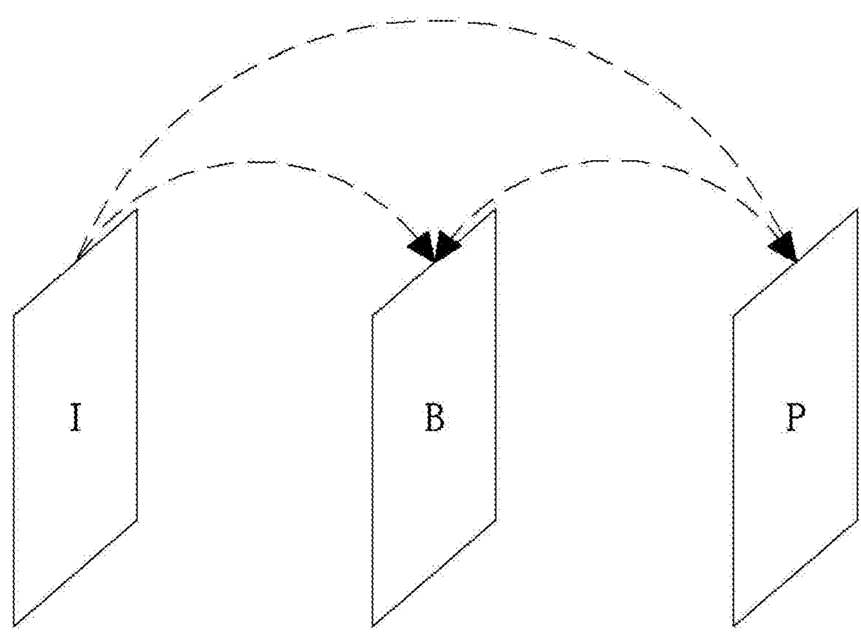
FIG. 9 is a diagram for explaining an embodiment of an inter-prediction procedure.

FIG. 9 is a diagram for explaining an embodiment of an inter prediction procedure.

The rectangles shown in FIG. 9 may represent images (or pictures). Further, in FIG. 9, arrows may represent prediction directions. An arrow pointing from a first picture to a second picture means that the second picture refers to the first picture. That is, each image may be encoded and/or decoded depending on the prediction direction.

Images may be classified into an Intra Picture (I picture), a Uni-prediction Picture or Predictive Coded Picture (P picture), and a Bi-prediction Picture or Bi-predictive Coded Picture (B picture) depending on the encoding type. Each picture may be encoded and/or decoded depending on the encoding type thereof.

When a target image that is the target to be encoded is an I picture, the target image may be encoded using data contained in the image itself without inter prediction that refers to other images. For example, an I picture may be encoded only via intra prediction.

When a target image is a P picture, the target image may be encoded via inter prediction, which uses reference pictures existing in one direction. Here, the one direction may be a forward direction or a backward direction.

When a target image is a B picture, the image may be encoded via inter prediction that uses reference pictures existing in two directions, or may be encoded via inter prediction that uses reference pictures existing in one of a forward direction and a backward direction. Here, the two directions may be the forward direction and the backward direction.

A P picture and a B picture that are encoded and/or decoded using reference pictures may be regarded as images in which inter prediction is used.

Below, inter prediction in an inter mode according to an embodiment will be described in detail.

Inter prediction or a motion compensation may be performed using a reference image and motion information.

In an inter mode, the encoding apparatus 100 may perform inter prediction and/or motion compensation on a target block. The decoding apparatus 200 may perform inter prediction and/or motion compensation, corresponding to inter prediction and/or motion compensation performed by the encoding apparatus 100, on a target block.

Motion information of the target block may be individually derived by the encoding apparatus 100 and the decoding apparatus 200 during the inter prediction. The motion information may be derived using motion information of a reconstructed neighbor block, motion information of a col block, and/or motion information of a block adjacent to the col block.

For example, the encoding apparatus 100 or the decoding apparatus 200 may perform prediction and/or motion compensation by using motion information of a spatial candidate and/or a temporal candidate as motion information of the target block. The target block may mean a PU and/or a PU partition.

A spatial candidate may be a reconstructed block which is spatially adjacent to the target block.

A temporal candidate may be a reconstructed block corresponding to the target block in a previously reconstructed co-located picture (col picture).

In inter prediction, the encoding apparatus 100 and the decoding apparatus 200 may improve encoding efficiency and decoding efficiency by utilizing the motion information of a spatial candidate and/or a temporal candidate. The motion information of a spatial candidate may be referred to as 'spatial motion information'. The motion information of a temporal candidate may be referred to as 'temporal motion information'.

Below, the motion information of a spatial candidate may be the motion information of a PU including the spatial candidate. The motion information of a temporal candidate may be the motion information of a PU including the temporal candidate. The motion information of a candidate block may be the motion information of a PU including the candidate block.

Inter prediction may be performed using a reference picture.

The reference picture may be at least one of a picture previous to a target picture and a picture subsequent to the target picture. The reference picture may be an image used for the prediction of the target block.

In inter prediction, a region in the reference picture may be specified by utilizing a reference picture index (or refIdx) for indicating a reference picture, a motion vector, which will be described later, etc. Here, the region specified in the reference picture may indicate a reference block.

Inter prediction may select a reference picture, and may also select a reference block corresponding to the target block from the reference picture. Further, inter prediction may generate a prediction block for the target block using the selected reference block.

The motion information may be derived during inter prediction by each of the encoding apparatus 100 and the decoding apparatus 200.

A spatial candidate may be a block 1) which is present in a target picture, 2) which has been previously reconstructed via encoding and/or decoding, and 3) which is adjacent to the target block or is located at the corner of the target block. Here, the "block located at the corner of the target block" may be either a block vertically adjacent to a neighbor block that is horizontally adjacent to the target block, or a block horizontally adjacent to a neighbor block that is vertically adjacent to the target block. Further, "block located at the corner of the target block" may have the same meaning as "block adjacent to the corner of the target block". The meaning of "block located at the corner of the target block" may be included in the meaning of "block adjacent to the target block".

For example, a spatial candidate may be a reconstructed block located to the left of the target block, a reconstructed block located above the target block, a reconstructed block located at the below-left corner of the target block, a reconstructed block located at the above-right corner of the target block, or a reconstructed block located at the above-left corner of the target block.

Each of the encoding apparatus 100 and the decoding apparatus 200 may identify a block present at the location spatially corresponding to the target block in a col picture. The location of the target block in the target picture and the location of the identified block in the col picture may correspond to each other.

Each of the encoding apparatus 100 and the decoding apparatus 200 may determine a col block present at the predefined relative location for the identified block to be a temporal candidate. The predefined relative location may be a location present inside and/or outside the identified block.

For example, the col block may include a first col block and a second col block. When the coordinates of the identified block are (xP, yP) and the size of the identified block is represented by (nPSW, nPSH), the first col block may be a block located at coordinates (xP+nPSW, yP+nPSH). The second col block may be a block located at coordinates (xP+(nPSW>>1), yP+(nPSH>>1)). The second col block may be selectively used when the first col block is unavailable.

The motion vector of the target block may be determined based on the motion vector of the col block. Each of the encoding apparatus 100 and the decoding apparatus 200 may scale the motion vector of the col block. The scaled motion vector of the col block may be used as the motion vector of the target block. Further, a motion vector for the motion information of a temporal candidate stored in a list may be a scaled motion vector.

The ratio of the motion vector of the target block to the motion vector of the col block may be identical to the ratio of a first temporal distance to a second temporal distance. The first temporal distance may be the distance between the reference picture and the target picture of the target block. The second temporal distance may be the distance between the reference picture and the col picture of the col block.

The scheme for deriving motion information may change depending on the inter-prediction mode of a target block. For example, as inter-prediction modes applied for inter prediction, an Advanced Motion Vector Predictor (AMVP) mode, a merge mode, a skip mode, a merge mode with a motion vector difference, a sub block merge mode, a triangle partition mode, an inter-intra combined prediction mode, an affine inter mode, a current picture reference mode, etc. may be present. The merge mode may also be referred to as a "motion merge mode". Individual modes will be described in detail below.

1) AMVP Mode

When an AMVP mode is used, the encoding apparatus 100 may search a neighbor region of a target block for a similar block. The encoding apparatus 100 may acquire a prediction block by performing prediction on the target block using motion information of the found similar block. The encoding apparatus 100 may encode a residual block, which is the difference between the target block and the prediction block.

1-1) Creation of List of Prediction Motion Vector Candidates

When an AMVP mode is used as the prediction mode, each of the encoding apparatus 100 and the decoding apparatus 200 may create a list of prediction motion vector candidates using the motion vector of a spatial candidate, the motion vector of a temporal candidate, and a zero vector. The prediction motion vector candidate list may include one or more prediction motion vector candidates. At least one of the motion vector of a spatial candidate, the motion vector of a temporal candidate, and a zero vector may be determined and used as a prediction motion vector candidate.

Hereinafter, the terms "prediction motion vector (candidate)" and "motion vector (candidate)" may be used to have the same meaning, and may be used interchangeably with each other.

Hereinafter, the terms "prediction motion vector candidate" and "AMVP candidate" may be used to have the same meaning, and may be used interchangeably with each other.

Hereinafter, the terms "prediction motion vector candidate list" and "AMVP candidate list" may be used to have the same meaning, and may be used interchangeably with each other.

Spatial candidates may include a reconstructed spatial neighbor block. In other words, the motion vector of the reconstructed neighbor block may be referred to as a "spatial prediction motion vector candidate".

Temporal candidates may include a col block and a block adjacent to the col block. In other words, the motion vector of the col block or the motion vector of the block adjacent to the col block may be referred to as a "temporal prediction motion vector candidate".

The zero vector may be a (0, 0) motion vector.

The prediction motion vector candidates may be motion vector predictors for predicting a motion vector. Also, in the encoding apparatus 100, each prediction motion vector candidate may be an initial search location for a motion vector.

1-2) Search for Motion Vectors that Use List of Prediction Motion Vector Candidates The encoding apparatus 100 may determine the motion vector to be used to encode a target block within a search range using a list of prediction motion vector candidates. Further, the encoding apparatus 100 may determine a prediction motion vector candidate to be used as the prediction motion vector of the target block, among prediction motion vector candidates present in the prediction motion vector candidate list.

The motion vector to be used to encode the target block may be a motion vector that can be encoded at minimum cost.

Further, the encoding apparatus 100 may determine whether to use the AMVP mode to encode the target block.

1-3) Transmission of Inter-Prediction Information

The encoding apparatus 100 may generate a bitstream including inter-prediction information required for inter prediction. The decoding apparatus 200 may perform inter prediction on the target block using the inter-prediction information of the bitstream.

The inter-prediction information may contain 1) mode information indicating whether an AMVP mode is used, 2) a prediction motion vector index, 3) a Motion Vector Difference (MVD), 4) a reference direction, and 5) a reference picture index.

Hereinafter, the terms "prediction motion vector index" and "AMVP index" may be used to have the same meaning, and may be used interchangeably with each other.

Further, the inter-prediction information may contain a residual signal.

The decoding apparatus 200 may acquire a prediction motion vector index, an MVD, a reference direction, and a reference picture index from the bitstream through entropy decoding when mode information indicates that the AMVP mode is used.

The prediction motion vector index may indicate a prediction motion vector candidate to be used for the prediction of a target block, among prediction motion vector candidates included in the prediction motion vector candidate list.

1-4) Inter Prediction in AMVP Mode that Uses Inter-Prediction Information

The decoding apparatus 200 may derive prediction motion vector candidates using a prediction motion vector candidate list, and may determine the motion information of a target block based on the derived prediction motion vector candidates.

The decoding apparatus 200 may determine a motion vector candidate for the target block, among the prediction motion vector candidates included in the prediction motion vector candidate list, using a prediction motion vector index. The decoding apparatus 200 may select a prediction motion vector candidate, indicated by the prediction motion vector index, from among prediction motion vector candidates included in the prediction motion vector candidate list, as the prediction motion vector of the target block.

The encoding apparatus 100 may generate an entropy-encoded prediction motion vector index by applying entropy encoding to a prediction motion vector index, and may generate a bitstream including the entropy-encoded prediction motion vector index. The entropy-encoded prediction motion vector index may be signaled from the encoding apparatus 100 to the decoding apparatus 200 through a bitstream. The decoding apparatus 200 may extract the entropy-encoded prediction motion vector index from the bitstream, and may acquire the prediction motion vector index by applying entropy decoding to the entropy-encoded prediction motion vector index.

The motion vector to be actually used for inter prediction of the target block may not match the prediction motion vector. In order to indicate the difference between the motion vector to be actually used for inter prediction of the target block and the prediction motion vector, an MVD may be used. The encoding apparatus 100 may derive a prediction motion vector similar to the motion vector to be actually used for inter prediction of the target block so as to use an MVD that is as small as possible.

A Motion Vector Difference (MVD) may be the difference between the motion vector of the target block and the prediction motion vector. The encoding apparatus 100 may calculate the MVD, and may generate an entropy-encoded MVD by applying entropy encoding to the MVD. The encoding apparatus 100 may generate a bitstream including the entropy-encoded MVD.

The MVD may be transmitted from the encoding apparatus 100 to the decoding apparatus 200 through the bitstream. The decoding apparatus 200 may extract the entropy-encoded MVD from the bitstream, and may acquire the MVD by applying entropy decoding to the entropy-encoded MVD.

The decoding apparatus 200 may derive the motion vector of the target block by summing the MVD and the prediction motion vector. In other words, the motion vector of the target block derived by the decoding apparatus 200 may be the sum of the MVD and the motion vector candidate.

Also, the encoding apparatus 100 may generate entropy-encoded MVD resolution information by applying entropy encoding to calculated MVD resolution information, and may generate a bitstream including the entropy-encoded MVD resolution information. The decoding apparatus 200 may extract the entropy-encoded MVD resolution information from the bitstream, and may acquire MVD resolution information by applying entropy decoding to the entropy-encoded MVD resolution information. The decoding apparatus 200 may adjust the resolution of the MVD using the MVD resolution information.

Meanwhile, the encoding apparatus 100 may calculate an MVD based on an affine model. The decoding apparatus 200 may derive the affine control motion vector of the target block through the sum of the MVD and an affine control motion vector candidate, and may derive the motion vector of a sub-block using the affine control motion vector.

The reference direction may indicate a list of reference pictures to be used for prediction of the target block. For example, the reference direction may indicate one of a reference picture list L0 and a reference picture list L1.

The reference direction merely indicates the reference picture list to be used for prediction of the target block, and may not mean that the directions of reference pictures are limited to a forward direction or a backward direction. In other words, each of the reference picture list L0 and the reference picture list L1 may include pictures in a forward direction and/or a backward direction.

That the reference direction is unidirectional may mean that a single reference picture list is used. That the reference direction is bidirectional may mean that two reference picture lists are used. In other words, the reference direction may indicate one of the case where only the reference picture list L0 is used, the case where only the reference picture list L1 is used, and the case where two reference picture lists are used.

The reference picture index may indicate a reference picture that is used for prediction of the target block, among reference pictures present in a reference picture list. The encoding apparatus 100 may generate an entropy-encoded reference picture index by applying entropy encoding to the reference picture index, and may generate a bitstream including the entropy-encoded reference picture index. The entropy-encoded reference picture index may be signaled from the encoding apparatus 100 to the decoding apparatus 200 through the bitstream. The decoding apparatus 200 may extract the entropy-encoded reference picture index from the bitstream, and may acquire the reference picture index by applying entropy decoding to the entropy-encoded reference picture index.

When two reference picture lists are used to predict the target block, a single reference picture index and a single motion vector may be used for each of the reference picture lists. Further, when two reference picture lists are used to predict the target block, two prediction blocks may be specified for the target block. For example, the (final) prediction block of the target block may be generated using the average or weighted sum of the two prediction blocks for the target block.

The motion vector of the target block may be derived by the prediction motion vector index, the MVD, the reference direction, and the reference picture index.

The decoding apparatus 200 may generate a prediction block for the target block based on the derived motion vector and the reference picture index. For example, the prediction block may be a reference block, indicated by the derived motion vector, in the reference picture indicated by the reference picture index.

Since the prediction motion vector index and the MVD are encoded without the motion vector itself of the target block being encoded, the number of bits transmitted from the encoding apparatus 100 to the decoding apparatus 200 may be decreased, and encoding efficiency may be improved.

For the target block, the motion information of reconstructed neighbor blocks may be used. In a specific inter-prediction mode, the encoding apparatus 100 may not separately encode the actual motion information of the target block. The motion information of the target block is not encoded, and additional information that enables the motion information of the target block to be derived using the motion information of reconstructed neighbor blocks may be encoded instead. As the additional information is encoded, the number of bits transmitted to the decoding apparatus 200 may be decreased, and encoding efficiency may be improved.

For example, as inter-prediction modes in which the motion information of the target block is not directly encoded, there may be a skip mode and/or a merge mode. Here, each of the encoding apparatus 100 and the decoding apparatus 200 may use an identifier and/or an index that indicates a unit, the motion information of which is to be used as the motion information of the target unit, among reconstructed neighbor units.

2) Merge Mode

As a scheme for deriving the motion information of a target block, there is merging. The term "merging" may mean the merging of the motion of multiple blocks. "Merging" may mean that the motion information of one block is also applied to other blocks. In other words, a merge mode may be a mode in which the motion information of the target block is derived from the motion information of a neighbor block.

When a merge mode is used, the encoding apparatus 100 may predict the motion information of a target block using the motion information of a spatial candidate and/or the motion information of a temporal candidate. The spatial candidate may include a reconstructed spatial neighbor block that is spatially adjacent to the target block. The spatial neighbor block may include a left neighbor block and an above neighbor block. The temporal candidate may include a col block. The terms "spatial candidate" and "spatial merge candidate" may be used to have the same meaning, and may be used interchangeably with each other. The terms "temporal candidate" and "temporal merge candidate" may be used to have the same meaning, and may be used interchangeably with each other.

The encoding apparatus 100 may acquire a prediction block via prediction. The encoding apparatus 100 may encode a residual block, which is the difference between the target block and the prediction block.

2-1) Creation of Merge Candidate List

When the merge mode is used, each of the encoding apparatus 100 and the decoding apparatus 200 may create a merge candidate list using the motion information of a spatial candidate and/or the motion information of a temporal candidate. The motion information may include 1) a motion vector, 2) a reference picture index, and 3) a reference direction. The reference direction may be unidirectional or bidirectional. The reference direction may mean a inter prediction indicator.

The merge candidate list may include merge candidates. The merge candidates may be motion information. In other words, the merge candidate list may be a list in which pieces of motion information are stored.

The merge candidates may be pieces of motion information of temporal candidates and/or spatial candidates. In other words, the merge candidates list may comprise motion information of a temporal candidates and/or spatial candidates, etc.

Further, the merge candidate list may include new merge candidates generated by a combination of merge candidates that are already present in the merge candidate list. In other words, the merge candidate list may include new motion information generated by a combination of pieces of motion information previously present in the merge candidate list.

Also, a merge candidate list may include history-based merge candidates. The history-based merge candidates may be the motion information of a block which is encoded and/or decoded prior to a target block.

Also, a merge candidate list may include a merge candidate based on an average of two merge candidates.

The merge candidates may be specific modes deriving inter prediction information. The merge candidate may be information indicating a specific mode deriving inter prediction information. Inter prediction information of a target block may be derived according to a specific mode which the merge candidate indicates. Furthermore, the specific mode may include a process of deriving a series of inter prediction information. This specific mode may be an inter prediction information derivation mode or a motion information derivation mode.

The inter prediction information of the target block may be derived according to the mode indicated by the merge candidate selected by the merge index among the merge candidates in the merge candidate list.

For example, the motion information derivation modes in the merge candidate list may be at least one of 1) motion information derivation mode for a sub-block unit and 2) an affine motion information derivation mode.

Furthermore, the merge candidate list may include motion information of a zero vector. The zero vector may also be referred to as a "zero-merge candidate".

In other words, pieces of motion information in the merge candidate list may be at least one of 1) motion information of a spatial candidate, 2) motion information of a temporal candidate, 3) motion information generated by a combination of pieces of motion information previously present in the merge candidate list, and 4) a zero vector.

Motion information may include 1) a motion vector, 2) a reference picture index, and 3) a reference direction. The reference direction may also be referred to as an "inter-prediction indicator". The reference direction may be unidirectional or bidirectional. The unidirectional reference direction may indicate L0 prediction or L1 prediction.

The merge candidate list may be created before prediction in the merge mode is performed.

The number of merge candidates in the merge candidate list may be predefined. Each of the encoding apparatus 100 and the decoding apparatus 200 may add merge candidates to the merge candidate list depending on the predefined scheme and predefined priorities so that the merge candidate list has a predefined number of merge candidates. The merge candidate list of the encoding apparatus 100 and the merge candidate list of the decoding apparatus 200 may be made identical to each other using the predefined scheme and the predefined priorities.

Merging may be applied on a CU basis or a PU basis. When merging is performed on a CU basis or a PU basis, the encoding apparatus 100 may transmit a bitstream including predefined information to the decoding apparatus 200. For example, the predefined information may contain 1) information indicating whether to perform merging for individual block partitions, and 2) information about a block with which merging is to be performed, among blocks that are spatial candidates and/or temporal candidates for the target block.

2-2) Search for Motion Vector that Uses Merge Candidate List

The encoding apparatus 100 may determine merge candidates to be used to encode a target block. For example, the encoding apparatus 100 may perform prediction on the target block using merge candidates in the merge candidate list, and may generate residual blocks for the merge candidates. The encoding apparatus 100 may use a merge candidate that incurs the minimum cost in prediction and in the encoding of residual blocks to encode the target block.

Further, the encoding apparatus 100 may determine whether to use a merge mode to encode the target block.

2-3) Transmission of Inter-Prediction Information

The encoding apparatus 100 may generate a bitstream that includes inter-prediction information required for inter prediction. The encoding apparatus 100 may generate entropy-encoded inter-prediction information by performing entropy encoding on inter-prediction information, and may transmit a bitstream including the entropy-encoded inter-prediction information to the decoding apparatus 200. Through the bitstream, the entropy-encoded inter-prediction information may be signaled to the decoding apparatus 200 by the encoding apparatus 100. The decoding apparatus 200 may extract entropy-encoded inter-prediction information from the bitstream, and may acquire inter-prediction information by applying entropy decoding to the entropy-encoded inter-prediction information.

The decoding apparatus 200 may perform inter prediction on the target block using the inter-prediction information of the bitstream.

The inter-prediction information may contain 1) mode information indicating whether a merge mode is used, 2) a merge index and 3) correction information.

Further, the inter-prediction information may contain a residual signal.

The decoding apparatus 200 may acquire the merge index from the bitstream only when the mode information indicates that the merge mode is used.

The mode information may be a merge flag. The unit of the mode information may be a block. Information about the block may include mode information, and the mode information may indicate whether a merge mode is applied to the block.

The merge index may indicate a merge candidate to be used for the prediction of the target block, among merge candidates included in the merge candidate list. Alternatively, the merge index may indicate a block with which the target block is to be merged, among neighbor blocks spatially or temporally adjacent to the target block.

The encoding apparatus 100 may select a merge candidate having the highest encoding performance among the merge candidates included in the merge candidate list and set a value of the merge index to indicate the selected merge candidate.

Correction information may be information used to correct a motion vector. The encoding apparatus 100 may generate correction information. The decoding apparatus 200 may correct the motion vector of a merge candidate selected by a merge index based on the correction information.

The correction information may include at least one of information indicating whether correction is to be performed, correction direction information, and correction size information. A prediction mode in which the motion vector is corrected based on the signaled correction information may be referred to as a "merge mode having a motion vector difference".

2-4) Inter Prediction of Merge Mode that Uses Inter-Prediction Information

The decoding apparatus 200 may perform prediction on the target block using the merge candidate indicated by the merge index, among merge candidates included in the merge candidate list.

The motion vector of the target block may be specified by the motion vector, reference picture index, and reference direction of the merge candidate indicated by the merge index.

3) Skip Mode

A skip mode may be a mode in which the motion information of a spatial candidate or the motion information of a temporal candidate is applied to the target block without change. Also, the skip mode may be a mode in which a residual signal is not used. In other words, when the skip mode is used, a reconstructed block may be the same as a prediction block.

The difference between the merge mode and the skip mode lies in whether or not a residual signal is transmitted or used. That is, the skip mode may be similar to the merge mode except that a residual signal is not transmitted or used.

When the skip mode is used, the encoding apparatus 100 may transmit information about a block, the motion information of which is to be used as the motion information of the target block, among blocks that are spatial candidates or temporal candidates, to the decoding apparatus 200 through a bitstream. The encoding apparatus 100 may generate entropy-encoded information by performing entropy encoding on the information, and may signal the entropy-encoded information to the decoding apparatus 200 through a bitstream. The decoding apparatus 200 may extract entropy-encoded information from the bitstream, and may acquire information by applying entropy decoding to the entropy-encoded information.

Further, when the skip mode is used, the encoding apparatus 100 may not transmit other syntax information, such as an MVD, to the decoding apparatus 200. For example, when the skip mode is used, the encoding apparatus 100 may not signal a syntax element related to at least one of an MVD, a coded block flag, and a transform coefficient level to the decoding apparatus 200.

3-1) Creation of Merge Candidate List

The skip mode may also use a merge candidate list. In other words, a merge candidate list may be used both in the merge mode and in the skip mode. In this aspect, the merge candidate list may also be referred to as a "skip candidate list" or a "merge/skip candidate list".

Alternatively, the skip mode may use an additional candidate list different from that of the merge mode. In this case, in the following description, a merge candidate list and a merge candidate may be replaced with a skip candidate list and a skip candidate, respectively.

The merge candidate list may be created before prediction in the skip mode is performed.

3-2) Search for Motion Vector that Uses Merge Candidate List

The encoding apparatus 100 may determine the merge candidates to be used to encode a target block. For example, the encoding apparatus 100 may perform prediction on the target block using the merge candidates in a merge candidate list. The encoding apparatus 100 may use a merge candidate that incurs the minimum cost in prediction to encode the target block.

Further, the encoding apparatus 100 may determine whether to use a skip mode to encode the target block.

3-3) Transmission of Inter-Prediction Information

The encoding apparatus 100 may generate a bitstream that includes inter-prediction information required for inter prediction. The decoding apparatus 200 may perform inter prediction on the target block using the inter-prediction information of the bitstream.

The inter-prediction information may include 1) mode information indicating whether a skip mode is used, and 2) a skip index.

The skip index may be identical to the above-described merge index.

When the skip mode is used, the target block may be encoded without using a residual signal. The inter-prediction information may not contain a residual signal. Alternatively, the bitstream may not include a residual signal.

The decoding apparatus 200 may acquire a skip index from the bitstream only when the mode information indicates that the skip mode is used. As described above, a merge index and a skip index may be identical to each other. The decoding apparatus 200 may acquire the skip index from the bitstream only when the mode information indicates that the merge mode or the skip mode is used.

The skip index may indicate the merge candidate to be used for the prediction of the target block, among the merge candidates included in the merge candidate list.

3-4) Inter Prediction in Skip Mode that Uses Inter-Prediction Information

The decoding apparatus 200 may perform prediction on the target block using a merge candidate indicated by a skip index, among the merge candidates included in a merge candidate list.

The motion vector of the target block may be specified by the motion vector, reference picture index, and reference direction of the merge candidate indicated by the skip index.

4) Current Picture Reference Mode

The current picture reference mode may denote a prediction mode that uses a previously reconstructed region in a target picture to which a target block belongs.

A motion vector for specifying the previously reconstructed region may be used. Whether the target block has been encoded in the current picture reference mode may be determined using the reference picture index of the target block.

A flag or index indicating whether the target block is a block encoded in the current picture reference mode may be signaled by the encoding apparatus 100 to the decoding apparatus 200.

Alternatively, whether the target block is a block encoded in the current picture reference mode may be inferred through the reference picture index of the target block.

When the target block is encoded in the current picture reference mode, the target picture may exist at a fixed location or an arbitrary location in a reference picture list for the target block.

For example, the fixed location may be either a location where a value of the reference picture index is 0 or the last location.

When the target picture exists at an arbitrary location in the reference picture list, an additional reference picture index indicating such an arbitrary location may be signaled by the encoding apparatus 100 to the decoding apparatus 200.

5) Sub-Block Merge Mode

A sub-block merge mode may be a mode in which motion information is derived from the sub-block of a CU.

When the sub-block merge mode is applied, a sub-block merge candidate list may be generated using the motion information of a co-located sub-block (col-sub-block) of a target sub-block (i.e., a sub-block-based temporal merge candidate) in a reference image and/or an affine control point motion vector merge candidate.

6) Triangle Partition Mode

In a triangle partition mode, a target block may be partitioned in a diagonal direction, and sub-target blocks resulting from partitioning may be generated. For each sub-target block, motion information of the corresponding sub-target block may be derived, and a prediction sample for each sub-target block may be derived using the derived motion information. A prediction sample for the target block may be derived through a weighted sum of the prediction samples for the sub-target blocks resulting from the partitioning.

7) Combination Inter-Intra Prediction Mode

The combination inter-intra prediction mode may be a mode in which a prediction sample for a target block is derived using a weighted sum of a prediction sample generated via inter-prediction and a prediction sample generated via intra-prediction.

In the above-described modes, the decoding apparatus 200 may autonomously correct derived motion information. For example, the decoding apparatus 200 may search a specific area for motion information having the minimum sum of Absolute Differences (SAD) based on a reference block indicated by the derived motion information, and may derive the found motion information as corrected motion information.

In the above-described modes, the decoding apparatus 200 may compensate for the prediction sample derived via inter prediction using an optical flow.

In the above-described AMVP mode, merge mode, skip mode, etc., motion information to be used for prediction of the target block may be specified among pieces of motion information in a list using the index information of the list.

In order to improve encoding efficiency, the encoding apparatus 100 may signal only the index of an element that incurs the minimum cost in inter prediction of the target block, among elements in the list. The encoding apparatus 100 may encode the index, and may signal the encoded index.

Therefore, the above-described lists (i.e. the prediction motion vector candidate list and the merge candidate list) must be able to be derived by the encoding apparatus 100 and the decoding apparatus 200 using the same scheme based on the same data. Here, the same data may include a reconstructed picture and a reconstructed block. Further, in order to specify an element using an index, the order of the elements in the list must be fixed.

Figure 10:
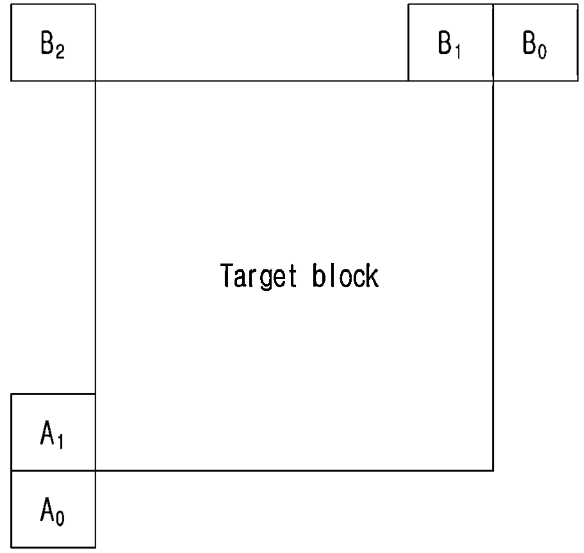
FIG. 10 illustrates spatial candidates according to an embodiment.

FIG. 10 illustrates spatial candidates according to an embodiment.

In FIG. 10, the locations of spatial candidates are illustrated.

The large block in the center of the drawing may denote a target block. Five small blocks may denote spatial candidates.

The coordinates of the target block may be (xP, yP), and the size of the target block may be represented by (nPSW, nPSH).

Spatial candidate $A_0$ may be a block adjacent to the below-left corner of the target block. $A_0$ may be a block that occupies pixels located at coordinates (xP−1, yP+nPSH).

Spatial candidate $A_1$ may be a block adjacent to the left of the target block. $A_1$ may be a lowermost block, among blocks adjacent to the left of the target block. Alternatively, $A_1$ may be a block adjacent to the top of $A_0$. $A_1$ may be a block that occupies pixels located at coordinates (xP−1, yP+nPSH−1).

Spatial candidate $B_0$ may be a block adjacent to the above-right corner of the target block. $B_0$ may be a block that occupies pixels located at coordinates (xP+nPSW, yP−1).

Spatial candidate $B_1$ may be a block adjacent to the top of the target block. $B_1$ may be a rightmost block, among blocks adjacent to the top of the target block. Alternatively, $B_1$ may be a block adjacent to the left of $B_0$. $B_1$ may be a block that occupies pixels located at coordinates (xP+nPSW−1, yP−1).

Spatial candidate $B_2$ may be a block adjacent to the above-left corner of the target block. $B_2$ may be a block that occupies pixels located at coordinates (xP−1, yP−1).

Determination of Availability of Spatial Candidate and Temporal Candidate

In order to include the motion information of a spatial candidate or the motion information of a temporal candidate in a list, it must be determined whether the motion information of the spatial candidate or the motion information of the temporal candidate is available.

Hereinafter, a candidate block may include a spatial candidate and a temporal candidate.

For example, the determination may be performed by sequentially applying the following steps 1) to 4).

Step 1) When a PU including a candidate block is out of the boundary of a picture, the availability of the candidate block may be set to "false". The expression "availability is set to false" may have the same meaning as "set to be unavailable".

Step 2) When a PU including a candidate block is out of the boundary of a slice, the availability of the candidate block may be set to "false". When the target block and the candidate block are located in different slices, the availability of the candidate block may be set to "false".

Step 3) When a PU including a candidate block is out of the boundary of a tile, the availability of the candidate block may be set to "false". When the target block and the candidate block are located in different tiles, the availability of the candidate block may be set to "false".

Step 4) When the prediction mode of a PU including a candidate block is an intra-prediction mode, the availability of the candidate block may be set to "false". When a PU including a candidate block does not use inter prediction, the availability of the candidate block may be set to "false".

Figure 11:
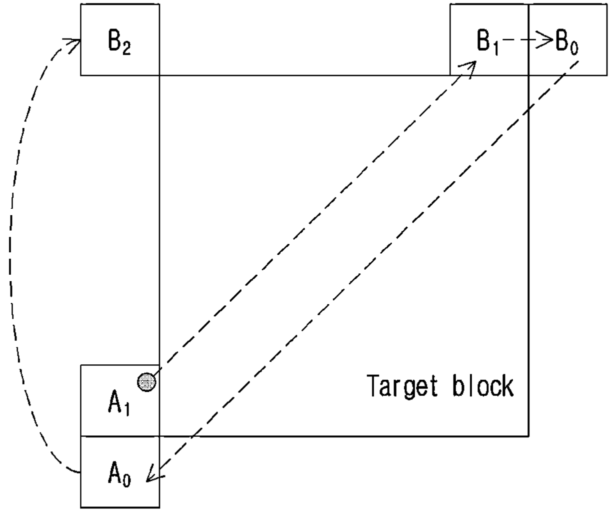
FIG. 11 illustrates the order of addition of motion information of spatial candidates to a merge list according to an embodiment.

FIG. 11 illustrates the order of addition of motion information of spatial candidates to a merge list according to an embodiment.

As shown in FIG. 11, when pieces of motion information of spatial candidates are added to a merge list, the order of $A_1$, $B_1$, $B_0$, $A_0$, and $B_2$ may be used. That is, pieces of motion information of available spatial candidates may be added to the merge list in the order of $A_1$, $B_1$, $B_0$, $A_0$, and $B_2$.

Method for Deriving Merge List in Merge Mode and Skip Mode

As described above, the maximum number of merge candidates in the merge list may be set. The set maximum number is indicated by "N". The set number may be transmitted from the encoding apparatus 100 to the decoding apparatus 200. The slice header of a slice may include N. In other words, the maximum number of merge candidates in the merge list for the target block of the slice may be set by the slice header. For example, the value of N may be basically 5.

Pieces of motion information (i.e., merge candidates) may be added to the merge list in the order of the following steps 1) to 4).

Step 1) Among spatial candidates, available spatial candidates may be added to the merge list. Pieces of motion information of the available spatial candidates may be added to the merge list in the order illustrated in FIG. 11. Here, when the motion information of an available spatial candidate overlaps other motion information already present in the merge list, the motion information may not be added to the merge list. The operation of checking whether the corresponding motion information overlaps other motion information present in the list may be referred to in brief as an "overlap check".

The maximum number of pieces of motion information that are added may be N.

Step 2) When the number of pieces of motion information in the merge list is less than N and a temporal candidate is available, the motion information of the temporal candidate may be added to the merge list. Here, when the motion information of the available temporal candidate overlaps other motion information already present in the merge list, the motion information may not be added to the merge list.

Step 3) When the number of pieces of motion information in the merge list is less than N and the type of a target slice is "B", combined motion information generated by combined bidirectional prediction (bi-prediction) may be added to the merge list.

The target slice may be a slice including a target block.

The combined motion information may be a combination of L0 motion information and L1 motion information. L0 motion information may be motion information that refers only to a reference picture list L0. L1 motion information may be motion information that refers only to a reference picture list L1.

In the merge list, one or more pieces of L0 motion information may be present. Further, in the merge list, one or more pieces of L1 motion information may be present.

The combined motion information may include one or more pieces of combined motion information. When the combined motion information is generated, L0 motion information and L1 motion information, which are to be used for generation, among the one or more pieces of L0 motion information and the one or more pieces of L1 motion information, may be predefined. One or more pieces of combined motion information may be generated in a predefined order via combined bidirectional prediction, which uses a pair of different pieces of motion information in the merge list. One of the pair of different pieces of motion information may be L0 motion information and the other of the pair may be L1 motion information.

For example, combined motion information that is added with the highest priority may be a combination of L0 motion information having a merge index of 0 and L1 motion information having a merge index of 1. When motion information having a merge index of 0 is not L0 motion information or when motion information having a merge index of 1 is not L1 motion information, the combined motion information may be neither generated nor added. Next, the combined motion information that is added with the next priority may be a combination of L0 motion information, having a merge index of 1, and L1 motion information, having a merge index of 0. Subsequent detailed combinations may conform to other combinations of video encoding/decoding fields.

Here, when the combined motion information overlaps other motion information already present in the merge list, the combined motion information may not be added to the merge list.

Step 4) When the number of pieces of motion information in the merge list is less than N, motion information of a zero vector may be added to the merge list.

The zero-vector motion information may be motion information for which the motion vector is a zero vector.

The number of pieces of zero-vector motion information may be one or more. The reference picture indices of one or more pieces of zero-vector motion information may be different from each other. For example, the value of the reference picture index of first zero-vector motion information may be 0. The value of the reference picture index of second zero-vector motion information may be 1.

The number of pieces of zero-vector motion information may be identical to the number of reference pictures in the reference picture list.

The reference direction of zero-vector motion information may be bidirectional. Both of the motion vectors may be zero vectors. The number of pieces of zero-vector motion information may be the smaller one of the number of reference pictures in the reference picture list L0 and the number of reference pictures in the reference picture list L1. Alternatively, when the number of reference pictures in the reference picture list L0 and the number of reference pictures in the reference picture list L1 are different from each other, a reference direction that is unidirectional may be used for a reference picture index that may be applied only to a single reference picture list.

The encoding apparatus 100 and/or the decoding apparatus 200 may sequentially add the zero-vector motion information to the merge list while changing the reference picture index.

When zero-vector motion information overlaps other motion information already present in the merge list, the zero-vector motion information may not be added to the merge list.

The order of the above-described steps 1) to 4) is merely exemplary, and may be changed. Further, some of the above steps may be omitted depending on predefined conditions.

Method for Deriving Prediction Motion Vector Candidate List in AMVP Mode

The maximum number of prediction motion vector candidates in a prediction motion vector candidate list may be predefined. The predefined maximum number is indicated by N. For example, the predefined maximum number may be 2.

Pieces of motion information (i.e. prediction motion vector candidates) may be added to the prediction motion vector candidate list in the order of the following steps 1) to 3).

Step 1) Available spatial candidates, among spatial candidates, may be added to the prediction motion vector candidate list. The spatial candidates may include a first spatial candidate and a second spatial candidate.

The first spatial candidate may be one of $A_0$, $A_1$, scaled $A_0$, and scaled $A_1$. The second spatial candidate may be one of $B_0$, $B_1$, $B_2$, scaled $B_0$, scaled $B_1$, and scaled $B_2$.

Pieces of motion information of available spatial candidates may be added to the prediction motion vector candidate list in the order of the first spatial candidate and the second spatial candidate. In this case, when the motion information of an available spatial candidate overlaps other motion information already present in the prediction motion vector candidate list, the motion information may not be added to the prediction motion vector candidate list. In other words, when the value of N is 2, if the motion information of a second spatial candidate is identical to the motion information of a first spatial candidate, the motion information of the second spatial candidate may not be added to the prediction motion vector candidate list.

The maximum number of pieces of motion information that are added may be N.

Step 2) When the number of pieces of motion information in the prediction motion vector candidate list is less than N and a temporal candidate is available, the motion information of the temporal candidate may be added to the prediction motion vector candidate list. In this case, when the motion information of the available temporal candidate overlaps other motion information already present in the prediction motion vector candidate list, the motion information may not be added to the prediction motion vector candidate list.

Step 3) When the number of pieces of motion information in the prediction motion vector candidate list is less than N, zero-vector motion information may be added to the prediction motion vector candidate list.

The zero-vector motion information may include one or more pieces of zero-vector motion information. The reference picture indices of the one or more pieces of zero-vector motion information may be different from each other.

The encoding apparatus 100 and/or the decoding apparatus 200 may sequentially add pieces of zero-vector motion information to the prediction motion vector candidate list while changing the reference picture index.

When zero-vector motion information overlaps other motion information already present in the prediction motion vector candidate list, the zero-vector motion information may not be added to the prediction motion vector candidate list.

The description of the zero-vector motion information, made above in connection with the merge list, may also be applied to zero-vector motion information. A repeated description thereof will be omitted.

The order of the above-described steps 1) to 3) is merely exemplary, and may be changed. Further, some of the steps may be omitted depending on predefined conditions.

Figure 12:
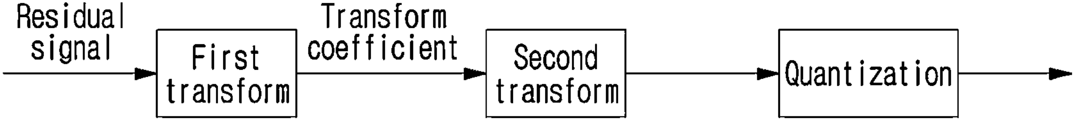
FIG. 12 illustrates a transform and quantization process according to an example.

FIG. 12 illustrates a transform and quantization process according to an example.

As illustrated in FIG. 12, quantized levels may be generated by performing a transform and/or quantization process on a residual signal.

A residual signal may be generated as the difference between an original block and a prediction block. Here, the prediction block may be a block generated via intra prediction or inter prediction.

The residual signal may be transformed into a signal in a frequency domain through a transform procedure that is a part of a quantization procedure.

A transform kernel used for a transform may include various DCT kernels, such as Discrete Cosine Transform (DCT) type 2 (DCT-II) and Discrete Sine Transform (DST) kernels.

These transform kernels may perform a separable transform or a two-dimensional (2D) non-separable transform on the residual signal. The separable transform may be a transform indicating that a one-dimensional (1D) transform is performed on the residual signal in each of a horizontal direction and a vertical direction.

The DCT type and the DST type, which are adaptively used for a 1D transform, may include DCT-V, DCT-VIII, DST-I, and DST-VII in addition to DCT-II, as shown in each of the following Table 3 and the following table 4.

TABLE 3

| Transform set | Transform candidates |
| --- | --- |
| 0 | DST-VII, DCT-VIII |
| 1 | DST-VII, DST-I |
| 2 | DST-VII, DCT-V |

TABLE 4

| Transform set | Transform candidates |
| --- | --- |
| 0 | DST-VII, DCT-VIII, DST-I |
| 1 | DST-VII, DST-I, DCT-VIII |
| 2 | DST-VII, DCT-V, DST-I |

As shown in Table 3 and Table 4, when a DCT type or a DST type to be used for a transform is derived, transform sets may be used. Each transform set may include multiple transform candidates. Each transform candidate may be a DCT type or a DST type.

The following Table 5 shows examples of a transform set to be applied to a horizontal direction and a transform set to be applied to a vertical direction depending on intra-prediction modes.

TABLE 5

| | Intra prediction mode | | | | | | | | | |
| --- | --- | --- | --- | --- | --- | --- | --- | --- | --- | --- |
| | 0 | 1 | 2 | 3 | 4 | 5 | 6 | 7 | 8 | 9 |
| Vertical direction transform set | 2 | 1 | 0 | 1 | 0 | 1 | 0 | 1 | 0 | 1 |
| Horizontal direction transform set | 2 | 1 | 0 | 1 | 0 | 1 | 0 | 1 | 0 | 1 |

| | Intra prediction mode | | | | | | | | | |
| --- | --- | --- | --- | --- | --- | --- | --- | --- | --- | --- |
| | 10 | 11 | 12 | 13 | 14 | 15 | 16 | 17 | 18 | 19 |
| Vertical direction transform set | 0 | 1 | 0 | 1 | 0 | 0 | 0 | 0 | 0 | 0 |
| Horizontal direction transform set | 0 | 1 | 0 | 1 | 2 | 2 | 2 | 2 | 2 | 2 |

| | Intra prediction mode | | | | | | | | | |
| --- | --- | --- | --- | --- | --- | --- | --- | --- | --- | --- |
| | 20 | 21 | 22 | 23 | 24 | 25 | 26 | 27 | 28 | 29 |
| Vertical direction transform set | 0 | 0 | 0 | 1 | 0 | 1 | 0 | 1 | 0 | 1 |
| Horizontal direction transform set | 2 | 2 | 2 | 1 | 0 | 1 | 0 | 1 | 0 | 1 |

TABLE 5-continued

| | Intra prediction mode | | | | | | | | | |
| --- | --- | --- | --- | --- | --- | --- | --- | --- | --- | --- |
| | 30 | 31 | 32 | 33 | 34 | 35 | 36 | 37 | 38 | 39 |
| Vertical direction transform set | 0 | 1 | 0 | 1 | 0 | 1 | 0 | 1 | 0 | 1 |
| Horizontal direction transform set | 0 | 1 | 0 | 1 | 0 | 1 | 0 | 1 | 0 | 1 |

| | Intra prediction mode | | | | | | | | | |
| --- | --- | --- | --- | --- | --- | --- | --- | --- | --- | --- |
| | 40 | 41 | 42 | 43 | 44 | 45 | 46 | 47 | 48 | 49 |
| Vertical direction transform set | 0 | 1 | 0 | 1 | 0 | 1 | 2 | 2 | 2 | 2 |
| Horizontal direction transform set | 0 | 1 | 0 | 1 | 0 | 1 | 0 | 0 | 0 | 0 |

| | Intra prediction mode | | | | | | | | | |
| --- | --- | --- | --- | --- | --- | --- | --- | --- | --- | --- |
| | 50 | 51 | 52 | 53 | 54 | 55 | 56 | 57 | 58 | 59 |
| Vertical direction transform set | 2 | 2 | 2 | 2 | 2 | 1 | 0 | 1 | 0 | 1 |
| Horizontal direction transform set | 0 | 0 | 0 | 0 | 0 | 1 | 0 | 1 | 0 | 1 |

| | Intra prediction mode | | | | | | |
| --- | --- | --- | --- | --- | --- | --- | --- |
| | 60 | 61 | 62 | 63 | 64 | 65 | 66 |
| Vertical direction transform set | 0 | 1 | 0 | 1 | 0 | 1 | 0 |
| Horizontal direction transform set | 0 | 1 | 0 | 1 | 0 | 1 | 0 |

In Table 5, numbers of vertical transform sets and horizontal transform sets that are to be applied to the horizontal direction of a residual signal depending on the intra-prediction modes of the target block are indicated.

As exemplified in Table 5, transform sets to be applied to the horizontal direction and the vertical direction may be predefined depending on the intra-prediction mode of the target block. The encoding apparatus 100 may perform a transform and an inverse transform on the residual signal using a transform included in the transform set corresponding to the intra-prediction mode of the target block. Further, the decoding apparatus 200 may perform an inverse transform on the residual signal using a transform included in the transform set corresponding to the intra-prediction mode of the target block.

In the transform and inverse transform, transform sets to be applied to the residual signal may be determined, as exemplified in Tables 3, 4, and 5, and may not be signaled. Transform indication information may be signaled from the encoding apparatus 100 to the decoding apparatus 200. The transform indication information may be information indicating which one of multiple transform candidates included in the transform set to be applied to the residual signal is used.

For example, when the size of the target block is 64×64 or less, transform sets, each having three transforms, may be configured depending on the intra-prediction modes. An optimal transform method may be selected from among a total of nine multiple transform methods resulting from combinations of three transforms in a horizontal direction and three transforms in a vertical direction. Through such an optimal transform method, the residual signal may be encoded and/or decoded, and thus coding efficiency may be improved.

Here, information indicating which one of transforms belonging to each transform set has been used for at least one of a vertical transform and a horizontal transform may be entropy-encoded and/or -decoded. Here, truncated unary binarization may be used to encode and/or decode such information.

As described above, methods using various transforms may be applied to a residual signal generated via intra prediction or inter prediction.

The transform may include at least one of a first transform and a secondary transform. A transform coefficient may be generated by performing the first transform on the residual signal, and a secondary transform coefficient may be generated by performing the secondary transform on the transform coefficient.

The first transform may be referred to as a "primary transform". Further, the first transform may also be referred to as an "Adaptive Multiple Transform (AMT) scheme". AMT may mean that, as described above, different transforms are applied to respective 1D directions (i.e. a vertical direction and a horizontal direction).

A secondary transform may be a transform for improving energy concentration on a transform coefficient generated by the first transform. Similar to the first transform, the secondary transform may be a separable transform or a non-separable transform. Such a non-separable transform may be a Non-Separable Secondary Transform (NSST).

The first transform may be performed using at least one of predefined multiple transform methods. For example, the predefined multiple transform methods may include a Discrete Cosine Transform (DCT), a Discrete Sine Transform (DST), a Karhunen-Loeve Transform (KLT), etc.

Further, a first transform may be a transform having various transform types depending on a kernel function that defines a Discrete Cosine Transform (DCT) or a Discrete Sine Transform (DST).

For example, the transform type may be determined based at least one of 1) a prediction mode of a target block (for example, one of an intra prediction and an inter prediction), 2) a size of a target block, 3) a shape of a target block, 4) an intra prediction mode of a target block, 5) a component of a target block (for example, one of a luma component an a chroma component), and 6) a partitioning type applied to a target block (for example, one of a Quad Tree, a Binary Tree and a Ternary Tree).

For example, the first transform may include transforms, such as DCT-2, DCT-5, DCT-7, DST-7, DST-1, DST-8, and DCT-8 depending on the transform kernel presented in the following Table 6. In the following Table 6, various transform types and transform kernel functions for Multiple Transform Selection (MTS) are exemplified.

MTS may refer to the selection of combinations of one or more DCT and/or DST kernels so as to transform a residual signal in a horizontal and/or vertical direction.

TABLE 6

| Transform type | Transform kernel function $T_i(j)$ |
|---|---|
| DCT-2 | $T_i(j) = \omega_0 \cdot \sqrt{\frac{2}{N}} \cdot \cos\left(\frac{\pi \cdot i \cdot (2j+1)}{2N}\right)$ where $\omega_0 = \sqrt{\frac{2}{N}}$ $(i = 0)$ or 1(otherwise) |
| DST-7 | $T_i(j) = \sqrt{\frac{4}{2N+1}} \cdot \sin\left(\frac{\pi \cdot (2j+1) \cdot (j+1)}{2N+1}\right)$ |
| DCT-5 | $T_i(j) = \omega_0 \cdot \omega_1 \cdot \sqrt{\frac{2}{2N-1}} \cdot \cos\left(\frac{2\pi \cdot i \cdot j}{2N+1}\right)$ where $\omega_{0/1} = \sqrt{\frac{2}{N}}$ $(i \text{ or } j = 0)$ or 1(otherwise) |
| DCT-8 | $T_i(j) = \sqrt{\frac{4}{2N+1}} \cdot \cos\left(\frac{\pi \cdot (2j+1) \cdot (2j+1)}{4N+2}\right)$ |
| DST-1 | $T_i(j) = \sqrt{\frac{2}{N+1}} \cdot \sin\left(\frac{\pi \cdot (i+1) \cdot (j+1)}{N+1}\right)$ |

The secondary transform may be performed on the transform coefficient generated by performing the first transform.

As in the first transform, transform sets may also be defined in a secondary transform. The methods for deriving and/or determining the above-described transform sets may be applied not only to the first transform but also to the secondary transform.

The first transform and the secondary transform may be determined for a specific target.

For example, a first transform and a secondary transform may be applied to signal components corresponding to one or more of a luminance (luma) component and a chrominance (chroma) component. Whether to apply the first transform and/or the secondary transform may be determined depending on at least one of coding parameters for a target block and/or a neighbor block. For example, whether to apply the first transform and/or the secondary transform may be determined depending on the size and/or shape of the target block.

In the encoding apparatus 100 and the decoding apparatus 200, transform information indicating the transform method to be used for the target may be derived by utilizing specified information.

For example, the transform information may include a transform index to be used for a primary transform and/or a secondary transform. Alternatively, the transform information may indicate that a primary transform and/or a secondary transform are not used.

For example, when the target of a primary transform and a secondary transform is a target block, the transform method(s) to be applied to the primary transform and/or the secondary transform indicated by the transform information may be determined depending on at least one of coding parameters for the target block and/or blocks neighbor the target block.

Alternatively, transform information indicating a transform method for a specific target may be signaled from the encoding apparatus 100 to the decoding apparatus 200.

For example, for a single CU, whether to use a primary transform, an index indicating the primary transform, whether to use a secondary transform, and an index indicating the secondary transform may be derived as the transform information by the decoding apparatus 200.

Alternatively, for a single CU, the transform information, which indicates whether to use a primary transform, an index indicating the primary transform, whether to use a secondary transform, and an index indicating the secondary transform, may be signaled.

The quantized transform coefficient (i.e. the quantized levels) may be generated by performing quantization on the result, generated by performing the first transform and/or the secondary transform, or on the residual signal.

Figure 13:
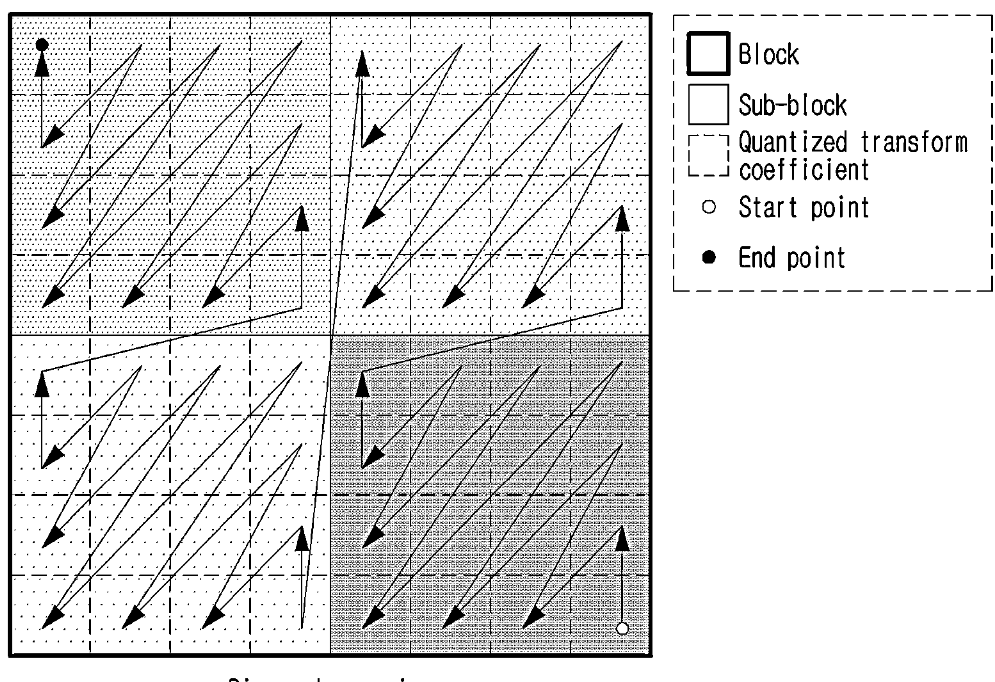
FIG. 13 illustrates diagonal scanning according to an example.

FIG. 13 illustrates diagonal scanning according to an example.

Figure 14:
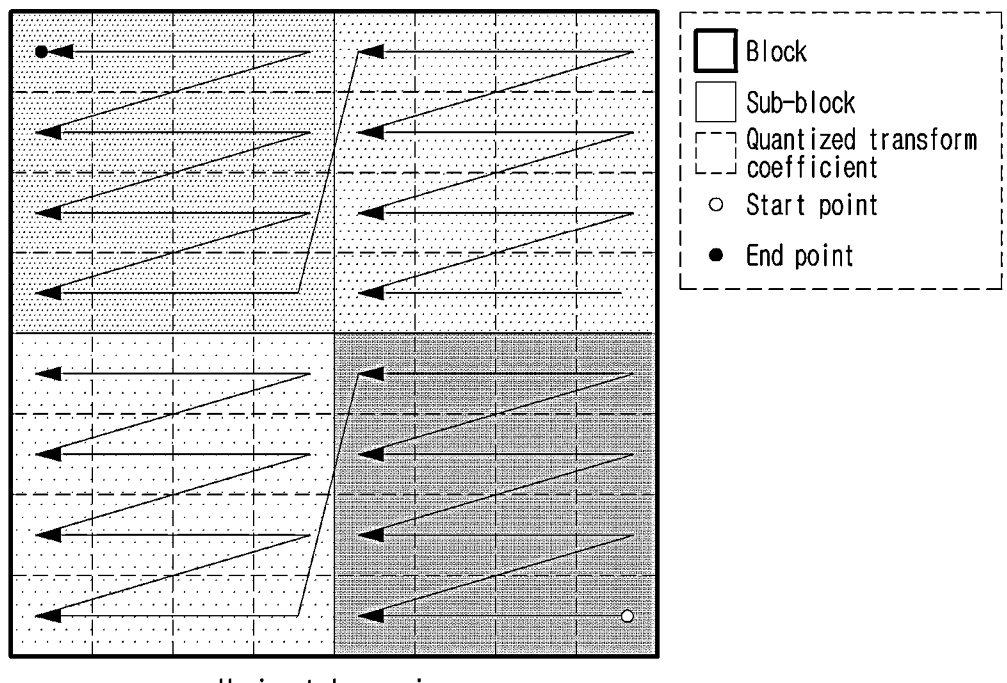
FIG. 14 illustrates horizontal scanning according to an example.

FIG. 14 illustrates horizontal scanning according to an example.

Figure 15:
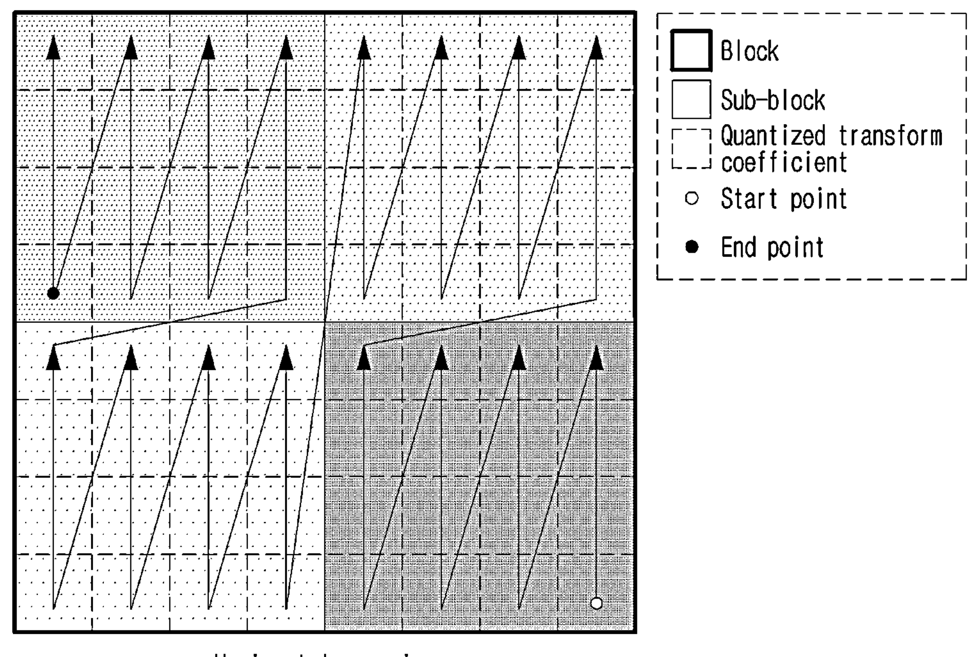
FIG. 15 illustrates vertical scanning according to an example.

FIG. 15 illustrates vertical scanning according to an example.

Quantized transform coefficients may be scanned via at least one of (up-right) diagonal scanning, vertical scanning, and horizontal scanning depending on at least one of an intra-prediction mode, a block size, and a block shape. The block may be a Transform Unit (TU).

Each scanning may be initiated at a specific start point, and may be terminated at a specific end point.

For example, quantized transform coefficients may be changed to 1D vector forms by scanning the coefficients of a block using diagonal scanning of FIG. 13. Alternatively, horizontal scanning of FIG. 14 or vertical scanning of FIG. 15, instead of diagonal scanning, may be used depending on the size and/or intra-prediction mode of a block.

Vertical scanning may be the operation of scanning 2D block-type coefficients in a column direction. Horizontal scanning may be the operation of scanning 2D block-type coefficients in a row direction.

In other words, which one of diagonal scanning, vertical scanning, and horizontal scanning is to be used may be determined depending on the size and/or inter-prediction mode of the block.

As illustrated in FIGS. 13, 14, and 15, the quantized transform coefficients may be scanned along a diagonal direction, a horizontal direction or a vertical direction.

The quantized transform coefficients may be represented by block shapes. Each block may include multiple sub-blocks. Each sub-block may be defined depending on a minimum block size or a minimum block shape.

In scanning, a scanning sequence depending on the type or direction of scanning may be primarily applied to sub-blocks. Further, a scanning sequence depending on the direction of scanning may be applied to quantized transform coefficients in each sub-block.

For example, as illustrated in FIGS. 13, 14, and 15, when the size of a target block is 8×8, quantized transform coefficients may be generated through a first transform, a secondary transform, and quantization on the residual signal of the target block. Therefore, one of three types of scanning sequences may be applied to four 4×4 sub-blocks, and quantized transform coefficients may also be scanned for each 4×4 sub-block depending on the scanning sequence.

The encoding apparatus 100 may generate entropy-encoded quantized transform coefficients by performing entropy encoding on scanned quantized transform coefficients, and may generate a bitstream including the entropy-encoded quantized transform coefficients.

The decoding apparatus 200 may extract the entropy-encoded quantized transform coefficients from the bitstream, and may generate quantized transform coefficients by performing entropy decoding on the entropy-encoded quantized transform coefficients. The quantized transform coefficients may be aligned in the form of a 2D block via inverse scanning. Here, as the method of inverse scanning, at least one of up-right diagonal scanning, vertical scanning, and horizontal scanning may be performed.

In the decoding apparatus 200, dequantization may be performed on the quantized transform coefficients. A secondary inverse transform may be performed on the result generated by performing dequantization depending on whether to perform the secondary inverse transform. Further, a first inverse transform may be performed on the result generated by performing the secondary inverse transform depending on whether the first inverse transform is to be performed. A reconstructed residual signal may be generated by performing the first inverse transform on the result generated by performing the secondary inverse transform.

For a luma component which is reconstructed via intra prediction or inter prediction, inverse mapping having a dynamic range may be performed before in-loop filtering.

The dynamic range may be divided into 16 equal pieces, and mapping functions for respective pieces may be signaled. Such a mapping function may be signaled at a slice level or a tile group level.

An inverse mapping function for performing inverse mapping may be derived based on the mapping function.

In-loop filtering, the storage of a reference picture, and motion compensation may be performed in an inverse mapping area.

A prediction block generated via inter prediction may be changed to a mapped area through mapping using a mapping function, and the changed prediction block may be used to generate a reconstructed block. However, since intra prediction is performed in the mapped area, a prediction block generated via intra prediction may be used to generate a reconstructed block without requiring mapping and/or inverse mapping.

For example, when the target block is a residual block of a chroma component, the residual block may be changed to an inversely mapped area by scaling the chroma component of the mapped area.

Whether scaling is available may be signaled at a slice level or a tile group level.

For example, scaling may be applied only to the case where mapping is available for a luma component and where the partitioning of the luma component and the partitioning of the chroma component follow the same tree structure.

Scaling may be performed based on the average of the values of samples in a luma prediction block, which corresponds to a chroma prediction block. Here, when the target block uses inter prediction, the luma prediction block may mean a mapped luma prediction block.

A value required for scaling may be derived by referring to a look-up table using the index of a piece to which the average of sample values of the luma prediction block belongs.

The residual block may be changed to an inversely mapped area by scaling the residual block using a finally derived value. Thereafter, for the block of a chroma component, reconstruction, intra prediction, inter prediction, in-loop filtering, and the storage of a reference picture may be performed in the inversely mapped area.

For example, information indicating whether the mapping and/or inverse mapping of a luma component and a chroma component are available may be signaled through a sequence parameter set.

A prediction block for the target block may be generated based on a block vector. The block vector may indicate displacement between the target block and a reference block. The reference block may be a block in a target image.

In this way, a prediction mode in which the prediction block is generated by referring to the target image may be referred to as an "Intra-Block Copy (IBC) mode".

An IBC mode may be applied to a CU having a specific size. For example, the IBC mode may be applied to an M×N CU. Here, M and N may be less than or equal to 64.

The IBC mode may include a skip mode, a merge mode, an AMVP mode, etc. In the case of the skip mode or the merge mode, a merge candidate list may be configured, and a merge index is signaled, and thus a single merge candidate may be specified among merge candidates present in the merge candidate list. The block vector of the specified merge candidate may be used as the block vector of the target block.

In the case of the AMVP mode, a differential block vector may be signaled. Also, a prediction block vector may be derived from the left neighbor block and the above neighbor block of the target block. Further, an index indicating which neighbor block is to be used may be signaled.

A prediction block in the IBC mode may be included in a target CTU or a left CTU, and may be limited to a block within a previously reconstructed area. For example, the value of a block vector may be limited so that a prediction block for a target block is located in a specific area. The specific area may be an area defined by three 64×64 blocks that are encoded and/or decoded prior to a 64×64 block including the target block. The value of the block vector is limited in this way, and thus memory consumption and device complexity caused by the implementation of the IBC mode may be decreased.

Figure 16:
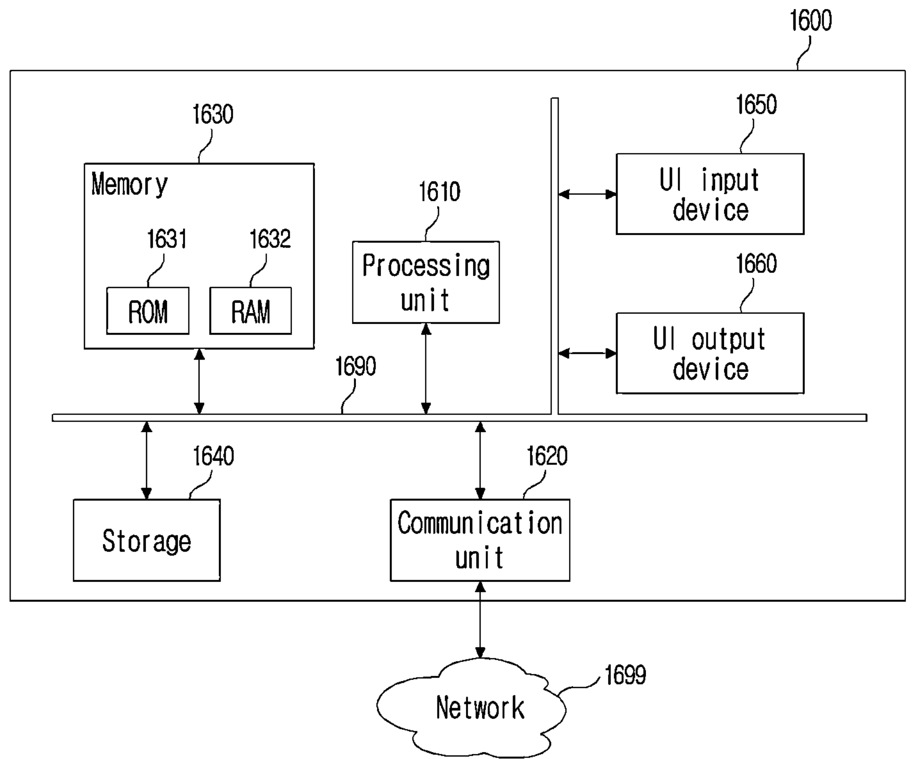
FIG. 16 is a configuration diagram of an encoding apparatus according to an embodiment.

FIG. 16 is a configuration diagram of an encoding apparatus according to an embodiment.

An encoding apparatus 1600 may correspond to the above-described encoding apparatus 100.

The encoding apparatus 1600 may include a processing unit 1610, memory 1630, a user interface (UI) input device 1650, a UI output device 1660, and storage 1640, which communicate with each other through a bus 1690. The encoding apparatus 1600 may further include a communication unit 1620 coupled to a network 1699.

The processing unit 1610 may be a Central Processing Unit (CPU) or a semiconductor device for executing processing instructions stored in the memory 1630 or the storage 1640. The processing unit 1610 may be at least one hardware processor.

The processing unit 1610 may generate and process signals, data or information that are input to the encoding apparatus 1600, are output from the encoding apparatus 1600, or are used in the encoding apparatus 1600, and may perform examination, comparison, determination, etc. related to the signals, data or information. In other words, in embodiments, the generation and processing of data or information and examination, comparison and determination related to data or information may be performed by the processing unit 1610.

The processing unit 1610 may include an inter-prediction unit 110, an intra-prediction unit 120, a switch 115, a subtractor 125, a transform unit 130, a quantization unit 140, an entropy encoding unit 150, a dequantization unit 160, an inverse transform unit 170, an adder 175, a filter unit 180, and a reference picture buffer 190.

At least some of the inter-prediction unit 110, the intra-prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 190 may be program modules, and may communicate with an external device or system. The program modules may be included in the encoding apparatus 1600 in the form of an operating system, an application program module, or other program modules.

The program modules may be physically stored in various types of well-known storage devices. Further, at least some of the program modules may also be stored in a remote storage device that is capable of communicating with the encoding apparatus 1200.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the encoding apparatus 1600.

The processing unit 1610 may execute instructions or code in the inter-prediction unit 110, the intra-prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 190.

A storage unit may denote the memory 1630 and/or the storage 1640. Each of the memory 1630 and the storage 1640 may be any of various types of volatile or nonvolatile storage media. For example, the memory 1630 may include at least one of Read-Only Memory (ROM) 1631 and Random Access Memory (RAM) 1632.

The storage unit may store data or information used for the operation of the encoding apparatus 1600. In an embodiment, the data or information of the encoding apparatus 1600 may be stored in the storage unit.

For example, the storage unit may store pictures, blocks, lists, motion information, inter-prediction information, bitstreams, etc.

The encoding apparatus 1600 may be implemented in a computer system including a computer-readable storage medium.

The storage medium may store at least one module required for the operation of the encoding apparatus 1600. The memory 1630 may store at least one module, and may be configured such that the at least one module is executed by the processing unit 1610.

Functions related to communication of the data or information of the encoding apparatus 1600 may be performed through the communication unit 1620.

For example, the communication unit 1620 may transmit a bitstream to a decoding apparatus 1600, which will be described later.

Figure 17:
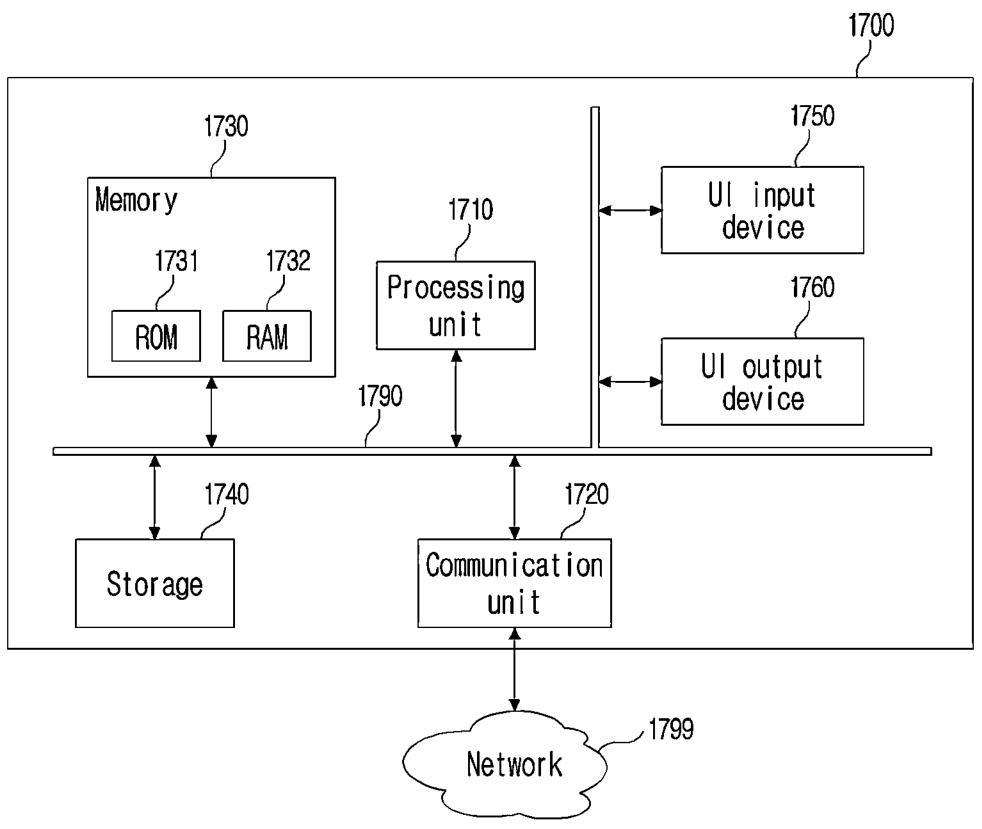
FIG. 17 is a configuration diagram of a decoding apparatus according to an embodiment.

FIG. 17 is a configuration diagram of a decoding apparatus according to an embodiment.

The decoding apparatus 1700 may correspond to the above-described decoding apparatus 200.

The decoding apparatus 1700 may include a processing unit 1710, memory 1730, a user interface (UI) input device 1750, a UI output device 1760, and storage 1740, which communicate with each other through a bus 1790. The decoding apparatus 1700 may further include a communication unit 1720 coupled to a network 1799.

The processing unit 1710 may be a Central Processing Unit (CPU) or a semiconductor device for executing processing instructions stored in the memory 1730 or the storage 1740. The processing unit 1710 may be at least one hardware processor.

The processing unit 1710 may generate and process signals, data or information that are input to the decoding apparatus 1700, are output from the decoding apparatus 1700, or are used in the decoding apparatus 1700, and may perform examination, comparison, determination, etc. related to the signals, data or information. In other words, in embodiments, the generation and processing of data or information and examination, comparison and determination related to data or information may be performed by the processing unit 1710.

The processing unit 1710 may include an entropy decoding unit 210, a dequantization unit 220, an inverse transform unit 230, an intra-prediction unit 240, an inter-prediction unit 250, a switch 245, an adder 255, a filter unit 260, and a reference picture buffer 270.

At least some of the entropy decoding unit 210, the dequantization unit 220, the inverse transform unit 230, the intra-prediction unit 240, the inter-prediction unit 250, the adder 255, the switch 245, the filter unit 260, and the reference picture buffer 270 of the decoding apparatus 200 may be program modules, and may communicate with an external device or system. The program modules may be included in the decoding apparatus 1700 in the form of an operating system, an application program module, or other program modules.

The program modules may be physically stored in various types of well-known storage devices. Further, at least some of the program modules may also be stored in a remote storage device that is capable of communicating with the decoding apparatus 1700.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the decoding apparatus 1700.

The processing unit 1710 may execute instructions or code in the entropy decoding unit 210, the dequantization unit 220, the inverse transform unit 230, the intra-prediction unit 240, the inter-prediction unit 250, the switch 245, the adder 255, the filter unit 260, and the reference picture buffer 270.

A storage unit may denote the memory 1730 and/or the storage 1740. Each of the memory 1730 and the storage 1740 may be any of various types of volatile or nonvolatile storage media. For example, the memory 1730 may include at least one of ROM 1731 and RAM 1732.

The storage unit may store data or information used for the operation of the decoding apparatus 1700. In an embodiment, the data or information of the decoding apparatus 1700 may be stored in the storage unit.

For example, the storage unit may store pictures, blocks, lists, motion information, inter-prediction information, bitstreams, etc.

The decoding apparatus 1700 may be implemented in a computer system including a computer-readable storage medium.

The storage medium may store at least one module required for the operation of the decoding apparatus 1700. The memory 1730 may store at least one module, and may be configured such that the at least one module is executed by the processing unit 1710.

Functions related to communication of the data or information of the decoding apparatus 1700 may be performed through the communication unit 1720.

For example, the communication unit 1720 may receive a bitstream from the encoding apparatus 1700.

Hereinafter, a processing unit may represent the processing unit 1610 of the encoding apparatus 1600 and/or the processing unit 1710 of the decoding apparatus 1700. For example, as to functions relating to prediction, the processing unit may represent the switch 115 and/or the switch 245. As to functions relating to inter prediction, the processing unit may represent the inter-prediction unit 110, the subtractor 125 and the adder 175, and may represent the inter prediction unit 250 and the adder 255. As to functions relating to intra prediction, the processing unit may represent the intra prediction unit 120, the subtractor 125, and the adder 175, and may represent the intra prediction unit 240 and the adder 255. As to functions related to transform, the processing unit may represent the transform unit 130 and the inverse transform unit 170, and may represent the inverse transform unit 230. As to functions relating quantization, the processing unit may represent the quantization unit 140 and the inverse quantization unit 160, and may indicate the inverse quantization unit 220. As to functions relating to entropy encoding and/or entropy decoding, the processing unit may represent the entropy encoding unit 150 and/or the entropy decoding unit 210. As to functions relating filtering, the processing unit may represent the filter unit 180 and/or the filter unit 260. As to functions relating a reference picture, the processing unit may indicate the reference picture buffer 190 and/or the reference picture buffer 270.

In this specification, 'specific information was predefined' means that corresponding specific information in an encoding device and a decoding device was determined to be the same value/method through the same rule and/or method in an encoding device and a decoding device. The specific information may be one of coding parameter and/or block information, a search pattern and/or order and whether a specific mode is used, but it is not limited thereto. The entropy encoding/decoding may be performed in a unit of at least one of a sequence level, a picture level, a tile level, a tile group level, a slice level, a Coding Tree Unit (CTU) level, a Coding Unit (CU) level and a Prediction Unit (PU), but a performed unit is not limited thereto.

In this specification, motion information (MI_L0, MI_L1) refers to motion information having motion information of MI_L0 in a L0 direction and MI_L1 in a L1 direction.

In this specification, 'motion information is corrected' means that an intermediate search step and/or a final search step of a method for deriving decoder-side motion information is performed from corresponding motion information to derive corrected motion information.

In this specification, a surrounding block refers to a block that is temporally or spatially close to a current block.

'Temporally close' means that it belongs to an image whose interval between a picture order count (POC) and a col-located image of a current image and/or a current image is different by less than POC_THRES.

The POC_THRES may be a positive number of 1 or more. POC_THRES may be predefined. Alternatively, information about POC_THRES may be encoded/decoded.

'Spatially close' means that a spatial distance from a predefined position of a current block is different by less than SPATIAL_THRES.

For example, a predefined position of the current block may be one of a top-left, center, top-right, bottom-left and bottom-right of a current block, but is not limited thereto. The SPATIAL_THRES may be a positive number of 1 or more. Alternatively, SPATIAL_THRES may be predefined. Information about SPATIAL_THRES may be encoded/decoded.

In this specification, 'matching cost' may refer to a calculation result value of a cost function between templates in a method for deriving decoder-side motion information. For example, the matching cost may be at least one of a two-sided matching cost or a template matching cost, but it is not limited thereto.

In this specification, 'matching cost for specific motion information' may be one of a matching cost between templates determined from corresponding specific motion information or a matching cost between templates determined from motion information derived from a method for deriving decoder-side motion information from corresponding motion information.

In this specification, 'motion vector' may be one of a motion vector in inter prediction or a block vector (BV) in intra block copy (IBC).

In this specification, a picture may have the same meaning as an image.

In this specification, an index has the same meaning as an index.

In this specification, bi-prediction, bidirectional prediction, inter bi-prediction and bidirectional inter prediction have the same meaning.

In this specification, a surrounding sample refers to a sample and/or a pixel that is temporally or spatially close to a current block. The sample may be a predicted sample or a reconstructed sample. The pixel may be a predicted pixel or a reconstructed pixel.

When performing inter prediction for a current block, motion vector resolution may be adaptively determined. When adaptive motion vector resolution (AMVR) which adaptively determines motion vector resolution is used, resolution of a motion vector difference may be adjusted in a unit of a block.

By adjusting resolution of a motion vector difference, encoding/decoding efficiency may be improved. Adjusted resolution may be one of 16-pel, 8-pel, 4-pel, full-pel, half-pel or quarter-pel, but it is not limited thereto. The 'pel' refers to a unit of a pixel. For example, when adjusted resolution of a current block is 4-pel, each component of a motion vector difference may have a multiple value of 4 pixels.

Candidates which may be selected for motion vector difference resolution may be predefined in an encoding device and a decoding device. In this case, index information specifying one of a plurality of candidates may be encoded and signaled.

A motion vector of a current block may be derived by referring to a pre-reconstructed region neighboring a current block. Specifically, a pre-reconstructed region neighboring a current block may be set as a current template and a reference template most similar to a current template in a search region may be searched. As above, deriving a motion vector of a current block by using templates may be referred to as template matching.

Figure 18:
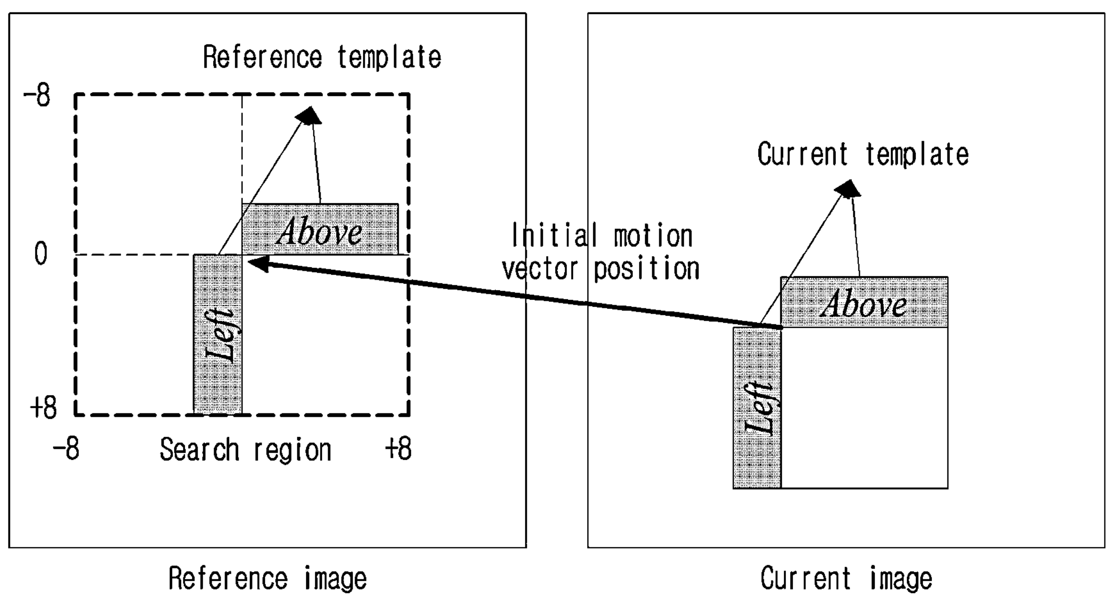
FIG. 18 shows an example in which template matching is applied.

FIG. 18 shows an example in which template matching is applied.

When template matching is applied, a motion vector of a current block may be derived through a comparison operation between a current template of a current block and a reference template of a reference block.

In template matching, each of a current template and a reference template may be configured by including at least one of a subset of pixels belonging to N lines adjacent to the left of a current block and a reference block or a subset of pixels belonging to M lines adjacent to the top (above) of a current block and a reference block. Here, N and M are an integer including 0, and may be 0, 1, 2, 3, 4 or an integer greater than 4. N and M may be set as the same value. For example, N and M may be predefined in an encoding device and a decoding device. Alternatively, N and M may be determined differently depending on at least one of a form of a current block or whether a block neighboring a current block is encoded by inter prediction.

Figure 19:
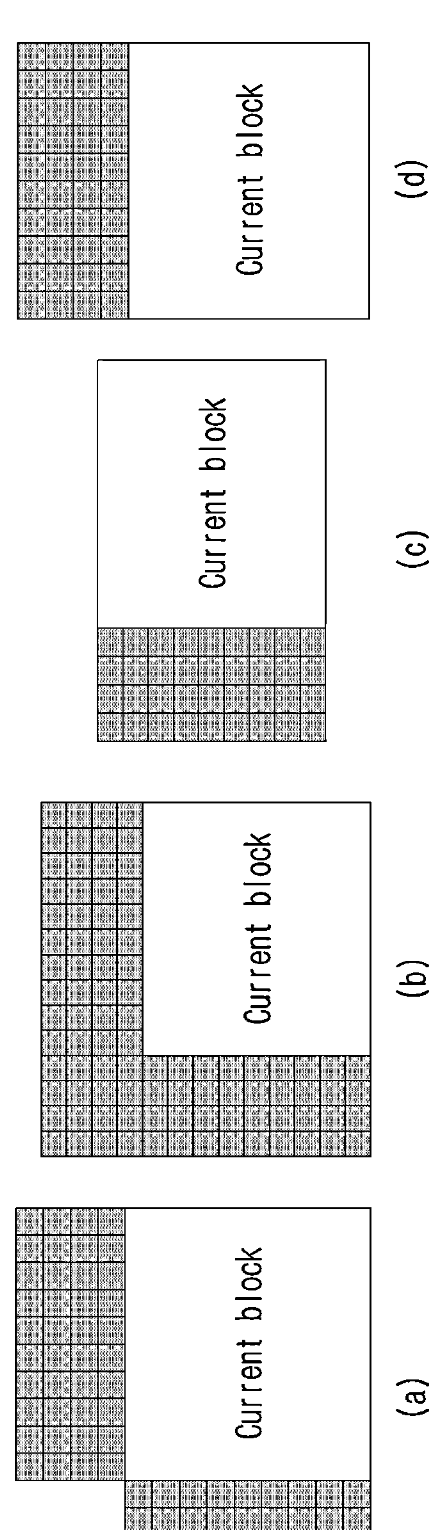
FIG. 19 shows an example in which a template is configured.

FIG. 19 shows an example in which a template is configured.

In FIG. 19, an example in which a current template adjacent to a current block is configured is shown, but a reference template adjacent to a reference block may be also configured in the same way as shown.

As in an example shown in FIGS. 19(*a*) and (*b*), a current template may be configured with pixels included in N columns on the left of a current block and pixels included in M columns on the top of a current block. In this case, as in an example shown in FIG. 19(*a*), pixels whose x-axis and y-axis coordinate are both smaller than a value of a top-left pixel of a current block may be set not to be included in a template region. Alternatively, as in an example shown in FIG. 19(*a*), pixels whose x-axis and y-axis coordinate are both smaller than a value of a top-left pixel of a current block may be set to be included in a template region.

Alternatively, as in an example shown in FIG. 19(*c*), a current template may be configured only with left pixels of a current block or as in an example shown in FIG. 19(*d*), a current template may be configured only with top pixels of a current block.

In FIG. 19, it was illustrated that N and M are 4, respectively.

However, a configuration for a current template and a reference template is not limited to a described example.

A current template in a search region and a reference template with the lowest cost are searched and a distance between a current block and a reference block is set as a motion vector. However, a method for deriving a motion vector is not limited thereto. Here, a cost between a current template and a reference template (i.e., a template matching cost) may be calculated by a comparison operation between a current template and a reference template. Specifically, Sum of Absolute Difference (SAD) between a current template and a reference template may be set as a cost between a current template and a reference template.

A reference block may refer to a block indicated by an initial motion vector or a motion vector derived through template matching.

When template matching is applied, a search step may be performed by applying at least one search pattern according to at least one of an inter prediction mode and motion vector resolution applied to a current block. As an example, a search step for a current block may be performed according to at least one search pattern in the order from top to bottom in Table 7 according to an inter prediction mode and resolution applied to a current block.

TABLE 7

| Search Pattern and Search | For an improved motion vector prediction mode, Index of adaptive motion vector resolution | | | | For a merge mode | |
|---|---|---|---|---|---|---|
| Resolution | 4-pel | full-pel | half-pel | quarter-pel | Alt_IF = 0 | Alt_IF = 1 |
| 4-pel diamond | v | | | | | |
| 4-pel cross | v | | | | | |
| full-pel diamond | | v | v | v | v | V |
| full-pel cross | | v | v | v | v | V |
| half-pel cross | | | v | v | v | V |
| quarter-pel cross | | | | v | v | |
| Octa-pel cross | | | | | v | |

In Table 7, ALT_IF refers to an index of an adaptive interpolation filter. The adaptive interpolation filter is used to calculate a pixel value at a sample position of specific resolution, and a different interpolation filter may be selected according to an index. For example, the specific resolution may be half-pel, but it is not limited thereto. An interpolation filter selected through an index may be a 6-tap interpolation filter or a 8-tap interpolation filter, but it is not limited thereto. In performing a comparison operation between a current template and a reference template, subsampling may be performed in a predefined manner for each template. By performing a comparison operation between subsampled templates, computational complexity may be reduced.

Figure 20:
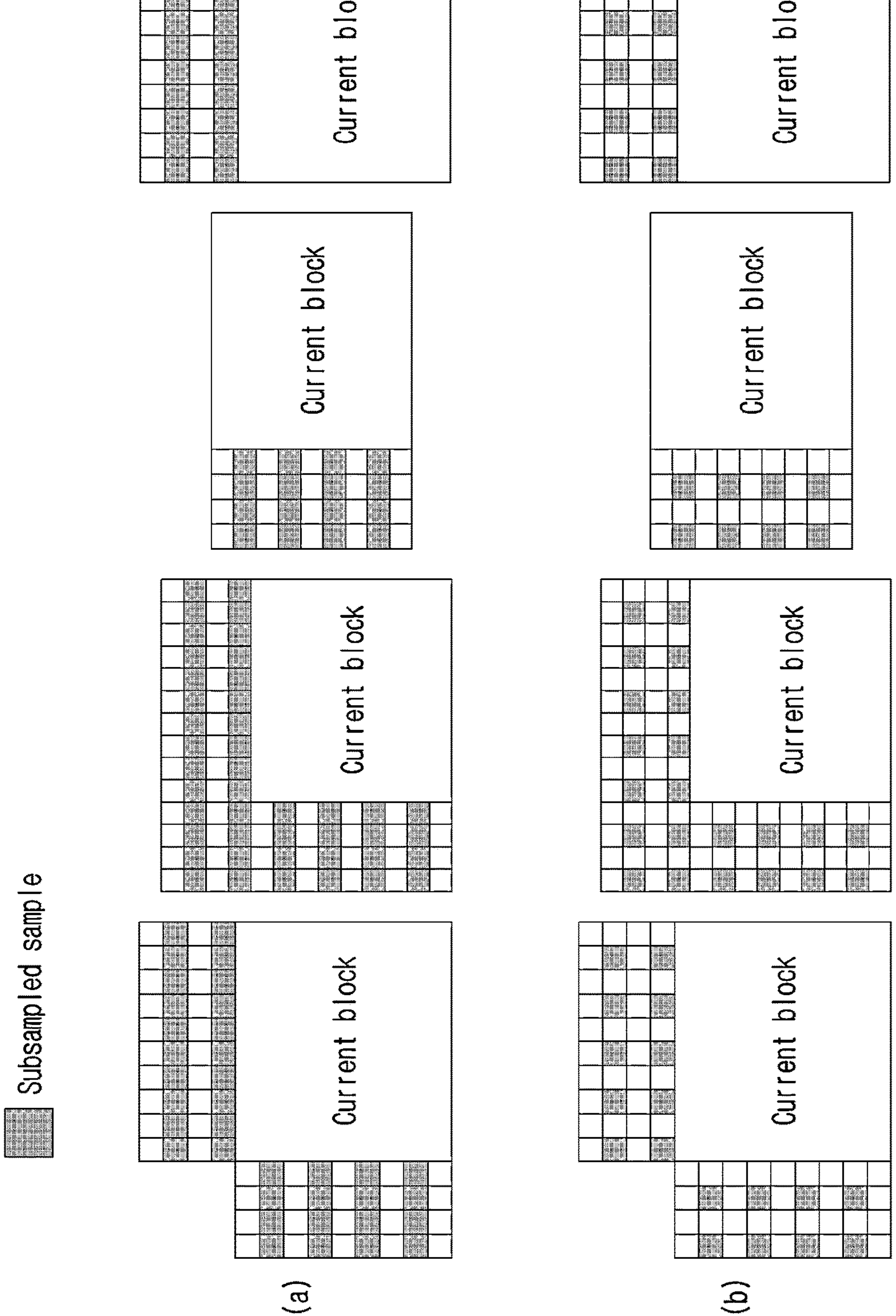
FIG. 20 shows an example in which subsampling is applied to a template.

FIG. 20 shows an example in which subsampling is applied to a template.

FIG. 20 shows an example in which subsampling is applied to a current template around a current block, but subsampling may be also performed in the same way to a reference template.

As in an example shown in FIG. 20(*a*), subsampling may be performed at an interval of 2 pixels in a vertical direction. As a result, as in an example shown in FIG. 20(*a*), only pixels belonging to an odd row may be used for template matching.

Alternatively, contrary to what is shown, subsampling may be performed to use only pixels belonging to an even row for template matching.

Although not shown, subsampling may be also performed at an interval of 2-pixel in a horizontal direction.

Alternatively, as in an example shown in FIG. 20(*b*), subsampling may be performed at an interval of 2 pixel in a vertical direction and a horizontal direction. As a result, as in an example shown in FIG. 20(*b*), only pixels at a position where an absolute value of a x-axis coordinate is an even number and an absolute value of a y-axis coordinate is an odd number may be used for template matching.

Even when an affine mode is applied, template matching may be applied.

Figure 21:
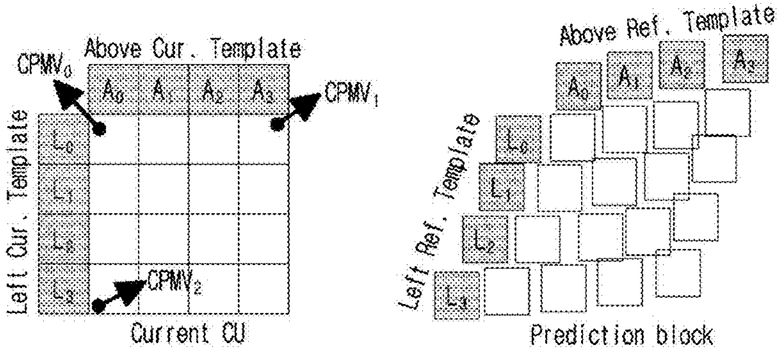
FIG. 21 is a diagram for describing an example in which template matching is applied when an affine mode is applied to a current block.

FIG. 21 is a diagram for describing an example in which template matching is applied when an affine mode is applied to a current block.

In FIG. 21, CPMV refers to a control point motion vector.

When an affine mode is applied, template matching may be performed in a unit of subtemplate. As an example, after performing template matching for each of sub-templates in a predefined size (e.g., $L_0$~$L_3$ and $A_0$~$A_3$ in FIG. 21), sub-reference templates with the smallest cost sum of sub-templates may be determined. Afterwards, based on sub-reference templates, a motion vector of each sub-block within a current block may be derived or a control point motion vector of a current block may be derived.

Figure 22:
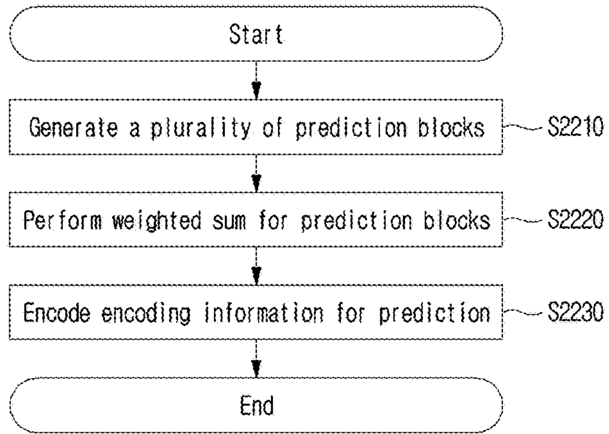
FIGS. 22 and 23 show a flowchart of a method for obtaining a prediction block based on multi-prediction in an encoding device and a decoding device, respectively.
Figure 23:
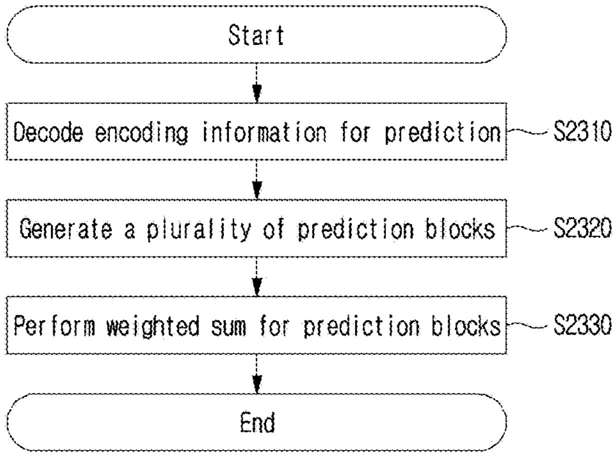

FIGS. 22 and 23 show a flowchart of a method for obtaining a prediction block based on multi-prediction in an encoding device and a decoding device, respectively.

When multi-prediction is applied, a plurality of prediction blocks may be obtained. In this case, a first prediction block among a plurality of prediction blocks may be obtained based on the same size and position as a current block. On the other hand, a second prediction block may be obtained based on a different size or position from a current block.

Figure 24:
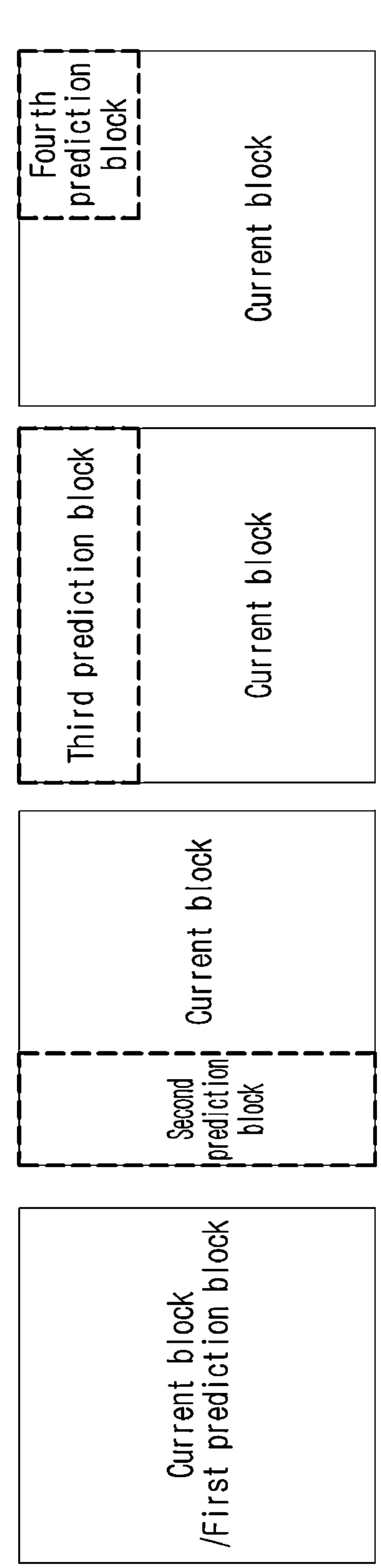
FIG. 24 shows a position and a size of each of a plurality of prediction blocks.

FIG. 24 shows a position and a size of each of a plurality of prediction blocks.

In an example shown in FIG. 24, it was illustrated that a first prediction block has the same position and size as a current block.

It was illustrated that a second and third prediction block, based on a top-left sample, have the same position as a current block, but their size is smaller that of a current block.

It was illustrated that a fourth prediction block has both a position and a size different from a current block.

As above, when multi-prediction is applied, at least one of a plurality of prediction blocks may be the same as a position and/or a size of a current block, while others may have a position and/or a size different from a current block. In other words, any one of a plurality of prediction blocks may have a different size or a different position from others.

Unlike what is shown, all of a plurality of prediction blocks may be obtained based on a position and/or a size of a current block. Alternatively, all of a plurality of prediction modes may be obtained based on a position and/or a size of a sub-block within a current block.

Alternatively, each of a plurality of prediction blocks may have a different position and/or size. As an example, a first prediction block among a plurality of prediction blocks may be generated to correspond to a position and a size of a first sub-block in a current block and a second prediction block among a plurality of prediction blocks may be generated to correspond to a position and a size of a second sub-block in a current block.

Here, a sub-block is a block partitioned from a current block, and may have a size smaller than a current block. When a current block is partitioned into a plurality of sub-blocks, each of sub-blocks may use a neighboring sub-block as an adjacent block.

As an example, a size of a sub-block may be N×M. Here, N and M may be a positive integer. For example, a sub-block size may be 4×4 or 8×8.

Information showing a sub-block size may be entropy-encoded/decoded in a unit of a sequence, a unit of a picture, a unit of a slice, a unit of a tile or a unit of a block. Here, a unit of a block may be at least one of a CTU unit, a CU unit or a PU unit.

Alternatively, a size of a sub-block may be adaptively determined according to a size of a current block. For example, when the number of samples included in a current block is equal to or less than K, a size of a sub-block may be set as a size of 4×4. On the other hand, when the number of samples included in a current block is greater than K, a size of a sub-block may be set as 8×8. Here, K is a positive integer, and for example, it may be 256.

Alternatively, a size of a sub-block may be predefined in an encoding device and a decoding device.

A sub-block may be square or rectangular. According to a shape of a current block, a shape of a sub-block may be determined. As an example, when a current block is rectangular, a sub-block may be also rectangular.

Information about a shape of a sub-block may be entropy-encoded/decoded in a unit of a sequence, a unit of a picture, a unit of a slice, a unit of a tile or a unit of a block.

Alternatively, a shape of a sub-block may be predefined in an encoding device and a decoding device.

Hereinafter, for convenience of a description, it is assumed that a first prediction block among a plurality of prediction blocks is obtained based on a position and a size of a current block. Meanwhile, it is assumed that the remaining prediction blocks except for a first prediction block are acquired based on a position and a size of a current block or based on a position and a size of a sub-block within a current block.

When it is assumed that among a plurality of prediction blocks, the remaining prediction blocks excluding a first prediction block are obtained in a unit of a sub-block, a plurality of prediction blocks may exist only for part of a plurality of sub-blocks in a current block.

As an example, for a first sub-block of a current block, a first prediction block obtained by performing prediction for a current block and a second prediction block obtained by performing prediction for the first sub-block may be overlapped. On the other hand, for a second sub-block, only a first prediction block obtained by performing prediction for a current block may exist. In this case, for a first sub-block, a final prediction block is obtained through a weighted sum operation of a first prediction block and a second prediction block, while for a second sub-block, a sub-block at a corresponding position in a first prediction block may be set as a final prediction block.

Meanwhile, the number and/or position of sub-blocks where a plurality of prediction blocks are generated may be predefined in an encoding device and a decoding device. As an example, a plurality of prediction blocks may be generated only for sub-blocks that border a specific boundary of a current block. Here, a specific boundary may include at least one of the top boundary, left boundary, right boundary or bottom boundary of a current block.

Based on the above, multi-prediction is described in detail.

In reference to FIG. 22, a plurality of prediction blocks may be generated for a current block or a sub-block S2210.

A final prediction block of a current block or a sub-block may be obtained through a weighted sum of a plurality of prediction blocks S2220.

In an encoding device, at least one of prediction information for at least one of a plurality of prediction blocks or information for a weighted sum operation of a plurality of prediction blocks may be encoded and signaled S2230.

In a decoder, at least one of prediction information or information for a weighted sum operation may be decoded from a bitstream S2310.

In a decoder, a plurality of prediction blocks may be generated for a current block or a sub-block S2320.

And, a final prediction block of a current block or a sub-block may be obtained by performing a weighted sum for a plurality of prediction blocks S2330.

After determining whether multi-prediction is performed, a plurality of prediction blocks may be generated or a single prediction block may be generated according to the decision.

Alternatively, for a current block, after obtaining a first prediction block, whether to perform multi-prediction may be determined based on a characteristic of a first prediction block or prediction information used to obtain a first prediction block. When it is determined that multi-prediction is performed, at least one prediction block may be additionally generated. On the other hand, when it is determined that multi-prediction is not performed, a first prediction block may be determined as a final prediction block for a current block or a sub-block.

Meanwhile, whether to perform multi-prediction may be determined in a unit of a sub-block. In this case, it may be determined that multi-prediction is performed only for part of sub-blocks.

Determine Whether to Apply Multi-Prediction

Information representing whether multi-prediction is applied may be encoded and signaled. As an example, multipred_flag, an indicator representing whether multi-prediction is applied to a current block, may be encoded and signaled. The multipred_flag may be encoded and signaled at a level of an image, a slice or a tile. Alternatively, the multipred_flag may be encoded and signaled at a level of a block such as a Coding Tree Unit (CTU) or a Coding Unit (CU). Alternatively, at a higher level, multipred_enabled_flag representing whether multi-prediction is allowed may be encoded and signaled, and when the multipred_enabled_flag is 1, multipred_flag may be encoded and signaled at a level of a block. Alternatively, multipred_enabled_flag representing whether multi-prediction is applied per sub-block may be encoded and signaled.

Multi-prediction may be performed only when a current block satisfies a predefined condition. As an example, multipred_flag may be encoded/decoded only when a current block satisfies a predefined condition. Alternatively, when a current block satisfies a predefined condition, multi-prediction may be performed by default.

A Predefined condition may be about coding parameter and/or block information. For example, the predefined condition may be about at least one of a prediction mode of a current block, a size of a current block, a size of a block vector, a size of a motion vector, a direction of inter prediction, information of a surrounding block, an index of bi-predictive with CU weights (BCW), an index of Adaptive Motion Vector Resolution (AMVR), an indicator of Combined Inter-Intra Prediction (CIIP), an indicator and/or whether to perform Position Dependent Prediction Combination (PDPC), an indicator of an affine mode or a directional intra prediction mode, but it is not limited thereto.

When the CIIP is applied, a third prediction block for a current block is obtained by performing a weighted sum for a first prediction block obtained by inter prediction and a second prediction block obtained by intra prediction.

The PDPC represents a technology for correcting a prediction value by at least one of a pixel position in a current block, an intra prediction mode of a current block or a current block size. When PDPC is applied, a prediction value may be corrected by using a weighted sum of a filtered reference sample and an unfiltered reference sample or by using a difference value between reference samples.

When a prediction value is corrected by using a weighted sum of a filtered reference sample and an unfiltered reference sample, a weight for a weighted sum may be determined based on at least one of an intra prediction mode of a current block or a size of a current block. In this case, a weight applied to a filtered reference sample and a weight applied to an unfiltered reference sample may have the same value or a different value.

The PDPC may be used in combination with intra prediction or may be used in combination with CIIP. Alternatively, in CIIP, a PDPC may be configured not to be used.

When bi-prediction is applied to a current block, the BCW is a technology for determining a weight combination of reference blocks in generating a prediction block of a current block from a reference block in a L0 direction and a reference block in a L1 direction.

For example, an index of a predefined table may be encoded/decoded, and a weight of each reference block may be determined by a weight indicated by an index in the predefined table.

The LIC refers to a technology which corrects at least part of a prediction block by using at least one of a derived weight and offset after deriving at least one of a weight and an offset by performing a comparison operation between a template of a current block and a template of a reference block. Specifically, a prediction block may be corrected by performing at least one of multiplying a weight to all or part of a prediction block or summing a weight to all or part of a prediction block.

The block information may include at least one of information on a surrounding block, information on a reference block or information on a reference block. Here, a reference block may be a block indicated by a motion vector or an initial motion vector of a current block in a reference picture.

Block information may include at least one of a coding parameter. As an example, information on a block may include at least one of information used in inter prediction, intra prediction, transform, inverse transform, quantization, dequantization, entropy encoding/decoding or an in-loop filter. In other words, block information may include at least one value or at least one of a combined shape of a block size, a block depth, block partition information, a block shape (square or non-square), whether partition in a quad tree shape is performed, whether partition in a binary tree shape is performed, a partition direction in a binary tree shape (a horizontal direction or a vertical direction), a partition shape in a binary tree shape (symmetric partition or asymmetric partition), a prediction mode (intra prediction or inter prediction), an intra luma prediction mode/direction, an intra chroma prediction mode/direction, intra partition information, inter partition information, an coding block partition flag, a block partition flag, a transform block partition flag, a reference sample filter tab, a reference sample filter coefficient, a block filter tab, a block filter coefficient, a block boundary filter tab, a block boundary filter coefficient, a motion vector (a motion vector for at least one of L0, L1, L2, L3, etc.), a motion vector difference (a motion vector difference for at least one of L0, L1, L2, L3, etc.), an inter prediction direction (an inter prediction for at least one of unidirectional prediction, bi-prediction, etc.), a reference image index (a reference image index for at least one of L0, L1, L2, L3, etc.), an inter prediction indicator, a prediction list utilization flag, a reference image list, a motion vector prediction index, a motion vector prediction candidate, a motion vector candidate list, whether to use a merge mode, a merge index, a merge candidate, a merge candidate list, whether to use a skip mode, an interpolation filter type, an interpolation filter tap, an interpolation filter coefficient, a motion vector size, motion vector expression accuracy (a motion vector expression unit such as an integer sample, a ½ sample, a ¼ sample, a ⅛ sample, a 1/16 sample, a 1/32 sample, etc.), a transform type, a transform size, information on whether to use first transform, information on whether to use second transform, a first transform index, a second transform index, information on whether there is a residual signal, an coding block pattern, an coding block flag, a quantization parameter, a residual quantization parameter, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/debinarization method, a context model determination method, a context model update method, whether to perform a regular mode, whether to perform a bypass mode, a context bin, a bypass bin, a significant coefficient flag, a last significant coefficient flag, a coefficient group unit encoding flag, a last significant coefficient position, a flag for whether a coefficient value is greater than 1, a flag for whether a coefficient value is greater than 2, a flag for whether a coefficient value is greater than 3, remaining coefficient value information, sign information, a reconstructed luma sample, a reconstructed chroma sample, a residual luma sample, a residual chroma sample, a luma transform coefficient, a chroma transform efficient, a luma quantization level, a chroma quantization level, a transform coefficient level scanning method, a size of a decoder lateral motion vector search region, a shape of a decoder lateral motion vector search region, the number of decoder lateral motion vector searches, CTU size information, minimum block size information, maximum block size information, maximum block depth information, minimum block depth information, slice identification information, slice partition information, tile identification information, a tile type, tile partition information, an input sample bit depth, a reconstructed sample bit depth, a residual sample bit depth, a transform coefficient bit depth or a quantization level bit depth.

At a block level, information on a prediction mode may be encoded and signaled. It may be used to determine whether to allow multi-prediction according to a prediction mode of a current block.

As an example, multi-prediction may be performed only when a prediction mode of a current block is intra prediction. For example, multipred_flag may be encoded/decoded only when a prediction mode of a current block is intra prediction. Alternatively, when a prediction mode of a current block is intra prediction, whether to perform multi-prediction may be true.

As an example, multi-prediction may be performed only when a prediction mode of a current block is inter prediction. For example, multipred_flag may be encoded/decoded only when a prediction mode of a current block is inter prediction. Alternatively, when a prediction mode of a current block is inter prediction, whether to perform multi-prediction may be true.

As an example, multi-prediction may be performed only when a prediction mode of a current block is intra block copy. For example, multipred_flag may be encoded/decoded only when a prediction mode of a current block is intra block copy. Alternatively, when a prediction mode of a current block is intra block copy, whether to perform multi-prediction may be true.

As an example, multi-prediction may be performed only when a CIIP is not applied to a current block. For example, multipred_flag may be encoded/decoded only when a CIIP is not applied to a current block. Alternatively, only when multi-prediction is not applied to a current block, a CIIP may be applied to a current block. Accordingly, only when multi-prediction is not applied to a current block, an indicator representing whether a CIIP is applied may be encoded/decoded.

As an example, when a CIIP is applied to a current block, multi-prediction may be always applied. When a CIIP is applied to a current block, encoding/decoding of multipred_flag may be omitted and its value may be inferred as indicating performing multi-prediction. Alternatively, multipred_flag may be encoded/decoded only when a CIIP is not applied to a current block.

As an example, multi-prediction may be performed only when a PDPC is not applied to a current block. For example, multipred_flag may be encoded/decoded only when a PDPC is not applied to a current block. Alternatively, a PDPC may be applied to a current block only when multi-prediction is not applied to a current block. Accordingly, only when multi-prediction is not applied to a current block, an indicator representing whether a PDPC is applied may be encoded/decoded.

As an example, when a PDPC is applied to a current block, multi-prediction may be always applied. When a PDPC is applied to a current block, encoding/decoding of multipred_flag may be omitted and its value may be inferred as indicating performing multi-prediction. Alternatively, multipred_flag may be encoded/decoded only when a PDPC is not applied to a current block.

As an example, multi-prediction may be performed only when a geometric partition mode is not applied to a current block. For example, multipred_flag may be encoded/decoded only when a geometric partition mode is not applied to a current block. Alternatively, a geometric partition mode may be applied to a current block only when multi-prediction is not applied to a current block. Accordingly, only when multi-prediction is not applied to a current block, an indicator representing whether a geometric partition mode is applied may be encoded/decoded.

As an example, when a geometric partition mode is applied to a current block, multi-prediction may be always applied. When a geometric partition mode is applied to a current block, encoding/decoding of multipred_flag may be omitted and its value may be inferred as indicating performing multi-prediction. Alternatively, multipred_flag may be encoded/decoded only when a geometric partition mode is not applied to a current block.

Meanwhile, the geometric splitting mode may include at least one of a geometric partition mode based on intra prediction, a geometric partition mode based on inter prediction and a geometric partition mode based on a combination of intra prediction and inter prediction. Here, a geometric partition mode based on intra prediction means that intra prediction is performed for each of a first partition and a second partition generated by geometric partition. And, a geometric partition mode based on inter prediction means that inter prediction is performed for each of a first partition and a second partition generated by geometric partition. In addition, a geometric partition mode based on a combination of intra prediction and inter prediction means that intra prediction is performed for one of a first partition and a second partition generated by geometric partition and inter prediction is performed for the other.

In this case, multi-prediction may be performed only in a geometric partition mode in which intra prediction is not used. In other words, determining whether to perform multi-prediction under the above-described geometric mode may be applied only to a geometric partition mode based on inter prediction.

As an example, multi-prediction may be performed only when a LIC is not applied to a current block. For example, multipred_flag may be encoded/decoded only when a LIC is not applied to a current block. Alternatively, a LIC may be applied to a current block only when multi-prediction is not applied to a current block. Accordingly, only when multi-prediction is not applied to a current block, an indicator representing whether a LIC is applied may be encoded/decoded.

As an example, when a LIC is applied to a current block, multi-prediction may be always applied. When a LIC is applied to a current block, encoding/decoding of multipred_flag may be omitted and its value may be inferred as indicating performing multi-prediction. Alternatively, when a LIC is applied to a current block, whether to perform multi-prediction may be determined through multipred_flag. Alternatively, when a LIC is applied to a current block and a size of a current block is equal to or greater than a threshold value, it may be determined that multi-prediction is always performed.

According to an embodiment of the present disclosure, whether to allow multi-prediction may be determined according to a size or prediction information of a current block.

As an example, multi-prediction may be performed only when at least one of a width or a height of a current block is equal to or greater than a threshold value. For example, multipred_flag may be encoded/decoded only when both a width and a height of a current block are equal to or greater than MULTIPREDMODE_MINSIZE. Alternatively, when both a width and a height of a current block are equal to or greater than MULTIPREDMODE_MINSIZE, whether to perform multi-prediction may be true. In this time, MULTIPREDMODE_MINSIZE may be a positive integer equal to or greater than 0. MULTIPREDMODE_MINSIZE may be predefined in an encoding device and a decoding device. Alternatively, information indicating MULTIPREDMODE_MINSIZE may be explicitly encoded and signaled.

As an example, multi-prediction may be performed only when at least one of a width or a height of a current block is less than or equal to a threshold value. For example, multipred_flag may be encoded/decoded only when both a width and a height of a current block are less than or equal to MULTIPREDMODE_MAXSIZE. Alternatively, when both a width and a height of a current block are equal to or greater than MULTIPREDMODE_MAXSIZE, whether to perform multi-prediction may be true. In this case, MULTIPREDMODE_MAXSIZE may be a positive integer equal to or greater than 0. MULTIPREDMODE_MAXSIZE may be predefined in an encoding device and a decoding device. Alternatively, information indicating MULTIPREDMODE_MAXSIZE may be explicitly encoded and signaled.

As an example, multi-prediction may be performed only when the number of samples belonging to a current block is equal to or greater than a threshold value. For example, multipred_flag may be encoded/decoded only when the number of samples belonging to a current block is equal to or greater than MULTIPREDMODE_MINSAMPLE. Alternatively, when the number of samples belonging to a current block is equal to or greater than MULTIPREDMODE_MINSAMPLE, whether to perform multi-prediction may be true. In this case, MULTIPREDMODE_MINSAMPLE is a positive integer equal to or greater than 0 and may be a value such as 64, 128 or 256. MULTIPREDMODE_MINSAMPLE may be predefined in an encoding device and a decoding device. Alternatively, information indicating MULTIPREDMODE_MINSAMPLE may be explicitly encoded and signaled.

As an example, multi-prediction may be performed only when the number of samples belonging to a current block is less than or equal to a threshold value. For example, multipred_flag may be encoded/decoded only when the number of samples belonging to a current block is less than or equal to MULTIPREDMODE_MAXSAMPLE. Alternatively, when the number of samples belonging to a current block is less than or equal to MULTIPREDMODE_MAXSAMPLE, whether to perform multi-prediction may be true. In this case, MULTIPREDMODE_MAXSAMPLE is a positive integer equal to or greater than 0 and may be a value such as 64, 128 or 256. MULTIPREDMODE_MAXSAMPLE may be predefined in an encoding device and a decoding device. Alternatively, information indicating MULTIPREDMODE_MAXSAMPLE may be explicitly encoded and signaled.

As an example, multi-prediction may be performed only when motion vector resolution of a current block is less than or equal to a threshold value. For example, multipred_flag may be encoded/decoded only when motion vector resolution of a current block is less than or equal to MULTIPRED_AMVRTHRES. Alternatively, when motion vector resolution of a current block is less than or equal to MULTIPRED_AMVRTHRES, whether to perform multi-prediction may be true. In this case, MULTIPRED_AMVRTHRES may be an integer such as 1, 2, 4, 8, etc. or may be a real number less than 1. MULTIPRED_AMVRTHRES may be predefined in an encoding device and a decoding device. Alternatively, information indicating MULTIPRED_AMVRTHRES may be explicitly encoded and signaled.

As an example, multi-prediction may be performed only when motion vector resolution of a current block is equal to or greater than a threshold value. For example, multipred_flag may be encoded/decoded only when motion vector resolution of a current block is equal to or greater than MULTIPREDMODE_AMVRTHRES. Alternatively, when motion vector resolution of a current block is equal to or greater than MULTIPREDMODE_AMVRTHRES, whether to perform multi-prediction may be true. In this case, MULTIPREDMODE_AMVRTHRES may be an integer such as 1, 2, 4, 8, etc. or may be a real number less than 1.

MULTIPREDMODE_AMVRTHRES may be predefined in an encoding device and a decoding device. Alternatively, information indicating MULTIPREDMODE_AMVRTHRES may be explicitly encoded and signaled. As an example, when MULTIPREDMODE_AMVRTHRES is 4, it means that motion vector resolution is 4 pels.

As an example, whether to perform multi-prediction may be determined based on an inter prediction indicator of a current block. For example, only when a prediction direction indicated by an intra prediction direction of a current block is at least one of unidirectional, bidirectional, 3-directional or 4-directional or the number of prediction directions is equal to or greater than one of them, multi-prediction may be performed. As an example, multi-prediction may be performed only when unidirectional prediction is applied to a current block or multi-prediction may be performed only when bidirectional prediction is applied to a current block.

According to an embodiment of the present disclosure, whether to allow multi-prediction may be determined according to a comparison result between prediction information for a current block or a sub-block and prediction information for a surrounding block. Here, a surrounding block may be adjacent to a current block or may be adjacent to a sub-block. When whether to perform multi-prediction is determined in a unit of a sub-block, it may be determined that multi-prediction is performed only for some sub-blocks within a current block.

As an example, whether to perform multi-prediction may be determined according to whether a prediction mode of a current block (or a sub-block) and a surrounding block is the same or different. For example, multipred_flag may be encoded/decoded only when a prediction mode of a current block (or a sub-block) is different from a prediction mode of a surrounding block. Alternatively, when a prediction mode of a current block (or a sub-block) is different from a prediction mode of a surrounding block, whether to perform multi-prediction may be true.

As an example, whether to perform multi-prediction may be determined based on a result of comparing a difference between motion vectors of a current block (or a sub-block) and a surrounding block or a difference between block vectors with a threshold value. As an example, multi-prediction may be performed only when a difference between motion vectors of a current block (or a sub-block) and a surrounding block or a difference between block vectors is equal to or greater than a threshold value. For example, multipred_flag may be encoded/decoded only when a difference between motion vectors of a current block (or a sub-block) and a surrounding block or a difference between block vectors is equal to or greater than MULTIPREDMODE_VECTORDIFFTHRES. Alternatively, when a difference between motion vectors of a current block (or a sub-block) and a surrounding block or a difference between block vectors is equal to or greater than MULTIPREDMODE_VECTORDIFFTHRES, whether to perform multi-prediction may be true. In this case, MULTIPREDMODE_VECTORDIFFTHRES may be equal to or greater than 0. MULTIPREDMODE_VECTORDIFFTHRES may be predefined in an encoding device and a decoding device. Alternatively, information indicating MULTIPREDMODE_VECTORDIFFTHRES may be explicitly encoded and signaled.

As an example, when a directional intra prediction mode is applied to each of a current block (or a sub-block) and a surrounding block, whether to perform multi-prediction may be determined based on a result of comparing a difference between intra prediction modes of a current block (or a sub-block) and a surrounding block with a threshold value. As an example, multi-prediction may be performed only when a difference between intra prediction modes of a current block (or a sub-block) and a surrounding block is equal to or greater than a threshold value. For example, multipred_flag may be encoded/decoded only when a difference between intra prediction modes of a current block (or a sub-block) and a surrounding block is equal to or greater than MULTIPREDMODE_INTRAMODETHRES. Alternatively, when a difference between intra prediction modes of a current block (or a sub-block) and a surrounding blocks is equal to or greater than MULTIPREDMODE_INTRAMODETHRES, whether to perform multi-prediction may be true. In this case, MULTIPREDMODE_INTRAMODETHRES may be an integer equal to or greater than 0. MULTIPREDMODE_INTRAMODETHRES may be predefined in an encoding device and a decoding device. Alternatively, information indicating MULTIPREDMODE_INTRAMODETHRES may be explicitly encoded and signaled.

As an example, multi-prediction may be performed only when a difference between intra prediction modes of a current block (or a sub-block) and a surrounding block is less than or equal to a threshold. For example, multipred_flag may be encoded/decoded only when a difference between intra prediction modes of a current block (or a sub-block) and a surrounding block is less than or equal to MULTIPRED_INTRAMODETHRES. Alternatively, when a difference between intra prediction modes of a current block (or a sub-block) and a surrounding block is less than or equal to MULTIPRED_INTRAMODETHRES, whether to perform multi-prediction may be true. In this case, MULTIPRED_INTRAMODETHRES may be an integer equal to or greater than 0. MULTIPRED_INTRAMODETHRES may be predefined in an encoding device and a decoding device. Alternatively, information indicating MULTIPRED_INTRAMODETHRES may be explicitly encoded and signaled.

According to an embodiment of the present disclosure, whether to allow multi-prediction may be determined based on prediction information of a surrounding block.

As an example, when an intra prediction mode is used for at least one of surrounding blocks referred to for deriving a coding parameter of a current block (or a sub-block), multi-prediction may be applied to a current block (or a sub-block). Here, a surrounding block may be a surrounding block adjacent to a current block (or a sub-block) in a specific direction or any one of a plurality of surrounding blocks.

Figure 25:
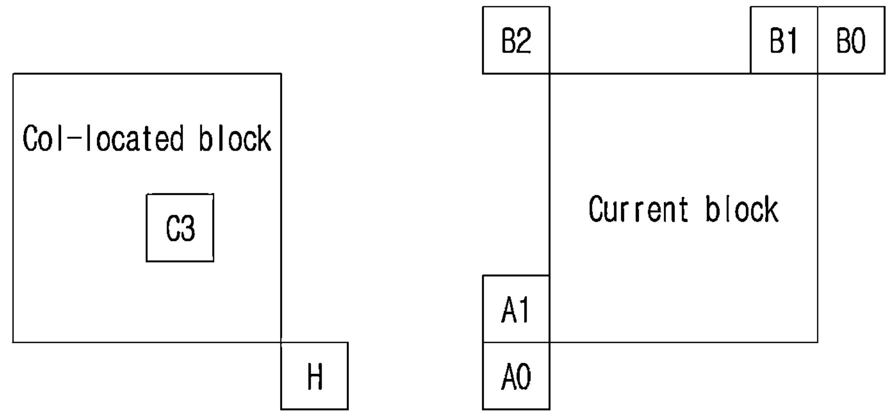
FIG. 25 shows surrounding blocks adjacent to a current block.

FIG. 25 shows surrounding blocks adjacent to a current block.

A surrounding block may be one of A0, A1, B0, B1, B2, C3 or H shown in FIG. 25. Alternatively, whether to perform multi-prediction may be determined by referring to a surrounding block at a position different from that shown.

According to an embodiment of the present disclosure, whether to perform multi-prediction or whether to encode/decode multipred_flag may be determined based on at least one of a prediction mode, motion information, a coding parameter or a size of at least one sample in a prediction block of a current block (or a sub-block), at least one sample in a reference block of a current block (or a sub-block), at least one sample in a surrounding block adjacent to a current block (or a sub-block) or a surrounding block.

As an example, multi-prediction may be performed or multipred_flag may be encoded/decoded only when a difference between the maximum value and the minimum value among prediction samples generated by predicting a current block (or a sub-block) is less than or equal to a threshold value. In other words, only when a difference between the maximum value and the minimum value of prediction samples in a first prediction block generated by predicting a current block (or a sub-block) is less than or equal to a threshold value, a prediction block other than a first prediction block may be additionally generated.

As an example, multi-prediction may be performed or multipred_flag may be encoded/decoded only when a difference between the maximum value and the minimum value among prediction samples of a current block (or a sub-block) is equal to or greater than a threshold value. In other words, only when a difference between the maximum value and the minimum value of prediction samples in a first prediction block generated by predicting a current block (or a sub-block) is equal to or greater than a threshold value, a prediction block other than a first prediction block may be additionally generated.

As an example, multi-prediction may be performed or multipred_flag may be encoded/decoded only when a difference between the maximum value and the minimum value among samples belonging to a reference block of a current block (or a sub-block) is less than or equal to a threshold value. In other words, only when a difference between the maximum value and the minimum value of prediction samples in a reference block specified by prediction information for a current block (or a sub-block) is less than or equal to a threshold value, a prediction block other than a first prediction block obtained from the reference block may be additionally generated.

As an example, multi-prediction may be performed or multipred_flag may be encoded/decoded only when a difference between the maximum value and the minimum value among samples belonging to a reference block of a current block (or a sub-block) is equal to or greater than a threshold value. In other words, only when a difference between the maximum value and the minimum value of prediction samples in a reference block specified by prediction information for a current block (or a sub-block) is equal to or greater than a threshold value, a prediction block other than a first prediction block obtained from the reference block may be additionally generated.

As an example, when a plurality of reference blocks exist for a current block (or a sub-block) (e.g., a L0 reference block and an a L1 reference block), for all reference blocks, only when a condition that a difference between the maximum value and the minimum value in a reference block is equal to or greater than a threshold value is satisfied, multi-prediction may be performed for a current block (or a sub-block) or multipred_flag may be encoded/decoded.

As an example, when a plurality of reference blocks exist for a current block (or a sub-block) (e.g., a L0 reference block and a L1 reference block), for all reference blocks, only when a condition that a difference between the maximum value and the minimum value in a reference block is less than or equal to a threshold value is satisfied, multi-prediction may be performed for a current block (or a sub-block) or multipred_flag may be encoded/decoded.

In the above-described example, a threshold value may be a positive integer. A threshold value may be predefined in an encoding device and a decoding device. Alternatively, information representing a threshold value may be encoded and signaled. Alternatively, a threshold value may be adaptively determined based on at least one of a prediction mode of a current block, a coding parameter of a current block, a height of a current block, a width of a current block or the number of samples in a current block.

As an example, when a surrounding block of a current block (or a sub-block) is not in a predefined prediction mode, multi-prediction may be performed for a current block (or a sub-block) or multipred_flag may be encoded/decoded.

As an example, when a surrounding block of a current block (or a sub-block) is in a predefined prediction mode, multi-prediction may be performed for a current block (or a sub-block) or multipred_flag may be encoded/decoded.

In the above-described example, a predefined prediction mode may be an intra block copy mode.

According to an embodiment of the present disclosure, after obtaining a first prediction block for a current block, whether to perform multi-prediction may be determined based on a characteristic of a first prediction block. Here, a first prediction block may be generated by inter prediction, intra prediction or intra block copy. In addition, when a prediction direction indicator of a current block indicates bi-prediction, a first prediction block may be obtained by performing a weighted sum for a L0 prediction block and a L1 prediction block. When a CIIP is applied to a current block, a first prediction block may be obtained by performing a weighted sum for a prediction block generated by inter prediction and a prediction block generated by intra prediction.

In addition, a characteristic shows the number of main gradients. A main gradient may be derived from a gradient histogram obtained based on a gradient of prediction samples in a first prediction block. As an example, when an amplitude value within a gradient histogram is greater than a threshold value, it may be selected as a main gradient.

By comparing the number of main gradients to a threshold value, whether multi-prediction is performed may be determined for a current block. As an example, multi-prediction may be performed for a current block only when the number of main gradients is greater than or smaller than a threshold value.

Alternatively, whether to perform multi-prediction may be determined based on a characteristic of a reference block used to obtain a first prediction block. Specifically, when a reference block is determined by a block vector or motion information of a current block, whether multi-prediction is performed for a current block may be determined based on the number of main gradients for a determined reference block. The number of main gradients for a reference block may be calculated from a gradient histogram obtained based on a slope of samples in a first reference block.

Meanwhile, when an inter prediction indicator of a current block indicates bi-prediction, whether to perform multi-prediction may be determined based on a characteristic of one of a L0 reference block and a L1 reference block. Alternatively, multi-prediction may be set to be performed when both a L0 reference block and a L1 reference block satisfy a condition that multi-prediction is performed (i.e., when the number of main gradients is greater than or smaller than a threshold value). Alternatively, multi-prediction may be set to be performed when only any one of a L0 reference block and a L1 reference block satisfies a condition that multi-prediction is performed.

Alternatively, when a prediction direction indicator of a current block indicates bi-prediction, whether to perform multi-prediction may be determined based on a characteristic of at least one of a L0 prediction block or a L1 prediction block. Alternatively, multi-prediction may be set to be performed when both a L0 prediction block and a L1 prediction block satisfy a condition that multi-prediction is performed (i.e., when the number of main gradients is greater than or smaller than a threshold value). Alternatively, multi-prediction may be set to be performed when only any one of a L0 prediction block and a L1 prediction block satisfies a condition that multi-prediction is performed.

When a CIIP is applied to a current block, whether to perform multi-prediction may be determined based on a characteristic of at least one of an intra prediction block obtained by intra prediction and an inter prediction block obtained by inter prediction. Alternatively, multi-prediction may be set to be performed when both an intra prediction block and an inter prediction block satisfy a condition that multi-prediction is performed. Alternatively, multi-prediction may be set to be performed when only any one of an intra prediction block and an inter prediction block satisfies a condition that multi-prediction is performed.

Meanwhile, when multi-prediction is applied, a plurality of prediction blocks may be generated for a current block or a sub-block. As an example, when the number of prediction blocks is MULTIPRED_NUM, MULTIPRED_NUM may be 1, 2 or a positive integer greater than it. MULTIPRED_NUM may be predefined in an encoding device and a decoding device.

A prediction mode and a coding parameter for each of a plurality of prediction blocks may be the same or different. Here, a prediction mode may be one of an intra prediction, inter prediction or intra block copy mode.

Hereinafter, for convenience of a description, each of prediction blocks generated by multi-prediction is referred to as a i-th prediction block (i is a positive integer with a value from 1 to MULTIPRED_NUM). However, i may not represent order for at least one of encoding, decoding, prediction, reconstruction or weighted sum of each prediction block. The i is a positive integer with a value from 1 to MULTIPRED_NUM.

When multi-prediction is performed, information on a prediction mode for obtaining at least one of a plurality of prediction blocks may be encoded and signaled. As an example, an indicator representing whether a specific prediction mode is used or whether a specific prediction mode is available may be encoded and signaled.

For at least one prediction mode, the indicator may be encoded and signaled. As an example, an indicator may be encoded and signaled for at least one of intra prediction, inter prediction, intra block copy, unidirectional intra prediction or bidirectional inter prediction. As an example, an indicator for an intra prediction mode may indicate whether intra prediction is performed in performing multi-prediction. Through encoding/decoding of the indicator, intra prediction may be determined not to be used or may be determined to be used in multi-prediction for a current block.

When an indicator representing whether a specific prediction mode is used or whether a specific prediction mode is available is a first value, it may represent that when multi-prediction is applied, all prediction blocks are predicted as the specific prediction mode or that at least one prediction block is predicted as the specific prediction mode. The first value may be true or 1.

When an indicator representing whether a specific prediction mode is used or whether a specific prediction mode is available is a second value, it may represent that when multi-prediction is applied, all prediction blocks are not predicted as the specific prediction mode. The second value may be false or 0.

For each prediction block, an indicator may be encoded and signaled. The indicator may specify a prediction mode used to obtain a prediction block corresponding to the indicator.

Alternatively, whether at least one prediction mode is used or available may be determined from one indicator.

As an example, when a value of the indicator is a first value, it represents that when multi-prediction is performed for a current block, at least two of intra prediction, inter prediction and intra block copy are used or available. As an example, when a value of the indicator is a second value, it represents that when multi-prediction is performed for a current block, only intra block copy is available.

Here, one of the first value and the second value may be 0 and the other may be an integer greater than 0.

When multi-prediction is performed, whether a specific prediction mode will be used or whether a specific prediction mode is available may be determined according to a predefined condition.

A predefined condition may be related to at least one of a coding parameter or block information. As an example, a predefined condition may be about at least one of a size of a current block, a size of a block vector, a size of a motion vector, a direction of inter prediction, surrounding block information, an index of Bi-predictive with CU Weights (BCW), index of Adaptive Motion Vector Resolution (AMVR), an indicator of Local Illumination Compensation (LIC), an indicator of Combined Inter-Intra Prediction (CIIP), an indicator and/or whether to perform Position dependent prediction combination (PDPC), an indicator of an affine mode or a directional intra prediction mode, but it is not limited thereto.

Per prediction mode, a condition for determining whether a corresponding prediction mode is used or available may be set. In other words, a condition for determining whether a first prediction mode is used or available may be different from a condition for determining whether a second prediction mode is used or available.

Alternatively, whether each of a plurality of prediction modes is used or available may be determined under the same condition.

When multi-prediction is applied, a coding parameter for at least one of a plurality of prediction blocks may be encoded/decoded.

Based on information used to obtain a specific prediction block, whether a corresponding prediction mode is used or available for multi-prediction, i.e., another prediction block may be determined.

As an example, whether inter prediction is used or available in multi-prediction may be determined by comparing a difference between a motion vector of a current block and a motion vector of a surrounding block with a threshold value. As an example, when a difference between a motion vector of a current block and a motion vector of a surrounding block is equal to or greater than MULTIPREDSPECIFIC_VECTORDIFFTHRES, inter prediction may be applied in multi-prediction. Alternatively, when a difference between a motion vector of a current block and a motion vector of a surrounding block is equal to or greater than MULTIPREDSPECIFIC_VECTORDIFFTHRES, an indicator representing whether to use inter prediction in multi-prediction may be encoded/decoded.

As an example, whether intra block copy is used or available in multi-prediction may be determined by comparing a difference between a block vector of a current block and a block vector of a surrounding block with a threshold value. As an example, when a difference between a block vector of a current block and a block vector of a surrounding block is equal to or greater than MULTIPREDSPECIFIC_VECTORDIFFTHRES, intra block copying may be applied in multi-prediction. Alternatively, when a difference between a block vector of a current block and a block vector of a surrounding block is equal to or greater than MULTIPREDSPECIFIC_VECTORDIFFTHRES, an indicator representing whether to use intra block copy in multi-prediction may be encoded/decoded.

In the above-described example, MULTIPREDSPECIFIC_VECTORDIFFTHRES may be a positive integer equal to or greater than 0. MULTIPREDSPECIFIC_VECTORDIFFTHRES may be predefined in an encoding device and a decoding device. Alternatively, information representing MULTIPREDSPECIFIC_VECTORDIFFTHRES may be encoded and signaled. MULTIPREDSPECIFIC_VECTORDIFFTHRES may be set as a different value per prediction mode or may be set equally for a plurality of prediction modes.

As an example, whether inter prediction is used or available in multi-prediction may be determined by comparing motion vector resolution of a current block with a value. For example, when motion vector resolution of a current block is equal to or greater than MULTIPREDSPECIFIC_AMVRTHRES, inter prediction may be applied in multi-prediction. Alternatively, when motion vector resolution of a current block is equal to or greater than MULTIPREDSPECIFIC_AMVRTHRES, an indicator representing whether to use inter prediction in multi-prediction may be encoded/decoded.

For example, when motion vector resolution of a current block is less than or equal to MULTIPREDSPECIFIC_AMVRTHRES, inter prediction may be applied in multi-prediction. Alternatively, when motion vector resolution of a current block is less than or equal to MULTIPREDSPECIFIC_AMVRTHRES, an indicator representing whether to use inter prediction in multi-prediction may be encoded/decoded.

As an example, whether intra prediction is used or available in multi-prediction may be determined by comparing a difference between a directional intra prediction mode of a current block and a directional intra prediction mode of a surrounding block with a threshold value. As an example, when a difference between a directional intra prediction mode of a current block and a directional intra prediction mode of a surrounding block is equal to or greater than MULTIPREDSPECIFIC_INTRAMODETHRES, intra prediction may be applied in multi-prediction. Alternatively, when a difference between a directional intra prediction mode of a current block and a directional intra prediction mode of a surrounding block is equal to or greater than MULTIPREDSPECIFIC_INTRAMODETHRES, an indicator representing whether to use intra prediction in multi-prediction may be encoded/decoded.

As an example, when a difference between a directional intra prediction mode of a current block and a directional intra prediction mode of a surrounding block is less than or equal to MULTIPREDSPECIFIC_INTRAMODETHRES, intra prediction may be applied in multi-prediction. Alternatively, when a difference between a directional intra prediction mode of a current block and a directional intra prediction mode of a surrounding block is less than or equal to MULTIPREDSPECIFIC_INTRAMODETHRES, an indicator representing whether to use intra prediction in multi-prediction may be encoded/decoded.

In the above-described example, MULTIPREDSPECIFIC_INTRAMODETHRES may be an integer equal to or greater than 0. The MULTIPREDSPECIFIC_INTRAMODETHRES may be predefined in an encoding device and a decoding device. Alternatively, information representing MULTIPREDSPECIFIC_INTRAMODETHRES may be encoded and signaled. Alternatively, MULTIPREDSPECIFIC_INTRAMODETHRES may be adaptively determined according to a directional intra prediction mode of a current block (or a sub-block).

An indicator representing whether a prediction mode is used or available in multi-prediction may be encoded and signaled.

As an example, when a prediction mode of a current block is not a specific prediction mode, a specific prediction mode may be available in multi-prediction. Here, a specific prediction mode may be inter prediction, intra prediction or intra block copy. As an example, when a first prediction block for a current block is generated in a prediction mode different from inter prediction, a second prediction block may be generated based on inter prediction. To this end, when a prediction mode of a current block is not inter prediction, an indicator representing whether inter prediction is applied in multi-prediction or whether inter prediction is available in multi-prediction may be encoded and signaled. Alternatively, when a prediction mode of a current block is not inter prediction, inter prediction may be set by default to be available in multi-prediction.

As an example, when a CIIP is not applied to a current block, a CIIP may be available in multi-prediction. As an example, when a first prediction block for a current block is generated without using a CIIP, a second prediction block may be generated based on a CIIP. To this end, when a CIIP is not applied to a current block, an indicator representing whether a CIIP is applied in multi-prediction or whether a CIIP is available in multi-prediction may be encoded and signaled. Alternatively, when a CIIP is not applied to a current block, a CIIP may be set to be available in multi-prediction by default.

As an example, when a PDPC is not applied to a current block, a PDPC may be available in multi-prediction. As an example, when a first prediction block for a current block is generated without using a PDPC, a second prediction block may be generated based on a PDPC. To this end, when a PDPC is not applied to a current block, an indicator representing whether a PDPC is applied in multi-prediction or whether a PDPC is available in multi-prediction may be encoded and signaled. Alternatively, when a PDPC is not applied to a current block, a PDPC may be set to be available by default in multi-prediction.

As an example, when a geometric partition mode is not applied to a current block, a geometric partition mode may be available in multi-prediction. As an example, when a first prediction block for a current block is generated without using a geometric partition mode, a second prediction block may be generated based on a geometric partition mode. To this end, when a geometric partition mode is not applied to a current block, an indicator representing whether a geometric partition mode is applied in multi-prediction or whether a geometric partition mode is available in multi-prediction may be encoded and signaled. Alternatively, when a geometric partition mode is not applied to a current block, a geometric partition mode may be set to be available in multi-prediction by default.

As an example, when a geometric partition mode is applied to a current block, but it is not a geometric partition mode based on intra prediction, a geometric partition mode based on intra prediction may be available in multi-prediction. As an example, when a first prediction block for a current block is generated by another geometric partition mode other than a geometric partition mode based on intra prediction, a second prediction block may be generated based on a geometric partition mode based on intra prediction. To this end, when a geometric partition mode based on intra prediction is not applied to a current block, an indicator representing whether a geometric partition mode based on intra prediction is applied in multi-prediction or whether a geometric partition mode based on intra prediction is available in multi-prediction may be encoded and signaled. Alternatively, when a geometric partition mode based on intra prediction is not applied to a current block, a geometric partition mode based on intra prediction may be set to be available in multi-prediction by default.

As an example, when a local search mode is not applied to a current block, a local search mode may be available in multi-prediction. As an example, when a first prediction block for a current block is generated without using a local search mode, a second prediction block may be generated based on a local search mode. To this end, when a local search mode is not applied to a current block, an indicator representing whether a local search mode is applied in multi-prediction or whether a local search mode is available in multi-prediction may be encoded and signaled. Alternatively, when a local search mode is not applied to a current block, a local search mode may be set to be available in multi-prediction by default.

A prediction mode used in at least one surrounding block of a current block may use multi-prediction. As an example, when a specific prediction mode is applied to a surrounding block of a current block, an indicator representing whether a local search mode is applied in multi-prediction or whether a local search mode is available in multi-prediction may be encoded and signaled. Alternatively, when a specific prediction mode is used for a surrounding block of a current block, a local search mode may be set to be available in multi-prediction by default. Alternatively, after listing prediction modes of a plurality of surrounding blocks of a current block, at least one prediction mode used in multi-prediction may be selected from a list.

Whether a specific prediction mode is used or available in multi-prediction may be determined by an inter prediction indicator of a current block. As an example, when an inter prediction indicator of a current block indicates unidirectional prediction, bidirectional prediction, 3-directional prediction or 4-directional prediction, an indicator representing whether a prediction method indicated by the inter prediction indicator is used in multi-prediction or whether a prediction method indicated by the inter prediction indicator is allowed may be encoded and signaled. Alternatively, a prediction method indicated by an inter prediction indicator of a current block may be set by default to be available in multi-prediction.

By referring to a prediction mode of a surrounding block adjacent to a current block, whether a specific prediction mode is used or available may be determined. For example, when at least one of surrounding blocks is not encoded/decoded by a specific prediction mode, the specific prediction mode may be used for multi-prediction of a current block. Alternatively, when at least one of surrounding blocks is not encoded/decoded by a specific prediction mode, an indicator representing whether the specific prediction mode is used in multi-prediction may be encoded/decoded.

When a directional intra prediction mode is applied to at least one of surrounding blocks referred to for deriving a coding parameter of a current block, the directional intra prediction mode may be used in multi-prediction. Alternatively, when a directional intra prediction mode is applied to at least one of surrounding blocks referred to for deriving a coding parameter of a current block, an indicator representing whether the directional intra prediction mode is used in multi-prediction may be encoded/decoded. Here, the surrounding block may be one of blocks shown in FIG. 25.

For each of a plurality of prediction modes, whether it is available for multi-prediction may be determined. Here, a plurality of prediction modes may include at least one of intra prediction, inter prediction or intra block copy. As an example, for each of a plurality of prediction modes, an indicator representing whether multi-prediction is available may be encoded and signaled.

In this case, when it is determined that all of a plurality of prediction modes are not available for multi-prediction, multi-prediction may not be applied to a current block. In other words, when it is determined that all of a plurality of prediction modes are not available for multi-prediction, an indicator representing whether to perform multi-prediction may have a false value.

According to whether to perform multi-prediction, whether to perform an intra loop filter may be determined. Alternatively, a coding parameter related to an intra loop filter may be determined based on at least one of whether multi-prediction is performed, whether a specific prediction mode is used when performing multi-prediction or whether a specific prediction mode is available when performing multi-prediction. Here, a coding parameter related to an intra-loop filter may include at least one of information on an intra-loop filter, information representing whether to apply an intra-loop filter, a coefficient of an intra-loop filter, the number of taps of an intra-loop filter, a shape/a form of an intra-loop filter, information representing whether to apply a deblocking filter, a coefficient of a deblocking filter, the number of taps of a deblocking filter, strength of a deblocking filter, a shape/a form of a deblocking filter, information representing whether to apply an adaptive sample offset, an adaptive sample offset value, an adaptive sample offset category, an adaptive sample offset type, information representing whether to apply an adaptive in-loop filter, a coefficient of an adaptive in-loop filter, the number of taps of an adaptive in-loop filter or a shape/a form of an adaptive in-loop filter.

Specifically, between a plurality of prediction blocks generated by performing multi-prediction, based on whether they correspond to a boundary for applying an intra-loop filter, a coding parameter related to an intra-loop filter may be determined. For example, an intra-loop filter for the inside of a current block may be applied to a boundary between a plurality of prediction blocks generated through multi-prediction.

Figure 26:
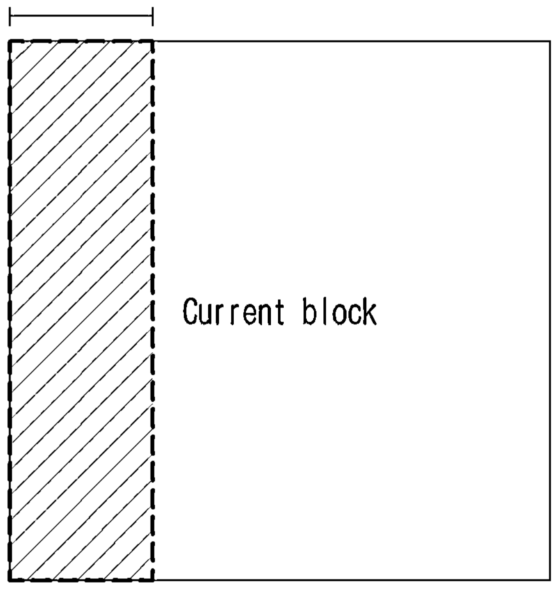
FIG. 26 is a diagram showing a boundary of a prediction block generated by multi-prediction.

FIG. 26 is a diagram showing a boundary of a prediction block generated by multi-prediction.

When multi-prediction is applied to sub-blocks bordering a left boundary of a current block, as in an example shown in FIG. 26, an intra-loop filer may be applied to a boundary between a region including sub-blocks bordering a left boundary of a current block (LINENUM_NEARBOUNDARY×H) and the remaining region excluding the sub-blocks (W-LINENUM_NEARBOUNDARY×H). Here, W and H represent a width and a height of a current block, respectively.

Alternatively, when multi-prediction is performed, at least one of a deblocking filter, an adaptive sample offset or an adaptive in-loop filter may not be performed.

For example, In performing multi-prediction, when a prediction block is generated through a specific prediction mode, at least one of a deblocking filter, an adaptive sample offset or an adaptive in-loop filter may not be performed. The specific prediction mode may be at least one of intra prediction, a predefined directional/nondirectional intra prediction mode, inter prediction or intra block copy.

Alternatively, the strength of an intra-loop filter may be adjusted according to whether multi-prediction is performed. For example, when a multi-prediction block method is performed, a weaker intra-loop filter may be used compared to a case in which a multi-prediction block method is not performed. Specifically, when a multi-prediction block method is performed, a deblocking filter of lower strength may be used compared to a case in which a multi-prediction block method is not performed.

Here, the strength of an intra-loop filter represents whether a difference between images before and after filtering is large. As an example, a weak intra-loop filter may have a smaller image difference before and after filtering compared to a strong intra-loop filter.

FIGS. 27 and 28 illustrate conditions under which the strength of a deblocking filter is determined.

In a shown example, whether each condition is satisfied is determined in descending order of a priority. When a high-priority condition is satisfied, the strength of a deblocking filter may be determined as a value that matches a corresponding condition.

However, a priority of conditions shown in FIGS. 27 and 28 is just an example of the present disclosure, and is not intended to limit the content of the present disclosure. In particular, in FIGS. 27 and 28, it was illustrated that whether multi-prediction was performed for a current block has the highest priority, but whether multi-prediction was performed for a current block may be arranged at a lower priority than illustrated.

When multi-prediction is performed for a current block, an intra-loop filter may be applied in a unit of a sub-block. As an example, an intra-loop filter may be applied to sub-blocks in a size of ILF_W and TLF_H. ILF_W and ILF_H represent a width and a height of a sub-block, respectively, and may be 4, 8 or a positive integer greater than 8. ILF_W and ILF_H may be predefined in an encoding device and a decoding device. Alternatively, information representing ILF_W and ILF_H may be encoded and signaled. ILF_W and ILF_H may have the same value or a different value. Alternatively, ILF_W and ILF_H may be adaptively determined based on a size/a shape of a current block.

When multi-prediction is applied, a final prediction sample for a prediction target position within a current block may be derived from a prediction sample for a prediction target position within a prediction block. In this case, when a plurality of prediction samples exist at a prediction target position, a final prediction sample may be derived by performing a weighted sum for a plurality of prediction samples.

Alternatively, when multi-prediction is applied, a final prediction sample may be derived from one prediction block in a first region within a current block, while a final prediction sample may be derived based on a weighted sum of a plurality of prediction blocks in a second region within a current block.

In this case, a method for deriving a final prediction sample for each position in a current block may be predefined. As an example, a decoder may determine whether to derive a final prediction sample from one prediction block or whether to derive a final prediction sample from a plurality of prediction blocks for each position in a current block in the same manner as an encoder.

As an example, as in an example shown in FIG. 26, LINENUM_NEARBOUNDARY lines may be set as a first region from a specific boundary of a current block. Here, a specific boundary may be one of the left, bottom, left or right of a current block.

LINENUM_NEARBOUNDARY may be 1, 2, 4, 8 or an integer greater than 8. LINENUM_NEARBOUNDARY may be a value predefined in an encoding device and a decoding device. Alternatively, information for determining LINENUM_NEARBOUNDARY may be encoded and signaled. Alternatively, LINENUM_NEARBOUNDARY may be adaptively determined according to a size/a shape of a current block.

As an example, as in an example shown in FIG. 26, LINENUM_NEARBOUNDARY lines may be set as a first region from a left boundary of a current block. A final prediction value of a sample belonging to a first region may be obtained by blending a plurality of prediction samples.

A final prediction value of a sample belonging to a second region in a current block may be derived to be the same as a value of a prediction sample belonging to a specific prediction block. Here, a second region may be the remaining regions excluding a first region in a current block.

In other words, for a first region in a current block, a final prediction sample may be obtained by performing a weighted sum for a first prediction block and a second prediction block, while for a second region in a current block, a final prediction sample may be derived from a first prediction block.

Unlike a shown example, LINENUM_NEARBOUNDARY_ABOVE lines from a top boundary of a current block and LINENUM_NEARBOUNDARY_LEFT lines from a left boundary of a current block may be set as a first region. Alternatively, a region commonly belonging to LINENUM_NEARBOUNDARY_ABOV lines from a top boundary of a current block and LINENUM_NEARBOUNDARY_LEFT lines from a left boundary of a current block may be set as a first region.

A method for deriving a final prediction sample may be determined per sub-block. Here, a method for deriving a final prediction sample may be blending a plurality of prediction blocks or applying one prediction block. A method for deriving a final prediction sample for each sub-block may be set equally or differently.

A method for deriving a final prediction sample for a sub-block may be determined based on at least one of information on an external surrounding block adjacent to a sub-block or a coding parameter. Here, an external surrounding block represents a block adjacent to a current block including a sub-block.

At a specific boundary of a sub-block, blending based on two or more prediction blocks may be performed to obtain a final prediction sample. Here, a specific boundary of a sub-block may be one of a top boundary, bottom boundary, left boundary or right boundary of a sub-block.

Specifically, prediction samples belonging to a LINENUM_NEARBOUNDARY line from a specific boundary within a sub-block may be obtained through blending of a first prediction block and a second prediction block.

When a plurality of prediction blocks are generated, a final prediction sample may be obtained by performing a weighted sum for a plurality of prediction samples in a boundary region between prediction blocks. Alternatively, correction for a prediction sample may be performed in a boundary region between prediction blocks.

Figure 29:
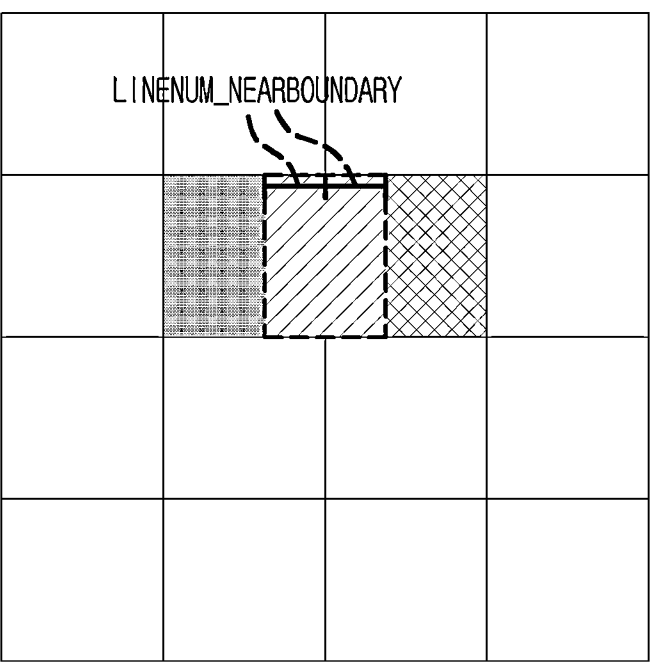
FIG. 29 shows an example in which a final prediction sample is derived from a boundary region between prediction blocks.

FIG. 29 shows an example in which a final prediction sample is derived from a boundary region between prediction blocks.

In a shown example, it was illustrated that a current block is partitioned into 16 sub-blocks. In this case, it is assumed that a first prediction block corresponds to a first sub-block among 16 sub-blocks and a second prediction block corresponds to a second sub-block on the right of the first sub-block.

In a shown example, it was illustrated that a boundary region between a first prediction block and a second prediction block is configured with LINENUM_NEARBOUNDARY lines. In this case, a prediction value for at least one of samples in a LINENUM_NEARBOUNDARY line may be determined based on at least one of a prediction sample belonging to a first prediction block and a prediction sample belonging to a second prediction block.

As an example, in an overlapping region or a boundary region between a first prediction block and a second prediction block, a final prediction sample may be obtained by a weighted sum operation between prediction samples belonging to a first prediction block and prediction samples belonging to a second prediction block.

Alternatively, a value of samples belonging to a boundary region between prediction blocks (specifically, a LINENUM_NEARBOUNDARY line) may be corrected. As an example, for prediction samples in a first prediction block and prediction samples in a second prediction block adjacent to a boundary between a first prediction block and a second prediction block (specifically, prediction samples belonging to LINENUM_NEARBOUNDARY), a filter may be applied.

Specifically, a value of a prediction sample belonging to a LINENUM_NEARBOUNDARY line in a first prediction block may be corrected based on a value of at least one of prediction samples belonging to a LINENUM_NEARBOUNDARY line in a second prediction block.

As such, a value of a prediction sample belonging to a LINENUM_NEARBOUNDARY line in a second prediction block may be corrected based on a value of at least one of prediction samples belonging to a LINENUM_NEARBOUNDARY line in a first prediction block.

In a shown example, it was illustrated that a first prediction block and a second prediction block are adjacent left and right, but even when a first prediction block and a second prediction block are adjacent above and below, a value of prediction samples in a boundary region may be derived in the same way.

For a first prediction block and a second prediction block for a current block, according to whether a specific condition is satisfied, in deriving a sample value belonging to a boundary region or an overlapping region between a first prediction block and a second prediction block, whether to use an adjacent prediction block may be determined.

Here, a specific condition may be related to a prediction mode. As an example, when inter prediction is applied to a current block and a first prediction block and a second prediction block are generated, a value of a prediction sample belonging to a LINENUM_NEARBOUNDARY line in a first prediction block may be determined based on a value of at least one of prediction samples belonging to a LINENUM_NEARBOUNDARY line in a second prediction block.

Alternatively, a specific conditions may include at least one of motion information of a current block, an intra prediction mode of a current block, a coding parameter of a current block, a size of a current block, a prediction mode used to derive a first prediction block and/or a second prediction block, motion information used to derive a first prediction block and/or a second prediction block, an intra prediction mode used to derive a first prediction block and/or a second prediction block or a size of a first prediction block and/or a second prediction block.

Based on whether multi-prediction is performed for a current block, whether Enhanced Multiple Transform is performed for a current block may be determined. Here, enhanced multiple transform means that one of Discrete Cosine Transform (DCT)-based transforms and Discrete Sine Transform (DST)-based transforms is selectively applied to each of vertical and horizontal transform. When enhanced multiple transform is not applied, a transform type of each vertical and horizontal transform may be determined as a default type. Here, a default type may be DCT2.

As an example, when a multi-prediction method is performed for a current block, enhanced multiple transform may be applied to a current block. When enhanced multiple transform is applied, information for determining transform types for a vertical and horizontal direction of a current block may be encoded and signaled. The information may be an index indicating one of a plurality of transform type set candidates. A transform type set candidate may be configured with a pair of a transform type candidate for a horizontal direction and a transform type candidate for a vertical direction.

Multi-prediction may be performed for at least one of color components of a current block. Here, a color component may include at least one of a luma component and a chroma component and a chroma component may include a Cb component and a Cr component.

A color component to which multi-prediction is applied may be predefined in an encoding device and a decoding device. As an example, multiple prediction may be applied only to a luma component. In other words, multiple prediction may not be performed for a chroma component.

Alternatively, for at least one of a plurality of color components, an indicator representing whether multiple prediction is performed may be encoded and signaled or an indicator representing a color component to which multiple prediction is applied may be encoded and signaled.

As an example, when it is determined that multiple prediction is performed for a current block, multiple prediction may be performed by default for a luma component. On the other hand, whether to perform multiple prediction for a chroma component may be determined by an indicator.

Alternatively, based on an indicator encoded and signaled for each of color components, whether multiple prediction is performed for each of color components may be determined.

Alternatively, whether multiple prediction is performed for each of color components or each of chroma components may be determined by one integrated indicator.

Alternatively, a color component that multiple prediction is performed may be determined according to a predefined condition. Here, a predefined condition may be for at least one of a coding parameter or block information. For example, a predefined condition may be for at least one of a size of a current block, a size of a block vector, a size of a motion vector, a direction of inter prediction, surrounding block information, an index of Bi-predictive with CU Weights (BCW), an index of Adaptive Motion Vector Resolution (AMVR), an indicator of Local Illumination Compensation (LIC), an indicator of Combined Inter-Intra Prediction (CIIP), an indicator and/or whether to perform Position Dependent Prediction Combination (PDPC), an indicator of a Geometric Partitioning Mode (GPM) and/or whether to use intra prediction in a GPM, an indicator of an affine mode or a directional intra prediction mode, but it is not limited thereto.

A predefined condition for each color component may be the same or different.

Based on the above description, each step in FIGS. 22 and 23 will be described in detail.

Step of Generating a Plurality of Prediction Blocks (S2210, S2320)

When multi-prediction is applied, a plurality of prediction blocks may be obtained. In this case, each of a plurality of prediction blocks may be generated by at least one of inter prediction, intra prediction or intra block copy.

At least one of a prediction mode or a coding parameter used to derive prediction blocks may be the same. As an example, one of inter prediction, intra prediction or intra block copy may be used to derive a plurality of prediction blocks.

Alternatively, at least one of a prediction mode or a coding parameter used to derive each of a plurality of prediction blocks may be different. As an example, a first prediction block may be derived by inter prediction, while a second prediction block may be derived by intra prediction.

TOTAL_NUM, the number of prediction blocks generated by multi-prediction, may be 1, 2, 3 or an integer greater than 3. TOTAL_NUM may be predefined in an encoder and a decoder. Alternatively, information indicating TOTAL_NUM may be encoded and signaled.

Alternatively, TOTAL_NUM may be adaptively determined based on at least one of a size of a current block, a shape of a current block or the number of prediction modes available for a current block.

In addition, the number of prediction blocks generated by intra prediction among prediction blocks generated by performing multi-prediction may be defined as INTRA_NUM, the number of prediction blocks generated by inter prediction may be defined as INTER_NUM and the number of prediction blocks generated by intra block copy may be defined as IBC_NUM. In this case, each of INTRA_NUM, INTER_NUM and IBC_NUM may be 0, 1, 2 or an integer greater than 2. In addition, INTRA_NUM, INTER_NUM and IBC_NUM may be predefined in an encoding device and a decoding device. Alternatively, according to a prediction mode used to derive a first prediction block, at least one of INTRA_NUM, INTER_NUM and IBC_NUM may be adaptively determined.

In order to generate a plurality of prediction blocks, a plurality of prediction information is required. Here, prediction information may include at least one of an intra prediction mode, motion information or a block vector according to a prediction mode.

As an example, when each of a plurality of prediction blocks is obtained based on a different prediction mode, each prediction information may be derived independently. As an example, when a first prediction block is obtained through intra prediction and a second prediction block is obtained through inter prediction, deriving an intra prediction mode for a current block may be independent of deriving motion information for a current block.

As an example, when a plurality of prediction blocks are obtained in the same prediction mode, a plurality of prediction information may be derived in the same method. As an example, when each of a first prediction block and a second prediction block is generated through intra prediction, a first intra prediction mode for a first prediction block and a second intra prediction mode for a second prediction block may be derived by using a MPM list or may be derived based on template matching, respectively. Alternatively, when each of a first prediction block and a second prediction block is generated through inter prediction, first motion information for a first prediction block and motion information for a second prediction block may be derived from a merge candidate list or a MVP list or may be derived through template matching or pairwise prediction.

Alternatively, when a plurality of prediction blocks are obtained in the same prediction mode, a plurality of prediction information may be derived in a different method. As an example, when each of a first prediction block and a second prediction block is generated through intra prediction, a first intra prediction mode for a first prediction block may be derived by using a MPM list, while a second intra prediction mode for a second prediction block may be derived based on template matching. Alternatively, when each of a first prediction block and a second prediction block is generated through inter prediction, first motion information for a first prediction block may be derived from a merge candidate list, while second motion information may be derived through a MVP list, template matching or pairwise prediction.

Alternatively, after first deriving first prediction blocks among a plurality of prediction blocks, second prediction information for obtaining a second prediction block may be derived by comparing prediction information used to derive a first prediction block with prediction information of a surrounding block.

Hereinafter, acquisition of prediction information and acquisition of a prediction block will be described in detail.

When at least one of a prediction mode, motion information, an intra prediction mode or a coding parameter is determined at a block level, at least one prediction block may be derived based on information determined at a block level. In other words, at least one of a prediction mode, motion information, an intra prediction mode or a coding parameter of a current block may be set to be the same as that used to derive at least one of a plurality of prediction blocks.

As an example, at least one of a prediction mode, motion information, an intra prediction mode or a coding parameter of a current block may be set to be the same as that used to derive a first prediction block among a plurality of prediction blocks.

In this case, a first prediction block may have at least one of the same position or size as a current block. When there are a plurality of prediction blocks having at least one of the same position or size as a current block, one of them may be selected as a first prediction block.

As an example, when a prediction mode of a current block is inter prediction, a first prediction block may be generated by inter prediction.

As an example, when a prediction mode of a current block is intra prediction, a first prediction block may be generated by intra prediction.

For example, when a prediction mode of a current block is intra block copy, a first prediction block may be generated by intra block copy.

Prediction performed to generate a prediction block may be performed in a unit of a block such as a CU, a PU or a TU or may be performed in a unit of a sub-block. Alternatively, prediction may be performed in a unit of a sub-block group configured with a plurality of sub-blocks.

As an example, a first prediction block among a plurality of prediction blocks may be obtained by performing prediction for a current block. On the other hand, a second prediction block among a plurality of prediction blocks may be obtained by performing prediction for a sub-block.

When a width and a height of a sub-block are SUB_W and SUB_H, respectively, SUB_W and SUB_H may be 1, 2, 4, 8 or an integer greater than 8. A sub-block may be in a square shape with the same width and height or may be in a non-square shape with a different width and height.

In generating a prediction block, a surrounding block or a surrounding sample adjacent to a current block or a sub-block may be referred to. As an example, when attempting to obtain a prediction block by performing intra prediction, samples belonging to a surrounding block of a current block or surrounding samples of a sub-block may be set as reference samples.

Alternatively, a coding parameter of a current block or a sub-block may be derived from a surrounding block or a surrounding sample. Here, a coding parameter may include at least one of motion information, a motion vector, an intra prediction mode, a reference picture or a block vector, but it is not limited thereto.

Figure 30:
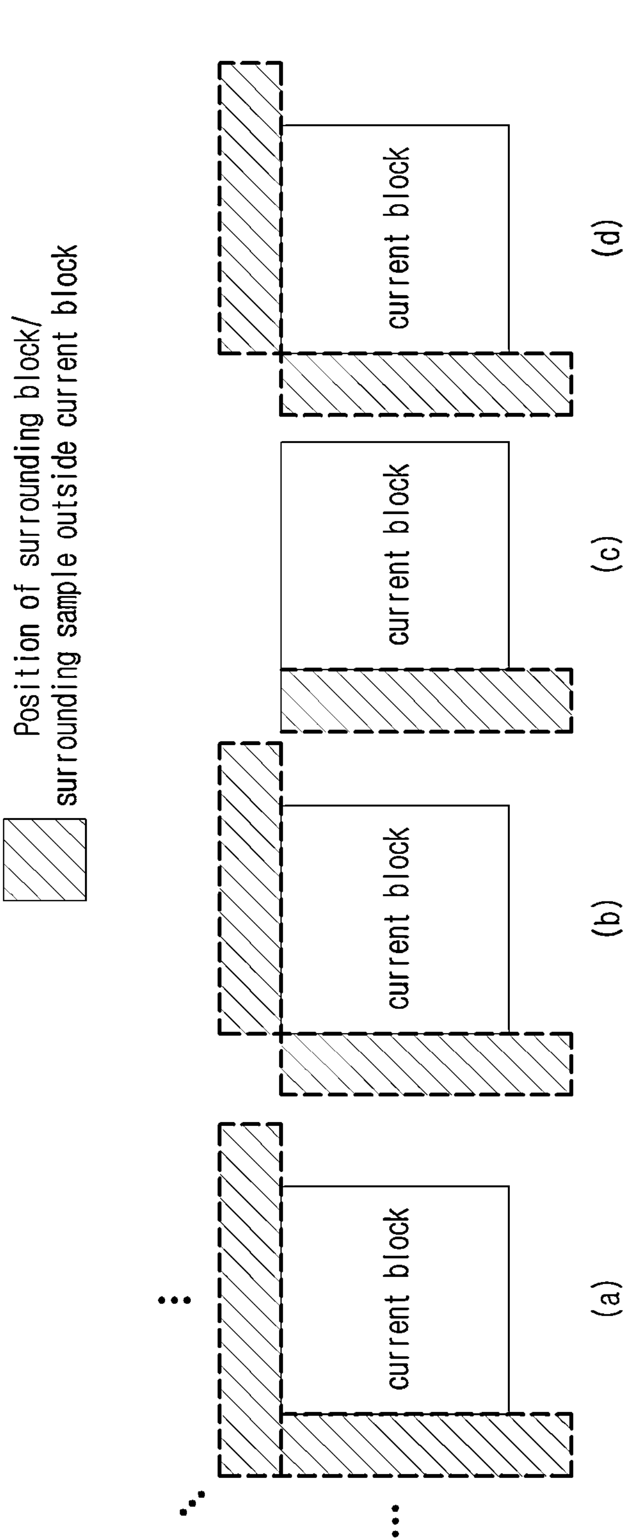
FIGS. 30 and 31 illustrate a position of a reference sample or a surrounding block referred to for generating a prediction block.
Figure 31:
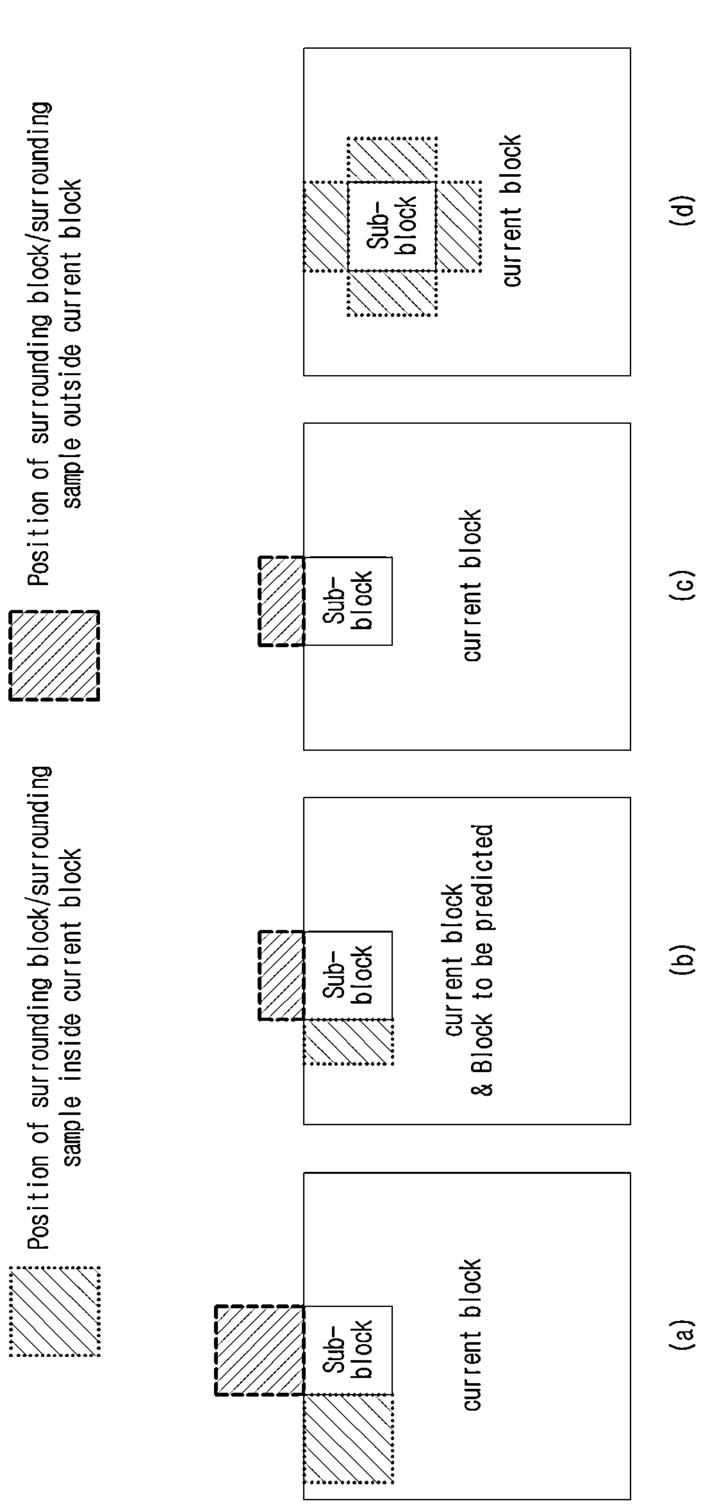

FIGS. 30 and 31 illustrate a position of a reference sample or a surrounding block referred to for generating a prediction block.

A surrounding block referred to for generating a prediction block of a current block or a sub-block may be a prediction block, a reconstructed block or a decoded block. In this case, as in an example shown in FIGS. 30(*a*) and (*b*), both a surrounding block adjacent to the top of a current block and a surrounding block adjacent to the left of a current block may be referred to.

In this case, as in an example shown in FIG. 30(*a*), a surrounding block adjacent to a top-left diagonal direction of a current block may be also set to be referenceable and as in an example shown in FIG. 30(*b*), a surrounding block adjacent to a top-left diagonal direction of a current block may be set to be non-referenceable.

Alternatively, as in an example shown in FIG. 30(*c*), only surrounding blocks adjacent to the left of a current block may be set to be referenceable or as in an example shown in FIG. 30(*d*), only surrounding blocks adjacent to the top of a current block may be set to be referenceable.

A surrounding block referred to for generating a prediction block of a current block or a sub-block may be a prediction sample, a reconstructed sample or a decoded sample. As an example, when prediction is performed in a unit of a sub-block, a prediction block for a sub-block may be obtained by referring to surrounding samples adjacent to the left, top, right or bottom of sub-blocks.

In FIGS. 31(*a*) and (*b*), it was illustrated that surrounding samples adjacent to the top and left of a sub-block may be referred to. In this case, according to a position of a sub-block, surrounding samples belonging to the same block as a sub-block (i.e., a current block) may be referred to.

Alternatively, surrounding samples belonging to the same block as a sub-block may be set to be non-referenceable. For example, when intra prediction is performed in a unit of a sub-block, only surrounding samples that do not belong to the same block as a sub-block may be used as a reference sample for intra prediction. Alternatively, HOG may be calculated or a template may be configured by referring only to surrounding samples that do not belong to the same block as a sub-block. Accordingly, in FIG. 31(*c*), it was shown that only surrounding samples adjacent to the top of a sub-block may be referred to.

Alternatively, a value of surrounding samples belonging to the same block as a sub-block may be replaced based on samples existing outside a current block. In other words, a value of surrounding reference samples belonging to the same block as a sub-block may be replaced with a value of samples existing outside a current block and prediction for a sub-block may be performed by referring to replaced samples.

Alternatively, as in FIG. 31(*d*), surrounding samples adjacent to the left, right, top and bottom of a sub-block may be set to be referenceable for generating a prediction block.

A region including surrounding blocks or surrounding samples may be referred to as a reference region.

Reference samples for performing intra prediction may be derived by using samples belonging to a reference region. Alternatively, HOG for deriving an intra prediction mode may be calculated based on samples belonging to a reference region or a template for deriving an intra prediction mode may be configured by using samples belonging to a reference region.

When all or at least part of a reference region belongs to a current block, samples included in a reference region overlapping with a current block may be set to be non-referenceable. In this case, intra prediction may be performed by replacing non-referenceable samples with samples around a current block.

Alternatively, a reference region overlapping with a current block may be configured by using a sample belonging to another available prediction block. In other words, a reference sample of a current block or a sample belonging to another prediction block available when configuring a template may be used.

Here, another available prediction block is a prediction block that includes at least part of a reference region overlapping with a current block, and it may be generated before performing prediction (e.g., intra prediction) referring to a reference region.

As an example, when at least part of a reference region referred to for performing intra prediction belongs to a current block, a value of samples in a reference region overlapping with a current block may be set as a value of a prediction sample in other prediction block generated before performing the intra prediction or a reconstructed sample derived based on the prediction sample. Accordingly, the intra prediction may be performed by referring to a prediction sample in other prediction block or a reconstructed sample derived based on the prediction sample.

When at least part of a reference region belongs to a current block and there are a plurality of prediction blocks including a reference region overlapping with a current block, one of a plurality of prediction blocks may be selected according to a predefined rule or method. Afterwards, based on a selected prediction block, a reference region overlapping with a current block may be configured.

Alternatively, when there are a plurality of prediction blocks including a reference region overlapping with a current block, a reference region may be configured based on a plurality of prediction blocks. As an example, a value of a sample in a reference region overlapping with a current block may be obtained by a weighted sum operation of a plurality of prediction blocks.

When at least part of a reference region belongs to a current block, an intra prediction mode may be derived by applying a first weight to a reference region overlapping with a current block among reference regions and applying a second weight to a reference region that does not overlap with a current block.

As an example, when attempting to perform intra prediction for a sub-block, HOG or a template matching cost calculated for a reference region overlapping with a current block may be multiplied by weight W_INSIDE.

On the other hand, HOG or a template matching cost calculated for a reference region that does not overlap with a current block may be multiplied by weight W_OUTSIDE.

W_INSIDE may have a value greater than 1 and W_OUTSIDE may have a value greater than 1 or smaller than 1. W_INSIDE and W_OUTSIDE may be predefined in an encoding device and a decoding device. Alternatively, information representing W_INSIDE and W_OUTSIDE may be encoded and signaled. Alternatively, W_INSIDE and W_OUTSIDE may be adaptively determined according to a size/a shape of a current block, a size/a shape of a sub-block or a position of a sub-block in a current block.

When HOG is calculated based on surrounding samples, at least one directional mode may be derived from HOG. Specifically, in HOG, directional modes corresponding to HOGMODE_NUM bins may be selected in descending order of amplitude (or size) values.

In this case, HOGMODE_NUM may be 0, 1, 2 or an integer greater than 2. HOGMODE_NUM may be predefined in an encoding device and a decoding device.

As an example, one directional mode with the largest amplitude value may be selected from HOG and intra prediction for a current block or a sub-block may be performed by using a selected directional mode.

Alternatively, two directional modes with the largest amplitude value may be selected from HOG and intra prediction for a current block or a sub-block may be performed based on each of two directional modes.

As another example, intra prediction for a current block or a sub-block may be performed by using an intra prediction mode of a surrounding block.

As an example, an intra prediction mode list may be configured based on an intra prediction mode of a surrounding block. The intra prediction mode list may be referred to as a Most Probable Mode (MPM) list. An intra prediction mode corresponding to a predefined index may be selected among a plurality of intra prediction mode candidates included in an intra prediction mode list. Here, a predefined index may be 0, 1, 2 or an integer greater than 2.

Intra prediction for a current block or a sub-block may be performed based on an intra prediction mode selected by the index.

When there are a plurality of predefined indexes, a plurality of intra prediction modes may be selected from an intra prediction mode list. In this case, intra prediction for a current block or a sub-block may be performed based on each of a plurality of intra prediction modes.

Here, the number of indexes may be 0, 1, 2 or an integer greater than 2.

Alternatively, an index indicating one of intra prediction mode candidates included in an intra prediction mode list may be explicitly encoded and signaled. In this case, a plurality of indexes may be encoded and signaled. When a plurality of intra prediction modes are selected based on a plurality of indexes, intra prediction for a current block or a sub-block may be performed based on each of a plurality of intra prediction modes.

HOG may be also used when configuring an intra prediction mode list. Specifically, at least one directional mode may be selected from HOG in descending order of amplitudes and at least one selected directional mode may be inserted as an intra prediction mode candidate in an intra prediction mode list.

When intra prediction is performed in a unit of a sub-block, an intra prediction mode of a sub-block may be derived by using an intra prediction mode list for a sub-block.

In this case, an intra prediction mode for a sub-block may be derived by referring to an intra prediction mode of a surrounding block outside a current block.

Alternatively, when a surrounding block adjacent to a sub-block belongs to a current block, an intra prediction mode of a sub-block may be derived by referring to an intra prediction mode of the surrounding block.

Alternatively, an intra prediction mode of a sub-block may be derived by referring to an intra prediction modes of each of a surrounding block adjacent to a sub-block and a surrounding block adjacent to a current block.

An intra prediction mode may be derived based on a template for a current block or a sub-block. Here, a current template for a current block or a sub-block may include at least one of a region adjacent to the top, a region adjacent to the left, a region adjacent to the top-left, a region adjacent to the bottom-left or a region adjacent to the bottom-right of a current block or a sub-block.

As an example, a current template for deriving an intra prediction mode may be configured as in an example shown in FIG. 19.

Alternatively, unlike an example shown in FIG. 19, a current template may be configured with samples that are not adjacent to ae current block or a sub-block.

A list configured with a plurality of intra prediction modes may be configured. In this case, TMMODE_LISTNUM, the number of intra prediction modes included in a list, may be predefined in an encoding device and a decoding device. As an example, TMMODE_LISTNUM may be set to 3, 6, 7, 22, 67, 125 or another positive integer.

The list may include an intra prediction mode of a surrounding block, at least one intra prediction mode selected from HOG, at least one intra prediction mode selected from a preference list or at least one intra prediction mode selected from an intra prediction mode list of a current block or a sub-block.

In this case, HOGMODE_NUM, the number of intra prediction modes selected from HOG, may be 0, 1, 2 or a positive integer greater than 2.

A preference list may be configured with PREDEF_INTRALIST_NUM intra prediction modes with the highest selection frequency. TMMODE_FROMDEFAULTNUM, the number of intra prediction modes selected from the preference list, may be predefined in an encoding device and a decoding device.

Each of intra prediction modes included in a list is applied to a current template and a matching cost is calculated based on a result of performing intra prediction. A matching cost may be obtained by comparing prediction samples obtained by applying an intra prediction mode in a current template with reconstructed samples in a current template. As an example, a matching cost may be calculated based on one of Sum of Absolute Differences (SAD), Sum of Absolute Transformed Differences (SATD) or Mean-Removed Sum of Absolute Differences (MR-SAD) between prediction samples and reconstructed samples. However, a type of a comparison operation for calculating a matching cost is not limited to listed examples.

When a matching cost for each of intra prediction modes included in a list is calculated, an intra prediction mode with the lowest matching cost is selected as an intra prediction mode of a current block or a sub-block.

Alternatively, when a matching cost for each of intra prediction modes included in a list is calculated, a matching cost may be additionally calculated for at least one intra prediction mode whose absolute value of an index difference from BESTMODE, an intra prediction mode with the lowest matching cost, is less than or equal to TMMODE_OFFSET, a threshold value. As an example, a matching cost may be additionally calculated for intra prediction modes whose difference from BESTMODE is +1 to +TMMODE_OFFSET and intra prediction modes whose difference from BESTMODE is −1 to −TMMODE_OFFSET. Here, TMMODE_OFFSET may be 0, 1 or a positive integer greater than 1. TMMODE_OFFSET may be predefined in an encoding device and a decoding device.

Afterwards, an intra prediction mode with the lowest cost is selected as an intra prediction mode of a current block or a sub-block by comparing a matching cost of at least one intra prediction mode whose absolute value of an index different between BESTMODE and BESTMODE is less than or equal to TMMODE_OFFSET.

Alternatively, when a matching cost for each of intra prediction modes included in a list is calculated, a matching cost may be calculated for not only intra prediction modes whose index difference from BESTMODE, an intra prediction mode with the lowest matching cost, is less than or equal to an offset, but also intra prediction modes whose index difference from SECONDMODE, an intra prediction mode with the second lowest matching cost, is less than or equal to an offset. In this case, TMMODE_OFFSET, an offset for BESTMODE, and TMMODE_SECOND_OFFSET, an offset for SECONDMODE, may have the same value. Alternatively, TMMODE_OFFSET, an offset for BESTMODE, and TMMODE_SECOND_OFFSET, an offset for SECOND MODE, may have a different value. In this case, TMMODE_SECOND_OFFSET may be 0, 1 or a positive integer greater than 1.

Afterwards, an intra prediction mode with the lowest cost is selected as an intra prediction mode of a current block or a sub-block by comparing a matching cost of at least one intra prediction mode whose absolute value of an index difference between BESTMODE and BESTMODE is less than or equal to TMMODE_OFFSET with a matching cost of at least one intra prediction mode whose absolute value of an index difference between SECONDMODE and SECONDMODE is less than or equal to TMMODE_SECOND_OFFSET.

Alternatively, BESTMODE_AFTER, an intra prediction mode with the lowest cost, may be selected by comparing a matching cost of at least one intra prediction mode whose absolute value of an index difference between BESTMODE and BESTMODE is less than or equal to TMMODE_OFFSET, and SECONDMODE_AFTER, an intra prediction mode with the lowest cost, may be selected by comparing a matching cost of at least one intra prediction mode whose absolute value of an index difference between SECONDMODE and SECONDMODE is less than or equal to TMMODE_SECOND_OFFSET. Afterwards, the one with the lower matching cost may be set as an intra prediction mode of a current block or a sub-block by comparing a matching cost of two intra prediction modes, BESTMODE_AFTER and SECONDMODEAFTER.

Alternatively, a plurality of intra prediction modes may be selected in ascending order of matching costs. When a plurality of intra prediction modes are selected for a current block or a sub-block, intra prediction for each of a plurality of intra prediction modes may be performed for a current block or a sub-block to obtain a plurality of prediction blocks.

Meanwhile, subsampling may be performed for a current template and a matching cost may be calculated based on samples at a subsampled position. Subsampling may be performed for at least one of a horizontal direction or a vertical direction as in an example shown in FIG. 20.

In performing multi-prediction, inter prediction or intra block copy may be applied to a current block. In this case, motion information of a current block may be derived by referring to motion information of at least one surrounding block adjacent to a current block.

Alternatively, after a current block is partitioned into a plurality of sub-blocks, inter prediction or intra block copy may be applied to each sub-block. In this case, motion information for a sub-block may be derived from a surrounding block. Here, motion information may include at least one of a motion vector, a reference picture, a block vector or an inter prediction direction indicator, but it is not limited thereto.

FIG. 32 illustrates a surrounding block referred to for deriving motion information of a sub-block.

In an example of FIG. 32, a thick line represents a current block. As in an example shown in FIG. 32(*a*), when a sub-block borders the top or left boundary of a current block, motion information of a sub-block may be derived from at least one of a surrounding sub-block adjacent to the top, a surrounding sub-block adjacent to the left, a surrounding sub-block adjacent to the top-left, a surrounding sub-block adjacent to the top-right or a surrounding sub-block adjacent to the bottom-left of a sub-block among sub-blocks positioned outside a current block.

As in an example shown in FIG. 32(*b*), for a sub-block that does not border the top or left boundary of a current block, motion information of a sub-block may be derived from at least one surrounding sub-block which is adjacent to a sub-block and belongs to the same block as the sub-block (i.e., a current block).

Alternatively, for a sub-block that does not border the top or left boundary of a current block, motion information may be derived from at least one surrounding sub-block which is positioned in an opposite direction of an arrow in FIG. 32(*b*) and is positioned outside a current block.

Alternatively, motion information of a sub-block may be derived by referring to motion information of a surrounding block which is positioned outside a current block and is closest to a sub-block.

Inter prediction may be performed by listing motion information of a plurality of surrounding blocks and selecting at least one motion information from the list.

Alternatively, a plurality of surrounding blocks may be searched sequentially until N motion information is searched. Here, N may be an integer equal to or greater than 1. Afterwards, inter prediction may be performed N times based on N motion information.

Alternatively, inter prediction may be performed based on motion information of each surrounding block.

When there are at least two different motion information for a current block, a current block may be partitioned into a plurality of sub-blocks and prediction may be performed in a unit of a sub-block. As an example, when motion information, e.g., a motion vector is set to be derived in a unit of a sub-block for a current block, a current block may be partitioned into a plurality of sub-blocks and prediction may be performed in a unit of a sub-block. Meanwhile, an inter prediction mode deriving motion information in a unit of a sub-block may include at least one of an affine mode, a spatial-temporal motion vector predictor (STMVP) or a multi-pass decoder-side motion vector refinement (MP-DMVR).

Alternatively, whether a sub-block-based inter prediction method is applied to a current block may be determined based on information encoded/decoded through a bitstream. For example, when the information indicates that a sub-block-based inter prediction method is applied to a current block, a current block may be partitioned into a plurality of sub-blocks and inter prediction may be performed in a unit of a sub-block.

Alternatively, when a current block satisfies a performance condition for bilateral matching, a current block may be partitioned into a plurality of sub-blocks and inter prediction may be performed in a unit of a sub-block.

Furthermore, when there are at least two different motion information for a current block, a current block may be partitioned into a plurality of sub-blocks and inter prediction may be performed multiple times in a unit of a sub-block. Afterwards, blending may be performed based on a plurality of prediction blocks for a sub-block.

Alternatively, whether to perform the blending may be determined based on information encoded/decoded through a bitstream. As an example, when information encoded/decoded through a bitstream indicates that a sub-block-based inter prediction method is applied to a current block, blending may be performed in a unit of a sub-block.

Alternatively, when a current block satisfies a performance condition for bilateral matching, blending may be performed in a unit of a sub-block.

A sub-block-based inter prediction method may include at least one of an affine mode, a mode of deriving a decoder motion vector, a bidirectional optical flow mode or a sub-block merge mode.

When at least one of Advanced Motion Vector Prediction (AMVP), a merge mode, an affine mode, a mode of deriving a decoder motion vector, an adaptive motion vector resolution mode, a Local Illumination Compensation or a bidirectional optical flow mode is applied to a current block, inter prediction may be performed in a unit of a sub-block.

Alternatively, when at least one of an Advanced Temporal Motion Vector Predictor (ATMVP) candidate and a Spatial-Temporal Motion Vector Predictor (STMVP) candidate is selected under a merge mode, inter prediction may be performed in a unit of a sub-block.

When motion information derived from a surrounding block includes bi-predictive motion information, only motion information for one direction of bi-predictive motion information of a surrounding block may be used for a current block or a sub-block. As an example, when a surrounding block includes bi-prediction motion information, one of a L0 direction and a L1 direction may be selected and motion information in a selected direction may be used for inter prediction of a current block or a sub-block.

When one of a L0 direction and a L1 direction is selected, a predefined rule may be followed in an encoding device and a decoding device. As an example, a L0 direction among bi-predictive motion information of a surrounding block may be always selected.

Alternatively, a direction with the lower (or higher) template matching cost may be selected by considering a template matching cost of each of a L0 direction and a L1 direction. Here, a template matching cost for a L0 direction may be obtained by a result of a comparison operation between a current template of a current block and a reference template of a L0 reference block specified by L0 motion information. In addition, a template matching cost for a L1 direction may be obtained by a result of a comparison operation between a current template of a current block and a reference template of a L1 reference block specified by L1 motion information.

Alternatively, one of a L0 direction and a L1 direction may be selected based on motion information of a first prediction block. As an example, when a first prediction block is obtained by inter prediction, one direction of bi-predictive motion information of a surrounding blocks may be selected according to whether a L0 direction or a L1 direction is derived to derive a first prediction block. As an example, the same direction as motion information used to derive a first prediction block may be selected. Alternatively, a direction different from motion information used to derive a first prediction block may be selected.

Alternatively, one of a L0 direction and a L1 direction may be selected based on a distance from a current picture for each of a L0 reference picture and a L1 reference picture. As an example, one of a L0 direction and a L1 direction may be selected by comparing an absolute value of a POC difference between a current picture and a L0 reference picture (hereinafter, referred to as a L0 POC difference) and an absolute value of a POC difference between a guswo picture and a L1 reference picture (hereinafter, referred to as a L1 POC difference). As an example, when a L0 POC difference is smaller than a L1 POC difference, a L0 direction may be selected and when a L1 POC difference is smaller than a L0 POC difference, a L1 direction may be selected.

Only at least one surrounding block encoded/decoded by referring to a reference picture used to derive a first prediction block may be set to be referenceable for a current block or a sub-block. In other words, motion information of a current block or a sub-block may be derived from a referenceable surrounding block.

Alternatively, a reference picture used to derive a first prediction block may be set as a reference picture for performing inter prediction. In other words, a plurality of inter prediction may be performed based on a single reference picture. In this case, when a reference picture used to derive a first prediction block is different from a reference picture of a surrounding block, a motion vector of a surrounding block may be scaled. The scaling may be performed based on a ratio of a POC difference between a current picture and a reference picture of a surrounding block and a POC difference between a current picture and a reference picture used to derive a first prediction block. Afterwards, inter prediction for a current block or a sub-block may be performed based on a scaled motion vector.

In performing inter prediction or intra block copy, the rest excluding a first prediction block among a plurality of prediction blocks may be set to be generated based on a specific inter prediction mode all the time. Here, a specific inter prediction mode may be at least one of a skip mode or a merge mode, but it is not limited thereto.

In performing inter prediction or intra block copy, at least one of a long-term reference picture, a reference picture which does not perform a deblocking filter, a reference picture which does not perform a sample adaptive offset, a reference picture which does not perform an adaptive loop filter, a reference picture which performs only a deblocking filter and a sample adaptive offset, a reference picture which performs only a deblocking filter and an adaptive loop filter or a reference picture which performs only a sample adaptive offset and an adaptive loop filter may be used.

In performing inter prediction or intra block copy, motion information of a current block or a sub-block may be derived by referring to surrounding blocks according to predetermined order which is predetermined in an encoding device and a decoding device.

FIGS. 33 and 34 illustrate the reference order of surrounding blocks.

As in an example shown in FIG. 33, based on a position of a sub-block, motion information of a sub-block may be derived by referring to surrounding blocks in the order of a top block, a left block, a bottom block and a right block.

Based on a position of a sub-block, the reference order of surrounding blocks may be adaptively determined.

As in an example shown in FIG. 34, for a sub-block that borders a top boundary in a current block, motion information of a sub-block may be derived by referring to surrounding blocks in the order of a surrounding top block, a surrounding top-left block and a surrounding top-right block adjacent to a corresponding sub-block.

For a sub-block that borders a left boundary of a current block, motion information of a sub-block may be derived by referring to surrounding blocks in the order of a surrounding left block, a surrounding top-left block and a surrounding bottom-left block adjacent to a corresponding sub-block.

For a sub-block that borders both a top boundary and a left boundary of a current block, motion information of a sub-block may be derived by referring to surrounding blocks in the order of a surrounding top block, a surrounding left block and a surrounding top-left block adjacent to a corresponding sub-block.

For a sub-block that borders both a top boundary and a right boundary of a current block, motion information of a sub-block may be derived by referring to surrounding blocks in the order of a surrounding top block, a surrounding top-left block and a surrounding top-right block adjacent to a corresponding sub-block.

For a sub-block that borders both a bottom boundary and a left boundary of a current block, motion information of a sub-block may be derived by referring to surrounding blocks in the order of a surrounding left block, a surrounding top-left block and a surrounding bottom-left block adjacent to a corresponding sub-block.

For a sub-block that does not border a boundary of a current block, motion information of a sub-block may be derived by referring to surrounding blocks in the order of a surrounding top block, a surrounding left block, a surrounding bottom block, a surrounding right block, a surrounding top-left block, a surrounding bottom-left block, a surrounding bottom-right block and a surrounding top-right block adjacent to a corresponding sub-block.

Motion information of a sub-block may be derived by referring to at least one block adjacent to a reference block. Here, a reference block may be indicated by a motion vector of a current block or a sub-block in a reference picture. A block adjacent to a reference block may be adjacent to a left boundary, a top boundary, a right boundary or a bottom boundary of a reference block.

In this case, motion information of a block adjacent to a bottom boundary or a right boundary of a reference block may have a lower priority than a surrounding block spatially adjacent to a sub-block. Alternatively, motion information of a block adjacent to a bottom boundary or a right boundary of a reference block may have a higher priority than a surrounding block spatially adjacent to a sub-block.

Only one of L0 direction and L1 direction motion information of a surrounding sub-block may be used for inter prediction of a current block or a sub-block.

As an example, when a surrounding sub-block is bidirectionally predicted, a size of a motion vector in each of a L0 direction and a L1 direction may be compared. As an example, when a motion vector in a L0 direction is greater than a motion vector in a L1 direction, inter prediction for a current block or a sub-block may be performed by using motion information in a L0 direction of a surrounding sub-block.

Alternatively, when a size of a motion vector in a specific direction, e.g., a sum of absolute values of a x component and a y component of a motion vector, is equal to or greater than a threshold value, motion information in a specific direction may be set to be available. In this case, threshold value J may be 0 or a positive integer greater than 0.

Based on at least one of a prediction direction or a motion vector of a sub-block that intends to perform inter prediction, motion information which will be used for prediction of a sub-block may be different.

As an example, a x-component and a y-component of a motion vector of a sub-block may be compared to select a surrounding sub-block which will be used for prediction of a sub-block. As an example, when an absolute value of a x component of a motion vector is greater than an absolute value of a y component, prediction for a sub-block may be performed by using motion information of at least one of a left sub-block or a right sub-block of a sub-block.

As an example, when an absolute value of a y component of a motion vector is greater than an absolute value of a x component, prediction for a sub-block may be performed by using motion information of at least one of a top sub-block or a bottom sub-block of a sub-block.

By comparing an absolute value of a x component or an absolute value of a y component of a motion vector of a current block or a sub-block with a threshold value, a surrounding block used to obtain a prediction block of a current block or a sub-block may be specified.

As an example, when an absolute value of a x component of a motion vector of a sub-block is equal to or greater than threshold value J, a second prediction block for a sub-block may be obtained by using motion information of at least one of a left block or a right block. Here, J may be 0 or a positive integer greater than 0.

As an example, when an absolute value of a y component of a motion vector of a sub-block is equal to or greater than threshold value J, a second prediction block for a sub-block may be obtained by using motion information of at least one of a top surrounding block or a bottom surrounding block. Here, J may be 0 or a positive integer greater than 0.

In performing prediction for a current block or a sub-block, at least one of a prediction mode, a coding parameter or motion information may be derived from at least one of a plurality of surrounding blocks adjacent to a current block or a sub-block. In this case, a prediction mode may include at least one of an inter prediction mode, an intra prediction mode or an intra block copy mode. In addition, the prediction mode may further include at least one of a directional mode, a merge mode, an affine mode, a sub-block merge mode, a local illumination compensation mode or a template matching mode.

A surrounding block with the same coding parameter as a coding parameter used to derive a first prediction block of a current block may not be referred to for generating a prediction block of a current block or a sub-block. In other words, only a surrounding block with a coding parameter different from a coding parameter used to predict a first prediction block of a current block may be referred to. For example, in performing inter prediction and/or intra block copy, based on motion information of a surrounding block having the same coding parameter as a coding parameter used for prediction of a first prediction block, a prediction block of a current block or a sub-block may not be generated. For example, in performing inter prediction and/or intra block copy for a sub-block, motion information of a surrounding block having the same coding parameter as a coding parameter used for prediction of a first prediction block may not be referred to for a sub-block. When there is at least one referenceable surrounding block, inter prediction and/or intra block copy may be performed for a sub-block at least once based on motion information or a block vector of each referenceable surrounding block.

In performing intra prediction for a current block or a sub-block, when at least one surrounding block adjacent to a current block or a sub-block is encoded by intra prediction, an intra prediction mode of a current block or a sub-block may be derived from at least one surrounding block.

Alternatively, in performing inter prediction for a current block or a sub-block, when at least one surrounding block adjacent to a current block or a sub-block is encoded by inter prediction, motion information for inter prediction of a current block or a sub-block may be derived from at least one surrounding block.

Meanwhile, when a local illumination compensation mode is applied to a surrounding block, a local illumination compensation parameter of a surrounding block may be used for local illumination compensation for a prediction block of a current block or a sub-block. In other words, local illumination compensation for a prediction block of a current block or a sub-block may be performed by using a local compensation parameter of a surrounding block used to derive a corresponding prediction block.

Alternatively, when local illumination compensation is applied to a first prediction block of a current block and local illumination compensation is also applied to a surrounding block used to derive a second prediction block, one of a local illumination compensation parameter applied to a first prediction block or a local illumination compensation parameter applied to a surrounding block may be selected for local illumination compensation of a second prediction block. Alternatively, a local illumination compensation parameter of a surrounding block among a local illumination compensation parameter of a first prediction block and a local illumination compensation parameter of a surrounding block may be always applied to a second prediction block. Meanwhile, when local illumination compensation is not applied to a surrounding block, a local illumination compensation parameter of a first prediction block may be applied to a second prediction block.

Alternatively, in performing intra block copy for a current block or a sub-block, when at least one surrounding block adjacent to a current block or a sub-block is encoded by intra block copy, a block vector for intra block copy of a current block or a sub-block may be derived from at least one surrounding block.

In deriving a coding parameter of a current block or a sub-block, a surrounding block having the same coding parameter as a coding parameter used to obtain a first prediction block of a current block may not be referred to. In other words, a coding parameter of a current block or a sub-block may be derived from a surrounding block having a coding parameter different from a coding parameter used to obtain a first prediction block.

Accordingly, at least one of coding parameters used to derive a first prediction block may be different from that used to derive a second prediction block. As an example, at least one of a size or a position of a first prediction block or a prediction mode, an intra prediction mode or motion information used to derive a first prediction block may be different from a second prediction block.

A reference block may be specified based on motion information of a current block. Specifically, a reference block may be specified based on a reference image index of a current block and a reference block in a reference picture may be specified based on a motion vector of a current block. In this case, a reference block specified by a motion vector may be set as a prediction block (a first prediction block) of a current block.

Meanwhile, according to the encoding/decoding order, for sub-blocks bordering a top boundary or a left boundary of a current block, there is a surrounding block which is positioned outside a current block and is pre-reconstructed. On the other hand, for sub-blocks bordering a right boundary or a bottom boundary of a current block, there are no surrounding blocks which are positioned outside a current block and are pre-reconstructed. To solve a problem that there is no referenceable surrounding block outside a current block, a reference block may be used.

Figure 35:
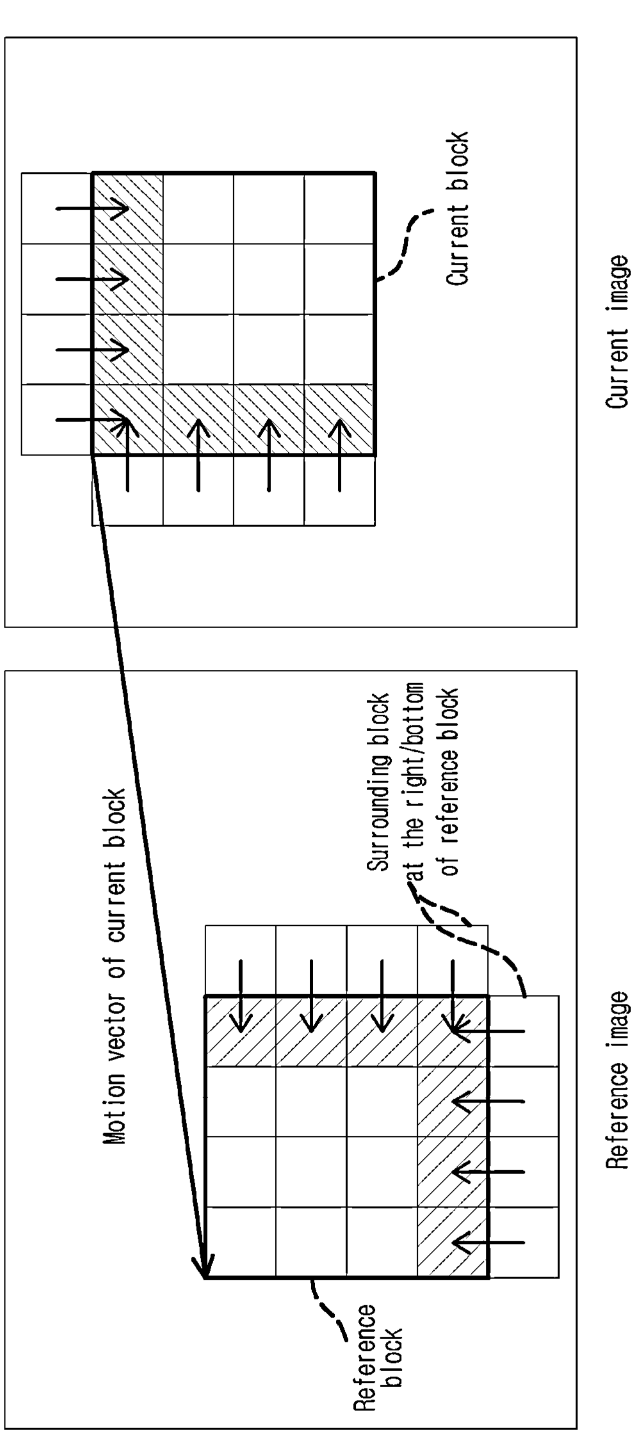
FIG. 35 is a diagram for describing an example of referring to motion information of a surrounding block of a reference block.

FIG. 35 is a diagram for describing an example of referring to motion information of a surrounding block of a reference block.

As in an example shown in FIG. 35, a sub-block adjacent to a top boundary or a left boundary of a current block may use movement information of a surrounding block which is positioned outside a current block and is adjacent to the top or left of a sub-block.

On the other hand, a sub-block adjacent to a bottom boundary or a right boundary of a current block may use movement information of a surrounding block which is positioned outside a reference block and is adjacent to the bottom or right at a position corresponding to a sub-block in a reference block.

Although not shown, motion information of a surrounding sub-block which belongs to a current block and is adjacent to a sub-block may be referred to or motion information of a surrounding sub-block that belongs to a reference block and is adjacent to a position corresponding to a sub-block in a reference block may be referred to.

To reduce computational complexity, a performance unit of prediction or weighted sum may be set as a sub-block group configured with at least one sub-block. There may be at least one sub-block group within a current block.

FIG. 36 illustrates a sub-block group within a current block.

The number of sub-blocks included in a sub-block group may or may not be uniform.

As an example, in FIG. 36(*a*), it was shown that there are three sub-block groups in a current block. In this case, it was illustrated that a first sub-block group is configured with one sub-block at a top-left position of a current block and a second sub-block group is configured with three sub-blocks adjacent to the top boundary of a current block. In addition, it was illustrated that a third sub-block group is configured with three sub-blocks adjacent to the left boundary of a current block.

In FIGS. 36(*b*) and (*c*), it was shown that there are two sub-block groups in a current block. In FIG. 36(*b*), it was shown that a first sub-block group is configured with four sub-blocks adjacent to the top boundary of a current block and a second sub-block group is configured with three sub-blocks adjacent to the left boundary of a current block. On the other hand, in FIG. 36(*c*), it was shown that a first sub-block group is configured with three sub-blocks adjacent to the top boundary of a current block and a second sub-block group is configured with four sub-blocks adjacent to the left boundary of a current block.

In FIG. 36(*d*), it was shown that one sub-block group is configured with all sub-blocks in a current block.

In FIG. 36(*e*), it was illustrated that a current block is partitioned into four sub-block groups in an uniform size.

In FIG. 36(*f*), it was shown that there are five sub-block groups in a current block. It was shown that among them, a first sub-block group to a third sub-block group are configured in the same way as shown in FIG. 36(*a*). It was shown that a fourth sub-block group is configured with sub-blocks that border the top boundary of a current block and sub-blocks that do not belong to a second sub-block group and a fifth sub-block group is configured with sub-blocks that border the left boundary of a current block and sub-blocks that do not belong to a third sub-block group.

As in a shown example, a width or a height of a sub-block group may be equal to or greater than a width or a height of a sub-block. Alternatively, unlike shown, a width or a height of a sub-block group may be set to be smaller than a width or a height of a sub-block.

In performing inter prediction for a current block or a sub-block, motion information of at least one of merge candidates included in a merge candidate list of a current block may be used. In this case, the merge candidate list may include at least one spatial merge candidate, at least one temporal merge candidate or at least one combined merge candidate.

Alternatively, in performing inter prediction for a current block or a sub-block, at least one of motion vector candidates included in a motion vector candidate list of a current block may be used. In this case, the motion vector candidate list may include at least one spatial motion vector candidate or at least one temporal motion vector candidate.

In performing intra prediction for a current block or a sub-block, at least one of MPMs included in a MPM list of a current block may be used. In addition, intra prediction may be performed by using at least one of directional modes included in a MPM list.

Alternatively, based on at least one of an intra prediction mode of a surrounding block adjacent to a current block or a sub-block, a histogram of oriented gradients (HOG) calculated from surrounding samples or a template configured with surrounding samples of a current block or a sub-block, an intra prediction mode may be derived.

In performing intra block copy for a current block or a sub-block, at least one of block vector merge candidates included in a block vector merge candidate list of a current block may be used.

Alternatively, in performing intra block copy for a current block or a sub-block, at least one of block vector candidates included in a block vector candidate list of a current block may be used.

When a current block is partitioned into a plurality of sub-blocks, prediction may be performed for each of partitioned sub-blocks. In this case, a size of each sub-block may be the same or different.

In this case, in performing prediction for a sub-block bordering a specific boundary of a current block, prediction may be performed by using a prediction mode of a surrounding block of a sub-block while being positioned outside a current block. For example, when a surrounding block adjacent to a sub-block to be predicted is encoded by inter prediction, inter prediction may be performed for a sub-block based on motion information of the sub-block. Alternatively, when a surrounding block adjacent to a sub-block to be predicted is encoded by intra prediction, intra prediction may be performed for a sub-block based on an intra prediction mode of the sub-block.

Alternatively, when a surrounding block adjacent to a sub-block to be predicted is encoded by intra block copy, intra block copy may be performed for a sub-block based on a block vector of the sub-block.

Meanwhile, only prediction information of a referenceable surrounding block may be used to perform prediction of a sub-block. When there are a plurality of referenceable surrounding blocks, for a sub-block, based on prediction information of each surrounding block, prediction may be performed for a sub-block multiple times.

As an example, prediction information of a surrounding block may be used to perform intra prediction, inter prediction or intra block copy of a current block or a sub-block only when it is not the same as prediction information used to generate a first prediction block of a current block or a sub-block.

As an example, when motion information of a surrounding block is not the same as motion information used to derive a first prediction block for a current block or a sub-block, based on at least one of motion information of the surrounding block or motion information used to derive the first prediction block, a prediction block may be additionally obtained for a current block or a sub-block.

Here, a first prediction block may be a prediction block with the same size/position as a current block, a prediction block obtained based on prediction information obtained at a current block level or when multi-prediction is applied, a prediction block generated first.

Motion information may include at least one of an inter prediction indicator, a reference picture index, a motion vector candidate index, a motion vector difference, a motion vector, a reference image, a POC of a reference image, information on whether to use a skip mode, information on whether to use a merge mode, a merge index, a weight, an offset, an inter prediction mode or a reference image list.

Alternatively, when motion information obtained by a predefined method is not the same as motion information used to generate a first prediction block, an additional prediction block may be generated through motion information obtained by the predefined method. Here, a predefined method may be derived by a motion vector merge mode, a merge mode, an AMVP mode, template matching or two-sided prediction.

For example, when a motion vector or an inter prediction indicator of motion information derived by a predefined method is not the same as a motion vector or an inter prediction indicator used to derive a first prediction block, a prediction block may be additionally generated by using motion information derived by a predefined method.

Alternatively, when motion information derived from a predefined method or a surrounding block is different from motion information used to obtain a first prediction block, inter prediction or intra block copy may be performed based on motion information used to obtain a first prediction block. As an example, when an inter prediction indicator of motion information derived from a surrounding block is not the same as a motion vector or an inter prediction indicator of motion information used to derive a first prediction block, an additional prediction block may be obtained by using a motion vector or an inter prediction indicator used to derive a first prediction block.

Meanwhile, when a reference picture index of a surrounding block or a POC of a reference picture is different from a reference picture index or a POC of a reference picture used to generate a first prediction block, motion information of the surrounding block may not be used for inter prediction.

Figures 37, 38:
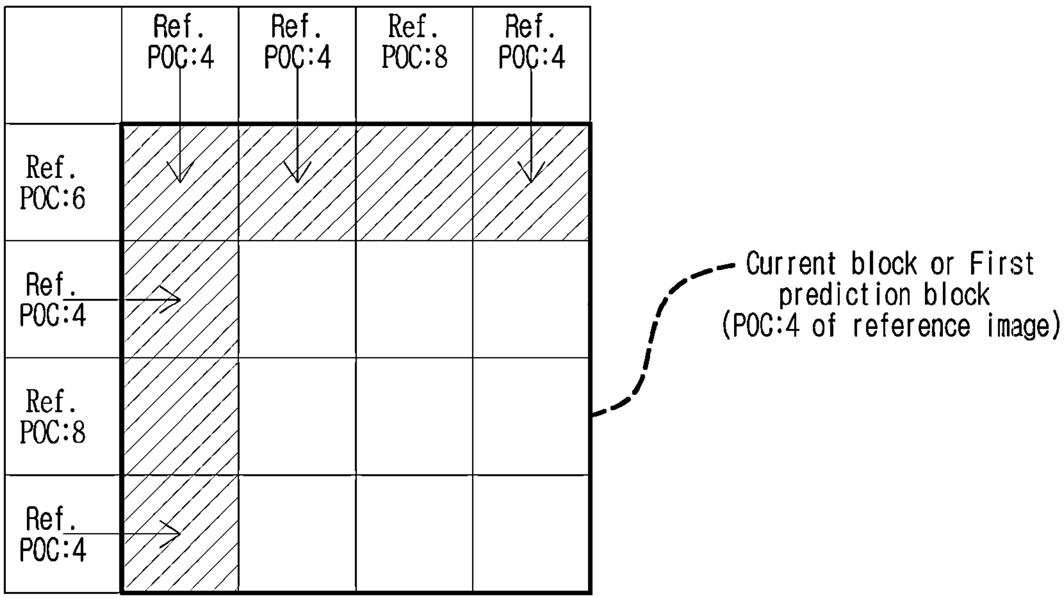
FIG. 37 shows an example in which a referenceable surrounding block is determined according to the POC of reference pictures.
FIG. 38 is a diagram for describing an example in which an intra prediction mode is derived per sub-block.

FIG. 37 shows an example in which a referenceable surrounding block is determined according to the POC of reference pictures.

In FIG. 37, it was illustrated that a POC of a reference picture used to obtain a first prediction block is 4. In this case, motion information of a surrounding block whose POC of a reference picture is 4 is available for inter prediction of a current block or a sub-block, while motion information of a surrounding block whose POC of a reference picture is not 4 may be unavailable for inter prediction of a current block or a sub-block.

While using the same reference picture as a reference picture used to obtain a first prediction block, only motion information of a surrounding block with a motion vector different from a motion vector used to obtain a first prediction block may be used for inter prediction of a current block or a sub-block.

Alternatively, when a first reference picture of a surrounding block is different from a second reference picture used to obtain a first prediction block, a motion vector of a surrounding block may be scaled according to a second reference picture and based on a scaled motion vector, inter prediction may be performed for a current block or a sub-block. In other words, inter prediction for a current block or a sub-block may be performed based on a first reference picture and a scaled motion vector. Alternatively, inter prediction for a current block or a sub-block may be performed without performing a motion vector of a surrounding block. In other words, inter prediction for a current block or a sub-block may be performed based on a motion vector of a first reference picture and a surrounding block.

Alternatively, while using the same inter prediction indicator as an inter prediction indicator used to obtain a first prediction block, only motion information of a surrounding block having a motion vector different from a motion vector used to obtain a first prediction block may be used for inter prediction of a current block or a sub-block.

When intra prediction is performed in a unit of a sub-block, an intra prediction mode of each sub-block may be the same. As an example, an intra prediction mode derived for a current block may be set as an intra prediction mode of sub-blocks.

Alternatively, an intra prediction mode of each sub-block may be determined individually. As an example, an intra prediction mode of a sub-block may be derived from at least one surrounding block adjacent to a sub-block.

FIG. 38 is a diagram for describing an example in which an intra prediction mode is derived per sub-block.

Intra prediction for a sub-block adjacent to the top boundary in a current block may be performed based on an intra prediction mode of a surrounding block adjacent to the top boundary of a sub-block.

In addition, intra prediction for a sub-block adjacent to the left boundary of a current block may be performed based on an intra prediction mode of a surrounding block adjacent to the left of a sub-block.

Intra prediction for a sub-block adjacent to both the top boundary and the left boundary of a current block may be performed by using at least one intra prediction mode of a surrounding block adjacent to the top or a surrounding block adjacent to the left. As an example, intra prediction may be performed by selecting one of a first intra prediction mode of a top surrounding block and a second intra prediction mode of a left surrounding block or intra prediction may be performed two times based on each of a first intra prediction mode and a second intra prediction mode.

Unlike shown, intra prediction of a sub-block may be performed by further referring to a surrounding block adjacent to the top-left, the top-right and the bottom-left of a sub-block.

Meanwhile, when a surrounding block of a sub-block is not encoded by intra prediction, for example, when a surrounding block is encoded by inter prediction, intra prediction may not be performed for a corresponding sub-block.

Alternatively, a prediction type which will be performed for a sub-block may be determined according to a prediction mode of a surrounding block of a sub-block. As an example, when a surrounding block is encoded by intra prediction, intra prediction may be performed for a sub-block based on an intra prediction mode of a surrounding block. On the other hand, when a surrounding block is encoded by inter prediction, inter prediction may be performed for a sub-block based on motion information of a surrounding block. Alternatively, when a surrounding block is encoded by intra block copy, intra block copy for a sub-block may be performed based on a block vector of a surrounding block.

Meanwhile, multi-prediction may be applied only to sub-blocks included in at least one of a top region configured with INTRALINETHRES_ABOVE lines from the top boundary of a current block or a left region configured with INTRALINETHRES_LEFT lines from the left boundary of a current block. In other words, intra prediction, inter prediction or intra block copy may be performed only for sub-blocks included in at least one of the top region or the left region.

A final prediction block of a sub-block not included in a top region and a left region may be set as a corresponding position in a first prediction block obtained by prediction for a current block.

INTRALINETHRES_ABOVE can be 0, 1, 2, 4 or an integer having the same value as a height of a current block. INTRALINETHRES_LEFT can be 0, 1, 2, 4 or an integer having the same value as a width of a current block.

A size of a top region (i.e., INTRALINETHRES_ABOVE) and a size of a left region (i.e., INTRALINETHRES_LEFT) may be predefined in an encoding device and a decoding device. Alternatively, information on at least one of a size of a top region or a size of a left region may be encoded and signaled.

Alternatively, according to an intra prediction mode of a current block, at least one of a size of a top region or a size of a left region may be adaptively determined.

As an example, when an intra prediction mode of a current block is a directional prediction mode and an index of the directional prediction mode is greater than a threshold value, a size of a left region may be set to be greater than when an index of the directional prediction mode is smaller than a threshold value. The threshold value may be one of a vertical right mode and a horizontal bottom mode, 0, HOR_IDX, VER_IDX, HOR_IDX/2, HOR_IDX/4, NUM_LUMA_MODE−HOR_IDX/2+1, NUM_LUMA_MODE−HOR_IDX/4+1 or a positive integer. The HOR_IDX and VER_IDX represent an index of a horizontal mode and a vertical mode, respectively.

As an example, when an intra prediction mode of a current block is a directional prediction mode and an index of the directional prediction mode is greater than a threshold value, a size of a top region may be set to be smaller than when an index of the directional prediction mode is smaller than a threshold value.

Step of Performing a Weighted Sum for Prediction Blocks (S2220, S2330)

Based on at least one prediction block, a final prediction block for a current block or a sub-block may be obtained. Here, a current block represents a coding block, a prediction block or a transform block.

When the number of prediction blocks generated for a current block or a sub-block is 1, a corresponding prediction block may be used as a final prediction block of a current block or a sub-block.

When a plurality of prediction blocks are generated for a current block or a sub-block, a final prediction block of a current block or a sub-block may be generated by a weighted sum of a plurality of prediction blocks. As an example, when TOTAL_NUM prediction blocks are generated, a weight of 1/TOTAL_NUM may be applied to each prediction block to obtain a final prediction block of a current block or a sub-block. In this case, a plurality of prediction blocks may be generated based on a position/a size of a current block or may be generated based on a position/a size of a sub-block. Alternatively, a first prediction block among a plurality of prediction blocks may have the same position/size as a current block, but a second prediction block may have the same position/size as a sub-block.

A weight applied to each prediction block may be set to have a different value. As an example, a weight applied to each prediction block may be adaptively determined according to a prediction mode or prediction information used to generate a prediction block. Here, a prediction mode may refer to one of an intra prediction, inter prediction or intra block copy mode, but it is not limited thereto.

Alternatively, a weight applied to each prediction block may be adaptively determined according to a pixel position.

A weighted sum operation may be performed in a unit of a sub-block. In performing a weighted sum operation of a sub-block, a prediction block larger than a sub-block, e.g., a first prediction block obtained with the same position/size as a current block may be used. In this case, a weighted sum operation may be performed by taking a region with the same position/size of a sub-block in a first prediction block.

Meanwhile, a plurality of prediction blocks may be obtained only for some sub-blocks in a current block. Accordingly, for some sub-blocks in a current block, a final prediction block is generated through a weighted sum operation of prediction blocks, while for the remaining sub-blocks, a prediction block obtained by prediction performed for a current block (i.e., a first prediction block) may be used as a final prediction block.

For example, for a region where a current block borders a boundary, a final prediction block may be generated through a weighted sum operation of a plurality of prediction blocks. Here, a region adjacent to a current block may be configured by including at least one line from a specific boundary of a current block. In addition, the specific boundary may include at least one of a top boundary, a left boundary, a bottom boundary or a right boundary.

Furthermore, a boundary region may correspond to part of a current block.

To apply a variable weight, weight information may be encoded and signaled in a bitstream. In this case, weight information may be signaled per prediction block. Alternatively, weight information may be encoded and signaled per reference image. Alternatively, weight information may be encoded and signaled for a block targeted for a weighted sum operation (e.g., a current block or a sub-block).

The weight information may represent a weight value applied to a specific prediction block. Alternatively, the weight information may be an index that identifies a weight set of prediction blocks.

When a plurality of prediction blocks are generated, boundary filtering may be performed for a boundary of a prediction block. For example, when a weighted sum operation is performed in a unit of a sub-block, boundary filtering may be performed for at least one boundary region among sub-blocks that a weighted sum operation was performed. For example, boundary filtering may be performed between a final prediction block obtained by a weighted sum operation (e.g., a prediction block obtained by performing a weighted sum for part of a first prediction block and a second prediction block) and a final prediction block obtained without performing a weighted sum operation (e.g., part of a first prediction block).

Alternatively, when a weighted sum operation is performed for a current block, boundary filtering based on surrounding reconstructed samples may be performed at a boundary of a current block.

Boundary filtering may be performed by using at least one reference sample line. In this case, the number of reference sample lines may be 1, 2 or an integer greater than 2.

Whether to perform boundary filtering may be determined by whether a predetermined condition is satisfied. In this case, a predetermined condition may be predefined in an encoder and a decoder. For example, whether to perform the boundary filtering may be determined based on at least one of a coding parameter of a current block and a surrounding block. For example, the boundary filtering may be performed for at least one of color components. For example, the boundary filtering may be performed at a boundary of corresponding sub-blocks only when a weighted sum is performed for both two adjacent sub-blocks. For example, when a weighted sum is performed in at least one sub-block of two adjacent sub-blocks, the boundary filtering may be performed at a boundary of two sub-blocks. For example, when a weighted sum operation is performed in one of two adjacent sub-blocks and a weighted sum operation is not performed in the other, boundary filtering may be performed at a boundary of two sub-blocks. For example, boundary filtering may be performed only at a boundary between a region where a weighted sum is performed and a region where a weighted sum is not performed. For example, boundary filtering may be performed for a boundary between a block that a weighted sum is performed and a surrounding block adjacent thereto.

When the number of prediction blocks is two, a weighted sum operation for obtaining a final prediction block of a current block or a sub-block may be performed based on the following Equation 1.

$$P\_BI = (WF\_L0 * P\_L0 + OFFSET\_LO + WF\_L1 * P\_L1 + OFFSET\_L1 + RF) >> 1 \quad \text{[Equation 1]}$$

When the number of prediction blocks is three, a weighted sum operation for obtaining a final prediction block of a current block or a sub-block may be performed based on the following Equation 2.

$$P\_TRI - (WF\_L0 * P\_L0 + OFFSET\_LO + WF\_L1 * P\_L1 + OFFSET\_L1 + WF\_L2 * P\_L2 + OFFSET\_L2 + RF)/3 \quad \text{[Equation 2]}$$

When the number of prediction blocks is four, a weighted sum operation for obtaining a final prediction block of a current block or a sub-block may be performed based on the following Equation 3.

$$P\_QUAD = (WF\_L0 * P\_L0 + OFFSET\_LO + WF\_L1 * P\_L1 + OFFSET\_L1 + WF\_L2 * P\_L2 + OFFSET\_L2 + WF\_L3 * P\_L3 + OFFSET\_L3 + RF) >> 2 \quad \text{[Equation 3]}$$

In Equation 1 to 3, P_BI, P_TRI and P_QUAD represent a final prediction block of a current block or a sub-block, respectively. WF_LN (N is 0 to 3) represents a weight applied to a N-th prediction block P_LN. In this case, WF_LN may be derived from a weight map for a current block or a sub-block. OFFSET_LN represents an offset for a N-th prediction block P_LN. In this case, OFFSET_LN may be derived from a weight map for a current block or a sub-block. RF represents a rounding factor. RF may be 0, a positive integer or a negative integer.

Weight WF_LN may be an integer including 0. Weight WF_LN may be a negative integer or a positive integer. When the rest excluding one of a plurality of weights are 0, it is substantially considered as a fact that a weighted sum operation is not performed. For example, in Equation 1, when WF_L0 is 0, it means that second prediction block P_L1 is set as a final prediction block and when WF_L1 is 0, it means that first prediction block P_L0 is set as a final prediction block.

A weight map or an offset map may have the same size as a current block or a sub-block. A weight map may be a matrix representing a weight value at a position of each sample in a current block or a sub-block. A weight map may be configured with at least one weight value. An offset map may be a matrix representing an offset value for each sample in a current block or a sub-block. An offset map may be configured with at least one offset value.

Figure 39:
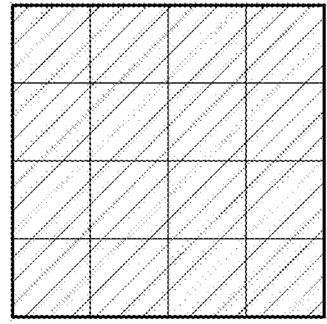
FIG. 39 is a diagram illustrating a weight map.

FIG. 39 is a diagram illustrating a weight map.

A block at a central position of FIG. 39 represents a block that intends to perform a weighted sum operation.

For a central block, at least one of eight illustrated weight maps may be selected and applied.

A weight map may be selected for part of a plurality of prediction blocks. As an example, when two prediction blocks are generated, a weight map may be selected for a first prediction block. A weight map for a second prediction block may be derived from a weight map of a first prediction block. As an example, a weight applied to a second prediction block for a sample at a specific position may be obtained by subtracting a weight applied to a first prediction block from 1.

A weight map or an offset map may be configured in a unit of a predetermined region, not in a unit of a sample. Here, a predetermined region may be at least one row, at least one column or a square block.

At least one of a weight or an offset for calculating a weighted sum may be entropy-encoded and signaled. Specifically, when a weighted sum operation is performed for a plurality of prediction blocks, a weight and an offset may be encoded and signaled for each of a plurality of prediction blocks.

FIGS. 40 and 41 show syntax elements for multi-prediction including a weight and an offset.

In FIGS. 40 and 41, it was illustrated that the following syntax elements are included.

Inter prediction indicator)—inter_pred_idc,

Reference image indexes (ref_idx_l0, ref_idx_l1, ref_idx_l2, ref_idx_l3),

Motion vector candidate indexes (mvp_l0_flag, mvp_l1_flag, mvp_l2_flag, mvp_l3_flag), Motion vector difference values, cu_skip_flag showing whether to use a skip mode, merge flag showing whether to use a merge mode, merge_idx (merge index) indicating a merge candidate, Weight (weighting factor) values (wf_l0, wf_l1, wf_l2, wf_l3), Offset values (offset_l0, offset_l1, offset_l2, offset_l3)

As another example, at least one of a weight or an offset may be derived by referring to a surrounding block of a current block or a sub-block. As an example, a weight/an offset applied to a surrounding block may be set as a weight/an offset of a current block or a sub-block. Alternatively, a weight/an offset applied to a surrounding block may be set as a weight prediction value/an offset prediction value of a current block or a sub-block. In this case, for a current block or a sub-block, a weight difference value/an offset difference value may be encoded and signaled.

Based on a POC of a current picture and a reference picture, a weight applied to each prediction block may be adaptively determined. As an example, a first weight applied to a first prediction block generated by a reference picture that is far from a current picture may have a smaller value than a second weight applied to a second prediction block generated by a reference picture that is close to a current picture.

In other words, as an example, when a POC difference (L0_POC_diff) between a current picture and a L0 reference picture is 2 and a difference (L1_POC_diff) between a current picture and a L1 reference picture is 1, a weight of ⅓ (L1_POC_diff/(L0_POC_diff+L1_POC_diff)) may be applied to a L0 prediction block and a weight of ⅔ (L0_POC_diff/(L0_POC_diff+L1_POC_diff)) may be applied to a L1 prediction block.

In other words, as a reference image is closer to a current image, a weight or an offset applied to a prediction block derived from a corresponding reference image may have a large value. In other words, a weight or an offset may be inversely proportional to a distance between a reference image and a current image.

As another example, at least one of weight information or offset information of a current block or a sub-block may be derived based on at least one of motion information, a coding parameter or a sample value of a current block or a sub-block or a sample value of a surrounding block.

Alternatively, at least one of weight information or offset information may be entropy-encoded/decoded based on at least one of coding parameters. In addition, a weighted sum of prediction blocks may be calculated based on at least one of coding parameters.

A weighted sum of prediction blocks may be applied only to some regions in a current block. As an example, a weighted sum operation of prediction blocks may be performed only for a boundary region adjacent to a boundary of a current block. In addition, a weighted sum operation of prediction blocks may be performed in a unit of a sub-block.

Based on region information (granularity), a region where prediction is performed or a region where a weighted sum of prediction blocks is performed may be determined. Here, region information may represent a block of a specific size or a block of a specific depth. As an example, when information on at least one of intra prediction, inter prediction or intra block copy is entropy-encoded/decoded at a specific block size or a specific block depth, a specific block size or a specific block depth may be defined as region information. For example, a size of a block or a depth of a block that information on motion compensation is entropy-encoded and signaled may be defined as region information.

Through a comparison operation between prediction blocks, at least one of a weight or an offset for each prediction block may be derived. In this case, at least one of a weight or an offset derived for a prediction block may be applied equally to all corresponding prediction blocks. Alternatively, at least one of a weight or an offset may be derived in a unit of a sample in a prediction block.

Prediction blocks that perform a comparison operation may be a prediction block generated by intra prediction, inter prediction or intra block copy, but they are not limited thereto. For example, at least one of prediction blocks that perform a comparison operation may be generated by inter prediction or intra block copy.

The comparison operation may be performed based on a first prediction block among a plurality of prediction blocks. In other words, each of the remaining prediction blocks excluding a first prediction block may be compared with a first prediction block to derive at least one of a weight or an offset for each of the remaining prediction blocks.

Here, a first prediction block may be generated based on prediction information for a current block or may be generated first among a plurality of prediction blocks.

As an example, for a second prediction block, a comparison operation with a first prediction block may be performed in a unit of a sample or a unit of a sub-block. In this case, as a comparison operation result value between a first prediction block and a second prediction block is smaller, a lower weight may be allocated. As an example, as a difference between a prediction sample in a second prediction block and a prediction sample in a first prediction block is smaller, a lower weight may be allocated to a corresponding prediction sample in a second prediction block. Alternatively, conversely, as a comparison operation result value between a second prediction block and a second prediction block is larger, a lower weight may be allocated.

As an example, for a second prediction block, a comparison operation with a first prediction block may be performed in a unit of a sample or a unit of a sub-block. In this case, as a comparison operation result value between a first prediction block and a second prediction block is smaller, a lower offset may be allocated. Alternatively, conversely, as a comparison operation result value between a second prediction block and a second prediction block is larger, a lower offset may be allocated.

A modified comparison operation result value may be obtained by multiplying a comparison operation result value of prediction blocks by a weight or by adding an offset and based on a modified comparison operation result value, at least one of a weight or an offset which will be applied to a prediction block may be determined. Here, at least one of a weight or an offset applied to a comparison operation result value may be determined according to a prediction mode used to generate a second prediction block compared with a first prediction block.

A matching cost may be calculated by performing a comparison operation between a prediction block and a surrounding sample. Here, a surrounding samples may be included in a template. In addition, the comparison operation may be derived based on a difference between a prediction sample obtained by performing prediction for a template and a reconstructed sample in a template.

Based on a matching cost for a template, at least one of a weight or an offset for a prediction block may be determined. Here, when a prediction block is generated with the same position and size as a sub-block, a template may include a surrounding sample adjacent to a sub-block. Alternatively, a template may include a surrounding sample that is positioned outside a current block and is adjacent to a sub-block. A template may be configured in a unit of a sub-block and at least one of a weight or an offset may be determined per sub-block. In this case, a template may be configured only for a sub-block that a weighted sum operation may be actually performed. As an example, a matching cost may be calculated by configuring a template only for a sub-block that borders the left boundary or the top boundary of a current block.

A configuration of a template may follow an example in FIG. 19 or FIG. 20. Alternatively, for the top of a sub-block, a template may be configured with one row and for the left of a sub-block, a template may be configured with one column.

In performing a weighted sum operation for a plurality of prediction blocks, a weight of each prediction block may be determined based on a matching cost for a template.

As an example, in performing a weighted sum of a first prediction block and a second prediction block, a first matching cost may be obtained by applying first motion information used to obtain a first prediction block to a template and a second matching cost may be obtained by applying second motion information used to obtain a second prediction block to a template. Here, first motion information represents motion information of a current block or a sub-block and second motion information represents motion information of a surrounding block adjacent to a sub-block. Hereinafter, a first matching cost and a second matching cost may be compared to determine at least one of a weight for a first prediction block and a weight for a second prediction block.

As an example, when a first matching cost is smaller than a second matching cost, a weight for a second prediction block may be set as 0. In other words, when a first matching cost is smaller than a second matching cost, a first prediction block may be set as a final prediction block without performing a weighted sum operation.

As an example, when a second matching cost is smaller than a first matching cost, a weighted sum operation which applies a non-zero weight to each of a first prediction block and a second prediction block may be performed.

Based on a first matching cost and a second matching cost, a third matching cost may be additionally derived. A third matching cost may be obtained by a weighted sum operation of a first matching cost and a second matching cost. As an example, a third matching cost may be determined by applying a weight of ¼ (or ¾) to a first matching cost and a weight of ¾ (or ¼) to a second matching cost. When a third matching cost among a first matching cost to a third matching cost is the smallest, a weighted sum operation which applies a non-zero weight to each of a first prediction block and a second prediction block may be performed.

Alternatively, after performing a weighted sum for first prediction samples obtained by performing prediction for a template based on first motion information and second prediction samples obtained by performing prediction for a template based on second motion information, a third matching cost may be obtained based on a difference between a weighted sum prediction sample and a reconstructed sample of a template.

Meanwhile, when a second matching cost is the smallest and when a third matching cost is the smallest, at least one of a range in which a weighted sum operation is performed or a weight for a weighted sum operation may be different. As an example, when a second matching cost among a first matching cost to a third matching cost is the smallest, a weighted sum operation may be performed for four lines in a sub-block, while when a third matching cost is the smallest, a weighted sum operation may be performed for two lines in a sub-block.

Even when intra prediction is performed, a weight may be determined in the same way. As an example, a first matching cost may be obtained by applying a first intra prediction mode applied to a current block or a sub-block to a template and a second matching cost may be obtained by applying a second intra prediction mode of a surrounding block to a template. In addition, a third matching cost may be obtained through a weighted sum operation of a first matching cost and a second matching cost. Afterwards, a first matching cost to a third matching cost may be compared to determine a weight applied to a first prediction block and a second prediction block.

Meanwhile, based on a matching cost of a template, whether to perform a weighted sum for a current block or a sub-block may be determined. As an example, after configuring a template per sub-block, whether a weighted sum operation is performed for a corresponding sub-block may be determined based on a matching cost of a template for a sub-block. As an example, when any one of the above-described first matching cost, second matching cost or third matching cost is smaller than a threshold value or is greater than a threshold value, a weighted sum may not be performed for a sub-block. When a weighted sum is not performed for a sub-block, a first prediction block may be set as a final prediction block of a corresponding sub-block.

Alternatively, after performing prediction for a template, whether to perform a weighted sum may be determined by comparing a prediction sample in a template with a prediction sample of a current block or a sub-block. As an example, one line adjacent to a sub-block may be configured with a template and intra prediction or inter prediction may be performed for a template to perform a prediction sample for a template. Afterwards, a difference between a prediction sample in a template and a prediction sample positioned at a boundary bordering a template in a sub-block may be derived. Specifically, a difference between a prediction sample in a template and a prediction sample in a sub-block adjacent thereto may be derived. A difference value for all prediction samples in a template may be summed and set as a matching cost of a template. Whether to apply a weighted sum to a current block or a sub-block may be determined by comparing a matching cost of a template with a threshold value.

Alternatively, a first matching cost may be calculated based on a difference between prediction samples obtained by performing inter prediction for a template and prediction samples in a sub-block adjacent to them and a second matching cost may be calculated based on a difference between prediction samples obtained by performing inter prediction for a template and prediction samples in a sub-block adjacent to them. And, a difference value between a first matching cost and a second matching cost may be compared with a threshold value to determine whether to apply a weighted sum to a current block or a sub-block. Specifically, when a matching cost difference value is greater than or smaller than a threshold value, it may be determined that a weighted sum is applied to a current block or a sub-block.

Alternatively, a weight which will be applied to a current block or a sub-block may be determined based on at least one of a first matching cost, a second matching cost or a matching cost difference value.

Based on the similarity with a surrounding reconstructed block and a prediction sample obtained by performing prediction in a current block or a sub-block, whether to use a specific prediction mode for a weighted sum or a weight applied to a prediction block obtained based on a specific prediction mode may be determined.

FIG. 42 shows surrounding samples and samples within a current block used to calculate similarity. Here, samples in a current block may represent prediction samples by a first prediction mode or prediction samples by a second prediction mode according to a prediction mode.

Here, a prediction mode may include intra prediction, inter prediction or intra block copy. A first prediction mode and a second prediction mode may be different from each other. Alternatively, a first prediction mode and a second prediction mode may have the same prediction mode, but may have a different prediction method. As an example, both a first prediction mode and a second prediction mode may be intra prediction, but may have a different intra prediction modes used for prediction. Alternatively, both a first prediction mode and a second prediction mode may be inter prediction, but may have different motion information such as a prediction direction (a L0 prediction, a L1 prediction or a pair prediction), a reference picture or a motion vector, etc.

As an example, a first similarity is obtained based on a difference between prediction samples obtained by applying a first prediction mode at a position adjacent to a boundary of a current block or a sub-block and reconstructed samples around the prediction samples. In addition, a second similarity is obtained based on a difference between prediction samples obtained by applying a first prediction mode at a position adjacent to a boundary of a current block or a sub-block and reconstructed samples around the prediction samples.

Afterwards, a first similarity and a second similarity may be compared to determine at least one of whether to use a first prediction block and a second prediction block for a weighted sum, a weight for a first prediction block and a weight for a second prediction block.

As an example, when a first similarity is smaller than a second similarity, a weight for a second prediction block may be set as 0. In other words, when a first similarity is smaller than a second similarity, a first prediction block may be set as a final prediction block without performing a weighted sum operation.

As an example, when a second similarity is smaller than a first similarity, a weighted sum operation which applies a non-zero weight to each of a first prediction block and a second prediction blocks may be performed.

Alternatively, when a second similarity is smaller than a first similarity and a difference between the two is equal to or greater than a threshold value, a weighted sum operation which applies a non-zero weight to each of a first prediction block and a second prediction blocks may be performed. On the other hand, when a difference between the two is smaller than a threshold value, a weight for a second prediction block may be set as 0.

Based on a first similarity and a second similarity, a third similarity may be additionally derived. A third similarity may be obtained by a weighted sum operation of a first similarity and a second similarity. As an example, a weight of ¼ (or ¾) may be applied to a first similarity and a weight of ¾ (or ¼) may be applied to a second similarity to determine a third similarity. When a third similarity among a first similarity to a third similarity is the smallest, a weighted sum operation which applies a non-zero weight to each of a first prediction block and a second prediction blocks may be performed.

Whether to perform a weighted sum operation or a weight may be determined through comparison between a first similarity and a third similarity or comparison between a second similarity and a third similarity among a first similarity to a third similarity.

Alternatively, after performing a weighted sum for a first prediction block and a second prediction block, a third similarity may be obtained based on a difference between a weighted sum prediction sample in a block and a surrounding reconstructed sample.

Meanwhile, when a second similarity is the smallest and when a third similarity is the smallest, at least one of a scope in which a weighted sum operation is performed or a weight for a weighted sum operation may be different. As an example, when a second similarity among a first similarity to a third similarity is the smallest, a weighted sum operation may be performed for four lines in a sub-block, while when a third similarity is the smallest, a weighted sum operation may be performed for two lines in a sub-block.

Meanwhile, instead of using a pre-generated first prediction block, a similarity may be obtained by using prediction modes different from those used to generate a first prediction block. As an example, a first similarity may be obtained based on a second prediction mode used to derive a first prediction mode and a second similarity may be obtained based on a third prediction mode. In this case, an additional prediction block for a current block or a sub-block may be generated by using a prediction mode corresponding to one with the smaller value of a first similarity and a second similarity.

Alternatively, a first weighted sum block may be generated by performing a weighted sum operation with a first prediction block and a second prediction block derived based on a second prediction mode and a second weighted sum block may be generated by performing a weighted sum operation with a first prediction block and a third prediction block derived based on a third prediction mode. Afterwards, a prediction mode used to generate an additional prediction block may be determined by comparing a first similarity calculated based on a first weighted sum block and a second similarity calculated based on a second weighted sum block. As an example, when a first similarity is smaller than a second similarity, a second prediction block based on a second prediction mode may be additionally generated and when a second similarity is smaller than a first similarity, a second prediction block based on a third prediction mode may be additionally generated.

Alternatively, it is determined to use both a second prediction mode and a third prediction mode, but based on a first similarity and a second similarity, a weight applied to a second prediction block and a weight applied to a third prediction block may be adaptively determined.

The same coding parameter and/or the same motion information may be applied to smaller sub-blocks within a block of a specific size indicated by region information. In other words, inter prediction, intra prediction or intra block copy of sub-blocks within a block of a specific size may be performed based on the same coding parameter and/or the same motion information.

As an example, in performing intra prediction for smaller sub-blocks within a block of a specific size indicated by region information, sub-blocks may share at least one of reference samples, coding parameters or used surrounding blocks.

As an example, for smaller sub-blocks within a block of a specific size indicated by region information, at least one of a weight, a weight map, an offset or an offset map may be shared.

Based on at least one of motion information or a coding parameter used to derive a prediction block, prediction for a template region may be performed and a matching cost for a template may be calculated. Here, a template region may include surrounding samples adjacent to a current block or may include surrounding samples adjacent to a sub-block according to a unit in which prediction is performed.

A matching cost may be derived based on a difference between a sample in a template and a prediction sample obtained by performing prediction for a template. Here, a sample in a template may be a reconstructed sample or a prediction sample.

According to an example described by FIG. 19 or FIG. 20, a template may be configured.

When a template is configured, a template may be configured only with samples that exist outside a current block.

Even when a template for a sub-block is configured, a template may be configured only with samples that exist outside a current block.

Alternatively, when a template for a sub-block is configured, surrounding samples adjacent to the sub-block within a current block may be included in a template.

A modified comparison matching cost may be obtained by multiplying a matching cost by a weight or adding an offset, and based on a modified matching cost, at least one of a weight or an offset which will be applied to a prediction block may be determined. Here, at least one of a weight or an offset applied to a matching cost may be determined according to a prediction mode used to generate a prediction block.

In a weighted sum operation, a weight may be determined in a unit of a sample or in a unit of a region. As an example, a weight may be set per row or column of a prediction block.

Figure 43:
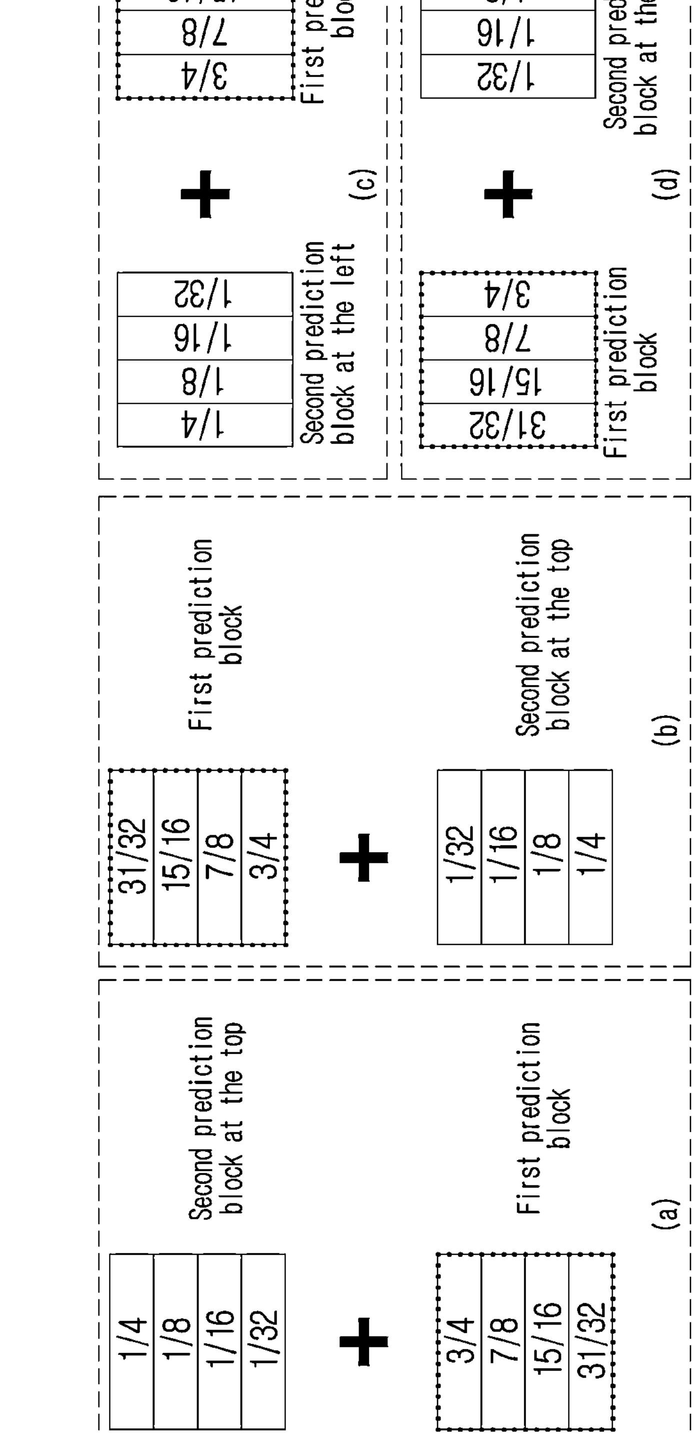
FIG. 43 shows an example in which a different weight is set per each line in a prediction block.

FIG. 43 shows an example in which a different weight is set per each line in a prediction block.

Figure 44:
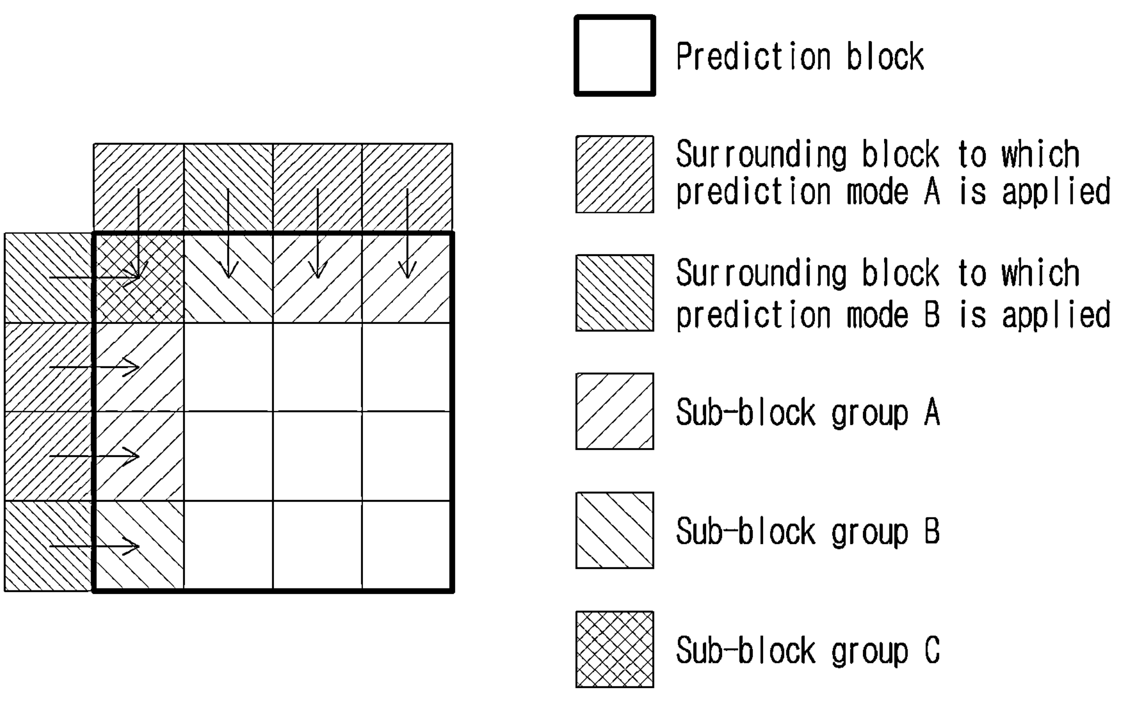
FIG. 44 shows an example in which prediction blocks used for a weighted sum operation are selected according to a prediction mode of a surrounding block.

FIGS. 44(*a*) and (*b*) show an example in which a weight is set in a unit of a row and FIGS. 43(*c*) and (*d*) show an example in which a weight is set in a unit of a column.

When a second prediction block that intends to perform a weighted sum operation is obtained based on prediction information of a surrounding block adjacent to the top or the bottom of a sub-block, as in FIGS. 43(*a*) and (*b*), a weight may be set in a unit of a row. On the other hand, when a second prediction block is obtained based on prediction information of a surrounding block adjacent to the left or the right of a sub-block, as in FIGS. 43(*c*) and (*d*), a weight may be set in a unit of a column.

Unlike a shown example, a weight may be set as a negative number smaller than 0.

In a weighted sum operation, an offset may be further used along with a weight. In this case, an offset may be 0, a negative number or a positive number.

As in an example shown in FIG. 43, when a weight is set in a unit of a line, the same weight may be applied to prediction samples belonging to the same line.

As an example, it is assumed that for a first prediction block, a weight of $\{3/4, 7/8, 15/16, 31/32\}$ is used for each row or each column and for a second prediction block, a weight of $\{1/4, 1/8, 1/16, 1/32\}$ is used for each row or each column. In this case, a weight of $3/4$ may be applied to all samples belonging to a first row or a first column in a first prediction block and a weight of $1/4$ may be determined to all samples belonging to a first row or a first column in a second prediction block.

According to a distance from a specific boundary of a current block or a sub-block, a size of a weight may be different. As an example, a larger weight may be allocated to a first prediction block as it is closer to a left boundary or a top boundary of a sub-block and a larger weight may be allocated to a second prediction block as it is closer to a right boundary or a bottom boundary of a sub-block.

Based on a prediction mode or motion information of a surrounding block adjacent to a prediction block, at least one of a weight, a weight map, an offset or an offset map for a prediction block may be determined. In this case, the surrounding block may be positioned outside a current block.

As an example, only a prediction block derived by the same prediction mode as a prediction mode of an adjacent surrounding block may be used for a weighted sum operation.

Meanwhile, a first prediction block may be used for a weighted sum operation by default regardless of a prediction mode of a surrounding block. Accordingly, at least one prediction block derived by the same prediction mode as a prediction mode of a first prediction block and an adjacent surrounding block may be used for a weighted sum operation.

For example, when a prediction mode of a surrounding block is intra prediction, a first prediction block or a second prediction block generated by intra prediction may be used for a weighted sum operation.

Alternatively, only a prediction block derived by using motion information different from an adjacent surrounding block may be used for a weighted sum operation. Meanwhile, a first prediction block may be used for a weighted sum operation by default regardless of motion information of a surrounding block. Accordingly, at least one prediction block derived by motion information that is different from motion information of a first prediction block and an adjacent surrounding block may be used for a weighted sum operation.

FIG. 44 shows an example in which prediction blocks used for a weighted sum operation are selected according to a prediction mode of a surrounding block.

In a shown example, each of prediction mode A and prediction mode B may be one of intra prediction, inter prediction or intra block copy.

All surrounding blocks of sub-block group A within a current block are encoded in prediction mode A. Accordingly, for a sub-block belonging to sub-block group A, a prediction block generated by prediction mode A may be used for a weighted sum operation.

All surrounding blocks of sub-block group B are encoded in prediction mode B.

Accordingly, for a sub-block belonging to sub-block group B, a prediction block generated by prediction mode B may be used for a weighted sum operation.

It was shown that one of surrounding blocks of sub-block group C is encoded in prediction mode A and the other is encoded in prediction mode B. Accordingly, for a sub-block belonging to sub-block group C, a prediction block generated by prediction mode A and a prediction block generated by prediction mode B may be used for a weighted sum operation.

Meanwhile, for each sub-block, a first prediction block may be used for a weighted sum operation by default. Here, a first prediction block may be a prediction block having the same position/size as a current block, a prediction block generated based on prediction information for a current block or a prediction block generated first among a plurality of blocks.

When calculating a weighted sum between prediction blocks, a different weight may be used according to a sample position in a prediction block. As an example, at least one of a plurality of weight maps shown in FIG. 39 may be applied to a prediction block.

As an example, a weight applied to each sample position in a first prediction block may be determined as one of {½, ¾, ⅞, 15/16, 31/32, 63/64, 127/128, 255/256, 511/512, 1023/1024}, while a weight applied to each sample position in a prediction block different from a first prediction block may be determined as one of {½, ¼, ⅛, 1/16, 1/32, 1/64, 1/128, 1/256, 1/512, 1/1024}.

A weight applied to a prediction block generated by referring to a region inside a current block may have a higher value or a lower value than a weight applied to a prediction block generated by referring to a region outside a current block.

Here, a prediction block generated by referring to a region inside a current block may be generated based on prediction information (e.g., motion information, an intra prediction mode or block vector) obtained from a surrounding block which is positioned inside a current block and is adjacent to a sub-block to be predicted.

Alternatively, a prediction block generated by referring to a region inside a current block may be obtained by performing intra prediction based on the reference samples when at least some of reference samples for intra prediction exist in a current block or when all reference samples exist in a current block.

Alternatively, a weight applied to a prediction block generated by referring to a region inside a current block may be set to be the same as a weight applied to a prediction block generated by referring to a region outside a current block.

A weighted sum operation may be performed only for samples belonging to at least one of K rows or L columns from a specific boundary of a sub-block or a current block. In other words, a weighted sum operation may be performed only in some regions within a sub-block. K and L may be a natural number such as 0, 1 or 2, etc. K and L may have the same value or may have a different value according to a position of a sub-block in a current block.

A specific boundary may include a left boundary, a top boundary, a right boundary or a bottom boundary. According to a position of a sub-block in a current block, a configuration of a region to which a weighted sum is to be applied may be different. As an example, when a sub-block borders a left boundary of a current block, a weighted sum operation may be performed for a sample position belonging to L columns from a left boundary of a sub-block. On the other hand, when a sub-block borders a top boundary of a current block, a weighted sum operation may be performed for a sample position belonging to K rows from a top boundary of a sub-block.

Alternatively, a weighted sum operation may be performed for at least one of sample positions belonging to L columns from each of a left boundary and a right boundary of a current block or sample positions belonging to K rows from each of a top boundary and a bottom boundary of a current block.

Alternatively, according to a size of a current block, a configuration of a region where a weighted sum operation is performed may be different. As an example, when a size of a current block is smaller than N×M, a weighted sum operation may be performed for at least one of sample positions belonging to K rows or sample positions belonging to K columns from each boundary of a current block or a sub-block. On the other hand, when a size of a current block is equal to or greater than N×M, a weighted sum operation may be performed for at least one of sample positions belonging to L rows or sample positions belonging to L columns from each boundary of a current block or a sub-block.

Here, N and M may be a positive integer and for example, N and M may be 8. N and M may have the same value or a different value.

According to a color component, a size of a region where a weighted sum operation is performed may be different. As an example, for a luma component, a weighted sum operation may be performed for sample positions belonging to K rows or K columns from a boundary of a current block or a sub-block. On the other hand, for a chroma component, a weighted sum operation may be performed for sample positions belonging to one row or one column from a boundary of a current block or a sub-block.

According to an inter prediction mode applied to a current block, a size of a region where a weighted sum operation is performed may be different. As an example, when a merge mode is applied to a current block and at least one of an enhanced temporal motion vector prediction candidate and a spatial-temporal motion vector prediction candidate is selected, a weighted sum operation may be performed for sample positions belonging to K rows or K columns from a boundary of a current block or a sub-block. Alternatively, when an affine motion compensation mode is applied to a current block, a weighted sum operation may be performed for sample positions belonging to K rows or K columns from a boundary of a current block or a sub-block.

According to a size of a subblock, a size of a region where a weighted sum operation is performed may be different. As an example, when a size of a sub-block is 4×4, a weighted sum operation may be performed for sample positions belonging to K rows or K columns from a boundary of a sub-block. Here, K may be 1, 2, 3 or 4. On the other hand, when a size of a sub-block is 8×8, a weighted sum operation may be performed for sample positions belonging to L rows or L columns from a boundary of a sub-block. Here, L may be 1, 2, 3, 4, 5, 6, 7 or 8.

According to a coding parameter of a current block, a size of a region where a weighted sum operation is performed may be different. As an example, according to a coding parameter of a current block, a weighted sum operation may be performed for sample positions belonging to K rows or K columns from a boundary of a current block or a sub-block. Here, a coding parameter may include at least one of an inter prediction indicator, a motion vector, a POC of a reference image or an intra prediction mode, but it is not limited thereto.

For example, when an inter prediction indicator is unidirectional prediction, a weighted sum operation may be performed for sample positions belonging to two rows or two columns from a boundary of a current block or a sub-block. On the other hand, when an inter prediction indicator is bidirectional prediction, a weighted sum operation may be performed for sample positions belonging to one row or one column from a boundary of a current block or a sub-block.

According to a POC of a reference picture referred to by a current block, a size of a region where a weighted sum operation is performed may be different. For example, when a POC difference between a current picture and a reference picture is smaller than threshold value J, a weighted sum operation may be performed for sample positions belonging to two rows or two columns from a boundary of a current block or a sub-block. On the other hand, when a POC difference between a current picture and a reference picture is equal to or greater than threshold value J, a weighted sum operation may be performed for sample positions belonging to one row or one column from a boundary of a current block or a sub-block.

In order to reduce computational complexity, a weighted sum operation may be performed for sample positions belonging to the fixed number of rows or the fixed number of columns from a boundary of a sub-block. Here, a fixed number may be 1 or 2. Alternatively, in order to reduce computational complexity, a weighted sum operation may be performed for all sample positions within a sub-block.

In order to reduce computational complexity, a size of a region to which a weighted sum operation is applied may be determined based on a coding parameter of a surrounding block adjacent to a current block or a sub-block. Here, a coding parameter may include at least one of a size of a motion vector, a direction of a motion vector and an intra prediction mode.

As an example, when a sum of an absolute value of a x component and a y component of a motion vector of a surrounding block is equal to or greater than threshold value J, a weighted sum operation may be performed for sample positions belonging to two rows or two columns from a boundary of a current block or a sub-block. When a sum of an absolute value of a x component and a y component of a motion vector of a surrounding block is smaller than threshold value J, a weighted sum operation may be performed for sample positions belonging to one row or one column from a boundary of a current block or a sub-block.

According to a coding parameter of a sub-block that intends to perform prediction, a size of a region to which a weighted sum operation is applied may be different. Here, a coding parameter may include at least one of a size of a motion vector, a direction of a motion vector and an intra prediction mode.

As an example, when an absolute value of a x component of a motion vector of a sub-block is equal to or greater than threshold value J, a weighted sum operation may be performed for sample positions belonging to two rows adjacent to the left boundary and/or the right boundary of a sub-block. On the other hand, when an absolute value of a x component of a motion vector of a sub-block is smaller than threshold value J, a weighted sum operation may be performed for sample positions belonging to one row adjacent to the left boundary and/or the right boundary of a sub-block.

As an example, when an absolute value of a y component of a motion vector of a sub-block is equal to or greater than threshold value J, a weighted sum operation may be performed for sample positions belonging to two rows adjacent to the top boundary and/or the bottom boundary of a sub-block. On the other hand, when an absolute value of a y component of a motion vector of a sub-block is smaller than threshold value J, a weighted sum operation may be performed for sample positions belonging to one row adjacent to the top boundary and/or the bottom boundary of a sub-block.

As an example, when a sum of an absolute value of a x component and a y component of a motion vector of a sub-block is equal to or greater than threshold value J, a weighted sum operation may be performed for sample positions belonging to two rows or two columns from a boundary of a sub-block. When a sum of an absolute value of a x component and a y component of a motion vector of a sub-block is smaller than threshold value J, a weighted sum operation may be performed for sample positions belonging to one row or one column from a boundary of a sub-block.

In the above embodiments, threshold value J may be set as 0 or an integer greater than 0.

When there are a plurality of prediction blocks that intends to perform a weighted sum operation, a weighted sum operation may be performed according to a predefined rule.

Figure 45:
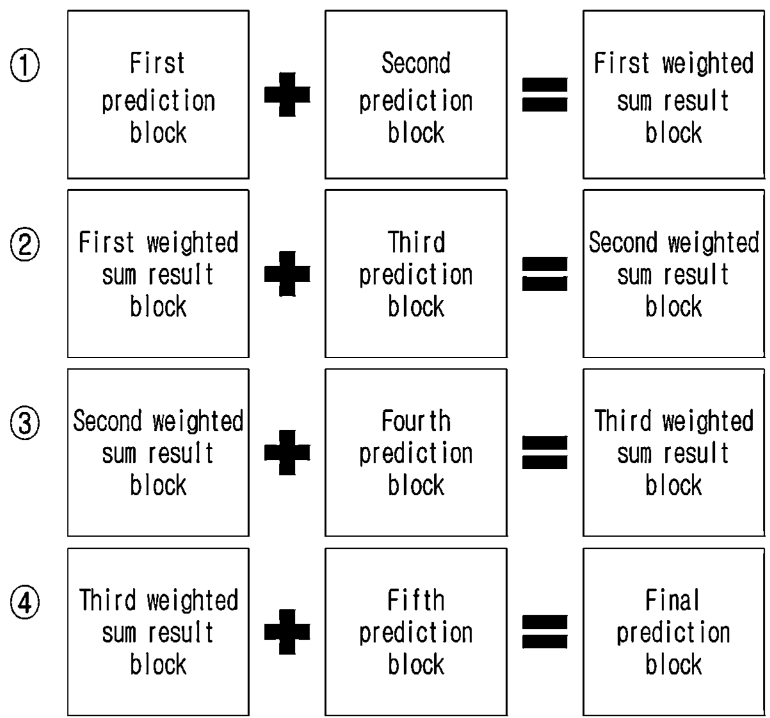
FIGS. 45 and 46 illustrate a performance rule of a weighted sum operation.
Figure 46:
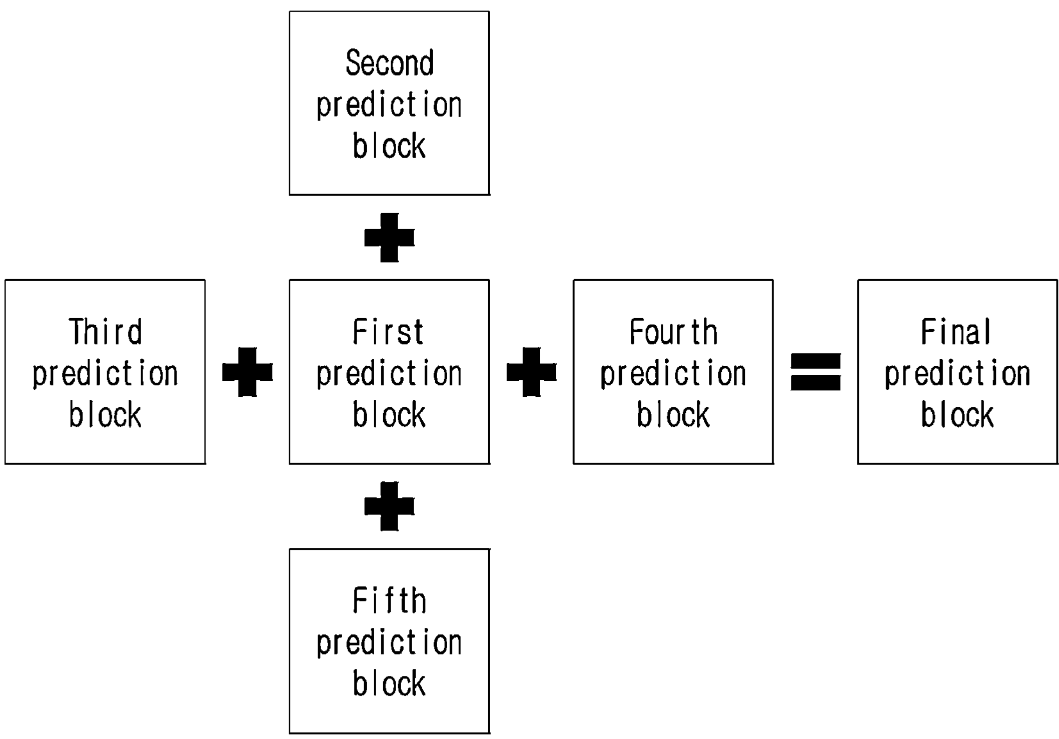

FIGS. 45 and 46 illustrate a performance rule of a weighted sum operation.

A final prediction block may be generated by performing a weighted sum in a method which is predefined from a multi-prediction block.

In FIGS. 45 and 46, it was illustrated that five prediction blocks intend to perform a weighted sum operation, but the same method may be also applied to fewer or more prediction blocks.

FIG. 45 shows an example in which a weighted sum operation is performed sequentially. A weighted sum operation for a N-th prediction block may be performed on a result of a weighted sum operation using a N-lth prediction block.

As an example, a first weighted sum result block may be generated as a result of a weighted sum operation of a first prediction block and a second prediction block. For a third prediction block, a weighted sum operation may be performed by using a first weighted sum result block obtained by using a second prediction block.

In other words, as in an example shown in FIG. 45, a weighted sum result may be performed sequentially according to predefined order.

In this case, order between prediction blocks may be determined by a priority between surrounding blocks used to derive prediction information used to derive a corresponding prediction block. As an example, a priority may be set in the order of a top surrounding block, a left prediction block, a right prediction block and a bottom prediction block. In other words, when a second prediction block is generated based on prediction information of a top surrounding block and a third prediction block is generated based on prediction information of a left surrounding block, a second prediction block may be used for a weighted sum operation before a third prediction block.

Meanwhile, a first prediction block may be always used first for a weighted sum operation. Here, a first prediction block may be a prediction block with the same size/position of a current block, a prediction block obtained based on prediction information of a current block or a prediction block obtained first among a plurality of prediction blocks.

Alternatively, as in an example shown in FIG. 46, a weighted sum operation for a plurality of prediction blocks may be performed in one step. In this case, storage space equivalent to the number of prediction blocks should be secured.

A weighted sum operation is performed between samples corresponding to the same position within prediction blocks. In this case, when a size of prediction blocks performing a weighted sum operation is different, a weighted sum operation may be performed only at a mutually overlapping position.

Figure 47:
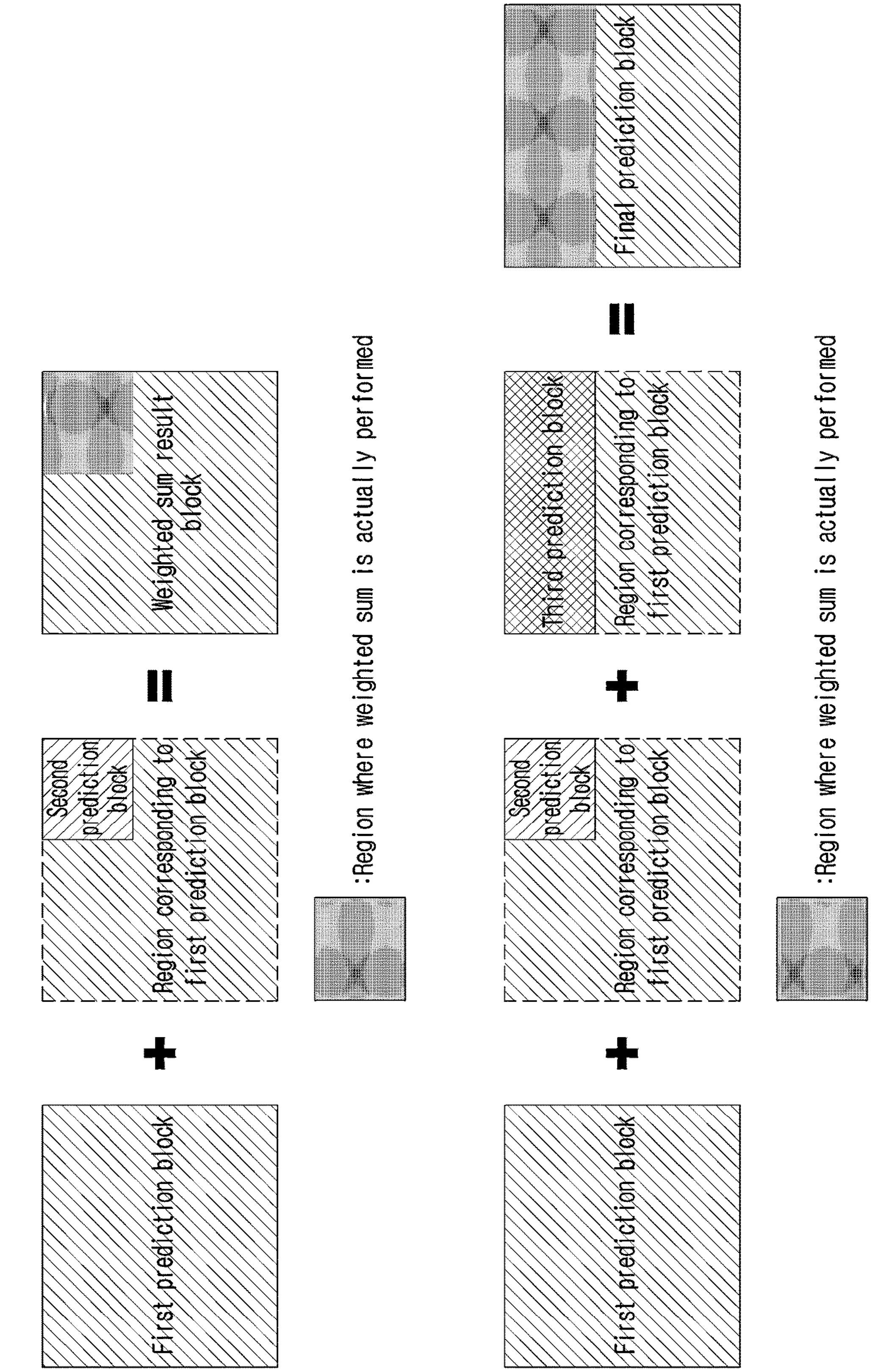
FIG. 47 is a diagram illustrating a region where a weighted sum is performed.

FIG. 47 is a diagram illustrating a region where a weighted sum is performed.

In a shown example, it was illustrated that a first prediction block is obtained for the entire region of a current block, while a second prediction block is obtained for a sub-block at a top-right position of a current block. In addition, it was illustrated that a third prediction block is obtained for a group of sub-blocks adjacent to the top boundary of a current block.

In this case, a weighted sum of a first prediction block and a second prediction block may be actually performed only for a sub-block at a top-right position of a current block. In other words, for a sub-block belonging to the top-right of a current block, a weighted block is generated by a weighted sum operation of a first prediction block and a second prediction block, but for other regions, a value of a first prediction block may be used as it is. In other words, a weighted sum result block of a first prediction block and a second prediction block may be configured with a weighted block obtained in an overlapping region between a first prediction block and a second prediction block and part of a first prediction block corresponding to other regions.

A third prediction block may be weighted to a weighted sum result block of a first prediction block and a second prediction block. In this case, a weighted block may be generated by a weighted sum operation only for a region that overlaps with a third prediction block among weighted sum result blocks of a first prediction block and a second prediction block and in other regions, a value of a weighted sum result block may be used as it is.

Alternatively, a first prediction block, a second prediction block and a third prediction block may be simultaneously used for a weighted sum operation. In this case, for a region included in all of a first prediction block, a second prediction block and a third prediction block (i.e., a top-right sub-block), a first weighted block is obtained by a weighted sum operation of a first prediction block, a second prediction block and a third prediction block. On the other hand, for a region which is included in a first prediction block and a third prediction block, but is not included in a second prediction block (i.e., top sub-blocks excluding a top-right sub-block), a second weighted block is obtained by a weighted sum operation of a first prediction block and a third prediction block. For a region which is included in a first prediction block, but is not included in any of a second prediction block and a third prediction block, a value of a first prediction block may be used as it is. In other words, a final prediction block obtained by performing a weighted sum for a first prediction block, a second prediction block and a third prediction block may be configured with a first weighted block, a second weighted block and a partial region of a first prediction block.

To improve encoding efficiency, instead of accumulating a weighted sum operation, a weighted sum for a plurality of prediction blocks may be performed regardless of order. In this case, a weight applied to the remaining prediction blocks excluding a first prediction block may be the same. Meanwhile, a weight applied to a first prediction block and other prediction blocks may be the same or different.

According to a prediction mode used to derive each prediction block, weighted sum order may be determined. As an example, a block generated by intra prediction among the remaining prediction blocks excluding a first prediction block may be used for a weighted sum operation before prediction blocks generated by inter prediction or intra block copy. Alternatively, conversely, a block generated by inter prediction or intra block copy among the remaining prediction blocks excluding a first prediction block may be used for a weighted sum operation before prediction blocks generated by intra prediction.

Alternatively, a weighted sum operation may be performed for prediction blocks predicted in the same prediction mode. Afterwards, a final prediction block may be generated by performing a weighted sum for a weighted sum result block of each prediction mode. As an example, a first weighted sum result block is obtained by performing a weighted sum for prediction blocks generated by intra prediction among a plurality of prediction blocks and a second weighted sum result block is obtained by performing a weighted sum for prediction blocks generated by inter prediction. Afterwards, a final prediction block may be obtained by performing a weighted sum for a first weighted sum result block and a second weighted sum result block.

Meanwhile, in deriving a weighted sum result block for each prediction mode, a first prediction block may be excluded. In this case, a final prediction block may be generated by performing a weighted sum for a weighted sum block per prediction mode and a first prediction block.

A weight and/or an offset used to generate a weighted sum result block for a prediction mode may be the same or different per prediction mode.

A weighted sum operation using a prediction block generated by intra prediction may be performed only for a sub-block that falls within WEIGHT_INTRALINETHRES_ABOVE lines from the top boundary of a current block and falls within WEIGHT_INTRALINETHRES_LEFT lines from the left boundary of a current block. In this case, WEIGHT_INTRALINETHRES_ABOVE may be 0, 1, 2, 4 or a height of a current block. WEIGHT_INTRALINETHRES_LEFT may be 0, 1, 2, 4 or a width of a current block.

WEIGHT_INTRALINETHRES_ABOVE and WEIGHT_I NTRALINETHRES_LEFT may be predefined in an encoding device and a decoding device.

Alternatively, according to an intra prediction mode used to derive a current block or a prediction block, at least one of WEIGHT_INTRALINETHRES_ABOVE and WEIGHT_ INTRALINETHRES_LEFT may be adaptively determined. As an example, when an intra prediction mode is a directional intra prediction mode and an index of a directional intra prediction mode is greater than a threshold value, a value of WEIGHT_INTRALINETHRES_LEFT may be set to be larger than in other cases.

On the other hand, when an intra prediction mode is a directional intra prediction mode and an index of a directional intra prediction mode is smaller than a threshold value, a value of WEIGHT_INTRALINETHRES_LEFT may be set to be smaller than in other cases.

Alternatively, when an intra prediction mode is a directional intra prediction mode and an index of a directional intra prediction mode is greater than a threshold value, a value of WEIGHT_INTRALINETHRES_ABOVE may be set to be smaller than in other cases.

On the other hand, when an intra prediction mode is a directional intra prediction mode and an index of a directional intra prediction mode is smaller than a threshold value, a value of WEIGHT_INTRALINETHRES_ABOVE may be set to be larger than in the other cases.

A threshold value may be one of a vertical right mode, a horizontal bottom mode, 0, HOR_IDX, VER_IDX, HOR_IDX/2, HOR_IDX/4, NUM_LUMA_MODE−HOR_IDX/2+1, NUM_LUMA_MODE−HOR_IDX/4+1 or a positive integer. The HOR_IDX and VER_IDX represent an index of a horizontal mode and a vertical mode, respectively.

Step of Entropy Encoding/Decoding Encoding Information (S2230, S2310)

Encoding information for performing a multi-prediction block method may be entropy-coded into a bitstream or may be entropy-decoded from a bitstream.

At least one of encoding information for performing a multi-prediction block method may be entropy-encoded/decoded in at least one of a parameter set, a header, a brick, a CTU, a CU, a PU, a TU, a CB, a PB or a TB.

In this case, at least one of a parameter set, a header, a brick, a CTU, a CU, a PU, a TU, a CB, a PB or a TB may be at least one of a video parameter set, a decoding parameter set, a sequence parameter set, an adaptation parameter set, a picture parameter set, a picture header, a sub-picture header, a slice header, a tile group header, a tile header, a brick, a coding tree unit (CTU), a coding unit (CU), a prediction unit (PU), a transform unit (TU), a coding block (CB), a prediction block (PB) or a transform block (TB), etc.

Here, prediction using a multi-prediction block method may be performed by using encoding information for performing the multi-prediction block method in at least one of the signaled parameter set, header, brick, CTU, CU, PU, TU, CB, PB or TB unit.

For example, when at least one of encoding information for performing the multi-prediction block method is entropy-coded/decoded in a sequence parameter set, prediction using a multi-prediction block method may be performed by using at least one of encoding information for performing a multi-prediction block method having the same syntax element value in a unit of a sequence.

As another example, when at least one of encoding information for performing the multi-prediction block method is entropy-encoded/decoded in a slice header, prediction using a multi-prediction block method may be performed by using at least one of encoding information for performing a multi-prediction block method having the same syntax element value in a unit of a slice.

As another example, when at least one of encoding information for performing the multi-prediction block method is entropy-encoded/decoded in an adaptation parameter set, prediction using a multi-prediction block method may be performed by using at least one of encoding information for performing a multi-prediction block method having the same syntax element value in a unit referring to the same adaptation parameter set.

As another example, when at least one of encoding information for performing the multi-prediction block method is entropy-encoded/decoded in a CU, prediction using a multi-prediction block method may be performed by using at least one of encoding information for performing a multi-prediction block method having the same syntax element value in the same CU unit.

As another example, when at least one of encoding information for performing the multi-prediction block method is entropy-encoded/decoded in a CB, prediction using a multi-prediction block method may be performed by using at least one of encoding information for performing a multi-prediction block method having the same syntax element value in the same CB unit.

As another example, when at least one of encoding information for performing the multi-prediction block method is entropy-encoded/decoded in a PU, prediction using a multi-prediction block method may be performed by using at least one of encoding information for performing a multi-prediction block method having the same syntax element value in the same PU unit.

As another example, when at least one of encoding information for performing the multi-prediction block method is entropy-encoded/decoded in a PB, prediction using a multi-prediction block method may be performed by using at least one of encoding information for performing a multi-prediction block method having the same syntax element value in the same PB unit.

As another example, when at least one of encoding information for performing the multi-prediction block method is entropy-encoded/decoded in a TU, prediction using a multi-prediction block method may be performed by using at least one of encoding information for performing a multi-prediction block method having the same syntax element value in the same TU unit.

As another example, when at least one of encoding information for performing the multi-prediction block method is entropy-encoded/decoded in a TB, prediction using a multi-prediction block method may be performed by using at least one of encoding information for performing a multi-prediction block method having the same syntax element value in the same TB unit.

For example, at least one of encoding information for performing the multi-prediction block method may be derived according to at least one of a coding parameter of a current tile/a current slice/a current sequence/a current image/a current block/a CTB/a CTU, encoding information for performing a multi-prediction block method, motion information, a prediction mode and an intra prediction mode.

When at least one of encoding information for performing the multi-prediction block method does not exist in a bitstream, at least one of at least one of encoding information for performing the multi-prediction block method may be inferred as a first value (e.g., 0).

An adaptation parameter set may refer to a parameter set that may be referred to and shared in a different picture, subpicture, slice, tile group, tile or brick. In addition, information in an adaptation parameter set may be used by referring to a different adaptation parameter set in a subpicture, a slice, a tile group, a tile or a brick in a picture.

In addition, an adaptation parameter set may refer to a different adaptation parameter set by using an identifier of a different adaptation parameter set in a subpicture, a slice, a tile group, a tile or a brick in a picture.

In addition, an adaptation parameter set may refer to a different adaptation parameter set by using an identifier of a different adaptation parameter set in a slice, a tile group, a tile or a brick in a subpicture.

In addition, an adaptation parameter set may refer to a different adaptation parameter set by using an identifier of a different adaptation parameter set in a tile or a brick in a slice.

In addition, an adaptation parameter set may refer to a different adaptation parameter set by using an identifier of a different adaptation parameter set in a brick in a tile.

By including information on an adaptation parameter set identifier in a parameter set or header of the subpicture, an adaptation parameter set corresponding to a corresponding adaptation parameter set identifier may be used in a subpicture.

By including information on an adaptation parameter set identifier in a parameter set or header of the tile, an adaptation parameter set corresponding to a corresponding adaptation parameter set identifier may be used in a tile.

By including information on an adaptation parameter set identifier in a header of the brick, an adaptation parameter set corresponding to a corresponding adaptation parameter set identifier may be used in a brick.

The picture may be partitioned into at least one tile row and at least one tile column.

The subpicture may be partitioned into at least one tile row and at least one tile column within a picture. The subpicture is a region with a rectangular/square shape within a picture and may include at least one CTU. In addition, at least one tile/brick/slice may be included in one subpicture.

The tile is a region with a rectangular/square shape within a picture and may include at least one CTU. In addition, a tile may be partitioned into at least one brick.

The brick may refer to at least one CTU row within a tile. A tile may be partitioned into at least one brick and each brick may have at least one CTU row. A tile that is not partitioned into at least two may also refer to a brick.

The slice may include at least one tile within a picture and may include at least one brick within a tile.

An encoder may perform a determination of a prediction mode (intra prediction, inter prediction, intra block copy), a determination of a surrounding block which will be included in a motion vector candidate list, a configuration of a motion vector candidate list, a determination of motion information (a determination of a motion vector candidate index, addition of a motion vector difference, derivation using a technology for deriving a decoder-side motion vector), derivation of an intra prediction mode (a determination of a surrounding block which will be included in a MPM list, a configuration of a MPM list, a determination of an intra prediction mode index, a determination of an intra prediction mode), a determination of a surrounding block which will be included in a block vector candidate list, a configuration of a block vector candidate list, a determination of a block vector, a determination of a block vector candidate index, a determination of a block vector difference, addition of a block vector difference, generation of a multi-prediction block (a determination of a prediction mode of each prediction block, a determination of a coding parameter of each prediction mode, a determination of a position and a size of each prediction block), a determination of a prediction mode by using at least one of the above-described embodiments in a process of performing a weighted sum of a multi-block (a determination of a weight value/map and an offset value/map for each prediction block, weighted sum order, a weighted sum method), a determination of a surrounding block which will be included in a motion vector candidate list, a configuration of a motion vector candidate list, a determination of motion information, derivation of an intra prediction mode, a determination of a surrounding block which will be included in a block vector candidate list, a configuration of a block vector candidate list, a determination of a block vector, a determination of a block vector candidate index, a determination of a block vector difference, addition of a block vector difference, generation of a multi-prediction block and a weighted sum of a multi-block. In addition, a decoder may perform a determination of a prediction mode by using at least one of the above-described embodiments in the process, a determination of a surrounding block which will be included in a motion vector candidate list, a configuration of a motion vector candidate list, a determination of motion information, derivation of an intra prediction mode, a determination of a surrounding block which will be included in a block vector candidate list, a configuration of a block vector candidate list, a determination of a block vector, a determination of a block vector candidate index, a determination of a block vector difference, addition of a block vector difference, generation of a multi-prediction block and a weighted sum of a multi-block.

The embodiments of the present invention may be applied according to a size of at least one of a coding block, a prediction block, a block and a unit. A size here may be defined as the minimum size and/or the maximum size to apply the embodiments or may be defined as a fixed size to which the embodiments are applied. In addition, in the embodiments, a first embodiment may be applied in a first size and a second embodiment may be applied in a second size. In other words, the embodiments may be applied in combination according to a size. In addition, the embodiments of the present disclosure may be applied only when a size is equal to or greater than the minimum size and less than or equal to the maximum size. In other words, the embodiments may be applied only when a block size is within a certain scope.

In addition, the embodiments of the present disclosure may be applied only when a size is equal to or greater than the minimum size and less than or equal to the maximum size, wherein the minimum size and the maximum size may be a size of one of a block and a unit, respectively.

In other words, a block targeted for the minimum size and a block targeted for the maximum size may be different. For example, the embodiments of the present disclosure may be applied only when a current block size is equal to or greater than the minimum size of a block and is less than or equal to the maximum size of a block.

For example, the embodiments may be applied only when a size of a current block is equal to or greater than 8×8. For example, the embodiments may be applied only when a size of a current block is equal to or greater than 16×16. For example, the embodiments may be applied only when a size of a current block is equal to or greater than 32×32. For example, the embodiments may be applied only when a size of a current block is equal to or greater than 64×64. For example, the embodiments may be applied only when a size of a current block is equal to or greater than 128×128. For example, the embodiments may be applied only when a size of a current block is 4×4. For example, the embodiments may be applied only when a size of a current block is less than or equal to 8×8. For example, the embodiments may be applied only when a size of a current block is less than or equal to 16×16. For example, the embodiments may be applied only when a size of a current block is equal to or greater than 8×8 and less than or equal to 16×16. For example, the embodiments may be applied only when a size of a current block is equal to or greater than 16×16 and less than or equal to 64×64.

The embodiments of the present disclosure may be applied according to a temporal layer. A separate identifier may be signaled to identify a temporal layer to which the embodiments may be applied and the embodiments may be applied to a temporal layer specified by a corresponding identifier. An identifier here may be defined as the minimum layer and/or the maximum layer to which the embodiment may be applied or may be defined as indicating a specific layer to which the embodiment is applied.

For example, the embodiments may be applied only when a temporal layer of a current image is the lowest layer. For example, the embodiments may be applied only when a temporal layer identifier of a current image is 0. For example, the embodiments may be applied only when a temporal layer identifier of a current image is equal to or greater than 1. For example, the embodiments may be applied only when a temporal layer of a current image is the highest layer.

In the above-described embodiments, at least one of a determination of a prediction mode, a determination of a surrounding block which will be included in a motion vector candidate list, a configuration of a motion vector candidate list, a determination of motion information, derivation of an intra prediction mode, a determination of a surrounding block which will be included in a block vector candidate list, a configuration of a block vector candidate list, a determination of a block vector, a determination of a block vector candidate index, a determination of a block vector difference, addition of a block vector difference, generation of a multi-prediction block and whether to perform a weighted sum of a multi-block may be determined based on at least one of coding parameters such as a prediction mode of a current block, an intra prediction mode, an inter prediction mode, a color component, a size, a shape, a motion vector candidate index, a motion vector candidate list, a motion vector difference, a type of a comparison operation, an intra block copy mode, a reference image, a reference image index, a coding parameter of a surrounding block, whether to derive a decoder motion vector, etc.

As in the embodiment of the present disclosure, a reference picture set used in a process of reference picture list construction and reference picture list modification may use at least one reference image list of L0, L1, L2 and L3.

According to the embodiment of the present disclosure, when calculating boundary strength in a deblocking filter, at least one and up to N motion vectors of a current block may be used. Here, N represents a positive integer equal to or greater than 1 and may be 2, 3, 4, etc.

Even when a motion vector has at least one of a 16-pel unit, a 8-pel unit, a 4-pel unit, an integer-pel unit, a ½-pel unit, a ¼-pel unit, a ⅛-pel unit, a 1/16-pel unit, a 1/32-pel unit and a 1/64-pel unit, the embodiments of the present disclosure may be applied. In addition, in an encoding/decoding process of a current block, a motion vector may be selectively used per the pixel unit.

A slice type to which the embodiments of the present disclosure are applied may be defined and the embodiments of the present invention may be applied according to a corresponding slice type.

A shape of a block to which the embodiments of the present disclosure are applied may have a square shape or a non-square shape.

At least one of syntax elements related to a determination of a prediction mode, a determination of a surrounding block which will be included in a motion vector candidate list, a configuration of a motion vector candidate list, a determination of motion information, derivation of an intra prediction mode, a determination of a surrounding block which will be included in a block vector candidate list, a configuration of a block vector candidate list, a determination of a block vector, a determination of a block vector candidate index, a determination of a block vector difference, addition of a block vector difference, generation of a multi-prediction block, a weighted sum of a multi-block, etc. such as an indicator, an index, a flag, etc. which is entropy-encoded in the encoder and is entropy-decoded in the decoder may use at least one of the following binarization, debinarization and entropy encoding/decoding method.

Signed 0-th order Exp_Golomb binarization/debinarization method (se(v))

Signed k-th order Exp_Golomb binarization/debinarization method (sek(v))

Unsigned 0-th order Exp_Golomb binarization/debinarization method for a positive integer (ue(v))

Unsigned k-th order Exp_Golomb binarization/debinarization method for a positive integer (uek(v))

Fixed-length binarization/debinarization method (f(n))

Truncated Rice binarization/debinarization method or Truncated Unary binarization/debinarization method (tu(v))

Truncated Binary binarization/debinarization method (tb (v))

Context adaptive arithmetic encoding/decoding method (ae(v))

Bytewise bit string (b(8))

Signed integer binarization/debinarization method (i(n))

Unsigned positive integer binarization/debinarization method (u(n))

In this case, u(n) may refer to a fixed-length binarization/debinarization method.

Unary binarization/debinarization method it is limited only to any one of the embodiments and is not applied to an encoding/decoding process of a current block, and a specific embodiment or at least one combination of the embodiments may be applied to an encoding/decoding process of a current block.

The embodiments may be performed using the same method by the encoding apparatus 1600 and by the decoding apparatus 1700. Also, the image may be encoded/decoded using at least one of the embodiments or at least one combination thereof.

The order of application of the embodiments may be different from each other by the encoding apparatus 1600 and the decoding apparatus 1700, and the order of application of the embodiments may be (at least partially) identical to each other by the encoding apparatus 1600 and the decoding apparatus 1700.

The embodiments may be performed for each of a luma signal and a chroma signal, and may be equally performed for the luma signal and the chroma signal.

The form of a block to which the embodiments are applied may have a square or non-square shape.

Whether at least one of the above-described embodiments is to be applied and/or performed may be determined based on a condition related to the size of a block. In other words, at least one of the above-described embodiments may be applied and/or performed when the condition related to the size of a block is satisfied. The condition includes a minimum block size and a maximum block size. The block may be one of blocks described above in connection with the embodiments and the units described above in connection with the embodiments. The block to which the minimum block size is applied and the block to which the maximum block size is applied may be different from each other.

For example, when the block size is equal to or greater than the minimum block size and/or less than or equal to the maximum block size, the above-described embodiments may be applied and/or performed. When the block size is greater than the minimum block size and/or less than or equal to the maximum block size, the above-described embodiments may be applied and/or performed.

For example, the above-described embodiments may be applied only to the case where the block size is a predefined block size. The predefined block size may be 2×2, 4×4, 8×8, 16×16, 32×32, 64×64, or 128×128. The predefined block size may be $(2*SIZE_X)\times(2*SIZE_Y)$. $SIZE_X$ may be one of integers of 1 or more. $SIZE_Y$ may be one of integers of 1 or more.

For example, the above-described embodiments may be applied only to the case where the block size is equal to or greater than the minimum block size. The above-described embodiments may be applied only to the case where the block size is greater than the minimum block size. The minimum block size may be 2×2, 4×4, 8×8, 16×16, 32×32, 64×64, or 128×128. Alternatively, the minimum block size may be $(2*SIZE_{MIN\_X})\times(2*SIZE_{MIN\_Y})$. $SIZE_{MIN\_X}$ may be one of integers of 1 or more. $SIZE_{MIN\_Y}$ may be one of integers of 1 or more.

For example, the above-described embodiments may be applied only to the case where the block size is less than or equal to the maximum block size. The above-described embodiments may be applied only to the case where the block size is less than the maximum block size. The maximum block size may be 2×2, 4×4, 8×8, 16×16, 32×32, 64×64, or 128×128. Alternatively, the maximum block size may be $(2*SIZE_{MAX\_X})\times(2*SIZE_{MAX\_Y})$. $SIZE_{MAX\_X}$ may be one of integers of 1 or more. $SIZE_{MAX\_Y}$ may be one of integers of 1 or more.

For example, the above-described embodiments may be applied only to the case where the block size is equal to or greater than the minimum block size and is less than or equal to the maximum block size. The above-described embodiments may be applied only to the case where the block size is greater than the minimum block size and is less than or equal to the maximum block size. The above-described embodiments may be applied only to the case where the block size is equal to or greater than the minimum block size and is less than the maximum block size. The above-described embodiments may be applied only to the case where the block size is greater than the minimum block size and is less than the maximum block size.

In the above-described embodiments, the block size may be a horizontal size (width) or a vertical size (height) of a block. The block size may indicate both the horizontal size and the vertical size of the block. The block size may indicate the area of the block. Each of the area, minimum block size, and maximum block size may be one of integers equal to or greater than 1. In addition, the block size may be the result (or value) of a well-known equation using the horizontal size and the vertical size of the block, or the result (or value) of an equation in embodiments.

Further, in the embodiments, a first embodiment may be applied to a first size, and a second embodiment may be applied to a second size.

The embodiments may be applied depending on a temporal layer. In order to identify a temporal layer to which the embodiments are applicable, a separate identifier may be signaled, and the embodiments may be applied to the temporal layer specified by the corresponding identifier. Here, the identifier may be defined as the lowest (bottom) layer and/or the highest (top) layer to which the embodiments are applicable, and may be defined as being indicating a specific layer to which the embodiments are applied. Further, a fixed temporal layer to which the embodiments are applied may also be defined.

For example, the embodiments may be applied only to the case where the temporal layer of a target image is the lowermost layer. For example, the embodiments may be applied only to the case where the temporal layer identifier of a target image is equal to or greater than 1. For example, the embodiments may be applied only to the case where the temporal layer of a target image is the highest layer.

A slice type or a tile group type to which the embodiments to which the embodiments are applied may be defined, and the embodiments may be applied depending on the corresponding slice type or tile group type.

In the above-described embodiments, it may be construed that, during the application of specific processing to a specific target, assuming that specified conditions may be required and the specific processing is performed under a specific determination, a specific coding parameter may be replaced with an additional coding parameter when a description has been made such that whether the specified conditions are satisfied is determined based on the specific coding parameter, or such that the specific determination is made based on the specific coding parameter. In other words, it may be considered that a coding parameter that influences the specific condition or the specific determination is merely exemplary, and it may be understood that, in addition to the specific coding parameter, a combination of one or more additional coding parameters functions as the specific coding parameter.

In the above-described embodiments, although the methods have been described based on flowcharts as a series of steps or units, the present disclosure is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the disclosure.

The above-described embodiments include examples in various aspects. Although all possible combinations for indicating various aspects cannot be described, those skilled in the art will appreciate that other combinations are possible in addition to explicitly described combinations. Therefore, it should be understood that the present disclosure includes other replacements, changes, and modifications belonging to the scope of the accompanying claims.

The above-described embodiments according to the present disclosure may be implemented as a program that can be executed by various computer means and may be recorded on a computer-readable storage medium. The computer-readable storage medium may include program instructions, data files, and data structures, either solely or in combination. Program instructions recorded on the storage medium may have been specially designed and configured for the present disclosure, or may be known to or available to those who have ordinary knowledge in the field of computer software.

A computer-readable storage medium may include information used in the embodiments of the present disclosure. For example, the computer-readable storage medium may include a bitstream, and the bitstream may contain the information described above in the embodiments of the present disclosure.

A bitstream may include a computer-executable code and/or program. A computer-executable code and/or program may include information described in embodiments and may include syntax elements described in embodiments. In other words, information and syntax elements described in embodiments may be considered as a computer-executable code in a bitstream and may be considered as at least part of a computer-executable code and/or program expressed by a bitstream. The computer-readable storage medium may include a non-transitory computer-readable medium.

Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

As described above, although the present disclosure has been described based on specific details such as detailed components and a limited number of embodiments and drawings, those are merely provided for easy understanding of the entire disclosure, the present disclosure is not limited to those embodiments, and those skilled in the art will practice various changes and modifications from the above description.

Accordingly, it should be noted that the spirit of the present embodiments is not limited to the above-described embodiments, and the accompanying claims and equivalents and modifications thereof fall within the scope of the present disclosure.

The invention claimed is:

1. A method of decoding an image, the method comprising:

generating, based on first prediction information, a first prediction block for a current sub-block included in a current block;

generating, based on second prediction information, a second prediction block for the current sub-block included in the current block; and generating a weighted prediction block of the current sub-block included in the current block through a weighted sum of the first prediction block and the second prediction block, wherein the second prediction information is derived from a neighboring block adjacent to the current sub-block, wherein in response to the neighboring block being coded by inter-prediction with LIC (Local Illumination Compensation), the second prediction information comprises motion information of the neighboring block and LIC parameters, and wherein the second prediction block is generated by modifying an initial prediction block, generated based on the motion information of the neighboring block, with the LIC parameters of the neighboring block.

2. The method of claim 1, wherein when a difference between a maximum value and a minimum value of prediction samples within the first prediction block is smaller than a threshold value, it is allowed to generate the second prediction block.

3. The method of claim 1, wherein a number of main gradients is determined from a HoG (Histogram of Gradient) generated based on a gradient of each prediction sample in the first prediction block, and wherein when the number of the main gradients is smaller than a threshold value, it is allowed to generate the second prediction block.

4. The method of claim 1, wherein in response to the neighboring block being coded by intra prediction, the second prediction information comprises an intra prediction mode derived from the neighboring block, and wherein the second prediction block is generated by performing intra prediction based on the intra prediction mode derived from the neighboring block.

5. The method of claim 4, wherein the intra prediction mode is obtained from a HoG (Histogram of Gradient) obtained by applying a filter to the neighboring block.

6. The method of claim 1, wherein a first weight applied to the first prediction block and a second weight applied to the second prediction block are determined by comparing a first template matching cost obtained by applying first prediction information to a current template adjacent to the current block and a second template matching cost obtained by applying the second prediction information to the current template.

7. The method of claim 6, wherein a third template matching cost is further considered to determine the first weight and the second weight, and wherein the third template matching cost is obtained based on a weighted predicted template which is obtained through a weighted sum of a first predicted template and a second predicted template, the first predicted template being obtained by predicting the template with the first prediction information and the second predicted template being obtained by predicting the template with the second prediction information.

8. The method of claim 7, wherein when the first template matching cost is the smallest among three template matching costs, the weighted prediction block for the sub-block is derived to be the same as the first prediction block for the sub-block.

9. The method of claim 7, wherein a number of lines on which the weighted sum between the first prediction block and the second prediction block within the sub-block is performed differs according to the first template matching cost, the second template matching cost and the third template matching cost.

10. A method of encoding an image, the method comprising:

generating, based on first prediction information, a first prediction block for a current sub-block included in a current block;

generating, based on second prediction information, a second prediction block for the current sub-block included in the current block; and generating a weighted prediction block of the current sub-block included in the current block through a weighted sum of the first prediction block and the second prediction block, wherein first prediction information used to generate the first prediction block is different from prediction information used to generate the second prediction block, and wherein the second prediction information is derived from a neighboring block adjacent to the current sub-block, wherein in response to the neighboring block being coded by inter-prediction with LIC (Local Illumination Compensation), the second prediction information comprises motion information of the neighboring block and LIC parameters, and wherein the second prediction block is generated by modifying an initial prediction block, generated based on the motion information of the neighboring block, with the LIC parameters of the neighboring block.

11. A method of transmitting compressed video data, comprising:

generating the compressed video data by encoding an image; and transmitting the compressed video data, wherein obtaining the compressed video data comprises:

generating, based on first prediction information, a first prediction block for a current sub-block included in a current block;

generating, based on second prediction information, a second prediction block for the current sub-block included in the current block; and generating a weighted prediction block of the current sub-block included in the current block through a weighted sum of the first prediction block and the second prediction block, wherein first prediction information used to generate the first prediction block is different from prediction information used to generate the second prediction block, and wherein the second prediction information is derived from a neighboring block adjacent to the current sub-block, wherein in response to the neighboring block being coded by inter-prediction with LIC (Local Illumination Compensation), the second prediction information comprises motion information of the neighboring block and LIC parameters, and wherein the second prediction block is generated by modifying an initial prediction block, generated based on the motion information of the neighboring block, with the LIC parameters of the neighboring block.

12. The method of claim 1, wherein whether a multiple prediction method is applied to the current block or not is determined based on a prediction mode of a neighboring block adjacent to the current block.

13. The method of claim 12, wherein in response to the neighboring block being coded by an IBC (Intra Block Copy) mode, applying the multiple prediction method to the current block is not allowed.

14. The method of claim 1, wherein in response to the LIC being applied to the current block, the first prediction block is generated by modifying an initial prediction block, generated based on motion information of the current block, with LIC parameters of the current block.

15. The method of claim 14, wherein the LIC parameters of the current block are obtained based on a difference between reconstruction samples in a current template and reconstruction samples in a reference template, the current template being adjacent to the current block and the reference template being specified by the motion information of the current block.

* * * * *